US012506830B2

(12) United States Patent
Kats et al.

(10) Patent No.: US 12,506,830 B2
(45) Date of Patent: Dec. 23, 2025

(54) DYNAMIC REWARDABLE ACTIVITY VALUE DETERMINATION AND ALLOCATION

(71) Applicant: DIGITAL REEF, INC., Dallas, TX (US)

(72) Inventors: Paul Kats, Los Angeles, CA (US); Jeffrey Chernick, Venice Beach, CA (US); Mark Randall Goldston, Beverly Hills, CA (US); Sohrab Pirayesh, Los Angeles, CA (US)

(73) Assignee: DIGITAL REEF, INC., Dallas, TX (US)

( * ) Notice: Subject to any disclaimer, the term of this patent is extended or adjusted under 35 U.S.C. 154(b) by 0 days.

(21) Appl. No.: 18/608,158

(22) Filed: Mar. 18, 2024

(65) Prior Publication Data

US 2024/0223700 A1 Jul. 4, 2024

Related U.S. Application Data

(63) Continuation of application No. 17/946,379, filed on Sep. 16, 2022, now Pat. No. 11,936,807, which is a (Continued)

(51) Int. Cl.
*H04M 3/42* (2006.01)
*H04M 1/2757* (2020.01)
(Continued)

(52) U.S. Cl.
CPC ..... *H04M 3/42051* (2013.01); *H04M 1/2757* (2020.01); *H04M 1/576* (2013.01);
(Continued)

(58) Field of Classification Search
CPC .. G07F 17/32; G07F 17/3223; G07F 17/3239; G07F 17/3225; G07F 17/3288;
(Continued)

(56) References Cited

U.S. PATENT DOCUMENTS 7,412,049 B1 8/2008 Koch
7,904,067 B1 3/2011 Tiwari et al.
(Continued)

FOREIGN PATENT DOCUMENTS

CN 102348172 A 2/2012
CN 103931165 A 7/2014
(Continued)

OTHER PUBLICATIONS

Extended European Search Report dated Apr. 5, 2024 for EP Application No. 23197024.5, 8 pages.
(Continued)

*Primary Examiner* — Kwasi Karikari
(74) *Attorney, Agent, or Firm* — RMCK Law Group, PLC

(57) ABSTRACT

A Sender Controlled Media (SCM) platform user is presented incentives for performing rewardable platform activities that result in accruing points in a user-specific account from which points can be redeemed by transfer or crypto-currency conversion to an external user-designated wallet. A reward received for each instance of a rewardable platform activity is determined based on a range of platform context including a target average points payout, an aggregated total points payout over a distribution period, and a type of rewardable platform activity.

20 Claims, 85 Drawing Sheets

Related U.S. Application Data continuation of application No. 17/695,136, filed on Mar. 15, 2022, now Pat. No. 11,451,659, which is a continuation-in-part of application No. 17/356,630, filed on Jun. 24, 2021, now Pat. No. 11,394,821, which is a continuation of application No. PCT/US2020/045897, filed on Aug. 12, 2020, and a continuation-in-part of application No. 16/659,071, filed on Oct. 21, 2019, now Pat. No. 11,381,679, which is a continuation of application No. PCT/US2018/064962, filed on Dec. 11, 2018, and a continuation-in-part of application No. 16/158,000, filed on Oct. 11, 2018, now Pat. No. 10,511,711, which is a continuation of application No. 15/725,645, filed on Oct. 5, 2017, now Pat. No. 10,104,228, which is a continuation-in-part of application No. 15/469,772, filed on Mar. 27, 2017, now Pat. No. 9,871,902, which is a continuation of application No. 15/142,200, filed on Apr. 29, 2016, now Pat. No. 9,609,124, said application No. 15/725,645 is a continuation-in-part of application No. PCT/US2016/030083, filed on Apr. 29, 2016.

(60) Provisional application No. 62/885,562, filed on Aug. 12, 2019, provisional application No. 62/597,309, filed on Dec. 11, 2017, provisional application No. 62/486,495, filed on Apr. 18, 2017, provisional application No. 62/459,742, filed on Feb. 16, 2017, provisional application No. 62/155,706, filed on May 1, 2015.

(51) Int. Cl.
*H04M 1/57* (2006.01)
*H04M 1/72403* (2021.01)
*H04M 1/72439* (2021.01)
*H04M 19/04* (2006.01)

(52) U.S. Cl.
CPC ... *H04M 1/72403* (2021.01); *H04M 1/72439* (2021.01); *H04M 3/42042* (2013.01); *H04M 19/04* (2013.01); *H04M 19/041* (2013.01); *H04M 2201/50* (2013.01); *H04M 2203/306* (2013.01)

(58) Field of Classification Search
CPC ............. G07F 17/3237; G07F 17/3255; G07F 17/3258; G07F 17/3227; G07F 17/3218; G07F 17/3232; G07F 17/3211; G07F 17/3272; G07F 17/3286; G07F 17/3262; G07F 17/3209; G07F 17/3206; G07F 17/326; G07F 17/3246; G07F 17/3274; H04W 72/30; H04W 8/24; H04W 4/24; H04W 76/10; H04W 36/144; H04W 4/025; H04W 12/082; H04W 76/18; H04W 60/06; H04W 12/108; H04W 4/38; H04W 12/68; H04W 4/35; H04W 72/25; H04W 92/18
See application file for complete search history.

(56) References Cited

U.S. PATENT DOCUMENTS

| | | | |
|---|---|---|---|
| 7,995,728 | B1 | 8/2011 | Martin et al. |
| 8,548,418 | B1 | 10/2013 | Jintaseranee et al. |
| 8,554,836 | B1 | 10/2013 | Wilson et al. |
| 8,576,270 | B1 | 11/2013 | Vitale et al. |
| 8,712,841 | B1 | 4/2014 | Rajagopalan et al. |
| 9,002,410 | B2 | 4/2015 | Tsui et al. |
| 9,203,954 | B1 | 12/2015 | Rensburg et al. |
| 9,304,621 | B1 | 4/2016 | Wakim et al. |
| 9,609,124 | B2 | 3/2017 | Kats et al. |
| 9,871,902 | B2 | 1/2018 | Kats et al. |
| 9,929,998 | B1 | 3/2018 | Soundararajan et al. |
| 10,104,228 | B2 | 10/2018 | Kats et al. |
| 10,511,711 | B2 | 12/2019 | Kats et al. |
| 10,951,557 | B2 | 3/2021 | Lu et al. |
| 11,394,821 | B2 * | 7/2022 | Kats ................. H04M 3/42042 |
| 11,451,659 | B2 | 9/2022 | Kats et al. |
| 2002/0164977 | A1 * | 11/2002 | Link, II ................ G06Q 30/02 455/414.1 |
| 2004/0005880 | A1 | 1/2004 | Shanahan |
| 2005/0143103 | A1 | 6/2005 | Bjorgan et al. |
| 2005/0180554 | A1 | 8/2005 | Alston et al. |
| 2006/0111085 | A1 | 5/2006 | Lee |
| 2006/0140200 | A1 | 6/2006 | Black et al. |
| 2006/0199570 | A1 | 9/2006 | Vendrow |
| 2006/0291641 | A1 | 12/2006 | Barclay et al. |
| 2006/0291841 | A1 | 12/2006 | Fukumoto et al. |
| 2007/0005585 | A1 | 1/2007 | Feng et al. |
| 2007/0161382 | A1 | 7/2007 | Melinger et al. |
| 2007/0189488 | A1 | 8/2007 | Stoops |
| 2007/0211872 | A1 | 9/2007 | Cai et al. |
| 2007/0230678 | A1 | 10/2007 | Bloebaum et al. |
| 2007/0297599 | A1 | 12/2007 | Sylvain |
| 2008/0137828 | A1 | 6/2008 | Chmaytelli |
| 2008/0162731 | A1 | 7/2008 | Kauppinen et al. |
| 2008/0172292 | A1 | 7/2008 | Hurowitz et al. |
| 2008/0219425 | A1 | 9/2008 | Wang |
| 2008/0220816 | A1 | 9/2008 | Ryu et al. |
| 2008/0235104 | A1 | 9/2008 | Chow et al. |
| 2009/0029721 | A1 | 1/2009 | Doraswamy |
| 2009/0041222 | A1 | 2/2009 | Guven |
| 2009/0067602 | A1 | 3/2009 | Rudolph |
| 2009/0113005 | A1 | 4/2009 | Gregg et al. |
| 2009/0318196 | A1 | 12/2009 | Sakakura et al. |
| 2010/0014647 | A1 | 1/2010 | Subramaniam |
| 2010/0146437 | A1 | 6/2010 | Woodcock et al. |
| 2010/0150332 | A1 | 6/2010 | Soo et al. |
| 2010/0274847 | A1 | 10/2010 | Anderson et al. |
| 2010/0330972 | A1 | 12/2010 | Angiolillo |
| 2011/0014932 | A1 | 1/2011 | Estevez |
| 2011/0051914 | A1 | 3/2011 | Neuman et al. |
| 2011/0288912 | A1 | 11/2011 | McCrea et al. |
| 2011/0313861 | A1 | 12/2011 | Lawrence, III et al. |
| 2011/0314390 | A1 | 12/2011 | Park et al. |
| 2012/0036440 | A1 | 2/2012 | Dare et al. |
| 2012/0102409 | A1 | 4/2012 | Fan et al. |
| 2012/0158863 | A1 | 6/2012 | Kikin-Gil et al. |
| 2012/0190333 | A1 | 7/2012 | Portman et al. |
| 2012/0209850 | A1 | 8/2012 | Kikin-Gil et al. |
| 2013/0072164 | A1 | 3/2013 | Balannik et al. |
| 2013/0093719 | A1 | 4/2013 | Tokutake |
| 2013/0293663 | A1 | 11/2013 | Chang et al. |
| 2013/0303151 | A1 | 11/2013 | Johnson |
| 2014/0018113 | A1 | 1/2014 | Wosk et al. |
| 2014/0095576 | A1 | 4/2014 | Edamadaka et al. |
| 2014/0128047 | A1 | 5/2014 | Edwards et al. |
| 2014/0149248 | A1 | 5/2014 | Bao |
| 2014/0169539 | A1 | 6/2014 | Mumick et al. |
| 2015/0103990 | A1 | 4/2015 | Lee |
| 2015/0206000 | A1 | 7/2015 | El et al. |
| 2015/0213490 | A1 | 7/2015 | Oikonomidis |
| 2015/0229781 | A1 | 8/2015 | Ashton et al. |
| 2015/0269623 | A1 | 9/2015 | Andersson |
| 2015/0278872 | A1 | 10/2015 | Raghavan et al. |
| 2016/0142540 | A1 | 5/2016 | Hickey et al. |
| 2016/0171981 | A1 | 6/2016 | Mohajer et al. |
| 2016/0219142 | A1 | 7/2016 | Brown |
| 2016/0337279 | A1 | 11/2016 | Lu et al. |
| 2017/0201608 | A1 | 7/2017 | Kats et al. |
| 2017/0220556 | A1 | 8/2017 | Pasternack |
| 2018/0048762 | A1 | 2/2018 | Kats et al. |
| 2019/0045052 | A1 | 2/2019 | Kats et al. |
| 2020/0053206 | A1 | 2/2020 | Kats et al. |
| 2020/0053207 | A1 | 2/2020 | Kats et al. |
| 2020/0053208 | A1 | 2/2020 | Kats et al. |
| 2020/0053209 | A1 | 2/2020 | Kats et al. |

(56) References Cited

U.S. PATENT DOCUMENTS

| | | | |
|---|---|---|---|
| 2020/0053210 | A1 | 2/2020 | Kats et al. |
| 2020/0053211 | A1 | 2/2020 | Kats et al. |
| 2020/0053212 | A1 | 2/2020 | Kats et al. |
| 2020/0053213 | A1 | 2/2020 | Kats et al. |
| 2020/0053214 | A1 | 2/2020 | Kats et al. |
| 2020/0053215 | A1 | 2/2020 | Kats et al. |

FOREIGN PATENT DOCUMENTS

| | | | |
|---|---|---|---|
| CN | 104335612 | A | 2/2015 |
| CN | 105208056 | A | 12/2015 |
| CN | 107258098 | A | 10/2017 |
| EP | 3222069 | A1 | 9/2017 |
| JP | 2007272227 | A | 10/2007 |
| KR | 1020160005563 | A | 1/2016 |
| WO | 2012088772 | A1 | 7/2012 |
| WO | 2016178984 | A1 | 11/2016 |
| WO | 2019118469 | A2 | 6/2019 |

OTHER PUBLICATIONS

U.S. Appl. No. 62/155,706, filed May 1, 2015, Paul Kats.
U.S. Appl. No. 62/459,742, filed Feb. 16, 2017, Paul Kats.
U.S. Appl. No. 62/486,495, filed Apr. 8, 2017, Paul Kats.
Extended European Search Report dated Jul. 21, 2021 for EP Application No. 18889857.1, 8 pages.
International Search Report and Written Opinion for International Application No. PCT/US2020/045897 mailed Nov. 19, 2020, 19 pages.
PCT International Preliminary Report on Patentability mailed Nov. 16, 2017 for International Application No. PCT/US2016/030083, 10 pages.
PCT International Search Report and Written Opinion mailed Jul. 29, 2016 for International Application No. PCT/US2016/030083, 11 pages.
PCT International Search Report and Written Opinion mailed Aug. 14, 2019 for International Application No. PCT/US2018/064962, 29 pages.
USPTO NonFinal Office Action mailed Jan. 29, 2020 for U.S. Appl. No. 16/658,887, 18 pages.
USPTO NonFinal Office Action mailed Jan. 31, 2020 for U.S. Appl. No. 16/659,116, 12 pages.
USPTO NonFinal Office Action mailed Feb. 14, 2020 for U.S. Appl. No. 16/659,201, 10 pages.
USPTO NonFinal Office Action mailed Mar. 3, 2020 for U.S. Appl. No. 16/659,278, 14 pages.
USPTO NonFinal Office Action mailed Apr. 9, 2018 for U.S. Appl. No. 15/725,645, 13 pages.
USPTO NonFinal Office Action mailed May 19, 2020 for U.S. Appl. No. 16/659,330, 11 pages.
USPTO NonFinal Office Action mailed May 21, 2020 for U.S. Appl. No. 16/659,071, 8 pages.
USPTO NonFinal Office Action mailed May 22, 2020 for U.S. Appl. No. 16/658,777, 10 pages.
USPTO NonFinal Office Action mailed Jun. 9, 2020 for U.S. Appl. No. 16/659,240, 10 pages.
USPTO NonFinal Office Action mailed Jun. 30, 2017 for U.S. Appl. No. 15/469,772, 16 pages.
USPTO NonFinal Office Action mailed Jul. 28, 2016 for U.S. Appl. No. 15/142,200, 13 pages.
USPTO NonFinal Office Action mailed Dec. 20, 2018 for U.S. Appl. No. 16/158,000, 11 pages.
USPTO Notice of Allowance mailed Jan. 20, 2017 for U.S. Appl. No. 15/142,200, 12 pages.
USPTO Notice of Allowance mailed Feb. 3, 2020 for U.S. Appl. No. 16/659,003, 10 pages.
USPTO Notice of Allowance mailed Jun. 19, 2019 for U.S. Appl. No. 16/158,000, 8 pages.
USPTO Notice of Allowance mailed Aug. 13, 2018 for U.S. Appl. No. 15/725,645, 7 pages.
USPTO Notice of Allowance mailed Oct. 11, 2017 for U.S. Appl. No. 15/469,772, 8 pages.
USPTO Notice of Allowance mailed Nov. 6, 2019 for U.S. Appl. No. 16/158,000, 8 pages.

* cited by examiner

Home - Feed

Notifications

- Like
- Re-Vyng (Add to your Library)
- Comment
- More (Report This Post)

Record button is fixed to bottom right

Video plays without audio as you scroll down.

Tap maximizes video, plays the audio.

Add Video

Add Audio

3100A

FIG. 31B
84% 10:35 AM
MicChat
Stitcher
Zillow
58°
Pasadena
Sohrab
So hungry!!!!
tap to reply
6
Phone
Messages
Internet
Contacts
Apps

3100B

3100C

3100E

3300

| ITEM ID | MEDIA TYPE | SCCMC REF | CHANNEL 1 REF | CHANNEL 2 REF | |
|---|---|---|---|---|---|
| SELFIE 1 | IMAGE | SENDER 1 | - | | |
| GIF 1 | IMAGE | - | COMEDY | | |
| GIF 2 | IMAGE | SENDER 1 | WORK | | |
| HOME MOVIE 1 | VIDEO | SENDER 2 | FAMILY | PERSONAL | |
| MY NY TRIP 2017 | IMAGE | SENDER 3 | PERSONAL | | |
| | | | | | |
| | | | | | |
| | | | | | |

FIG 33

FIG. 37
yaaasss!
YAASS!
YAASSQUEENS

FIG. 43
4308
Veronia
+1 (234) 567-8910
slide to answer
4306
SET AS MY CALLER ID
4304
Smile & Wave!
Hold to record your Caller ID video
4302
100

Type, choose or record why you are calling. 4902

Caller's message shows as Video/visual voicemail 4904

6602

6602

| Field ID | Field Type / Description |
| --- | --- |
| CID 1 | Free form text caller ID ASCII characters (max 15) |
| CID 2 | Configurable caller phone number |
| FIXED 1 | Actual caller phone number |
| TOKEN | Secure caller token reference |
| USER 1 | Link field ex.: https://scm.server.com/=part?/=time? |
| SOURCE | Name of telephony system originating this call |

6604 6608 6606

DYNAMIC REWARDABLE ACTIVITY VALUE DETERMINATION AND ALLOCATION

CROSS-REFERENCE TO RELATED APPLICATIONS

This application is a continuation of U.S. patent application Ser. No. 17/946,379 filed Sep. 16, 2022, which is a continuation of U.S. patent application Ser. No. 17/695,136 filed on Mar. 15, 2022 (now U.S. Pat. No. 11,451,659), which is a continuation-in-part of U.S. patent application Ser. No. 17/356,630 filed on Jun. 24, 2021 (now U.S. Pat. No. 11,394,821), which (i) is a bypass continuation of International Application PCT/US2020/045897 filed on Aug. 12, 2020, and published as WO/2021/030419 on Feb. 18, 2021, which claims the benefit of U.S. Provisional Pat. App. No. 62/885,562, filed on Aug. 12, 2019, and (ii) is a continuation-in-part of U.S. patent application Ser. No. 16/659,071 filed on Oct. 21, 2019 (now U.S. Pat. No. 11,381,679). U.S. patent application Ser. No. 16/659,071 is: (i) a bypass continuation of International Application PCT/US2018/064962 filed on Dec. 11, 2018, and published as WO/2019/118469 on Jun. 20, 2019, which claims the benefit of U.S. Provisional Pat. App. No. 62/597,309, filed on Dec. 11, 2017; and (ii) a continuation-in-part of U.S. patent application Ser. No. 16/158,000 filed on Oct. 11, 2018 (now U.S. Pat. No. 10,511,711).

U.S. patent application Ser. No. 16/158,000 is a continuation of U.S. patent application Ser. No. 15/725,645 filed on Oct. 5, 2017 (now U.S. Pat. No. 10,104,228), which claims the benefit of U.S. Provisional Pat. App. No. 62/459,742 filed on Feb. 16, 2017, and U.S. Provisional Pat. App. No. 62/486,495 filed on Apr. 18, 2017. U.S. patent application Ser. No. 15/725,645 is also: (i) a bypass continuation-in-part of International Application PCT/US2016/30083 filed on Apr. 29, 2016, and published as WO2016/178984, which claims priority to U.S. Provisional Pat. App. No. 62/155,706 filed on May 1, 2015; and (ii) a continuation-in-part of U.S. patent application Ser. No. 15/469,772 filed on Mar. 27, 2017 (now U.S. Pat. No. 9,871,902). U.S. patent application Ser. No. 15/469,772 is a continuation of U.S. patent application Ser. No. 15/142,200 filed on Apr. 29, 2016 (now U.S. Pat. No. 9,609,124), which claims priority to U.S. Provisional Pat. App. No. 62/155,706 filed on May 1, 2015.

Each of the above-identified applications is hereby incorporated by reference in its entirety as if fully set forth herein.

TECHNICAL FIELD

This application relates to the field of mobile devices, and more particularly to the management of content, such as ring tones and video, that may be played when one user contacts another via a mobile device.

BACKGROUND

The proliferation of mobile devices has enabled a wide range of highly personalized social interactions, such as sharing of photos, videos, and music, among other types of content. However, the contact function of a typical mobile device is quite generic, typically providing an alphabetized list of names, with phone numbers and other basic contact information. Calls and texts between users typically identify the user, and may even play a selected ring tone that is selected by the recipient of the call or text to play when a particular individual calls or texts, but the event of a call or text is otherwise un-customized.

Users of a platform that provides the features above may perform various platform activities, such as placing a call, but without a mechanism for receiving a reward for performing this and other activities.

A need exists for improved methods and systems for dynamic reward value determination and allocation to users who perform rewardable platform activities through mobile devices operating in a context of a sender-controlled media platform.

SUMMARY

In embodiments, methods and systems of content matching may include a system that includes a computer-to-computer interface configured to facilitate communication between a messaging platform that is adapted to associate a hash tag with a message and a content matching platform, the communication between the messaging platform and the content matching platform comprising at least one of messages and hash tags. The system may include a natural language processing facility of the content matching platform producing an output comprising at least one of an understanding, theme, emotion, and intent of a message communicated from the messaging platform. The system may also include a metadata matching facility in communication with the content matching platform, the metadata matching facility configured to identify candidate hash tags by determining similarity of hash tags in a pool of hash tags with an output of the natural language processing, the content matching facility communicating at least one of the candidate hash tags to the messaging platform over the computer-to-computer interface. The system may further include an electronic user interface that facilitates user selection of one or more of the candidate hash tags that the content matching facility communicates to the messaging platform for associating with the message processed by the natural language processing facility. In the system, the computer-to-computer interface may include an Application Programming Interface (API). In the system, determining similarity of hash tags with an output of the natural language processing of the message may include determining similarity of metadata associated with the hash tags. In the system, the metadata associated with the hash tags may be generated by processing the hash tags with the natural language processing facility. In the system, the at least one of the candidate hash tags may indicate an emotion of the message. In the system, the at least one of the candidate hash tags may indicate an intent of the message. In the system, the content matching platform may tag the message with the at least one candidate hash tags and communicates the tagged message to the messaging platform. The system may further include the content matching platform communicating the output of natural language processing of the message to the messaging platform.

In embodiments, methods and systems of content matching may include a system that includes a computer-to-computer interface configured to facilitate communication between a messaging platform that is adapted to associate a hash tag with a message and a content matching platform, the communication between the messaging platform and the content matching platform comprising at least one of messages and hash tags. The system may further include a natural language processing facility of the content matching platform producing an output comprising at least one of an understanding, theme, emotion, and intent of a message communicated from the messaging platform and of a plurality of hash tags in a pool of hash tags. The system may further include a metadata matching facility configured to determine candidate hash tags by determining similarity of an output of the natural language processing for the plurality of hash tags with an output of the natural language processing for the message communicated from the messaging platform, the content matching facility communicating at least one candidate hash tag based on the determined similarity to the messaging platform over the computer-to-computer interface. In the system, the output of the natural language processing of the at least one candidate hash tag may be more similar to the output of the natural language processing of the message than the natural language processing of any of the other hash tags in the pool of hash tags. The system may further include an electronic user interface that facilitates user selection of one or more of the candidate hash tags that the content matching facility communicates to the messaging platform for associating with the message processed by the natural language processing facility. In the system, the computer-to-computer interface may be an Application Programming Interface (API). In the system, determining similarity of hash tags with an output of the natural language processing of the message may include determining similarity of metadata associated with the hash tags. In the system, the metadata associated with the hash tags may be generated by processing the hash tags with the natural language processing facility.

In embodiments, methods and systems of content matching may include communicating a portion of a message from a messaging platform to a content matching platform. The method may also include processing text in the portion of the message with natural language processing, thereby generating an NLP output comprising at least one of a theme, understanding, intent, and emotion of the message. The message may also include determining similarity of the NLP output with a plurality of hash tags. The method may also include communicating at least one candidate hash tag for the message to the messaging platform based on the determined similarity. In the method, determining similarity may include comparing a portion of the NLP output with the hash tags. In the method, determining similarity may include comparing a portion of the NLP output with metadata descriptive of the hash tags. The method may further include facilitating user selection of the at least one candidate hash tag by presenting in an electronic user interface a plurality of hash tags based on the determined similarity. In the method, the communicating a portion of a message and communicating at least one candidate hash tag may utilize an Application Programming Interface between the content matching platform and the messaging platform.

Provided herein are methods and systems for a sender-controlled contact media content type (referred to herein in some cases as "SCCMC") that can be sent among mobile devices, including addressing the contacts systems and methods of such devices to provide rich interactions among users upon the occurrence of contact events. Such methods and systems may occur at the level of the contacts functions of a mobile device, such as being initiated directly upon a contact independent of the need for an application on the recipient's mobile device. In embodiments, the SCCMC can play, for example, on the lock screen of the recipient's mobile device as an incoming call occurs, or the SCCMC can display on a contact screen when the phone is unlocked and active, including, without limitation, on the home screen of the recipient's mobile device, on a screen that displays when the recipient is on a phone call and/or when the recipient is using an application on the recipient's mobile device. The methods and systems described herein may allow a first user (user A) to create custom photos, videos, ring tones and the like that are played, under control of user A, on the mobile device of another user (user B), such as when user A calls or texts user B's device. For example, user A may create a video, with associated audio content, and deliver that content to user B's phone, and have the video and audio play on user B's phone when user A contacts user B, such as by text or call. The content may, in a single broadcast act, comprise both voice layer and data layer content and use, in a coordinated fashion, voice layer and data layer transmission mediums. Such content is referred to herein as a sender-controlled contact media content item ("SCCMC") or, in some cases as a "Ving" or a "Vyng."

Provided herein are methods and systems for providing a sender-controlled contact media content data structure that is adapted to be created using a mobile device of a sender and sent to at least one mobile device of at least one recipient; and a host computing system including at least one server for managing the sender-controlled contact media content data structure; wherein the sender-controlled contact media data structure is adapted to be displayed via the contacts function of the mobile device of a recipient under control of the sender of the sender-controlled contact media content data structure.

Methods and systems are provided herein, including methods and systems that include a sender-controlled contact media content data structure that is adapted to be created using a mobile device of a sender and sent to at least one mobile device of at least one recipient; and a host computing system including at least one server for managing the sender-controlled contact media content data structure; wherein the sender-controlled contact media data structure is adapted to be displayed on a screen of a recipient's mobile device when the recipient's device is turned on and able to receive at least one of a data signal and a voice signal, wherein the sender-controlled contact media data structure displays content that is under the control of the sender of the sender-controlled contact media content data structure.

In embodiments, the sender-controlled contact media content data structure uses voice layer and data layer transmission mediums in a single broadcast act by the sender. In embodiments, the screen of the recipient's mobile device is the screen that displays upon the occurrence of a contact event at the recipient's mobile device. In embodiments, the screen of the recipient's mobile device is the lock screen of the recipient's mobile device. In embodiments, the screen of the recipient's mobile device is the home screen of the recipient's mobile device. In embodiments, the screen of the recipient's mobile device is an active screen of the recipient's mobile device that displays when the mobile device is unlocked. In embodiments, the screen of the recipient's mobile device is a screen that displays while the recipient is on a phone call using the recipient's mobile device.

The methods and systems disclosed herein may include an installable application running on the host computing system for establishing a data connection between the mobile device of the sender and the at least one mobile device of the at least one recipient. In embodiments, the installable application is configured to allow discovery of peer devices in proximity to allow an exchange of the sender-controlled contact media content data structure between the mobile device of the sender and the at least one mobile device of the at least one recipient. In embodiments, the installable application enables a user interface that allows the creation of the sender-controlled contact media content data structure on the mobile device of the sender.

In embodiments, the host computing system enables downloading of the sender-controlled contact media content data structure on the at least one mobile device of the at least one recipient.

In embodiments, the mobile device of the sender and the at least one mobile device of the at least one recipient are communicatively coupled to the server, and wherein the server is a content server. In embodiments, the mobile device of the sender is communicatively coupled to mobile devices of a plurality of recipients, such that each of the recipient devices receives the sender-controlled contact media content data structure. In some cases, this is described as a "bomb," a "Vyng bomb," or the like.

In embodiments, a plurality of sender-controlled contact media data structures is organized into a channel, such that at least one recipient's mobile device plays a series of the sender-controlled contact media data structures upon a plurality of contact events from at least one sender. In embodiments, the channel is associated with at least one of a topic of interest to a sender, a topic of interest to at least one recipient and a social graph of at least one of a sender and at least one recipient. In embodiments, the sender-controlled contact media data structures are selected by the sender from a curated library of sender-controlled contact media data structures. In embodiments, the library is curated by an algorithm based on a topic of interest indicated by at least one of the sender and the recipient. In embodiments, the library is curated by an editor based on the subject matter of the channel.

The methods and systems described herein may include methods and systems for taking a sender-controlled contact media content data structure that is created using a mobile device of a sender; providing a host system that enables transmission of the sender-controlled contact media content data structure from the mobile device of the sender to at least one mobile device of at least one recipient; and causing the display of the sender-controlled contact media content data structure on a screen of the at least one mobile device of the at least one recipient when the at least one recipient's device is turned on and able to receive at least one of a data signal and a voice signal, wherein the sender-controlled contact media data structure displays content that is under the control of the sender of the sender-controlled contact media content data structure. In embodiments, the sender-controlled contact media content data structure uses voice layer and data layer transmission mediums in a single broadcast act by the sender. In embodiments, the screen of the recipient's mobile device is the screen that displays upon the occurrence of a contact event at the recipient's mobile device. In embodiments, the screen of the recipient's mobile device is the lock screen of the recipient's mobile device. In embodiments, the screen of the recipient's mobile device is the home screen of the recipient's mobile device. In embodiments, the screen of the recipient's mobile device is an active screen of the recipient's mobile device that displays when the mobile device is unlocked. In embodiments, the screen of the recipient's mobile device is a screen that displays while the recipient is on a phone call using the recipient's mobile device. In embodiments, the sender-controlled contact media content data structure comprises one or more of audio, video, contact data, and metadata. In embodiments, sending the sender-controlled contact media content data structure comprises sending a text message, wherein the text message includes an embedded link to facilitate installation of an application by the at least one recipient on the at least one mobile device of the at least one recipient upon tapping of the embedded link by the at least one recipient, wherein the installable application establishes a data connection between the mobile phone of the sender and the mobile phone of the at least one recipient.

In embodiments, the methods and systems described herein may further include downloading of the sender-controlled contact media content data structure on the at least one mobile device of the at least one recipient using the embedded link, wherein the downloading of the sender-controlled contact media content data structure enables displaying a contact of the sender as being associated with the sender-controlled contact media content data structure on the at least one mobile device of the at least one recipient.

In embodiments, the methods and systems described herein may further include initiating a contact by the mobile device of the sender with the at least one mobile device of the at least one recipient such that the sender-controlled contact media content data structure is displayed on the at least one mobile device of the at least one recipient when the contact between the mobile device of the sender and the at least one mobile device of the at least one recipient initiates. In embodiments, the contact is initiated between the mobile device of the sender and the at least one mobile device of the at least one recipient when the sender places a phone call. In embodiments, the contact is initiated between the mobile device of the sender and the at least one mobile device of the at least one recipient when the sender sends a text message to the at least one mobile device of the at least one recipient.

In embodiments, the methods and systems described herein may further include enabling a user interface on the mobile device of the sender to allow the creation of the sender-controlled contact media content data structure through the user interface. In embodiments, the user interface further allows editing of the sender-controlled contact media content data structure from an external source that stores the sender-controlled contact media content data structure. In embodiments, the external source comprises one of a cloud repository and a library of a third-party content provider. In embodiments, the user interface allows for the creating the sender-controlled contact media content data structure associated with an emotional state of the sender. In embodiments, the emotional state is indicated through a data field in metadata associated with the sender-controlled contact media content data structure. In embodiments, the emotional state is indicated by one or more of a facial expression, an image, a sound, and an emoticon.

In embodiments, the methods and systems described herein may further include setting a privacy control through the installable application to limit publication of the sender-controlled contact media content data structure to a select audience.

The methods and systems disclosed herein may include methods and systems for segregating the created sender-controlled contact media content data structure into one or more of audio, video, and metadata components; associating each of the components of the created sender-controlled contact media content data structure with a particular tone; and storing the tone for each of the components locally on the mobile device of the sender. In embodiments, the methods and systems described herein may further include uploading the tone for each of the components on an application server or a content server. In embodiments, the methods and systems described herein may further include allowing previewing the sender-controlled contact media content data structure; and adding custom details to the sender-controlled contact media content data structure, either before or after sending the sender-controlled contact media content data structure to the at least one recipient. In embodiments, causing the display of the sender-controlled contact media content data structure on the screen of the at least one mobile device is triggered by detection of the passing of the recipient's mobile device into an area defined by a geofence.

The methods and systems disclosed herein may include establishing a personal channel having at least one media item by accessing an installable application from the mobile device and selecting at least one pre-configured menu item that permits access to the at least one media item as part of the personal channel. The personal channel may include the at least one media item selected from at least one media content source. The at least one media content source may include at least one of sender-controlled contact media content received from other devices, content available locally on the mobile device, content created or captured by the mobile device, content obtained from social network servers, and combinations thereof. The methods and systems disclosed herein may further include sharing the personal channel of the sender with at least one recipient of the sender-controlled contact media content data structure.

The methods and systems may further include initiating a contact with the mobile device of the at least one recipient for notifying the mobile device of the at least one recipient to provide a media content for use as the sender-controlled contact media content data structure associated with the at least one recipient. In some examples, the at least one recipient may be selected from a contact list or phonebook available on the sender's mobile device. The methods and systems may enable providing a link to a website to the at least one recipient for uploading some media content that may be used as the sender-controlled contact media content data structure associated with the at least one recipient.

Methods and systems are provided herein for establishing a personal channel of media content items to be displayed on the lockscreen of a user's mobile device in response to a triggering contact event. These may include providing a host system that enables handling of contact media content data structures for controlled display of the contact media content data structures on the lockscreen of at least one mobile device; causing a display of the contact media content data structure on a screen of the at least one mobile device of the at least one recipient when the at least one recipient's device is turned on and able to receive at least one of a data signal and a voice signal, where the contact media data structure displays media content on the lockscreen of the at least one mobile device upon receipt of a triggering contact event to the at least one mobile device; and enabling a user to establish a personal channel of contact media content having at least one media item by accessing an installable application on the at least one mobile device and selecting at least one pre-configured menu item that designates the at least one media item as part of the personal channel. In embodiments, the personal channel includes the at least one media item selected from at least one media content source, where the at least one media content source includes at least one of a sender-controlled contact media content received from another device, content available locally on the at least one mobile device, content created using the mobile device, and content obtained from a server. The methods and systems may further include enabling the user to share the personal channel with at least one other user of a mobile application that is configured to interact with the host system. The methods and systems may further include initiating a contact with the mobile device of the at least one other user of a mobile device that is configured to interact with the host system to request that the other user designate a contact media content item to be displayed when the other user initiates a triggering contact to the user of the at least one mobile device. In embodiments, the at least one other user is selected from a contact list available on the mobile device of the sender. In embodiments, notifying the mobile device of the at least one other user includes sending a link for a website where the other user is invited to upload the media content to be displayed when the other user initiates a triggering contact to the user of the at least one mobile device.

In embodiments, methods and systems described herein may include a systems that may include a lockscreen capable application executing on a recipient computing device, the lockscreen capable device facilitating user interface access to a communication function of the recipient computing device while the computing device remains in a locked state, wherein the lockscreen capable application intercepts a communication received by the recipient device, the communication associated with at least one communication application or service operable on the recipient computing device. The system may further include a content association application executing on the recipient computing device, wherein the content association application facilitates associating a content item with the communication, based on a relevance of the content item with the communication, the relevance determined from processing the intercepted communication to identify an association based on metadata descriptive of content items stored in a library of content items. The system may further include automatically associating a content item in response to detecting an indication of an intercepted communication. Automatically associating may include associating at least one of a GIF and a video with the communication. Automatically associating may further include determining an emotional state of the communication and associating content in response to the determined emotional state. Automatically associating may further include determining a context of the communication and associating content in response to the determined context.

Methods and systems described herein may include a system that may include a sender computing device configured with a sender-controlled contact media content-based application (SCCMC application), the SCCMC application executing on the sender device and interfacing with a sender state detection application executing on the sender device, wherein the sender state detection application detects at least one of a mood of the sender, a physical status of the sender, an emotional state of the sender and a mental state of the sender, and wherein the SCCMC application uses the detected state of the sender to determine an SCCMC structure that corresponds to the detected state and associates information that identifies the determined SCCMC structure with an outgoing message for a recipient. In the system, the outgoing message is associated with a phone call from the sender to a recipient. In the system, the SCCMC application further determines a content channel associated with at least one of the sender and the recipient and bases the determined SCCMC structure on the determined content channel.

Methods and systems described herein may include a method that may include adapting a sender-controlled contact media content structure in response to receiving an indication of a current state of a sender of the sender-controlled contact media content structure, wherein the state is one of a mood, a physical status, an emotional status, and a mental status. In the method, the state is determined in response to facial recognition of the sender contemporaneously with the sender sending a message from a sender's computing device to a recipient's computing device. In the method, adapting occurs while a recipient computing device is processing a contact event resulting from receipt of a message from a sender's computing device.

Methods and systems described herein may include a method that may include operating a sender-controlled contact media content structure creation platform on a computing device that, in response to intercepting a message being communicated between messaging applications resident on a sender's mobile device and a recipient's mobile device, offers customized services of the platform to a user of the mobile device on which the message is intercepted. In the method, the message is intercepted on a sender mobile device prior to the message being sent to the recipient. In the system, the message is intercepted on a recipient mobile device prior to the messaging application resident on the recipient's mobile device receiving the message. In the system, intercepting includes developing an understanding of the message with natural language processing, the understanding further used to facilitate making suggestions for video/image/audio of an SCCMC to be associated with the message.

Methods and systems described herein may include a method that may include operating a sender-controlled contact media content (SCCMC) structure contact event handling platform. The platform may perform the steps including intercepting a message associated with other messaging applications resident on the mobile device, wherein the message is targeted to a first messaging application of the other messaging applications; processing the message with natural language processing to determine at least one SCCMC structure; forwarding the determined at least one SCCMC structure to an SCCMC unified messaging user interface; processing the SCCMC structure with the unified messaging interface; presenting at least one of text and imagery determined from the processing of the SCCMC structure in the unified messaging interface; and delivering a message that is compatible with the other messaging applications to the first messaging application. In the method, the message is intercepted on a recipient mobile device. In the method, the platform operation may be performed while the recipient's mobile device is locked. In the method, the message is intercepted on a sender's mobile device.

Methods and systems described herein may include a method that may include integrating at least one of audio, video, imagery, and text indicated by a sender-controlled contact media content (SCCMC) structure into an augmented reality environment in response to detecting a mobile-to-mobile device contact event, the integrating indicating the contact event.

Methods and systems described herein include a lockscreen capable application executing on a recipient computing device. The lockscreen capable application is configured to facilitate user interface access to a communication function of the recipient computing device while the recipient computing device remains in a locked state. The lockscreen capable application is configured to intercept a communication received by the recipient computing device. The intercepted communication is associated with at least one of a communication application or a communication service operable on the recipient computing device. The methods and systems further include a content association application executing on the recipient computing device. The content association application is configured to facilitate associating a media content item with the intercepted communication based on a relevance of the media content item with the intercepted communication. The relevance is determined by automatically processing the intercepted communication to identify an association based on metadata descriptive of media content items stored in a library of the media content items.

In embodiments, the associating of the media content item is performed automatically by the content association application in response to detecting an indication of the intercepted communication.

In embodiments, the content association application is configured to associate at least one of a GIF and a video with the intercepted communication.

In embodiments, the processing automatically of the intercepted communication to identify the association includes automatically determining an emotional state of the intercepted communication and automatically associating at least one of the media content items in response to the automatically determined emotional state.

In embodiments, the processing automatically of the intercepted communication to identify the association includes determining a context of the intercepted communication and associating at least one of the media content items in response to the determined context.

Methods and systems described herein include a sender computing device configured with a sender-controlled contact media content-based application (SCCMC application). The SCCMC application is configured to execute on the sender device and interface with a sender state detection application that executes on the sender device. The sender state detection application is configured to detect a detected state that includes at least one of a mood of the sender, a physical status of the sender, an emotional state of the sender and a mental state of the sender. The SCCMC application uses the detected state of the sender to determine an SCCMC structure that corresponds to the detected state and associates information that identifies the determined SCCMC structure with an outgoing message for a recipient.

In embodiments, the outgoing message is associated with a phone call from the sender to a recipient.

In embodiments, the SCCMC application is configured to determine a content channel associated with at least one of the sender and the recipient and to base the determined SCCMC structure on the determined content channel.

Methods and systems described herein include adapting a sender-controlled contact media content structure in response to receiving an indication of a current state of a sender of the sender-controlled contact media content structure. The current state of the sender is one of a mood, a physical status, an emotional status, and a mental status.

In embodiments, the current state of the sender is determined in response to facial recognition of the sender contemporaneously with the sender sending a message from a sender's computing device to a recipient's computing device.

In embodiments, the adapting of the sender controlled contact media content occurs while a recipient's computing device is processing a contact event resulting from receipt of a message from a sender's computing device.

Methods and systems described herein include operating a sender-controlled contact media content structure creation platform on a computing device that, in response to intercepting a message being communicated between messaging applications resident on a sender's mobile device and a recipient's mobile device, offers customized services of the platform to a user of the mobile device on which the message is intercepted.

In embodiments, the message is intercepted on a sender mobile device prior to the message being sent to the recipient.

In embodiments, the message is intercepted on a recipient mobile device prior to the messaging application resident on the recipient's mobile device receiving the message.

In embodiments, the intercepting includes developing an understanding of the message with natural language processing, and wherein the understanding is further used to facilitate making suggestions for video/image/audio of a sender-controlled contact media content to be associated with the message.

Methods and systems described herein include operating a sender-controlled contact media content (SCCMC) structure contact event handling platform including intercepting a message associated with other messaging applications resident on the mobile device, wherein the message is targeted to a first messaging application of the other messaging applications. The methods and system also include processing the message with natural language processing to determine at least one SCCMC structure and forwarding the determined at least one SCCMC structure to an SCCMC unified messaging user interface. The methods and systems further include processing the SCCMC structure with the unified messaging interface, presenting at least one of text and imagery determined from the processing of the SCCMC structure in the unified messaging interface, and delivering the message that is compatible with the other messaging applications to the first messaging application.

In embodiments, the message is intercepted on a recipient's computing device.

In embodiments, the message is intercepted on a recipient computing device while the recipient's computing device is locked.

In embodiments, the message is intercepted on a sender's computing device.

Methods and systems described herein include integrating at least one of audio, video, imagery, and text indicated by a sender-controlled contact media content (SCCMC) structure into an augmented reality environment in response to detecting a mobile-to-mobile device contact event. The integrating of the at least one of audio, video, imagery, and text is an indicator of the contact event.

In embodiments, the methods and systems include adapting the sender-controlled contact media content structure in response to receiving an indication of a current state of a sender of the sender-controlled contact media content structure. The current state of the sender is one of a mood, a physical status, an emotional status, and a mental status.

In embodiments, the current state of the sender is determined in response to facial recognition of the sender contemporaneously with the sender sending a message from a sender's computing device to a recipient's computing device.

In embodiments, integrating includes developing an understanding of the message from the sender with natural language processing, and wherein the understanding is further used to facilitate making suggestions for video/image/audio of a sender-controlled contact media content to be associated with the message.

In embodiments, a smart phone dialer app may be adapted to work collaboratively with a business app and an SCM app/platform/service to enable a method of operating a smart phone dialer app executing on a processor of a smart phone. The method may include exchanging call information descriptive of a type of call capable of being made through the dialer with a business application via a business application computer interface. The method may further include sharing a portion of the call information with a sender controlled media (SCM) platform through a SCM platform computer interface. The method may further include receiving, responsively to the sharing, information descriptive of an SCM data structure that may be available to the platform and that may be associated with the call. The method may further include configuring a visual portion of the SCM data structure to be rendered in a user interface of the dialer app in connection with a call of the described type. In embodiments, the visual portion may be configured to be rendered contemporaneously with making the call through the dialer. In embodiments, the visual portion may be configured to be rendered after the dialer receives an indication of the call being answered. In embodiments, the visual portion may be configured to be rendered during dialing. In embodiments, the visual portion includes an offer that encourages a recipient to answer the call. In embodiments, the visual portion may be configured to be rendered after completion of the call. In embodiments, the visual portion includes an interactive element through which a recipient of the call can provide feedback on the call. In embodiments, rendering the visual portion occurs responsive to receiving an indication from the SCM platform of an action occurring responsive to the call being made, wherein the action occurring may be associated with a second smart phone to which the call was made. In embodiments, at least a portion of the visual portion of the SCM data structure may be streamed to the dialer app over a cellular network. In embodiments, sharing a portion of the call information descriptive of the call includes sharing a purpose of the call. In embodiments, sharing the purpose of the call includes transmitting a code that corresponds to an SCM content channel, the channel being selectable from a set of business-specific SCM content channels comprising a plurality of SCM data structures that are related to the purpose of the call. In embodiments, wherein sharing a portion of the call information descriptive of the call includes sharing an identifier of a target recipient of the call. In embodiments, sharing the identifier of the target recipient of the call includes transmitting a phone number of a target recipient smart phone through the SCM platform computer interface. In embodiments, the dialer may make the call to a target recipient identified in the information descriptive of the call. In embodiments, exchanging the call information descriptive of the call may occur before the dialer making the call. In embodiments, sharing the portion of the call information descriptive of the call occurs before the dialer making the call. In embodiments, the dialer makes the call responsive to the exchange of information descriptive of the call via the business application computer interface. In embodiments, the smart phone dialer app may be a native dialer app of the smart phone and the business application computer interface comprises an application programming interface of the smart phone adapted by a set of visual caller id business development tools to enable the native dialer app to interact with the business application.

In embodiments, a smart phone dialer app may be adapted to work collaboratively with a business app and an SCM app/platform/service smart phone dialer app that may be executable on a processor of a smart phone. The dialer app may include a business application computer interface through which the dialer app exchanges, with the business application, call information descriptive of a type call capable of being made through the dialer app. The dialer app may also include a sender-controlled media (SCM) platform computer interface through which the dialer app shares a portion of the call information and receives, responsively thereto, information descriptive of SCM content available to the platform that may be associated with the call. The dialer app may further include a computer user interface through which a visual portion of the SCM content may be rendered by a processor in connection with a call of the described type. In embodiments, the information descriptive of the call includes an identifier of a target recipient of the call. In embodiments, the identifier of the target recipient may be a phone number of the call being made through the dialer. In embodiments, the information descriptive of the call includes a business purpose for the call. In embodiments, the portion of information shared through the SCM platform computer interface includes a code that indicates a channel of SCM content, the channel being selectable from a set of business-specific SCM content channels. In embodiments, the portion of information shared through the SCM platform computer interface includes a code that indicates a SCM data structure required to be available on a call receiving device of a recipient of the call prior to the call being connected to the call receiving device. In embodiments, the call information descriptive of the call may be exchanged prior to the dialer initiating the call. In embodiments, the dialer initiates the call responsive to receiving the call information from the business application. In embodiments, the dialer app may be a native dialer app of the smart phone and the business application interface comprises an application programming interface of the smart phone adapted by a set of visual caller id business development tools to enable the native dialer app to interact with the business application. In embodiments, the visual portion may be rendered after the dialer receives an indication of the call being answered. In embodiments, the visual portion may be rendered during dialing. In embodiments, the visual portion may be configured to be rendered after completion of the call. In embodiments, the visual portion includes an interactive element through which a caller can provide feedback on the call.

In embodiments, a smart phone dialer app may be adapted to work collaboratively with a business app and an SCM app/platform/service to enable a method of adapting a native smart phone dialer app comprising. The method may include configuring an application programming computer interface of a business application to be responsive to communication from an application programming computer interface of a smart phone dialer app and to initiate communication with the smart phone dialer app based on an activity of a workflow of the business application. The method may further include configuring an application programming computer interface of the smart phone dialer app to communicate call descriptive information with a sender-controlled media (SCM) platform application programming computer interface, the call descriptive information having been received via the configured application programming computer interface of the business application, the smart phone application programming computer interface further configured to receive information descriptive of at least one SCM data structure available to the SCM platform based on the call descriptive information communicated to the SCM platform application programming interface.

In embodiments, workflow-specific SCM content presented on a recipient (customer) screen may be determined by a method that includes identifying call information available from a business application executing on a processor performing a call-action step of a business workflow. The method may further include providing that a smart phone portion of a sender-controlled media (SCM) data structure identifiable by at least a portion of the call information may be available to a dialer app executing on a smart phone of a customer identifiable in the call information by communicating at least one of an identifier of the SCM data structure and the smart phone portion thereof to the dialer app of the customer smart phone over a computer network. The method may yet further include updating the business application with indications of customer interactions with a user interface of the dialer app responsive to a call placed to the customer smart phone during the call-action step of the business workflow. In embodiments, the call information includes customer and call purpose. In embodiments, the identifier of the SCM data structure includes a link to content of an advertising network, wherein the link may be based on the call information. In embodiments, the method may further include using the call information available from the business application and context of the call placed to the customer to determine and incorporate at least one of a link to content of an advertising network and content of the advertising network into the information communicated to the dialer app of the customer. In embodiments, the smart phone portion may be configured to be rendered after the dialer receives an indication of the call being answered. In embodiments, the smart phone portion may be configured to be rendered during dialing. In embodiments, the smart phone portion includes an offer that encourages a recipient to answer the call. In embodiments, the smart phone portion may be configured to be rendered after completion of the call. In embodiments, the smart phone portion includes an interactive element through which a recipient of the call can provide feedback on the call.

In embodiments, workflow-specific SCM content presented on a recipient (customer) screen may be determined by a system that includes a business application executing on a processor performing a call-action step of a business workflow. The system may further include a source-controlled media (SCM) platform executing on a processor managing content rendering on a smart phone of a customer associated with the workflow. The system may further include a service constructed to identify customer and call purpose of the call-action from the business application, communicate the identified call action information to the SCM platform, and update the business application of customer actions that are responsive to the SCM platform managing the content rendering. The SCM platform may further be constructed to provide that a smart phone portion of an SCM data structure identifiable by a portion of the identified call action information may be available to a dialer app executing on the smart phone of the customer. In embodiments, the dialer app executing on the smart phone may be capable of rendering visual content referenced in the smart phone portion of the SCM data structure. In embodiments, the dialer app renders the visual content on a lock-screen of the customer smart phone. In embodiments, the smart phone portion may be configured to be rendered during dialing. In embodiments, the smart phone portion includes an offer that encourages a recipient to answer the call. In embodiments, the smart phone portion may be configured to be rendered after completion of the call. In embodiments, the smart phone portion includes an interactive element through which a recipient of the call can provide feedback on the call. In embodiments, to provide that the smart phone portion of the SCM data structure may be available to the customer smart phone dialer app, the SCM platform may be constructed with a computer-to-computer interface through which at least one of an identifier of the SCM data structure and the smart phone portion thereof may be communicated to the dialer app of the customer smart phone over a computer network. In embodiments, the dialer app executing on the smart phone of the customer may be constructed to communicate with the SCM platform via an application programming computer interface that may be customized with business-specific communication and rendering features. In embodiments, the system may further include a dialer app on a caller smart phone that may be constructed to initiate a call to the customer smart phone responsive to the identified customer information of the call-action. In embodiments, the dialer app on the caller smart phone may be further constructed to render call purpose related information on a user interface of the caller smart phone contemporaneously with initiating the call. In embodiments, the dialer app on the caller smart phone may be further constructed to render call purpose related information on a user interface of the caller smart phone responsive to receiving an indication of the call being answered. In embodiments, the dialer app on the caller smart phone may be further constructed to render information related to the business workflow on a user interface of the caller smart phone responsive to receiving an indication of a customer action determined by the customer smart phone dialer app. In embodiments, caller smart phone dialer app may be a native dialer app of the smart phone that may be constructed with an application programming interface that may be adapted by a set of visual caller id business development tools to enable the native dialer app to interact with the business application.

In embodiments, configuring a set of services to enable a business application to control content presented on a dialer screen of a customer placing a call to a business may be enabled by a system that includes a business application constructed to activate an ordered set of business workflow tasks responsive to receiving call related information of an incoming call to a business. The system may further include a set of visual content services providing that business-relevant visual content may be available to a dialer application of a device making the call. The system may further include a call handling set of services operating on a networked server. The services may have one or more functions including: a call intercepting function for intercepting the incoming call, a computer interface to the business application through which call related information may be provided to the business application contemporaneously with intercepting the call, a computer interface to the set of visual content services through which at least one of caller identification information and call context may be provided, a call evaluation circuit that determines a relationship of the caller with the business and updates the call related information based thereon, and a call connecting circuit that connects the intercepted incoming call to a business user based on aspects of the activated ordered set of business workflow tasks. The business application may be further constructed to present visual content on a dialer app screen of the connected business user, the visual content facilitating at least one of the ordered set of workflow tasks. In embodiments, the call handling set of services further indicates a candidate call type to the business application and the set of visual content services based on the determined caller relationship. In embodiments, the set of visual content services identifies a business-specific channel of content based on the candidate call type to be made available to the dialer application making the call. In embodiments, the business application validates the candidate call type based on context of the call that is available from the call handling set of services. In embodiments, the identifier of the data structure includes a link to content of an advertising network, wherein the link is based on the call information. In embodiments, the call handling set of services comprises using the call related information and the call context to determine and incorporate at least one of a link to content of an advertising network and content of the advertising network into the information communicated to the dialer application of the customer. In embodiments, the dialer application of a device making the call may be a native dialer app that may be constructed with an application programming interface that may be adapted by a set of visual caller id business development tools to enable the native dialer app to interact with the set of visual content services. In embodiments, the call evaluation circuit further determines call purpose based on the call context and updates the call related information based thereon.

In embodiments, configuring a set of services to enable a business application to control content presented on a dialer screen of a customer placing a call to a business may enable a method including intercepting an incoming call to a business. The method may further include determining a relationship of the caller with the business. The method may further include updating a set of call related information based thereon. The method may further include transmitting the set of call related information about the incoming call contemporaneously with intercepting the call to a business application constructed to activate an ordered set of business workflow tasks responsive to receiving the call related information. The method may yet further include transmitting a portion of the set of call related information to a set of visual content services that are constructed to provide that caller-specific visual content may be available to a dialer application of a device making the call. The method may further include connecting the intercepted incoming call to a business user based on aspects of the activated ordered set of business workflow tasks. The caller-specific visual content may be constructed for rendering in a user interface screen of the dialer application on the device making the call. In embodiments, the method may further include transmitting a candidate call type to the business application and to the set of visual content services based on the determined caller relationship. In embodiments, the method may further include identifying a business-specific channel of content, based on the candidate call type, to be made available to the dialer application making the call. In embodiments, the visual content services identify a business-specific channel of content, based on the candidate call type, to be made available to the dialer application making the call. In embodiments, the business application validates the candidate call type based on context of the call that is available from the call handling set of services. In embodiments, ensuring that caller-specific visual content is available to a dialer application of a device making the call includes streaming to the dialer application over a cellular network.

In embodiments, configuring a set of services to enable a business application to control content presented on a dialer screen of a customer placing a call to a business may enable a method of configuring a set of services to enable a business application to control content presented on a dialer screen of a customer calling a business. The method may include constructing a business application to activate an ordered set of business workflow tasks responsive to receiving call related information of an incoming call. The method may include constructing a set of visual content services that provide that caller-specific visual content may be available to a dialer application of a device making the call. The method may include constructing a call intercepting function for intercepting the incoming call. The method may include constructing a computer interface to the business application through which call related information may be provided to the business application contemporaneously with intercepting the call. The method may include constructing a computer interface to the set of visual content services through which at least one of caller identification information and call context may be provided. The method may include constructing a caller identification circuit that determines a relationship of the caller with the business and updates the call related information based thereon. The method may include constructing a call connecting circuit that connects the intercepted incoming call to a business user based on aspects of the activated ordered set of business workflow tasks. The caller-specific visual content may be constructed for rendering in a user interface screen of the dialer application on the device making the call.

In embodiments, configuring a set of services to enable business application control of and receipt of feedback from at least attempting to present call-specific SCM content to a customer as part of an interaction, e.g., via a phone call with the customer may enable a method. The method may include configuring a business application that performs a customer interaction workflow to make available, through an application programming interface, interaction information descriptive of a customer and a purpose of an interaction associated with an instance of execution of the workflow. The method may further include configuring a set of interaction setup services that accesses the available interaction information through the application programming interface and presents it to a smart phone dialer content rendering management platform that provides that content for rendering that may be identifiable by the interaction information may be available to a smart phone dialer app executing on a smart phone of the customer. The method may yet further include configuring a set of interaction response services that update the business application with information from the content rendering management platform that may be descriptive of customer actions that are responsive to the rendering. In embodiments, the set of interaction response services communicate with the business application through the application programming interface. In embodiments, the content rendering management platform provides that content for rendering may be available to the dialer application by communicating at least one of an identifier of a data structure comprising the content for rendering and the caller-specific visual content portion thereof to the dialer application over a computer network. In embodiments, the set of interaction setup services may be further configured to determine and incorporate at least one of a link to content of an advertising network and content of the advertising network into the information communicated to the dialer application of the customer. In embodiments, the business application is configured to make available a phone number of the customer. In embodiments, the identifier of the data structure includes a link to content of an advertising network, wherein the link is based on the call information. In embodiments, the business application may be configured with a set of visual caller id business development tools. The set of visual caller id business development tools may include a set of software development kits (SDKs), a set of application programming interfaces (APIs), and a set of services for data processing and handling. In embodiments, the set of services comprises a set of microservices.

In embodiments, a system may include a dialer app may execute on a processor of a smart phone through which a user is enabled to sequentially selects numbers from a dial pad interface of the dialer app. The system may include a phrase forming circuit that forms phrases from alphabetic characters associated with the selected numbers, wherein the phrases are formed to match the sequence of dialer pad selections. The system may include a candidate entity search engine that performs search activity responsive to the forming phrases and returns a ranked set of search results to the dialer app. The dialer app may present at least one result of the set of search results in a contact portion of the dial pad interface and responsive to a user selection thereof, dials the selected contact. The phrase forming circuit may form phrases based on a plurality of sets of contact resources that include a set of user contacts. The set of contact resources further may include a set of candidate contacts determined from user contact activity conducted through the smart phone. The set of contact resources further may include results of search engine activity based on Internet searches of at least one of the set of candidate phrases. The set of contact resources further may include results of a smart phone app query comprising at least one of the phrases. The smart phone app manages curated lists of business contacts based on business type and location. The set of contact resources further may include a set of Sender Controlled Media (SCM) platform participants. The set of contact resources further may include a set of sponsored contacts. The set of sponsored contacts may be sponsored via the SCM platform. The dialer app may be adapted to communicate with a Sender Controlled Media (SCM) platform contemporaneously with dialing the selected contact.

In embodiments, a method may include receiving with a server dial pad selections in a selection order from a dialer app on a smart phone. The method may further include forming with a processor of the server the ordered dial pad selections into partial phrases based on alphabetic characters associated with the dial pad selections through the dialer app as the dial pad selections are received. The method may further include determining with the server a set of candidate phrases from the partial phrases based on sets of contact resources available to the smart phone. The method may further include refining with the server the set of candidate phrases based on user context. The method may further include causing a call to be placed via the dialer app on the smart phone responsive to receiving a user selection of one of the candidate phrases. In embodiments, the sets of contact resources may include a set of user contacts. The sets of contact resources may include a set of candidate contacts determined from user contact activity through the smart phone. The sets of contact resources may include results of search engine activity based on Internet searches of at least one of the set of candidate phrases. The sets of contact resources may include results of a smart phone app query comprising at least one of the set of candidate phrases. The smart phone app manages curated lists business contacts based on business type and location. The sets of contact resources may include a set of Sender Controlled Media (SCM) platform participants. The sets of contact resources may include a set of sponsored contacts. The set of sponsored contacts may be sponsored via the SCM platform.

In embodiments, a method may include forming with a processor an ordered stream of numeric values representing dial pad element selections into partial phrases based on alphabetic characters associated with each dial pad element. The method may include determining with the processor a set of candidate contact entities based on results of search engine activity responsive to at least one of the partial phrases. The method may include refining with the processor the set of candidate contact entities based on user context. The method may include causing a call to be placed by a source of the ordered stream responsive to receiving a user selection from the refined set of candidate contact entities, wherein the call is caused to be placed to the user-selected contact entity.

In embodiments, a method may include presenting a set of user selectable elements arranged as a dial pad in an electronic interface of a computing device capable of placing a phone call, wherein at least one of the selectable elements is associated with a single digit number and a plurality of alphabetic characters. The method may include with a processor of the computing device sequential selection of the dial pad elements. The method may include forming with the processor the detected sequence into alphabetic phrases based on the alphabetic characters associated with selected dial pad elements. The method may include forwarding the alphabetic phrases while they are being formed to a candidate contact entity recommendation facility. The method may include, responsive to receiving a response to the forwarding, presenting in the electronic interface at least one candidate contact entity in a contact portion of the dial pad. The candidate contact recommendation facility may determine a set of candidate contact entities based on results of search engine activity responsive to at least one of the alphabetic phrases. Forwarding the alphabetic phrases may include forwarding a context of a user associated with a device on which the sequence of dial pad elements is detected. The method further may include causing the set of candidate contact entities to be refined based on the context.

In embodiments, a method may include detecting a request to connect a phone call to a user. The method may include facilitating presentation of an incentive offer in an incoming call display on a lockscreen of a smart phone of the user, wherein the incentive offer requires that the user accept the incoming call as a condition for activation. The method may include responsive to a user interaction with the incoming call display on the lockscreen, performing at least one of connecting the phone call to the user's smart phone plus storing an indication that the user has accepted the incentive offer, and declining the request to connect the phone call to the user.

In embodiments, facilitating presentation of the incentive offer may include configuring a sender controlled media (SCM) data structure that includes a visual portion with the incentive offer and making the configured SCM data structure available to a dialer app controlling the incoming call display screen. In embodiments, facilitating presentation of the incentive offer may include making an SCM data structure that includes a visual portion with the incentive offer available to a dialer app controlling the incoming call display screen. In embodiments, making the SCM data structure available may include uploading at least the visual portion to the smart phone from a server with which the smart phone is networked, prior to presentation of the incentive offer. Making the SCM data structure available may include uploading at least the visual portion to the smart phone from a server with which the smart phone is networked. Making the SCM data structure available may include uploading a link for the SCM data structure to the smart phone from a server with which the smart phone is networked. Uploading the link may be responsive to detecting the request to connect the phone call.

In embodiments, a method may include presenting an incentive offer in association with an incoming call in an incoming call display screen on a lockscreen of a user's smart phone, wherein the incentive offer requires that the user accept the incoming call as a condition for activation. The method may include, responsive to a user interaction with the incoming call display on the lockscreen, performing at least one of connecting the call to the user's smart phone plus storing an indication that the user has accepted the incentive offer, and declining the request to connect the phone call to the user. Presenting the incentive offer may include configuring a sender controlled media (SCM) data structure that includes a visual portion with the incentive offer and making the configured SCM data structure available to a dialer app controlling the incoming call display screen. Presenting the incentive offer may include making an SCM data structure that includes a visual portion with the incentive offer available to a dialer app controlling the incoming call display screen. Making the SCM data structure available may include uploading at least the visual portion to the smart phone from a server with which the smart phone is networked, prior to presentation of the incentive offer. Making the SCM data structure available may include uploading at least the visual portion to the smart phone from a server with which the smart phone is networked. Making the SCM data structure available may include uploading a link for the SCM data structure to the smart phone from a server with which the smart phone is networked. In embodiments, computer implemented method executable on a processor, the method may include accessing a library of Sender Controlled Media (SCM) dialer app functions. The method may include selecting in the library at least one SCM dialer app function for inclusion use with a first dialer app. The method may include using a software development kit. Using a software development kit may include configuring the selected at least one SCM dialer app function for operation with the first dialer app. Using a software development kit may include preparing dialer app modification instructions for adapting the first dialer app to perform the configured SCM dialer app function. Using a software development kit may include preparing generating a second dialer app comprising the first dialer app adapted to perform the configured SCM dialer app function. The method may include installing the second dialer app on a smart phone as a primary dialer app for handling incoming and outgoing calls. The library of SCM dialer app functions may include at least one function selected from a list of functions consisting of (i) rendering content other than generic caller ID content in a call answer screen of a dialer app; (ii) access to content other than generic caller ID content for rendering in response to an incoming call; (iii) matching incoming call identification to a content data structure that includes visual content for rendering; (iv) coordinating rendering with call connection; (v) support for user interaction with rendered content; (vi) access to phone audio/video capture capability for capturing content for delivery to a recipient of a call; (vii) storage of captured content; (viii) replacing standard caller ID content for an outgoing call with custom content, wherein the custom content includes a link to content to be rendered; and (ix) secondary channel communication with at least one other SCM function-capable dialer app.

A system may include a library of Sender Controlled Media (SCM) dialer app functions stored in a non-transient computer storage media and being accessible to a processor. The system may include a software development kit operating on the processor and constructed to enable a user to select in the library at least one SCM dialer app function for inclusion use with a first dialer app. The software development kit may enable a user to configure the selected at least one SCM dialer app function for operation with the first dialer app. The software development kit may enable a user to prepare dialer app modification instructions for adapting the first dialer app to perform the configured SCM dialer app function. The software development kit may enable a user to generate a second dialer app comprising the first dialer app adapted to perform the configured SCM dialer app function. The software development kit may enable a user to install the second dialer app on a smart phone as a primary dialer app for handling incoming and outgoing calls. The library of SCM dialer app functions may include at least one function selected from a list of functions consisting of (i) rendering content other than generic caller ID content in a call answer screen of a dialer app; (ii) access to content other than generic caller ID content for rendering in response to an incoming call; (iii) matching incoming call identification to a content data structure that includes visual content for rendering; (iv) coordinating rendering with call connection; (v) support for user interaction with rendered content; (vi) access to phone audio/video capture capability for capturing content for delivery to a recipient of a call; (vii) storage of captured content; (viii) replacing standard caller ID content for an outgoing call with custom content, wherein the custom content includes a link to content to be rendered; and (ix) secondary channel communication with at least one other SCM function-capable dialer app.

In embodiments, a method may include receiving with a processor of a smart phone an encoded set of call-specific metadata contemporaneously with an incoming call, wherein the call-specific metadata is descriptive of the incoming call. The method may include decoding with the processor the set of call-specific metadata prior to connecting the incoming call. The method may include causing a call handling function to be performed by activating a link that is present in the call-specific metadata, wherein the call handling function impacts presentation of visual content on an incoming call interface in a lockscreen of a smart phone to which the incoming call is directed. The call handling function may include a dialer app of the smart phone. The call handling function may include an app on the smart phone other than a dialer app. The call handling function may include a server-based function. The call handling function validates the call-specific metadata by verifying that caller ID information in the metadata matches call-source information in the metadata. In embodiments, the call-source information is immutable. In embodiments, the call handling function references community intelligence of a Sender Controlled Media (SCM) platform that facilitates determining an integrity of a caller associated with the incoming call. In embodiments, the call handling function is a visual content management service of a Sender Controlled Media (SCM) platform that facilitates access to the visual content to be presented on the incoming call interface of the smart phone. In embodiments, activating the link present in the call-specific metadata includes first populating at least one variable field in the link with data representative of a context of the call. In embodiments, the at least one variable field is populated with a name of a user of the smart phone. In embodiments, the link that is present in the call-specific metadata may include an indication that a source device for the incoming call is configured with a Sender Controlled Media (SCM) compatible dialer app.

In embodiments, a system may include a call interceptor that receives incoming calls and associated encoded call-specific metadata that are destined for a smart phone. The system may include a call-specific metadata handler that decodes, validates, and makes accessible to the call interceptor the call-specific metadata. The system may include a call handling function executing on a server, the call handling function executing in response to the call interceptor activating a link that is present in the call-specific metadata, wherein the call handling function causes an internet protocol-based communication app on the smart phone to be activated and connected with a companion internet protocol-based communication app on a computing device from which the incoming call originated. The call handling function may include a dialer app of the smart phone. The call handling function may include an app on the smart phone other than a dialer app. The call handling function may include a server-based function. The call handling function validates the call-specific metadata by verifying that caller ID information in the metadata matches call-source information in the metadata. In embodiments, the call-source information is immutable. The call handling function references community intelligence of a Sender Controlled Media (SCM) platform that facilitates determining an integrity of a caller associated with the incoming call. The call handling function is a visual content management service of a Sender Controlled Media (SCM) platform that facilitates access to the visual content to be presented on the incoming call interface of the smart phone. In embodiments, activating the link present in the call-specific metadata includes first populating at least one variable field in the link with data representative of a context of the call. In embodiments, the at least one variable field is populated with a name of a user of the smart phone. In embodiments, decoding may include use of a public key of a phone service provider that originated the incoming call. In embodiments, the link that is present in the call-specific metadata may include an indication that a source device for the incoming call is configured with a Sender Controlled Media (SCM) compatible dialer app.

In embodiments, a method may include receiving an incoming call with a Sender Controlled Media (SCM) configured dialer app. The method may include presenting visual content in an interactive user interface of a smart phone controlled by the dialer app, wherein the user interface is presented in a lockscreen of the dialer app. The method may include responsive to detecting user activity responsive to content presented in the user interface, activating a secondary channel of communication between an originator of the incoming call and a user of the smart phone via the lockscreen-based interactive user interface, wherein the secondary channel facilitates exchange of digital information contemporaneously with the incoming call. The secondary channel may be operative during at least one of a pre-call phase of the incoming call, an in-call phase of the incoming call, and a post-call phase of the incoming call. The secondary channel may be operative independent of maintaining the smart phone in a locked state.

In embodiments, a method may include receiving an incoming call with a Sender Controlled Media (SCM) configured dialer app. The method may include presenting visual content in an interactive user interface of a smart phone controlled by the dialer app, wherein the user interface is presented in a lockscreen of the dialer app. The method may include responsive to detecting user activity responsive to content presented in the user interface, retrieving information from a network resource based on the user activity and presenting at least a portion of the retrieved information in the lockscreen-based user interface. In embodiments, the user interface is operative during at least one of a pre-call phase of the incoming call, an in-call phase of the incoming call, and a post-call phase of the incoming call. In embodiments, the user interface is operative independent of maintaining the smart phone in a locked state. The method may further include activating, responsive to the detected user activity, a secondary channel of communication between an originator of the incoming call and a user of the smart phone via the lockscreen-based interactive user interface, wherein the secondary channel facilitates exchange of digital information contemporaneously with the incoming call.

A Sender Controlled Media platform may provide call-based rewards to platform users. In example embodiments, an SCM data structure of an SCM platform may be configured to adapt a user's phone lockscreen display screen to include an incentive to place a call, an incentive to receive a call, an incentive to remain on a call, or the like, such as a displayable element that, when activated through the display screen, executes a call-reward mechanism of the platform that signals to a reward engine to produce a variable reward total based on an outcome of execution of the reward mechanism, including, for example, completion of a first call of the day. The reward mechanism may involve a probabilistic determination of the reward total based on first-call activity of other call originators of the SCM platform, optionally selected based on similarities to the user, where the reward total is a variable minimum value no less than zero and no more than a maximum value that is adjusted based on platform factors (including first call of the day activity), so that over many executions of the reward mechanism for other platform users' first call activity, an average reward total over the course of a distribution period that is typically 24 hours (but can be determined algorithmically) approaches a target average reward total. In embodiments, a reward may be in the form of a token, such as a cryptocurrency token, such as Bitcoin™, ETH™, or the like, or a non-fungible token, or the like.

A Sender Controlled Media platform may provide call-based rewards to call originators. In example embodiments, an SCM data structure of an SCM platform may be configured to adapt a call originator's phone dialer app display screen to include an incentive to place a call, such as a displayable element that, when activated through the display screen, executes a first-call reward mechanism of the platform that signals to a reward engine to produce a variable reward total based on an outcome of execution of the reward mechanism. In embodiments, the reward mechanism involves a probabilistic determination of the reward total based on first-call activity of other call originators of the SCM platform, where the reward total is a variable minimum value that may be determined on a daily basis but no less than zero and no more than a maximum value that may be adjusted based on platform activity, such as first call of the day activity so that over many executions of the reward mechanism for platform users first call activity, an average reward total over a reward distribution period (e.g., one day) approaches a target average reward total.

A Sender Controlled Media platform may provide permission-granting-based rewards to platform users. An SCM data structure of an SCM platform may be configured to adapt a user's phone display screen to include an incentive to grant permissions, such as a displayable element that, when activated through the display screen, executes a permission reward mechanism of the platform that signals to a permission-granting reward engine to produce a variable reward total based on an outcome of execution of the reward mechanism. In embodiments, a reward calculation involves a probabilistic determination of the reward total based on permission granting activity of other call originators of the SCM platform, where the reward total is more than zero and no more than a maximum total so that over many executions of the reward mechanism, an average reward total approaches a target average reward total. In embodiments, the permissions include permission to receive content, to opt into activity tracking, to suggest friends to invite, and the like.

A Sender Controlled Media platform may provide gifting chance rewards to platform users. An SCM data structure of an SCM platform may be configured to adapt a user's phone display screen to include an incentive to gift a variable reward to another call originator in the platform, such as a displayable element that, when activated through the display screen, executes a gift reward mechanism of the platform that signals to a reward engine to produce a variable reward total based on an outcome of execution of the reward mechanism. In embodiments, the reward mechanism involves a probabilistic determination of the reward total based on gift reward activity of other call originators of the SCM platform, where the reward total is more than zero and no more than a maximum total so that over many executions of the reward mechanism, an average reward total approaches a target average reward total. In embodiments, gifting a variable reward is a reward chance that includes a key to activate a reward mechanism with a particular configuration for calculating a reward point total.

A Sender Controlled Media platform may provide platform activity-based rewards to platform users. An SCM data structure of an SCM platform may be configured to adapt a user's phone display screen to include an incentive to perform a platform-impacting action, such as a displayable element that, when activated through the display screen, executes a platform reward mechanism of the platform that signals to a reward engine to produce a variable reward total based on an outcome of execution of the reward mechanism. In embodiments, the reward mechanism involves a probabilistic determination of the reward total based on a type of activity of the offer, where the reward total is more than zero and no more than a maximum total so that over many executions of the reward mechanism, a target average reward total approaches a target average reward total. In example embodiments, the platform activity includes, without limitation, opening a wallet account, referring a friend, joining the platform, completing a survey, uploading a profile photo or video, and the like.

In example embodiments, a reward mechanism and reward engine of the platform work cooperatively to produce a probabilistic determination of a reward total based on a type of activity of the offer, where the reward total is more than zero and no more than a maximum total so that over many executions of the reward mechanism, a target average reward total approaches a target average reward total.

A platform-delivered phone dialer app may facilitate a SCM platform incentivizing and rewarding a user of the platform-delivered phone app for performing rewardable platform activities, such as placing a first call of the day. A dialer app/add-in for a phone may adapt a user's phone originating display screen to include an incentive to place a call, such as a displayable element that, when activated through the display screen, executes a first-call reward mechanism of the platform that signals to a reward engine to produce a variable reward total based on an outcome of execution of the reward mechanism. In embodiments, the reward mechanism involves a probabilistic determination of the reward total based on first-call activity of other call originators of the SCM platform, where the reward total is more than zero and no more than a maximum total so that over many executions of the reward mechanism, an average reward total approaches a target average reward total. In example embodiments, the dialer app interfaces with a reward mechanism to get an incentive selectable displayable element. In example embodiments, the dialer app performs first call of the day incentive presentation, activates the reward mechanism during the call (e.g., when the call is placed, when the call is answered/sent to voice mail, when the call is longer than 21 seconds, when the call terminates and the like), and reward results presentation.

An SCM data structure of an SCM platform may be configured to adapt a message from a messaging app of a message originator's device to include an incentive to join the platform. The SCM data structure may include or reference a displayable element for use in the message (e.g., a HTTP/URL link) that, when activated by a recipient, executes a join-up reward mechanism of the platform that signals to a reward engine of the platform to produce a variable reward total based on an outcome of execution of the join-up reward mechanism.

In an aspect of methods and systems of sender-controlled media platform reward determination and allocation, a method of incentivized rewardable platform activity tracking may include configuring a sender controlled media (SCM) data structure with interactive displayable content that, when activated by a user in a user interface adapted by the SCM, activates a rewardable platform activity. The aspect may further include presenting the interactive displayable content in a user interface of a display screen of a user's phone. The aspect may further include receiving an indication of a user selection of a rewardable platform activity through the user interface of a rewardable platform activity incentive portion of the interactive displayable content. Yet further, the aspect may include executing a reward mechanism that monitors user actions within the platform based on a set of requirements of the selected rewardable platform activity. In the aspect and responsive to receiving an indication that a reward point total for the selected rewardable platform activity may be a variable amount, performing a reward total determining function that performs a probabilistic determination of a reward total for the selected rewardable platform activity based at least in part on reward point totals rewarded to users of the platform during a reward distribution period of time. In the aspect, the probabilistic determination produces a reward total that may be greater or equal to a variable minimum value not less than zero points and that may be no more than a maximum value that may be adjusted at the start of each distribution period so that over a plurality of executions of the probabilistic determination for other platform users, an average reward total over the course of the distribution period approaches a target average reward total.

In the aspect, selectable rewardable platform activity may be selected from a list of rewardable activities consisting of a first call of the day activity, completing a survey activity, configuring a profile video activity, configuring a profile photograph activity, referring a friend to join the platform activity, signing up for an external wallet activity, granting permissions to receive promotional content, granting permissions to permit activity tracking, and watching sponsored content. In the aspect, the interactive displayable content comprises a link that activates a platform service that may be consistent with a rewardable platform activity represented by the interactive displayable content. In the aspect, the platform service may be a reward mechanism that facilitates a user performing the rewardable platform activity. In example embodiments, the reward mechanism triggers a reward engine to calculate a reward points total. Further in the aspect, the reward engine performs the probabilistic determination when calculating the rewards points total. In the aspect, the probabilistic determination of reward total may be based on a target U.S. dollars (USD) equivalent of aggregated reward total points rewarded to platform users since a start time of the distribution period. The distribution period includes a calendar day. A start time of the distribution period may be based on Greenwich Mean Time (GMT). In the aspect, the target USD equivalent may be based on an exchange rate between USD and a cryptocurrency on which the reward total may be based. Also, the determination of a reward points total for the user performing the selected rewardable platform activity may be based on an estimate of a total number of platform users to activate the reward mechanism during the reward distribution period. Yet further, the determination of a reward points total for the user having performed the selected rewardable platform activity may be adapted for the user based on user-specific behaviors on the platform. Additionally in the aspect, user-specific behaviors that indicate that the user may be a frequent user of the platform causes a weighting of higher value reward increments to be more likely to be calculated for rewarding the user.

In another aspect of methods and systems of sender-controlled media platform reward determination and allocation, a system may include an incentive configuration module of a call management platform executing on a processor and producing a sender controlled media (SCM) data structure of displayable content that includes at least one reference to a rewardable platform activity. In the aspect, a system may include a reward mechanism module that, when executing on the processor, records and tracks user activity on the platform for performing the rewardable platform activity. Further in this aspect, a system may include a reward engine that performs a probabilistic determination of reward points associated with the executing of the reward mechanism based on at least a target average points reward value. Further in this aspect, a system may include a reward account manager that, when executing on the processor, adjusts a user points account based on an indication of the determination of the reward points from the reward engine and adjusts a corresponding number of points for a platform account of points. And yet further in this aspect, a system may include a reward redemption system that, when executing on the processor, handles user requests for redemption by transferring points from a wallet of the user in which the reward manager adjusts user points into an external wallet designated by the user, wherein redemption includes transfer of one or more cryptocurrency units from a cryptocurrency portion of a platform-owned wallet to the user wallet. In the aspect, the rewardable platform activity may be selected from a list of rewardable activities consisting of a first call of the day activity, completing a survey activity, configuring a profile video activity, configuring a profile photograph activity, referring a friend to join the platform activity, signing up for an external wallet activity, granting permissions to receive promotional content, granting permissions to permit activity tracking, and watching sponsored content. In the aspect, the displayable content comprises a link that activates a platform service that may be consistent with a rewardable platform activity represented by the displayable content. In the aspect, the platform service may be an instance of the reward mechanism that may be specific to the selected rewardable platform activity and that facilitates a user performing the rewardable platform activity. In the aspect, the reward mechanism triggers the reward engine to calculate the reward points total. In the aspect, the reward engine performs the probabilistic determination when calculating the reward points total. In the aspect, the reward engine may be adapted to determine a reward points total for the user having performed the selected rewardable platform activity based on user-specific behaviors on the platform.

BRIEF DESCRIPTION OF THE FIGURES

In the accompanying figures, like reference numerals refer to identical or functionally similar elements throughout the separate views and together with the detailed description below are incorporated in and form part of the specification, serve to further illustrate various embodiments and to explain various principles and advantages all in accordance with the systems and methods disclosed herein.

FIG. 33 illustrates an embodiment of a media content library in accordance with an embodiment of the systems and methods disclosed herein.

Figure 1:
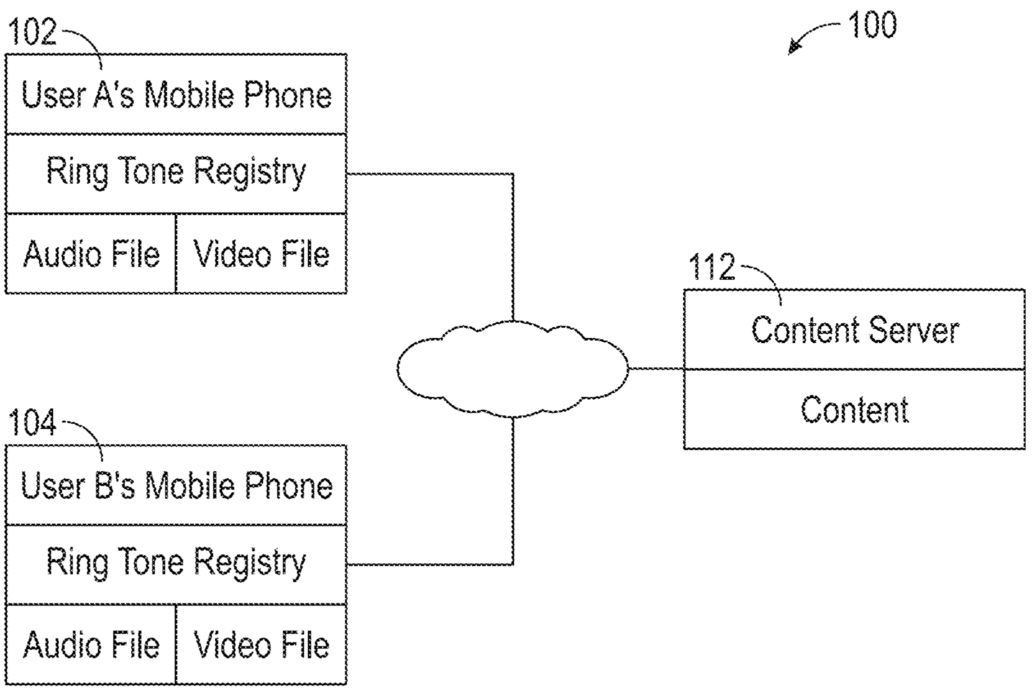
FIG. 1 illustrates an architecture for a method and system for an SCCMC in accordance with an embodiment of the systems and methods disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the systems and methods disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that the embodiments reside primarily in combinations of method steps and/or system components related to enabling a user to associate a service with a product in a way that makes it much more convenient and effective for the user to take advantage of the benefits of the service in connection with the product. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those skilled in the art.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one skilled in the art to operate satisfactorily for an intended purpose. Ranges of values and/or numeric values are provided herein as examples only and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

As used herein, the term "tone" may be used to refer to a single instance of a sender-controlled contact media content type, which may include one or more of audio, video (which may include video captured by video cameras, voice, computer-generated video, animations, or other video-type content that can be displayed in any format on a mobile device, such as a mobile phone), contact data, and/or metadata. A single tone may be adapted for broadcast, in a single act by a sender, over both voice layer and data layer transmission mediums in a coordinated fashion. As noted above, an SCCMC is also referred to herein (including in the figures) for convenience as a "Vyng," which is an example of a brand name for the SCCMC that would be understood by users to refer to this novel type of content item.

FIG. 1 illustrates an embodiment of an architecture 100 for an SCCMC. The architecture 100 includes a user A's mobile phone 102, referred to alternatively herein as a sender mobile phone 102. The architecture 100 further includes a user B's mobile phone 104, alternatively referred to as a recipient mobile phone 104. The sender mobile phone 102 and recipient mobile phone 104 are each communicatively connected with a content server 112. The architecture 100 may run an application (referred to herein in some cases as the App) that may establish a data connection, or tunnel, between the two user's phones and may control creation and display of SCCMC-type content between the two devices 102 and 104. The architecture 100 and the SCCMC-type content data structure may be used with any type of mobile device or mobile device operating system or platform, such as the Android™ operating system, the iOS™ operating system, or other operating systems. Embodiments provided herein that describe a particular operating system should be understood to apply to other operating systems, except where the context indicates otherwise (such as where a particular operating system lacks the functions described in connection with a particular embodiment). In addition to using and integrating with mobile operating system platforms, the architecture 100 and SCCMC-type content items may be integrated with and layered within other applications, including ones that host developer platforms, such as Facebook Messenger™ and Viber™. Integration with apps that have calling features, including ones that use Voice over IP allows for the SCCMC-type content item to leverage the platforms that support such applications, including to produce SCCMC-type content items to be delivered upon incoming calls. This may be accomplished, among other things, by use of the developer platform resources that are associated with such applications, such as developer user interfaces, application programming interfaces, developer tools, and the like, including integration of the content server 112 described in connection with the architecture 100.

Figure 2A:
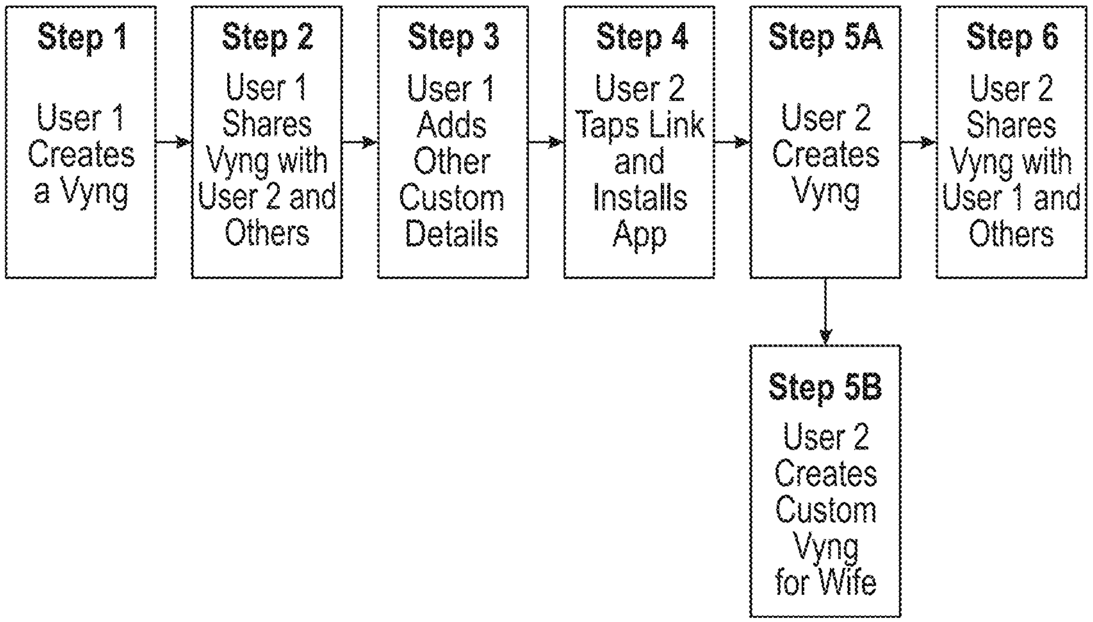
FIGS. 2A and 2B illustrate a process for creating and sharing an SCCMC in accordance with an embodiment of the systems and methods disclosed herein.

FIG. 2A illustrates a process for creating and sharing an SCCMC tone (referred to in some cases simply as a "tone"). First, the architecture 100 may enable a user interface on the sender mobile phone 102 to allow the sender to create video and/or audio content, or an SCCMC tone, at step 1. The user may edit the audio and/or video content from external sources (e.g., stored in the cloud or from a library of a third-party content provider), internal sources (e.g., from saved audio/video on the phone), or may create new video/audio. The user may set privacy controls via the App to limit publication of the SCCMC tone to a select audience.

The user's composite creation may be separated into audio, video, and metadata components. These components may be associated with a particular tone, such as by being assigned as properties of the tone. The tone may then be stored locally on the device 102. The tone may be uploaded to the application server or content server 112 and may be persisted in storage, such as associated with the server 112 or in cloud-based storage.

In an exemplary embodiment, a first user may create the SCCMC such as using the App at step 1. At a step 2, the first user may then share the SCCMC with friends, such as by text/SMS message (such as in a snippet, link, or the like in a text) such as with a second user. At a step 3, the first user may preview the SCCMC and/or add other custom details, either before or after sharing the SCCMC with one or more other users. At a step 4, the second user may tap the link and install the App, which may set the SCCMC of the first user on the second user's phone 104. Either user may send the SCCMC to multiple persons, and a community around the App may be used, such as within a group of friends, within a school district, within a workgroup or enterprise, or the like. When the second user first downloads the App, the first user's contact may be shown now associated with the SCCMC tone created by the first user. The second user may further create a tone at a step 5A. At a step 6, the second user may share this SCCMC with the first user and/or other friends, for example. The second user may, for example, create a custom SCCMC for his spouse at a step 5B.

Figure 2B:
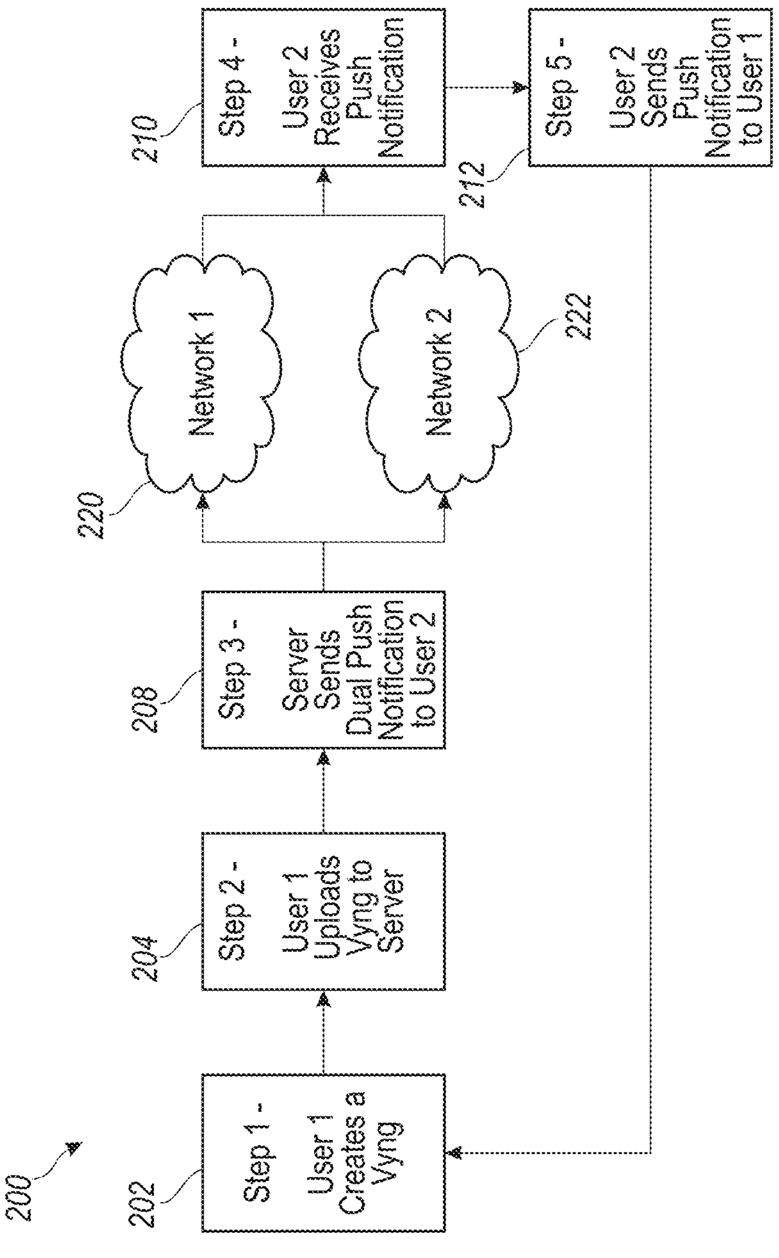

FIG. 2B illustrates a process 200 for creating and sharing an SCCMC tone (referred to in some cases simply as a "tone" or in other cases as a "Ving" or a "Vyng"). First, the architecture 100 may enable a user interface on the sender mobile phone 102 to allow the sender to create video and/or audio content, or an SCCMC tone, at step 202. The user may edit the audio and/or video content from external sources (e.g., stored in the cloud or from a library of a third-party content provider), internal sources (e.g., from saved audio/video on the phone), or may create new video/audio. The user may set privacy controls via the App to limit publication of the SCCMC tone to a select audience.

The user's composite creation may be separated into audio, video, and metadata components. These components may be associated with a particular tone, such as by being assigned as properties of the tone. The tone may then be stored locally on the device 102. The tone may be uploaded to the application server or content server 112 and may be persisted in storage, such as associated with the server 112 or in cloud-based storage.

In an exemplary embodiment illustrated in FIG. 2B, a first user may create the SCCMC such as using the App at the first step 202. The SCCMC may be created using a standard encoding protocol. Standard encoding protocols may include HTML5, Flash, MP4/H.264, WebM, Ogg, 3GP/MPEG4 and the like. At a second step 204, the first user may upload the SCCMC to a server. The server may be a hosted on a cloud hosting service. Cloud hosting services may include Amazon Web Services™ (AWS), Microsoft Azure Infrastructure Services™, Google Cloud Platform™, CenturyLink Cloud™ (CLC), VMware vCloud Air™, IBM SoftLayer™, Rackspace™ and the like.

At a third step 208, a dual push notification may be sent from the server to a second user. The dual push notification may be sent over a first network 220, a second network 222, or a first network 220 and a second network 222. First network 220 and second network 222 may be on separate infrastructures operated by different operators, such as an Amazon™ SMS infrastructure, a Google™ Cloud Messaging infrastructure, a Pushy™ MQTT infrastructure, an infrastructure of a mobile telecommunications operator, and the like. Sending the push notification over multiple, separate infrastructures may increase the reliability of the push notification sent from the first user being received by the second user.

At a fourth step 210, the second user may receive the push notification on the second user's mobile phone 104. The push notification may include information that tells the second user's mobile phone 104 to prepare to play the SCCMC created by the first user. The second user's mobile phone 104 may download the SCCMC. The SCCMC may be installed on the second user's mobile phone 104 to be played on a screen of the second user's mobile phone 104, such as at the lock screen, on the home screen, in an application, or on a screen that displays while the recipient is on a phone call. At a fifth step 212, the second user may send a push notification to the first user. The push notification sent by the second user to the first user may inform the first user that the second user received the SCCMC sent by the first user. The push notification sent by the second user to the first user may also inform the first user that the SCCMC sent by the first user to the second user is ready to play on the second user's mobile phone 104.

Figure 2C:
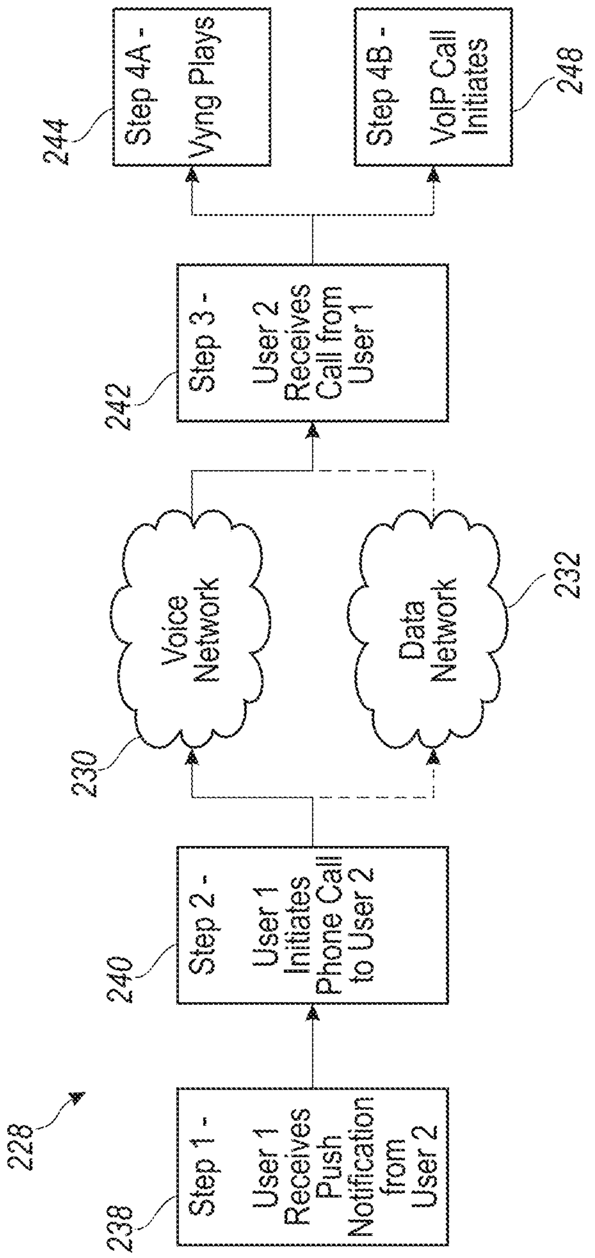
FIG. 2C illustrates a process for initiating a phone call in accordance with an embodiment of the systems and methods disclosed herein.
Figure 3A:
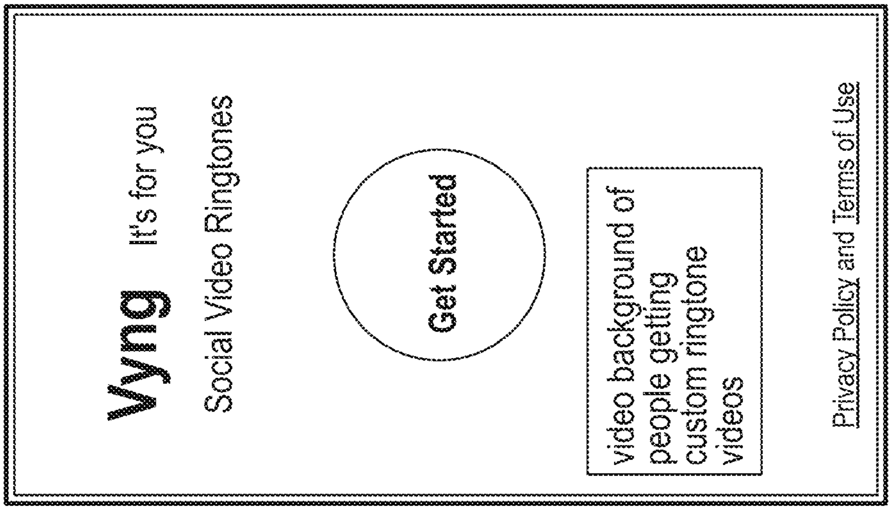
FIGS. 3A-3G illustrate the creation of an SCCMC in accordance with an embodiment of the systems and methods disclosed herein.
Figure 3B:
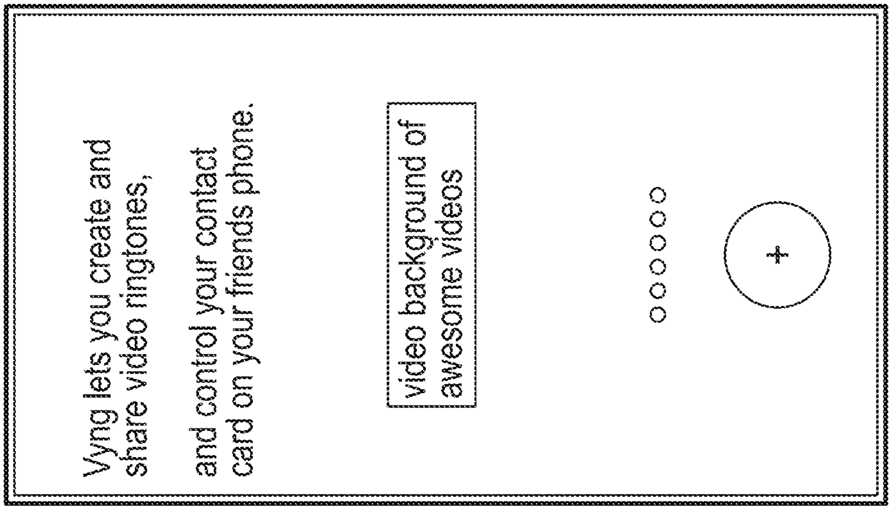
Figure 3C:
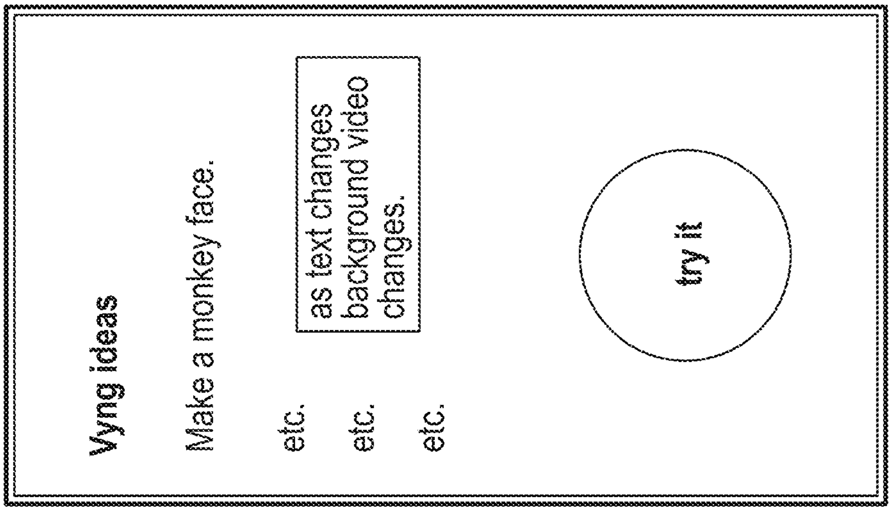
Figure 3D:
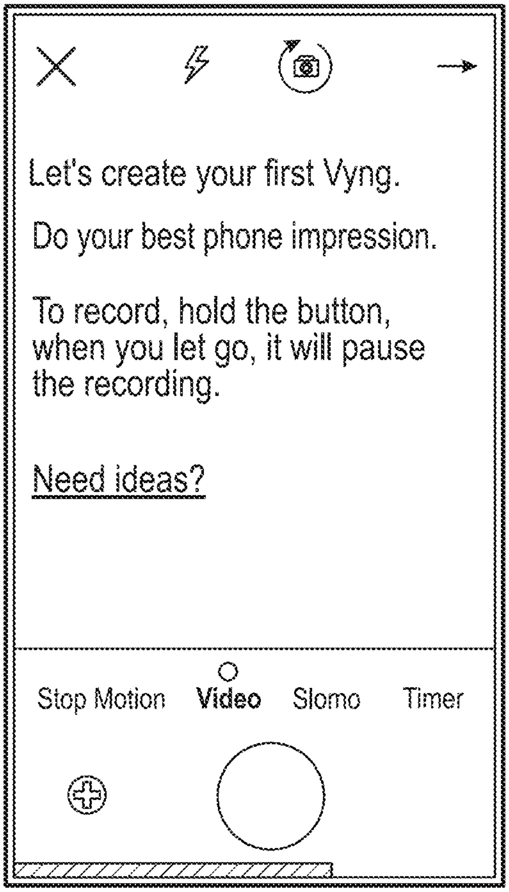
Figure 3E:
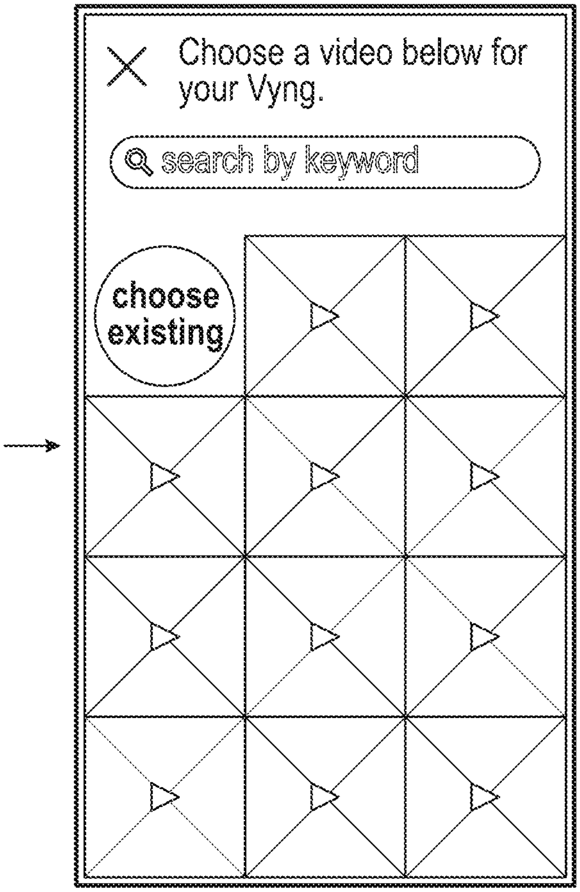
Figures 3F, 3G:
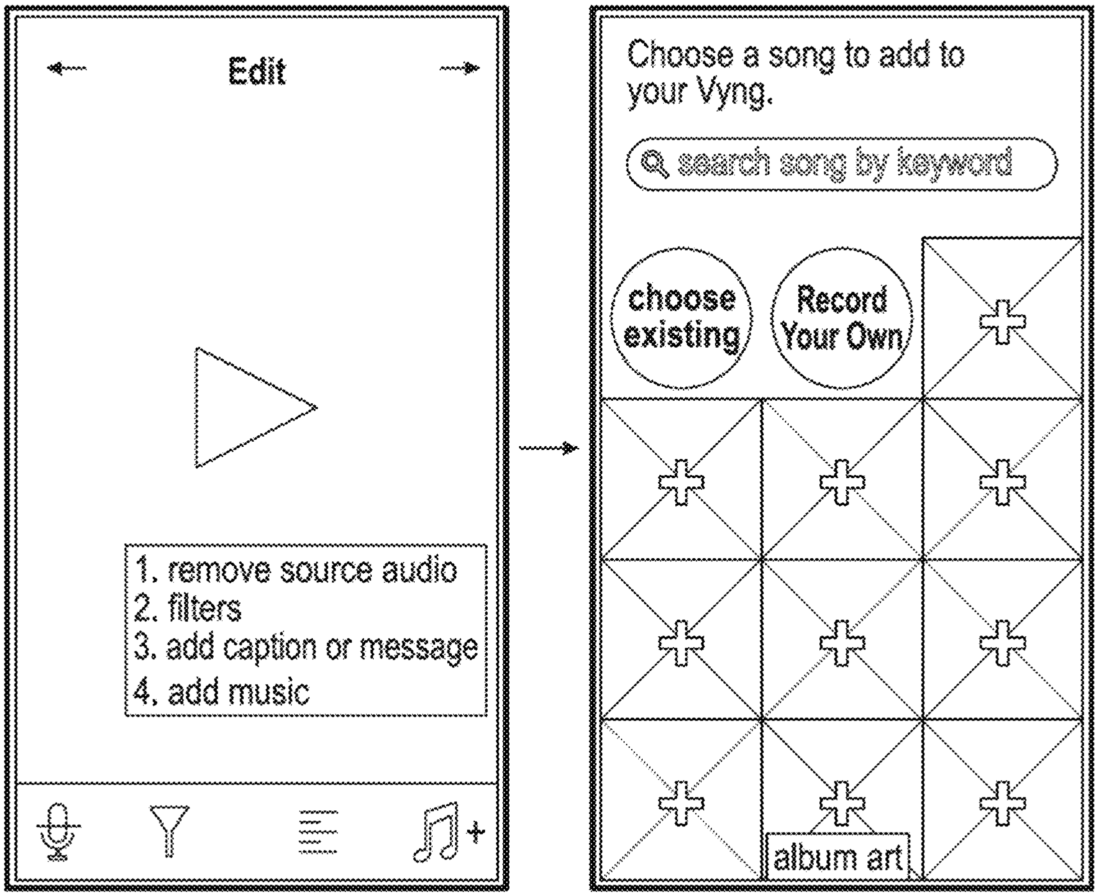

FIG. 2C illustrates a process and flow 228 for initiating a phone call. A phone call may be initiated when a first user receives a push notification from a second user, as illustrated in the first step 238. In a second step 240, the first user may initiate a phone call from the first user's mobile phone 102 to the second user's mobile phone 104. The phone call may be initiated over a voice network 230, a data network 232, or both, and may be associated with a message from the sender to a recipient. In embodiments, the call may use both transmission layers (voice and data). A voice network 230 may be a cellular phone network. A phone call initiated over a data network 232 may be a voice over Internet protocol (VOIP) phone call. A VOIP phone call may be initiated with a second push notification sent from the first user to the second user. A second push notification may include a session ID. A VOIP call may be initiated using a third-party service. A third-party service may be provided by Top Box™, Skype™, Google Hangouts™, WhatsApp™, WeChat™ and the like.

The second user may receive the phone call on the second user's mobile device 104 from the first user's mobile device 102 at a third step 242. The second user's mobile device 104 may play the SCCMC when the phone call is received from the first user's mobile device 102, as illustrated in subsequent steps 244 and 248.

FIGS. 3A-3G illustrate detailed screenshots of a user interface of the App by which a first user may create a new SCCMC. The first user may create the SCCMC with custom ringtones, text tones, and photo as part of his or her contact card that may be controlled by the first user himself on his or her friend's phone (recipient mobile phone 104) instantly. The App may provide interfaces for getting started with the App, brief tutorials, the capability for recording videos, the ability to select friends, the ability to push videos to other people's phones, and the like. Ideas may be provided as prompts to the user. The App may allow creating and sharing of videos and tunes. The App may allow listening to or viewing other ringtones that have already been created. The App may allow creating the first SCCMC for a user. The App may also allow various video options, such as slow motion, the use of a timer, and the like, to be included in or with the SCCMC. The App may allow the user to edit a page and/or request additional tools or advanced features. In an example, the source file may be removed and the App may keep the video and play something else for audio and/or split the video and audio and change either one. The App may allow adding filters, captions, messages, or music, customization of the message, and the like. The App may allow sharing a page to a list of friends and the like. The App may allow sharing through a text message, such as via a button that allows the user to send a preview of the SCCMC with video and/or audio and a link to download the App. The App may enable a store for downloading the App if it is not already installed on the phone of the recipient. If the second user has an App, a message may trigger delivering the SCCMC tone to a queue.

For purposes of creation, a button in the App may allow the first user to discover and choose audio, videos or SCCMC tones that he may already have. The videos or other forms of content to be used in the SCCMC may be stored in a library, and the App may facilitate discovery from the library. The App may also allow browsing other videos that come from other websites that enable sharing or downloading of video. In embodiments, the SCCMC may be selected from a curated library of SCCMC-type content. The library may be automatically curated, under computer control, via an algorithm that is based on a topic of interest indicated by a sender or a recipient of an SCCMC. The library may be curated by an editor based on subject matter, such as the subject matter of a channel to which a sender or recipient subscribes.

The App may allow searching for keywords, and it may automatically upload a video that is searched for those keywords. The App may also allow using stop-motion photos in the SCCMC and may allow video or audio payload. The App may allow adding audio to videos, and the like. The audio files may be either taken from what is already created (user's library), or from the sender mobile phone 102, or from other users, albums (such as music store), and the like.

Figure 4A:
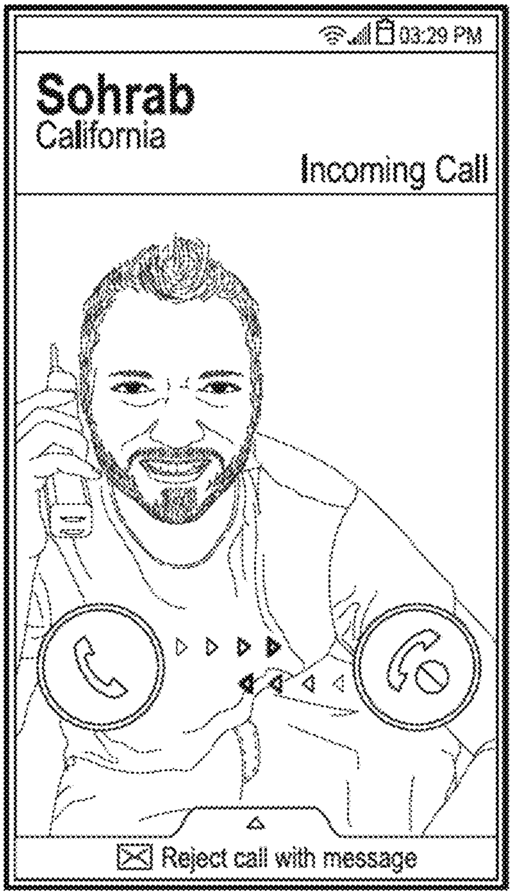
FIGS. 4A-4F illustrate examples of an SCCMC in accordance with an embodiment of the systems and methods disclosed herein.
Figure 4B:
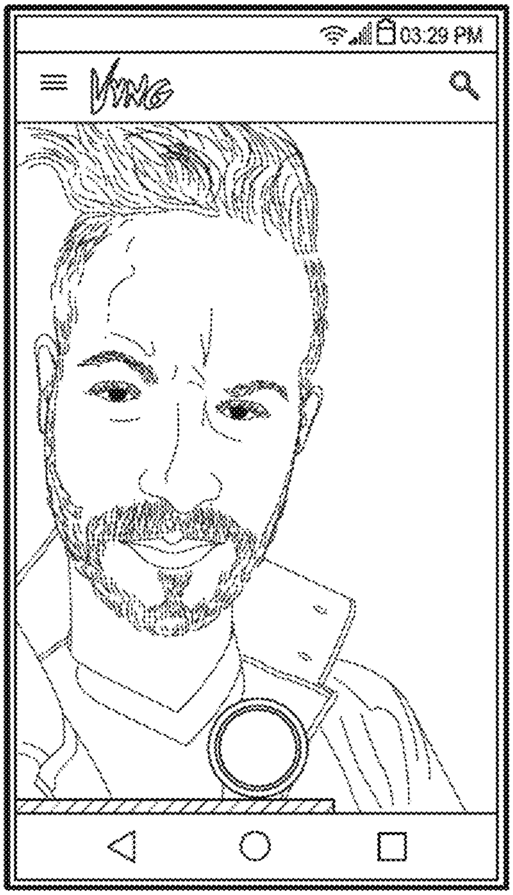
Figure 4C:
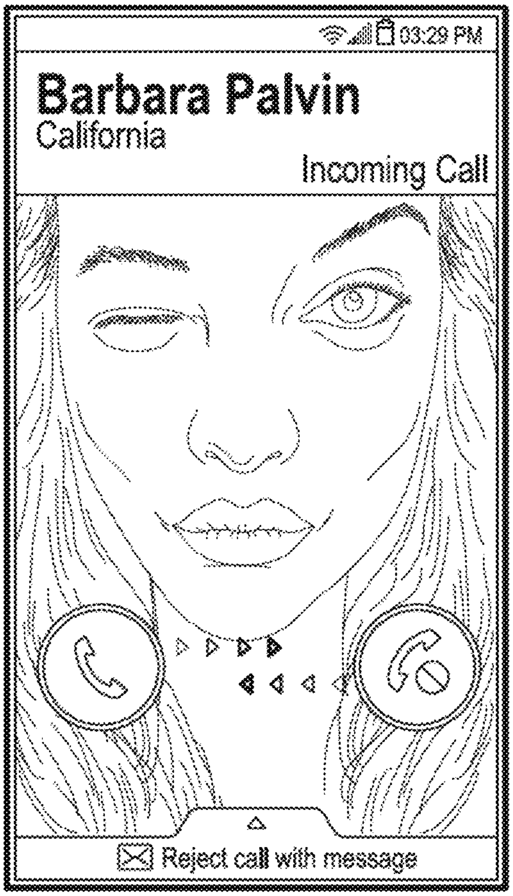
Figure 4D:
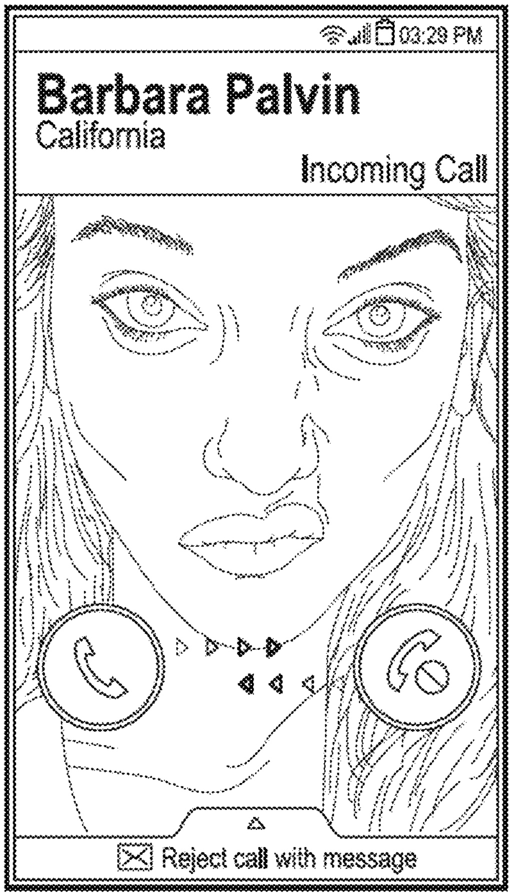
Figure 4E:
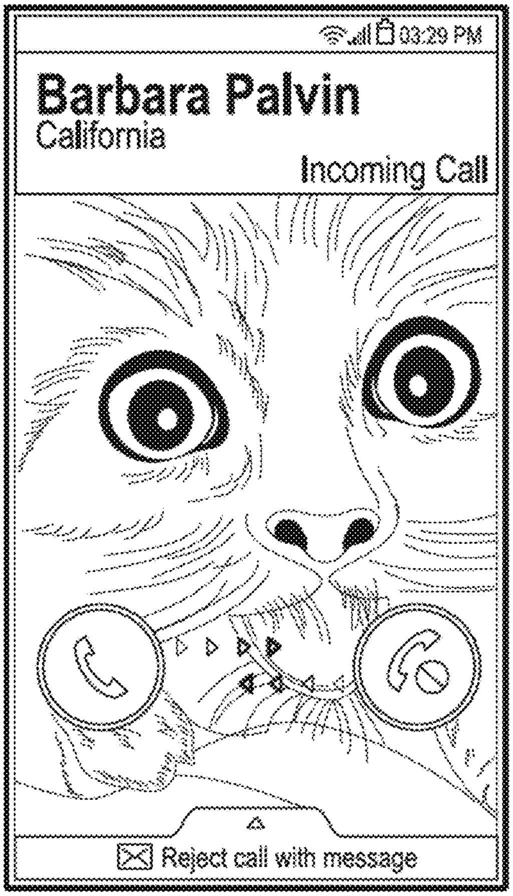
Figure 4F:
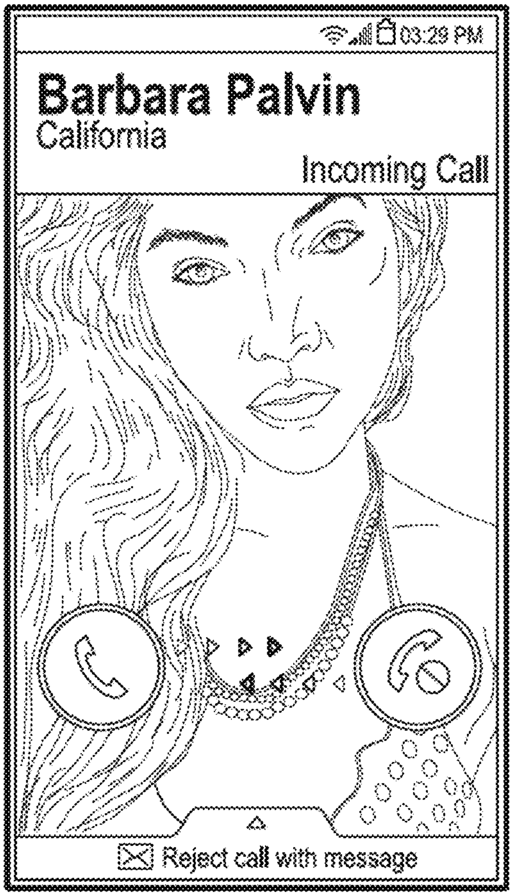

FIGS. 4A and 4B illustrate a call being received on a second user's mobile device 104. The call may display the SCCMC tone created by the first user automatically on the second user's phone. In embodiments, the first user may wish to convey a current emotional state. A user interface on the first user's phone may, for example, allow the first user to create multiple tones, each of which is associated with an emotional state. The emotional states may be indicated in metadata of the tones. When the user initiates a call, the user may indicate a current emotional state, which, when transmitted to the phone of the second user, may initiate a process by which the App selects and displays the correct SCCMC tone that is associated with that current emotional state of the first user. The emotional state may be conveyed by a facial expression, an image, a sound, an emoticon, or other characteristic associated with a particular tone.

As shown, the recipient mobile phone 104 may display the SCCMC that the first user directs the recipient mobile phone 104 to ring/show video that reflects the current mood of the first user. The App may be able to choose what the first user sends, or what message is displayed on the second user's phone, such as indicated by emojis, by selecting a mood, or the like. In embodiments, the correct SCCMC tone may be associated with and therefore shared every time the first user calls or texts the second user. In other embodiments one or more tones is stored on the second user's mobile device 104 and is triggered by the receipt of a call from the number of the first user's device 102, possibly carrying with it other information (which may be transmitted over the server 112 via the App) that allows selection of particular emotional content. In embodiments, the App may change an SCCMC during a call. The App may be triggered to change an SCCMC during a call when the mood of the first user changes to a different mood, for example. The App may select a new SCCMC for display on the second user's device 104 to reflect the different mood of the first user. A user may be able to respond to the SCCMC.

A user may be able to respond to an SCCMC by tapping on the SCCMC. For example, a second user may be able to provide feedback to a first user on an SCCMC sent by the first user to the second user. The feedback sent by the second user may indicate the second user's satisfaction with the SCCMC sent by the first user to the second user. The second user may provide feedback to the first user by tapping on an SCCMC received from a first user, for example. The tap may generate a heart or other emoji on the SCCMC displayed on the second user's mobile device 104. The tap may also generate a heart or other emoji on the screen of the first user's mobile device 102.

Figure 5A:
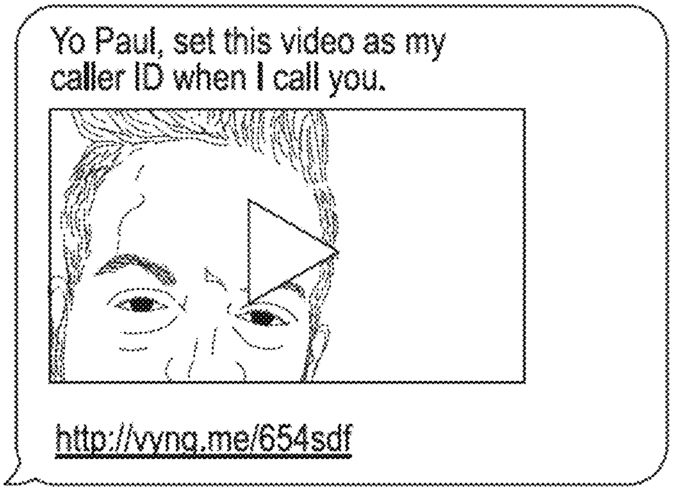
FIGS. 5A, 5B, and 5C illustrate User A sharing an SCCMC with User B in accordance with an embodiment of the systems and methods disclosed herein.
Figure 5B:
Figure 5C:
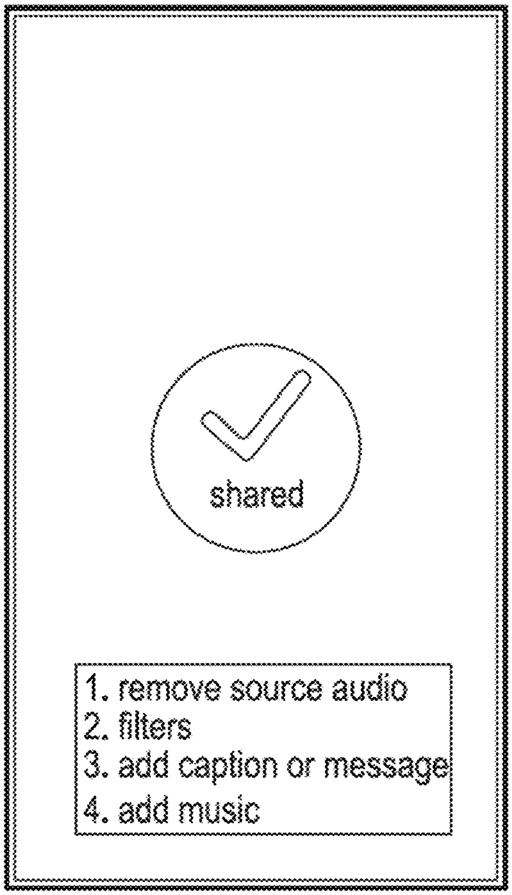

FIGS. 5A-5C illustrate embodiments of user interface features by which the first user may share an SCCMC tone with the second user. FIG. 5A illustrates a message that the second user may receive from the first user, prompting the second user to accept delivery of and set the SCCMC tone of the first user on the mobile device of the second user. The message may include text, video, audio, links, and the like. FIG. 5B illustrates a detailed screenshot of the interface by which a first user may select which friends the first user would like to have received the particular SCCMC tone. FIG. 5C illustrates a confirmation that may be displayed to the first user when the SCCMC has been successfully shared with the selected friends of the first user.

In various embodiments, content delivery may be achieved either through a client-server architecture (including a cloud architecture), a peer-to-peer architecture, or other content delivery architecture.

In a client-server approach, the App may periodically query the application server or content server 112 for newly published or updated content. A content update may also be triggered via a push message from the server 112. Content may be filtered based upon privacy settings set by the content creator. The App may automatically download newly published or updated content and may synchronize the local data store on the device 102 with other content, such as cloud-stored content.

In a peer-to-peer approach, users, such as the first user and the second user in the examples above, who are in proximity to each other or connected via any peer-to-peer network connection may discover each other through the App. For example, the peer application may broadcast its presence to a listening port on the other peer device to establish its presence and seek to exchange credentials. Once discovered, peers may be displayed in the App to a user. The user may then selectively send SCCMC tones to one or more discovered peers.

Figure 6:
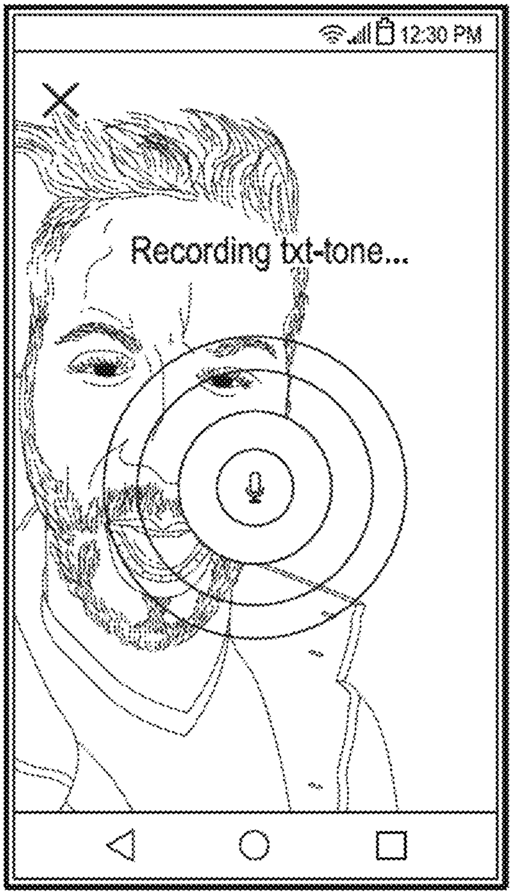
FIG. 6 illustrates User A adding custom details to an SCCMC in accordance with an embodiment of the systems and methods disclosed herein.

FIG. 6 illustrates a detailed screenshot of a user interface by which a user may record audio for inclusion in or with an SCCMC tone.

Figure 7:
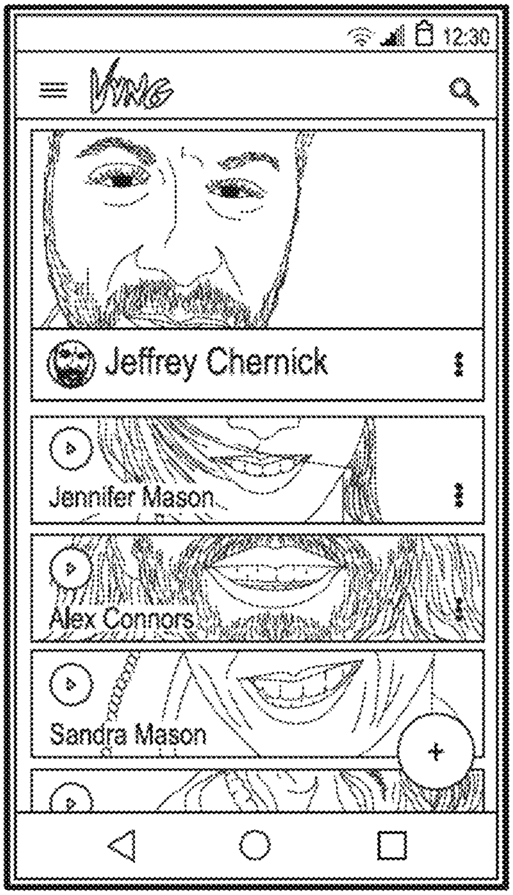
FIG. 7 illustrates User B setting an SCCMC received from User A in accordance with an embodiment of the systems and methods disclosed herein.

FIG. 7 provides a detailed screenshot of an interface by which a user may see snapshots of various SCCMC tones, such as ones received from other users or ones created to be shared with other users. When the App is installed on the phone of a user, the phone number of the user may be verified. Verification may be done in the background, such as when the phone is running the Android operating system. The App then may use the phone number to automatically set any SCCMC tones that are shared with the user by any friends of the user who are listed in the contacts on the phone of the user. The SCCMC tones may be set automatically by seamlessly matching the phone number associated with the SCCMC tone to the phone number of a contact in the address book on the phone of the user. Once the App is installed on the phone of a user, any new SCCMC tones sent to the user may be automatically set and a notification may be displayed in the notification list of the phone. SCCMC tone acceptance by the user may be automatic, may be active and require input from the user, and the like. SCCMC tone acceptance may be controlled by the user in the settings of the phone or of the App.

In embodiments, upon initiation of the application on a mobile device 102, 104, the App may register with the operating system of the mobile device, including registering as a listener for incoming voice calls and incoming text messages.

When the App is notified of an incoming call, it may receive the incoming phone number from the operating system. The App may query its own internal database for an SCCMC tone that is linked to the incoming phone number. If a match is found, the App starts a new activity to play the SCCMC tone, such as using the default ringer application on the phone.

When the App is notified of an incoming text message (SMS), it may receive the incoming phone number from the operating system. The App may query its own internal database, such as for audio to play that is linked to the incoming phone number. If a match is found, the App may play the audio file, such as in an alternative to playing the default sound normally used to indicate an incoming text message.

The App may further allow pushing and synchronizing content to the contacts portion of a friend's/contact's phone, such as the recipient mobile phone 104, where the first user may control the video/audio presentation when the recipient mobile phone 104 rings upon the call of the first user. In embodiments, a user may find, manipulate and/or create video and/or audio and push it to the contacts function on someone else's phone, such as the recipient mobile 104.

Figure 8:
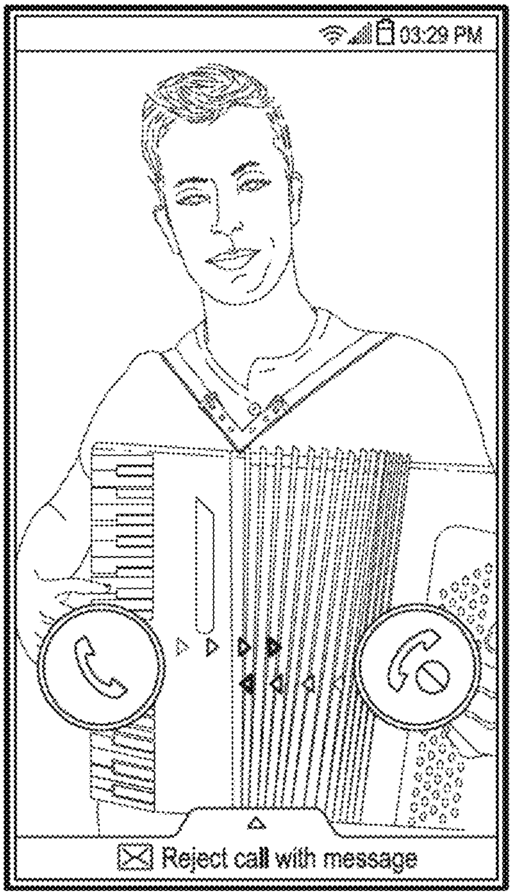
FIG. 8 illustrates User B creating an SCCMC and sharing the SCCMC with User A and others in accordance with an embodiment of the systems and methods disclosed herein.
Figure 9:
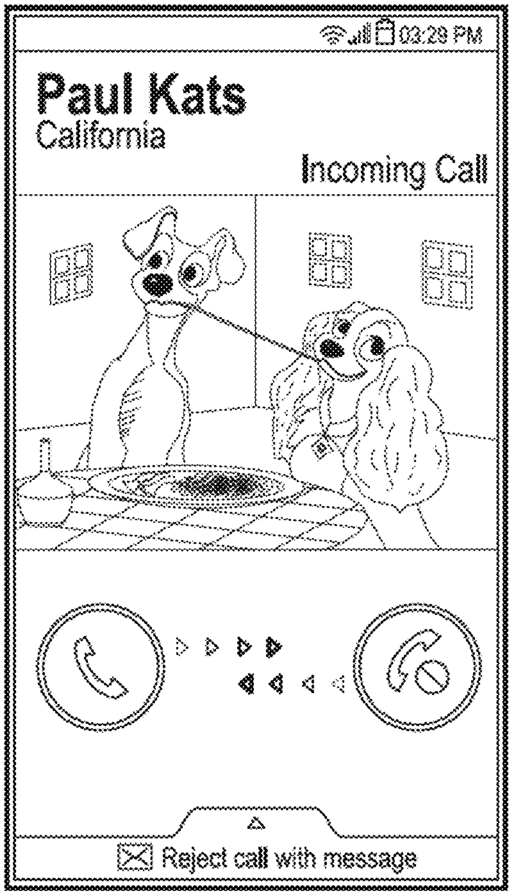
FIG. 9 illustrates an SCCMC created by User B for his or her significant other in accordance with an embodiment of the systems and methods disclosed herein.

FIGS. 8 and 9 illustrate examples of an SCCMC tone being displayed on the mobile phone 104 of the user as the user receives a call from someone who created and sent an SCCMC tone to the user.

Figure 10:
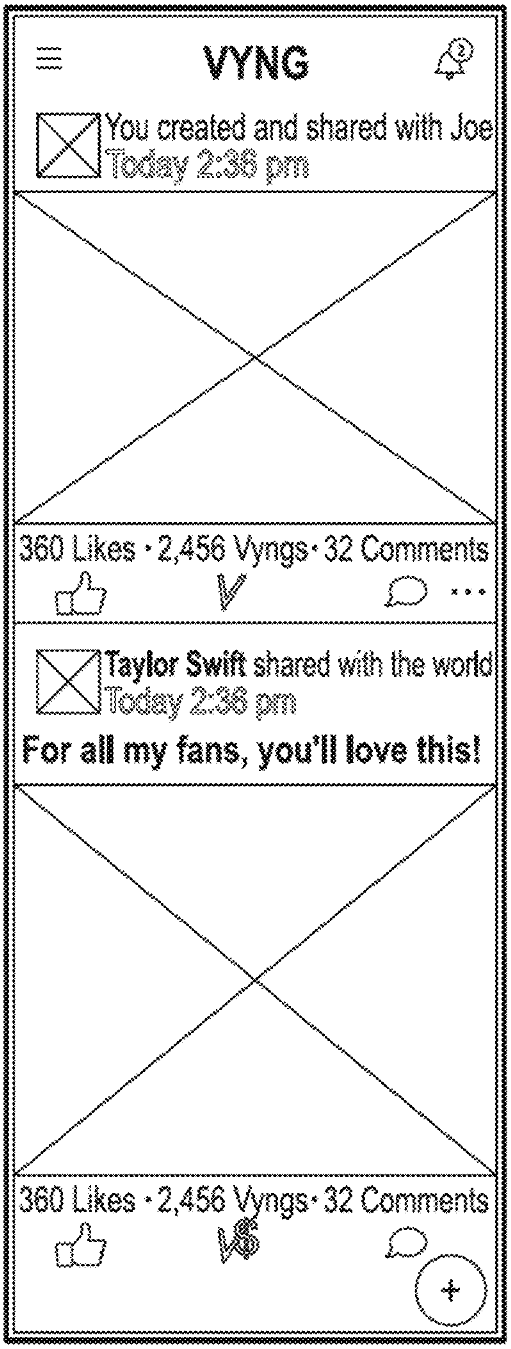
FIG. 10 illustrates a Home-Feed screenshot of an SCCMC in accordance with an embodiment of the systems and methods disclosed herein.

FIG. 10 illustrates a "Home—Feed" interface screenshot. The interface allows a user to see what he or she has downloaded and what he or she has shared with another user. The interface may allow a user to "like" or comment on the SCCMC tone. The interface shows what is pending in the news feeds of the user. The interface may also show updates in the SCCMC tone by other users.

Figure 11A:
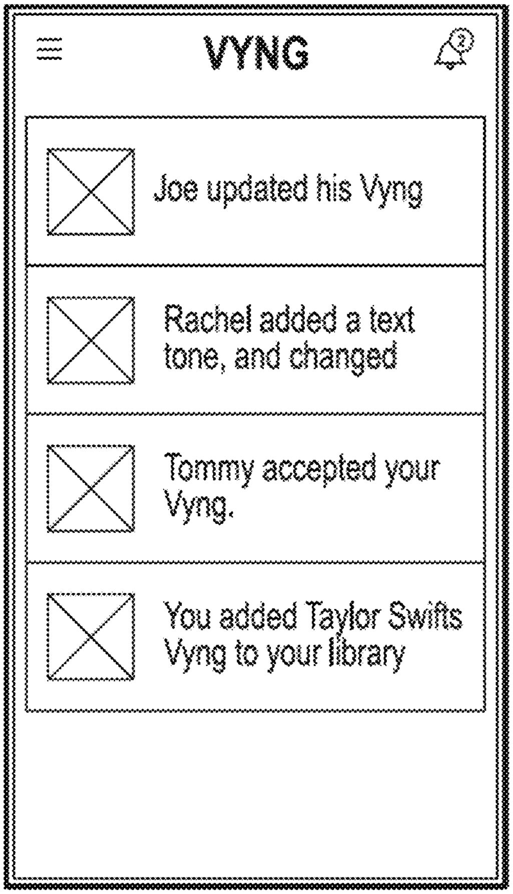
FIGS. 11A and 11B illustrate Notifications screenshots of an SCCMC in accordance with an embodiment of the systems and methods disclosed herein.
Figure 11B:
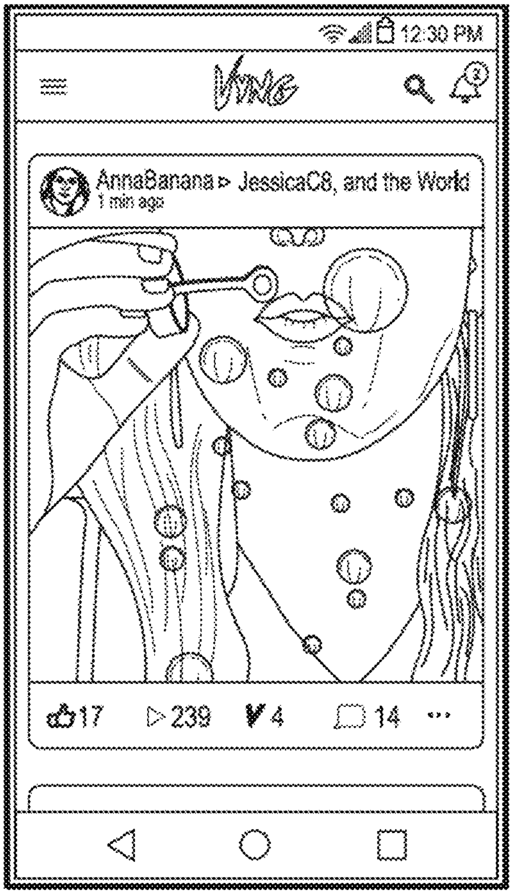

FIGS. 11A and 11B illustrate screenshots for displaying notifications. A user may receive notifications via one or more push messages sent through the mobile operating system of the phone of the user. As illustrated in embodiments shown in FIGS. 11A-11B, a user may access notifications via a notification icon 1102 displayed in the App. The App may enable a communication channel between the first user and his or her close contacts, including the second user, so that the first user and his or her friends may have an automatic update channel. For example, as shown in FIG. 11A, Joe may have updated his SCCMC tone and shared the update with a second user over the communication channel. As an example, the first user may change audio and video associated with the SCCMC tone that the first user shared with the second user. The App may reflect changes in the user profile of the first user on the phone of the second user and notify the second user of the changes in the notifications interface of the phone of the second user. The changes may reflect a changed text (e.g., audio) tone, changed SCCMC tone, and the like.

In the illustrated embodiment shown in FIG. 11A, the first user not only created a video ringtone but also created a text tone. The App changes the text tone accordingly.

Embodiments may include user linking. For example, the first user and the second user may link their accounts so that shared content is available between the users. The first user may send a text message with an identifying token via the App to the second user. The App on the recipient's phone 104 may listen for the incoming text message and automatically send the identifying token to the server 112. The two accounts are then linked server-side so that content may be shared between the first user and the second user.

User discovery may also be enabled. The App may also display a feed of publicly shared tones. The users may discover and link their accounts to other users in the public feed via private request/accept messages. Users may "like" a tone, add a tone to their library (re-Vyng), comment on a tone, report a tone and the like. A record button may be fixed to the bottom of the feed screen. Video may play without audio as a user scrolls through the feed. Users may maximize the video by tapping on it, and when the video is maximized the accompanying audio may be played.

Figure 12:
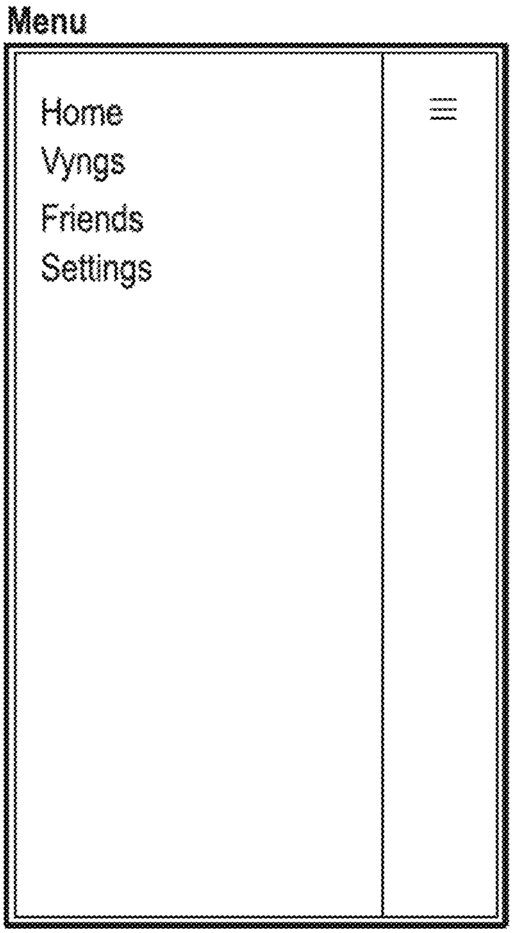
FIG. 12 illustrates a Menu screenshot of an SCCMC in accordance with an embodiment of the systems and methods disclosed herein.

FIG. 12 illustrates a "Menu" screenshot. The user may access a home screen, a list of tones (referred to as "Vyngs" in FIG. 12), a list of the user's friends, and other settings from the "Menu".

Figure 13:
FIG. 13 illustrates a Settings screenshot of an SCCMC in accordance with an embodiment of the systems and methods disclosed herein.

FIG. 13 illustrates a Settings screenshot. Various settings options may be provided to allow the second user to set allowances for his or her contacts e.g., preview tones before they automatically update on the recipient mobile 104.

FIGS. 14A-14I illustrate various screenshots for the process to enable contact editing between the first user and the second user using an SCCMC tone. A channel is provided to enable contact editing between the first user and the second user. The edits made by the first user to the contact provided to the second user may be done automatically or under control of the first user, the second user or the first and second user. A user may allow an SCCMC to be saved, synchronized, or automatically updated.

The first user may go into a payload that the first user sends to the second user. The first user may put content in the form of a profile picture, name, and email into the payload. If the first user changes any of this content, then the second user receives an update (e.g., the first user changed his or her profile picture, email, etc.) that may automatically update the content on the recipient's phone 104, or the recipient may have settings that control updates to the recipient's phone, such as by allowing the payload to be updated under control or automatically, based on the settings selected by the recipient.

The SCCMC tone created for the first user may be shared with the second user, the world, or other people selected by the first user. The first user may decide to not share the SCCMC tone.

Figure 14A:
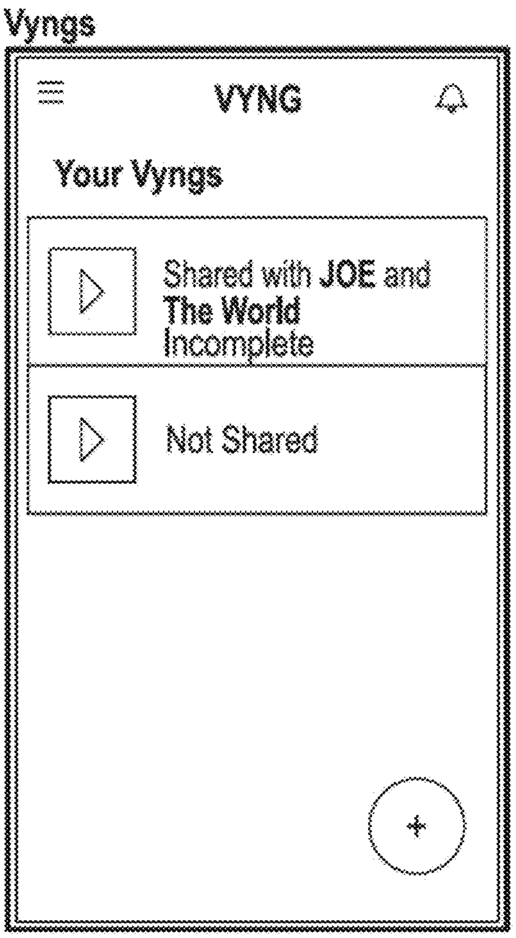
FIGS. 14A-14I illustrate screenshots of a process to enable contact editing between users in accordance with an embodiment of the systems and methods disclosed herein.
Figure 14B:
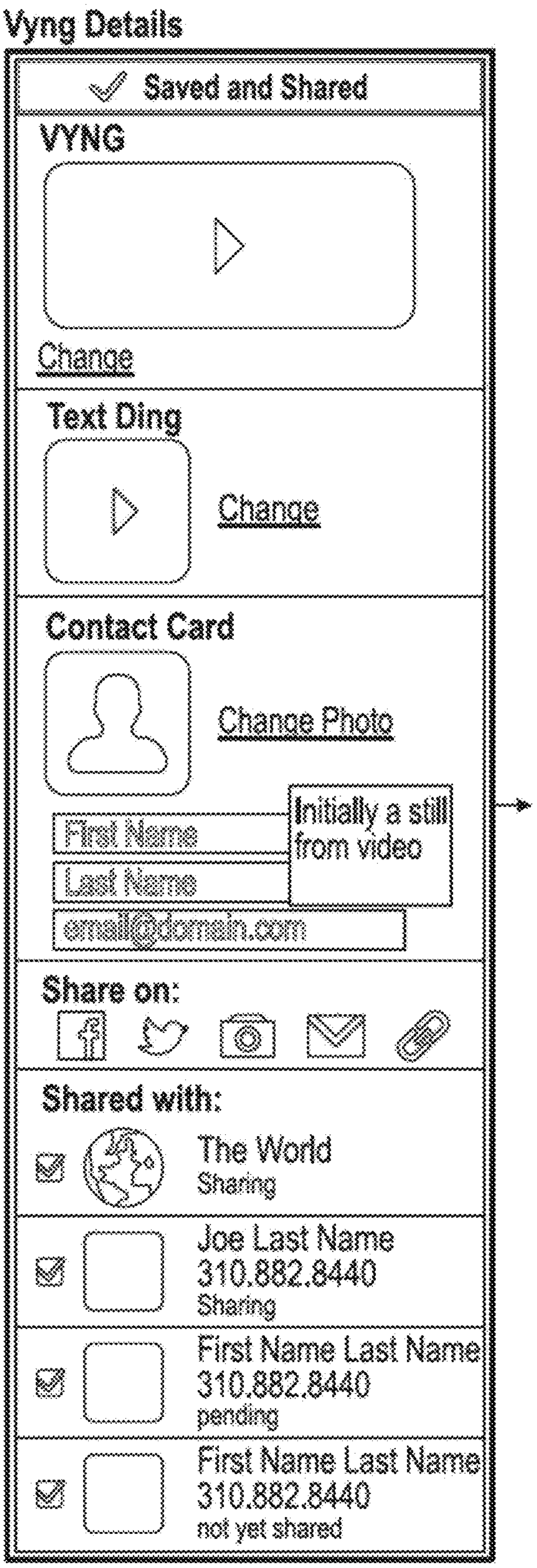
Figure 14C:
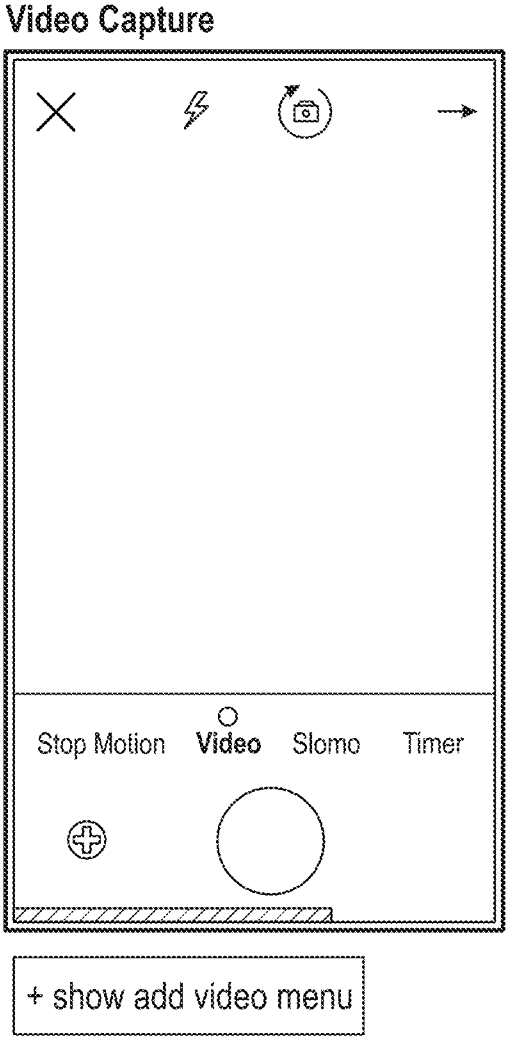
Figure 14D:
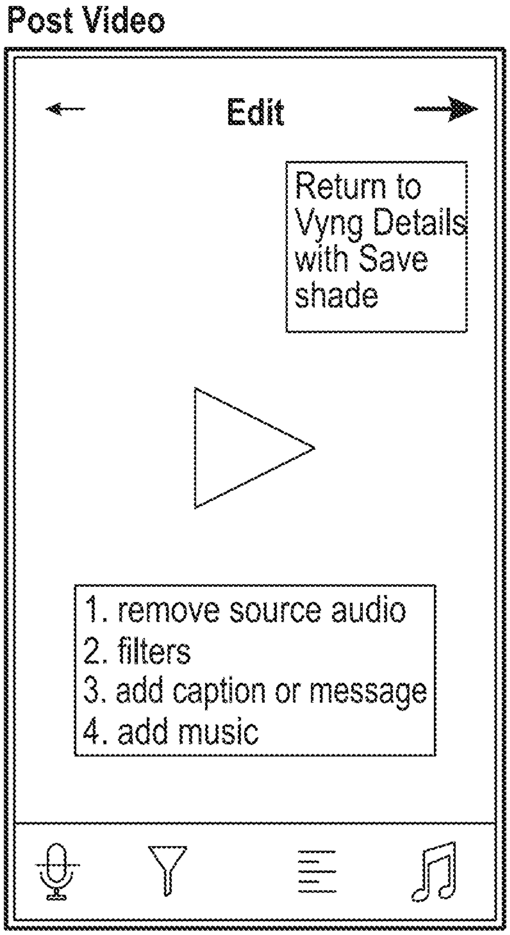
Figure 14E:
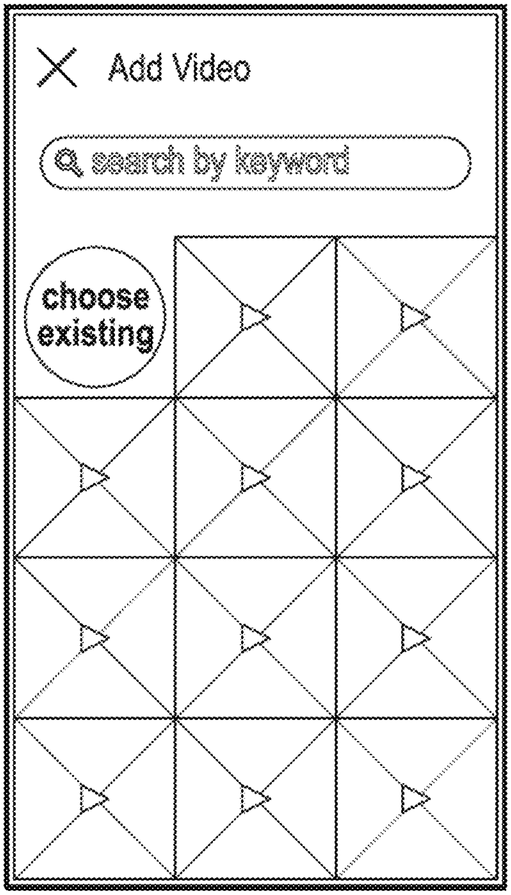
Figure 14F:
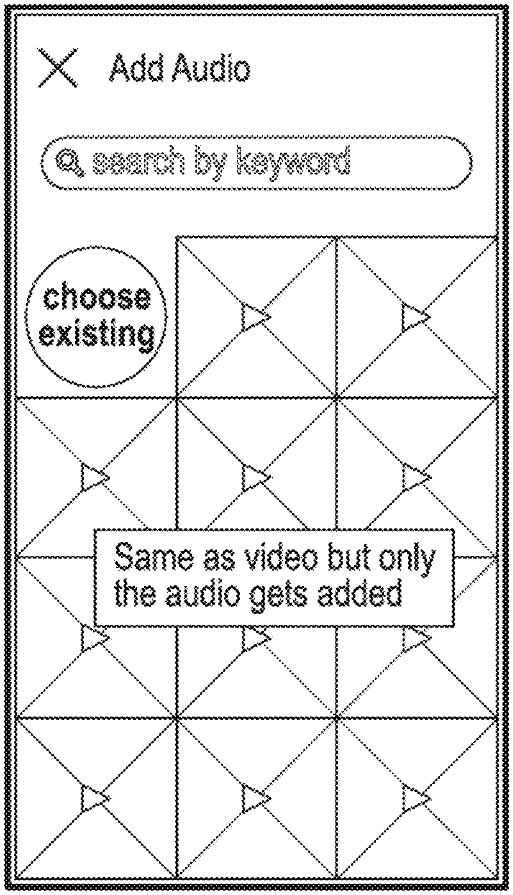
Figure 14G:
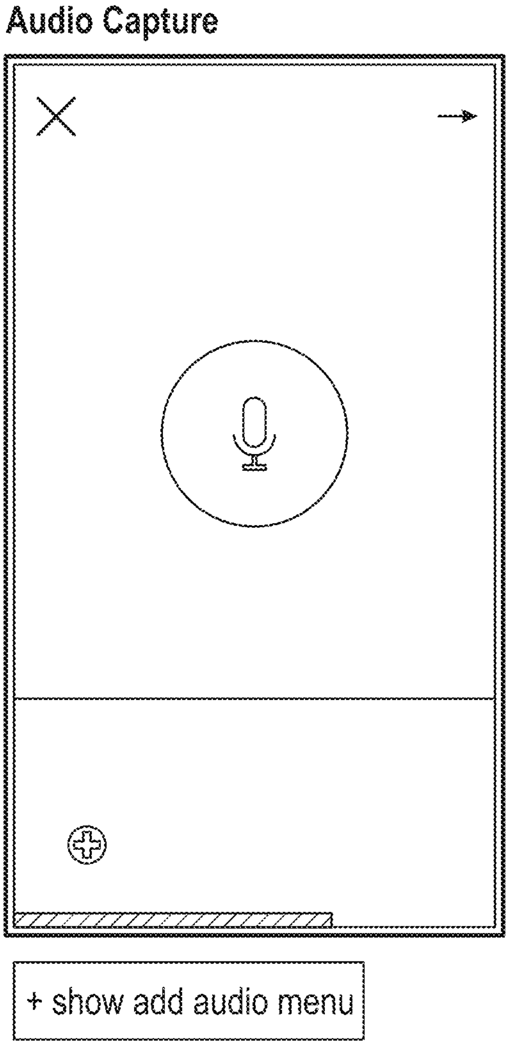
Figure 14H:
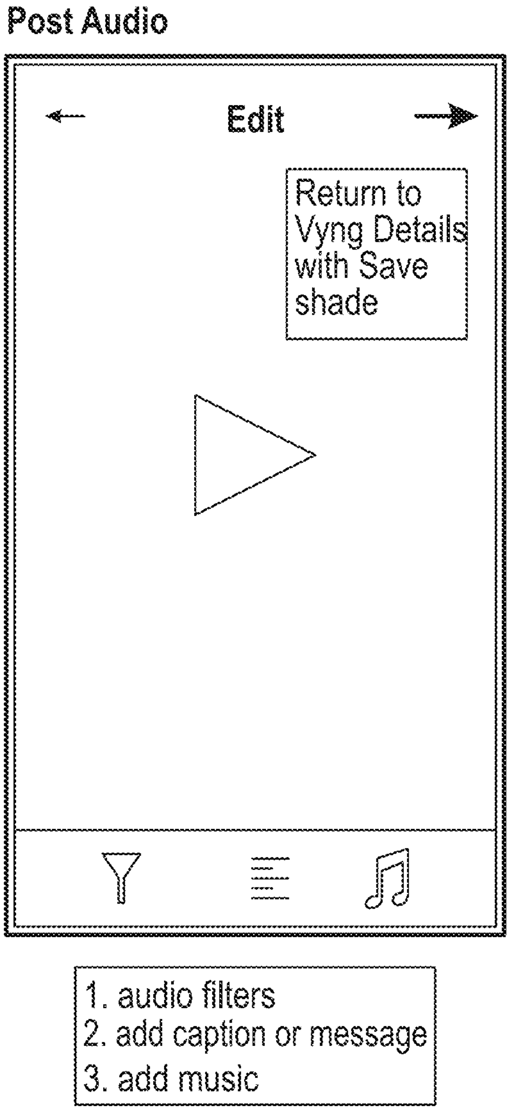
Figure 14I:
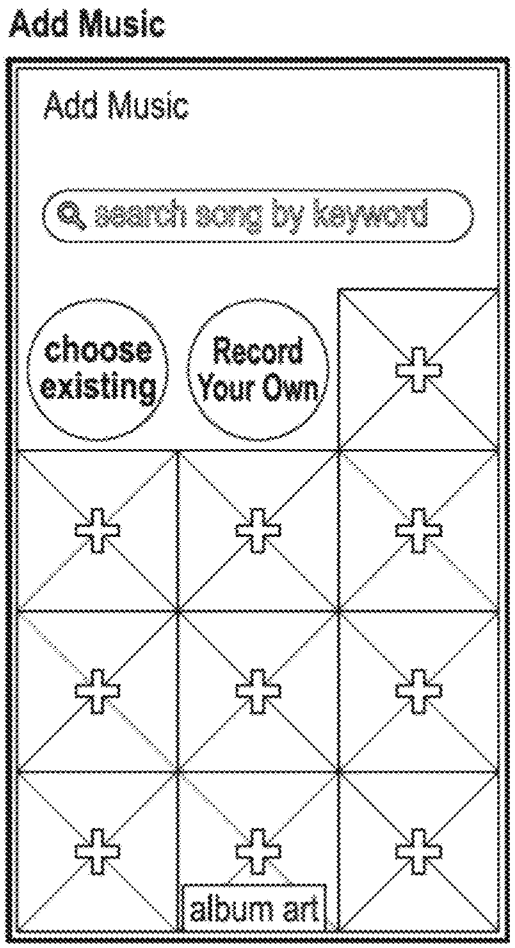

The first user may choose to select existing video or audio to add to the SCCMC tone as shown in FIGS. 14E and 14F, newly captured audio as shown in FIGS. 14G and 14H, and music as shown in FIG. 14I. Newly captured audio may be captured and posted automatically.

In an example, an SCCMC tone may live on the recipient's phone 104 at the level of the contacts function, rather than in an application that the second user has to locate, access, and use. The contact card may create all the features of the SCCMC tone using content taken from the social network of the first user. If the first user calls or texts the second user, the SCCMC displays the contact of the first user, whenever the second user uses the normal functions of the phone 102 to interact with the call or text from the first user. Thus, the SCCMC tone is played within the contacts function of the recipient's phone, without requiring the recipient to interact with an application.

Figure 15A:
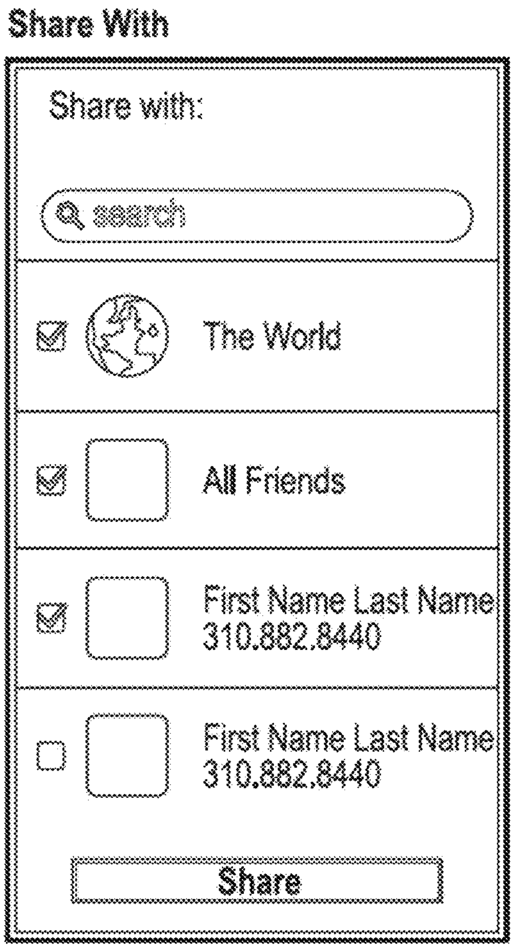
FIGS. 15A, 15B, and 15C illustrate screenshots of a process to deliver a contact with an SCCMC that automatically, or under user control, updates on the phone contacts of another user in accordance with an embodiment of the systems and methods disclosed herein.
Figure 15B:
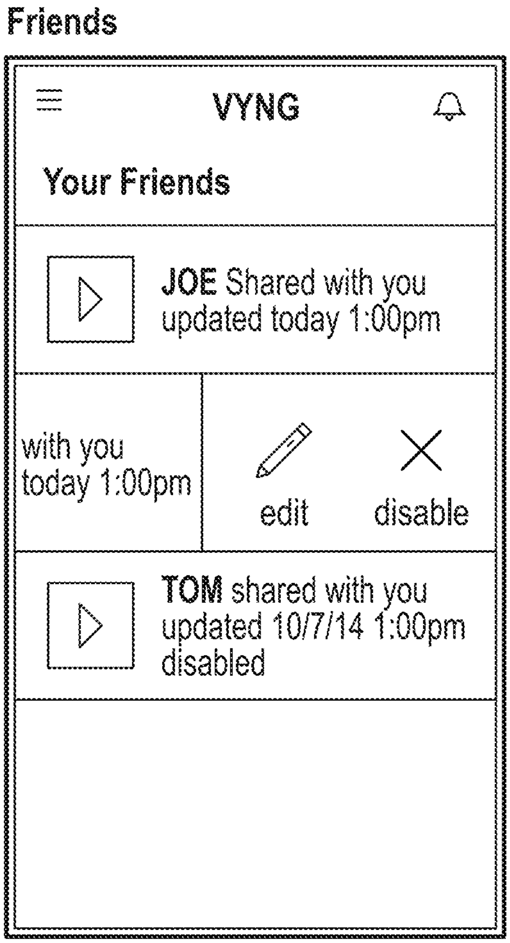
Figure 15C:
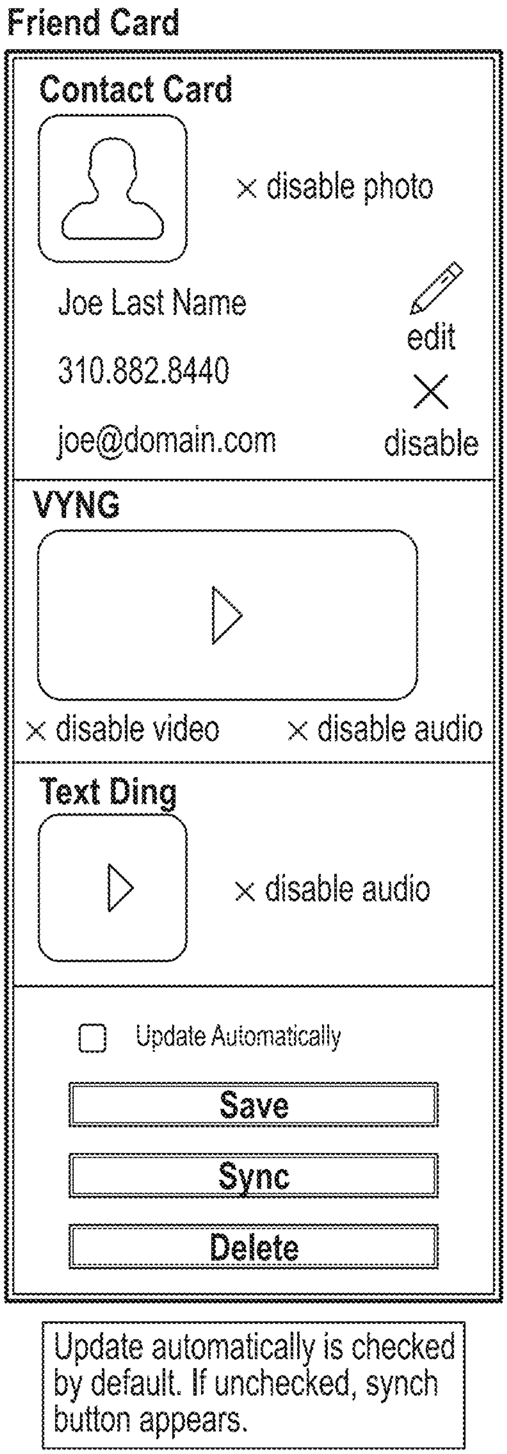

FIGS. 15A, 15B, and 15C illustrate screenshots providing the process to deliver a contact with an SCCMC tone that then automatically, or under user control, updates on the phone contacts of another user. FIG. 15A illustrates a screenshot providing an interface that may allow a first user to select with whom the first user wishes to share the SCCMC tone. The first user may choose to share the SCCMC tone publicly, for example with the world, with all friends or with selected friends. FIG. 15B illustrates a screenshot providing an interface that may allow a second user who receives the SCCMC from the first user to enable or disable the SCCMC. FIG. 15C illustrates a screenshot providing an interface that may allow the second user to edit the SCCMC received from the first user and control the behavior of the SCCMC on the phone of the second user.

Various content control functions may be enabled. When the App receives new or updated SCCMC tone information, the App may update the local store of metadata in the application database and update the local contact information of the registered user with fields stored in a data record for the SCCMC tone. The App may also convert the ringtone audio portion of the SCCMC tone into an acceptable format for a ringtone or text tone on the local device, save the ringtone to the shared data store in the phone's operating system, and register the ringtone with the operating system. Using application programming interfaces (APIs) of the operating system, the App may assign the ringtone to the sender on the recipient's phone 104.

Figure 16:
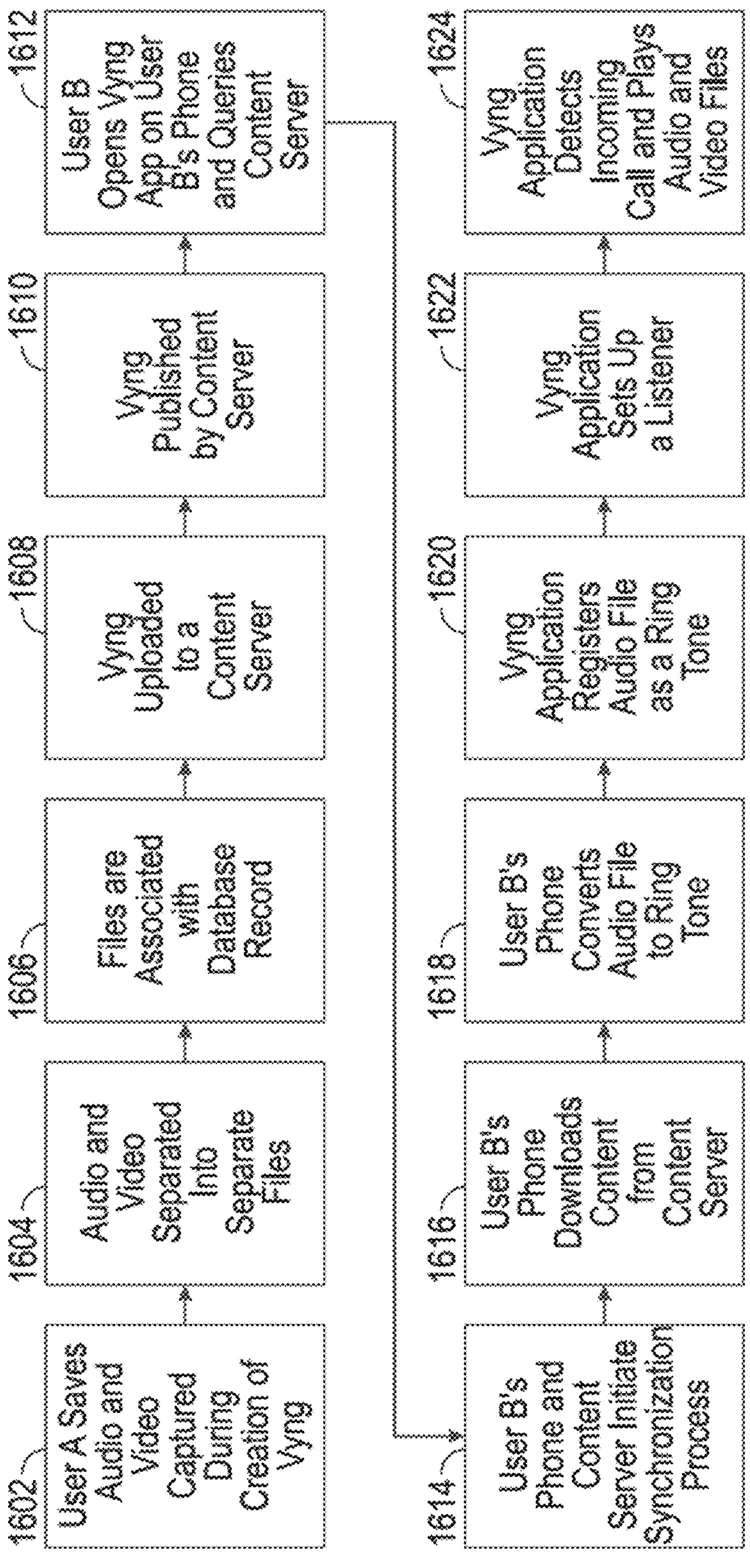
FIG. 16 illustrates a process for transferring an SCCMC from User A to User B in accordance with an embodiment of the systems and methods disclosed herein.

FIG. 16 depicts steps of a method for enabling delivery of an SCCMC tone from the first user (User A) to the second user (User B), according to an embodiment. First, in a step 1602, the first user, referred to herein as User A, may save audio and video captured during creation of the SCCMC tone, which may include audio and video captured by a video camera of the user's phone, audio and/or video retrieved from saved files, and/or video and/or audio retrieved from other sources, such as found in a search, retrieved from storage (including in the cloud), or the like. Next, in a step 1604, the audio and video may be separated into two separate files, one for audio and one for video.

Next, in a step 1606, the files may be associated with a database record that may store information about the SCCMC tone, such as the identifying information for User A, identifying information and property information for the audio file and the video file, and metadata, such as further information about user A and information about how User A wishes to share the SCCMC tone. At a step 1608, the SCCMC tone may be uploaded from User A's mobile phone 102, such as a smartphone, to a content server 112, and at a step 1610 the content server 112 may publish the SCCMC tone along with certain privacy controls that are based on preferences of User A, such as whether the SCCMC tone is just for User A, is intended to be shared with another party (referred to here as User B or the second user) or parties, or is intended to be public. Such privacy controls for a given SCCMC tone may be captured in the application that User A uses on User A's device to create and upload the SCCMC tone.

Next, at a step 1612, User B may open the App on User B's mobile phone 104, which queries the content server 112 to assess what is available to User B's mobile phone 104 in a feed that is associated with User B, which may include User B's own creations, content shared with User B by others (such as User A), and public content published by various users. The content server 112 and User B's mobile phone 104 may undertake a synchronization process at step 1614, where a difference is determined between the available feed on the content server 112 and the content already on User B's phone, after which at a step 1616 User B's mobile phone 104 downloads any content not already present on User B's phone from the content server 112. Once the updated SCCMC tone data is downloaded, the SCCMC App on User B's mobile phone 104 may turn the audio file portion of the SCCMC tone into a ring tone at step 1618, which is a special class or format that typically has its own registry in mobile operating systems, such as the Android™ or iOS™ mobile operating systems, deployed on certain smartphones. At step 1620, the SCCMC App may register the audio file associated with the SCCMC tone in the ringtone registry as a ringtone. Next, at a step 1622, the SCCMC tone may set up a listener, using the feature of the operating system that enables listening for incoming phone calls (which in the case of devices running the Android™ mobile operating system is enabled by an SDK for the operating system). The SCCMC App may access native APIs exposed by the Android™, iOS™ or other operating systems to listen for a call. At a step 1624, if an incoming call is detected from a number (e.g., the number of User A) that has a tone associated with it on User B's mobile phone 104, the SCCMC App retrieves the audio and/or video file portions of the SCCMC tone that was downloaded and the audio file portion and video file portion may be played individually or together.

In some closed operating system environments, one cannot detect an incoming phone call or set the user's ringtone for the user. In such cases, the content server 112 may just update contact information on User B's mobile phone 104, such as allowing User B to save an SCCMC tone for calls from User A, but in such cases possibly requiring actions for User B that are not needed in other situations. In embodiments, the content server 112 may also push notifications to users, so that User B may view User A's content that was shared for User B.

In embodiments, such as involving closed operating systems, an SCCMC content tone may be downloaded and stored on User B's mobile phone 104 for later access, such as at a time when the operating system makes available the ability to listen to a call, or at such time as the user elects to have the phone "jailbroken" or otherwise made open.

In embodiments, other ways to share content may involve the P2P transfer of an SCCMC tone, optionally with separated audio and video components, directly from a phone of a first user to a second user, without requiring a content server 112 or client-server arrangement, or with the content server 112 supplying a complementary role, but not being required for the transfer of the SCCMC. This may include using the Airdrop™ function in phones that use the iOS™ operating system or similar P2P transfer functions in other operating systems, such as Android™.

Figure 17A:
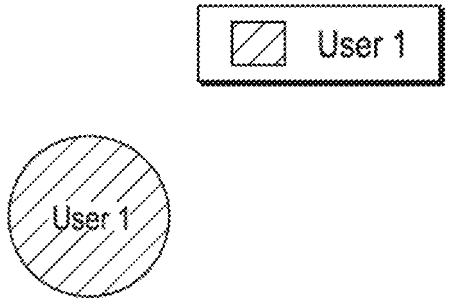
FIGS. 17A-17D illustrate user community growth of an SCCMC through a viral sharing effect in accordance with an embodiment of the systems and methods disclosed herein.
Figure 17B:
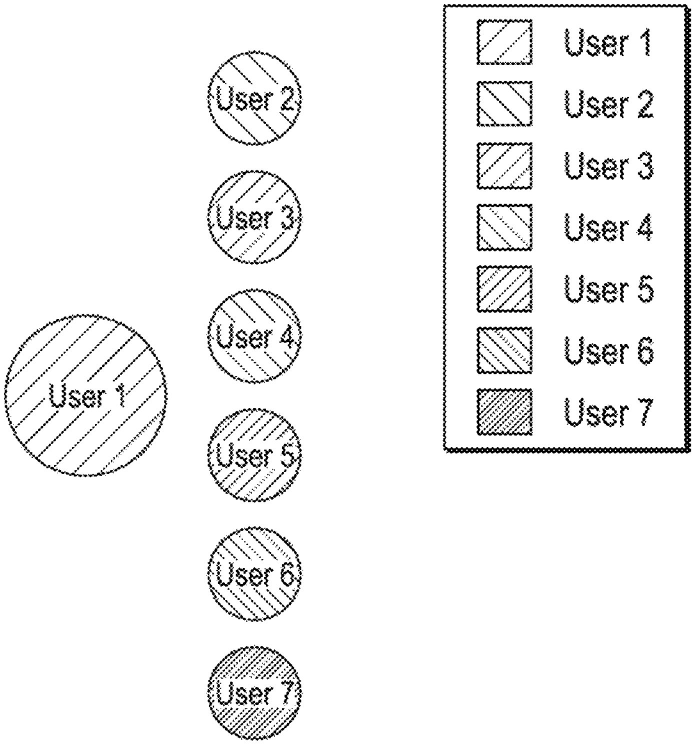
Figure 17C:
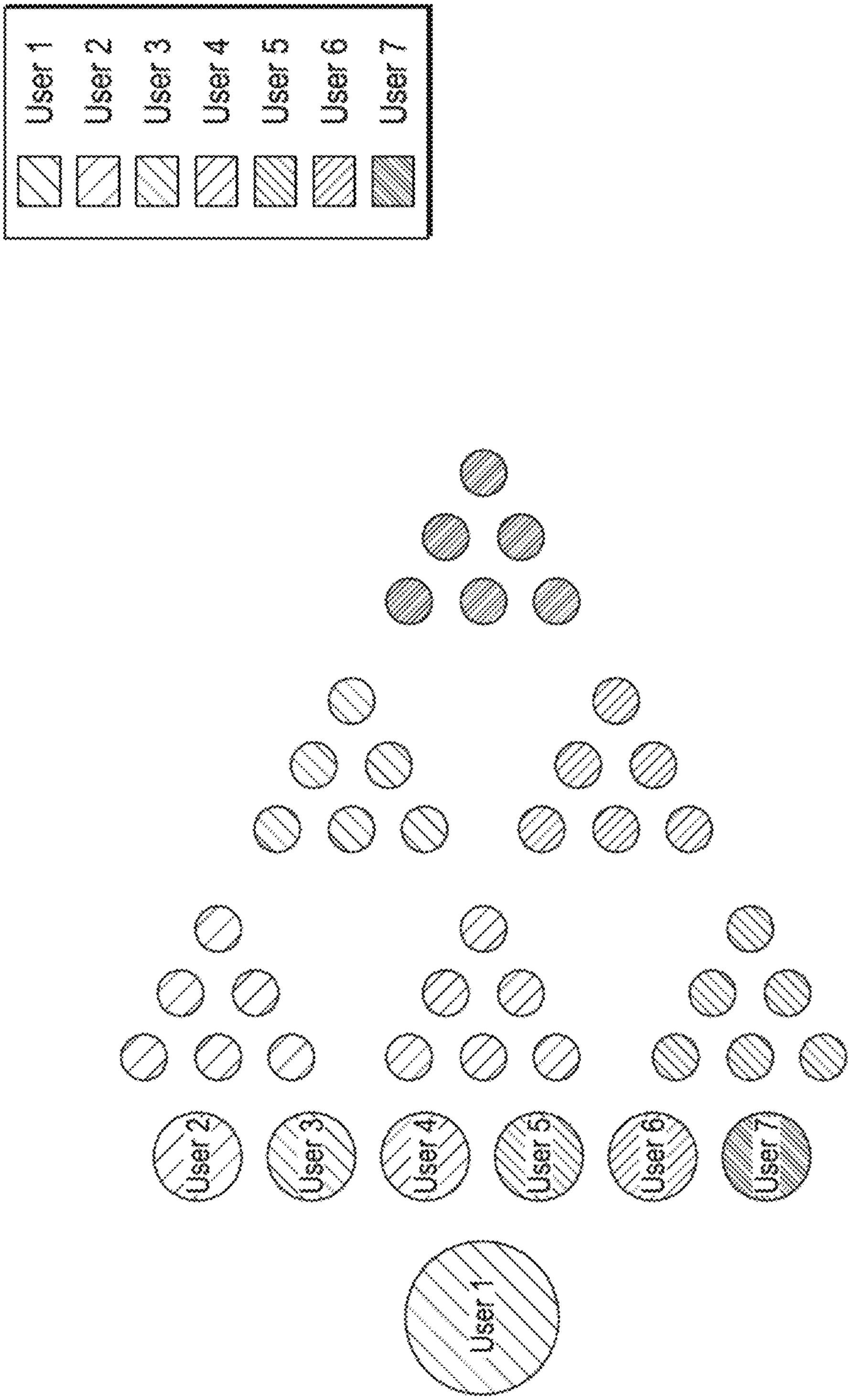
Figure 17D:
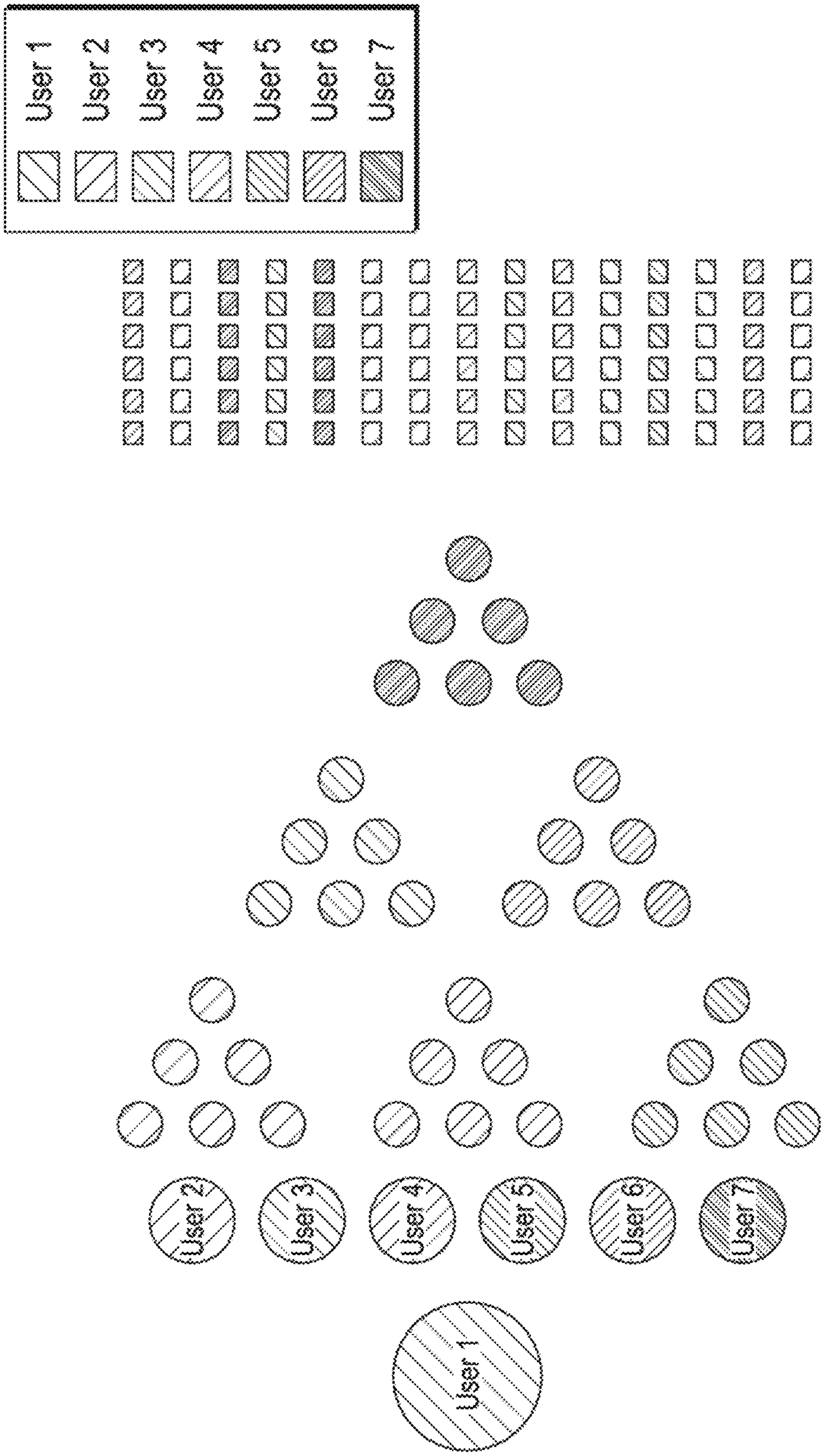

FIGS. 17A-D illustrate a user community growth through viral sharing effects. FIG. 17A illustrates a first user who has created an SCCMC tone. FIG. 17B illustrates the first user sharing the SCCMC tone with a first set of recipients. As illustrated in FIG. 17C, upon receipt of the SCCMC tone from the first user, the first recipients create and share their own SCCMC tones with a second set of recipients and the first set of recipients become users of the SCCMC tones in the process. FIG. 17D illustrates the second set of recipients then sharing their own SCCMC tones with a third set of recipients, as the second set of recipients become users of the SCCMC tones in the process, continuing the growth cycle.

Figure 18A:
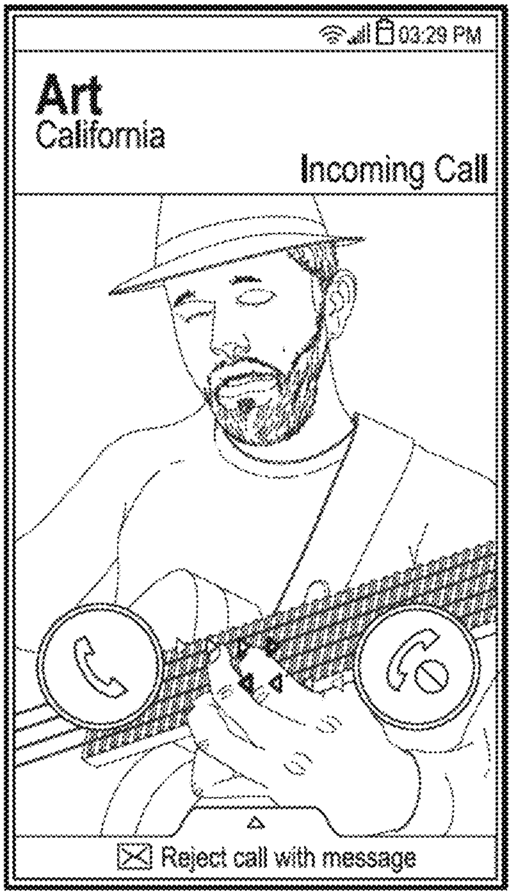
FIGS. 18A, 18B, and 18C illustrate monetization examples of an SCCMC in accordance with an embodiment of the systems and methods disclosed herein.
Figure 18B:
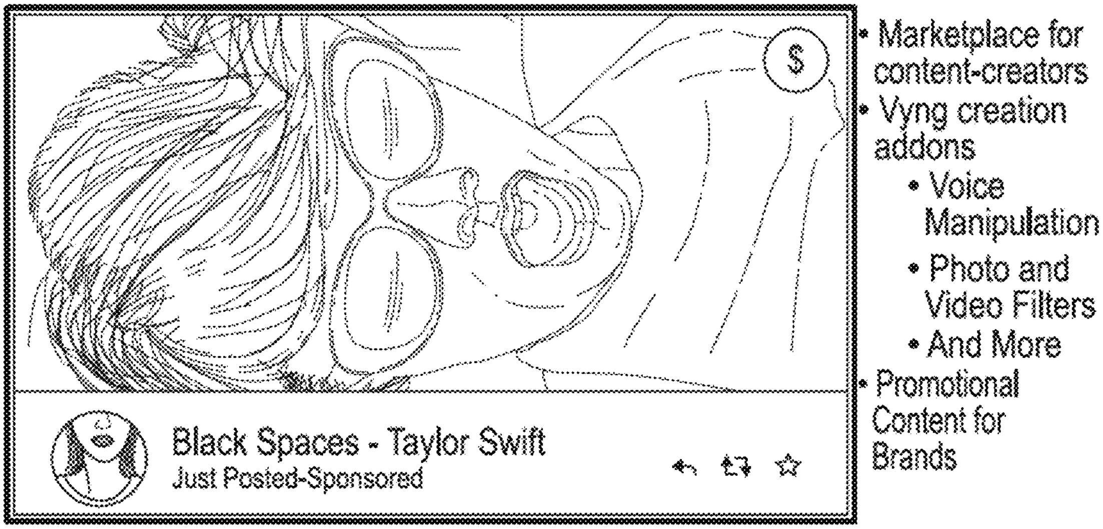
Figure 18C:
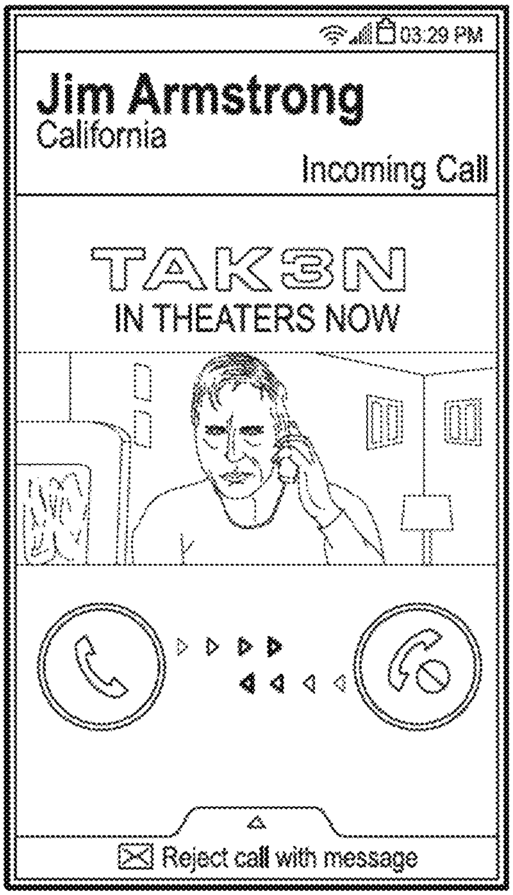

FIGS. 18A, 18B, and 18C illustrate monetization examples. FIG. 18A illustrates built-in advertising opportunities made available by a recipient of an SCCMC tone asking the sender of the SCCMC how sender created/used/shared a sender-controlled SCCMC. FIG. 18B illustrates a premium sender-controlled SCCMC tone as posted on a content feed. A premium SCCMC tone may support content taken from a marketplace for content creators. The marketplace for content creators may include SCCMC tone creation add-ons and brand promotional content. Brand promotional content be directly uploaded to the marketplace by brands and may include brand songs.

A creator of an SCCMC may select content from the marketplace to include in the SCCMC that the user is creating. A creator of an SCCMC may select content from a content library that is made available by the marketplace to the creator of the SCCMC. The marketplace may make available SCCMC content add-ons, which may include voice manipulation functions, photo filters, video filters, and the like. A premium SCCMC may also include promotional content for brands. An affiliate code may be linked to an SCCMC or a particular content component, such as an audio or video file, included in an SCCMC. Content may be ranked, rated, shared, liked, or subscribed to by content creators, content senders, or content recipients.

FIG. 18C illustrates an example of advertising in a sender-controlled SCCMC, in which an advertisement is displayed to a second user when a first user calls or sends a text message to a second user. An advertisement may include image components, audio components, video components, and the like.

In another example, a sender of an SCCMC tone may associate a song with an SCCMC tone and choose to have that song play on the mobile device of a recipient when the sender calls or sends a text message to that recipient. The song may be a song performed by a favorite artist, another favorite song, and the like. In yet another example, a pre-recorded message from a celebrity personality may play on the phone of a recipient of an SCCMC tone when the sender of the SCCMC tone calls or sends a text message to the recipient. The pre-recorded message may be selected based on how the recipient chooses to interact with the call or text message by either accepting, rejecting, or replying to the call or message.

Figure 19:
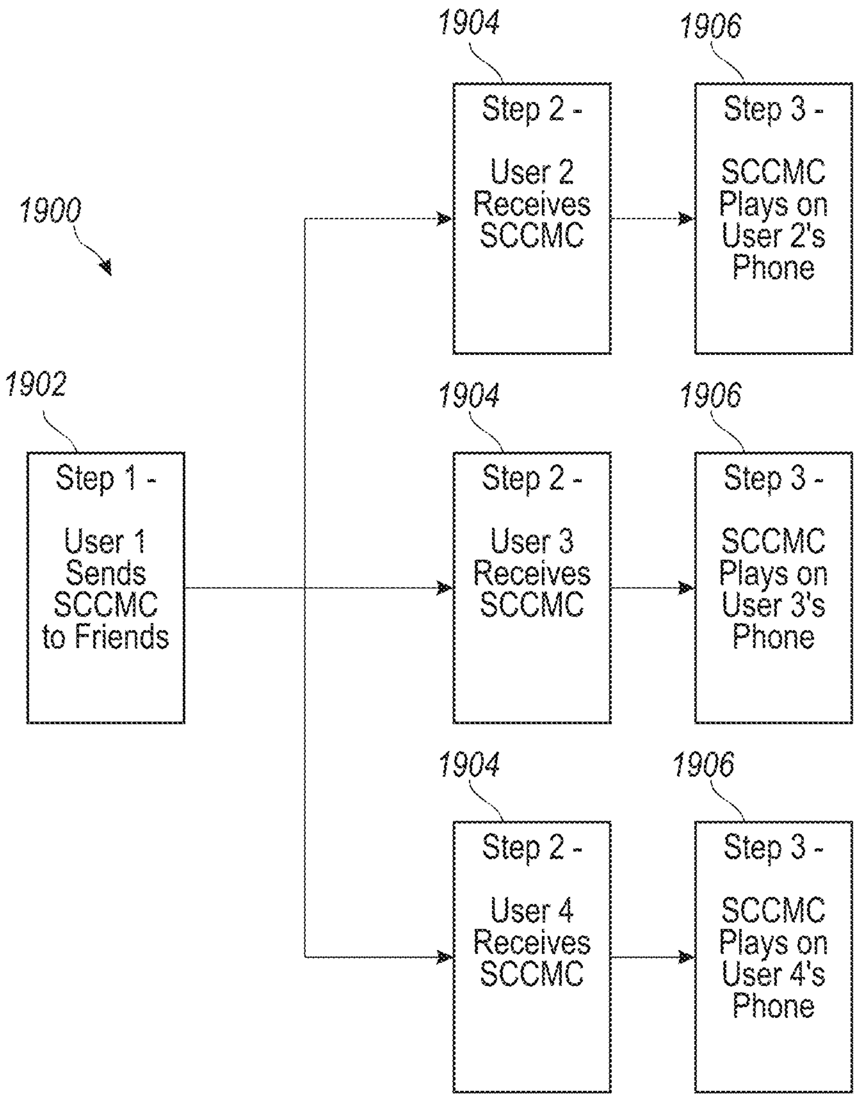
FIGS. 19-21 illustrate trigger examples of an SCCMC in accordance with an embodiment of the systems and methods disclosed herein.

FIG. 19 illustrates flow 1900 in which an SCCMC that may be triggered to play by the sending of an SCCMC from a user to a friend or group of friends. In the example illustrated in FIG. 19, a first user may send an SCCMC to a group of friends, shown in this example as a second user, a third user and a fourth user, as illustrated in first step 1902. In a second step 1904, the second user, third user and fourth user may receive the SCCMC from the first user. In a third step 1906, the SCCMC may play immediately on the screen of the second user's mobile phone when the SCCMC is received on the second user's mobile phone, the screen of the third user's mobile phone when the SCCMC is received on the third user's mobile phone and the screen of the fourth user's mobile phone when the SCCMC is received on the fourth user's mobile phone. An SCCMC that may be triggered to play by the sending of an SCCMC from a user to a friend or group of friends may be referred to as a "Vyng Bomb," in some cases. It may be noted that the SCCMC may be delivered, as described in connection with FIGS. 2B and 2C, over transmission layers of voice and data networks, so that user 2 may receive the SCCMC over a data network and play it upon initiation of a VOIP call, while user 3 may receive the SCCMC over a voice network, such that the SCCMC tone is played on the screen of user 3's phone when the call is received. In embodiments, the trigger to play the SCCMC may comprise a push notification over a data network without involving a phone call. The SCCMC may, in such embodiments, play and immediately disappear without there ever existing a phone call or a VoIP call.

Figure 20:
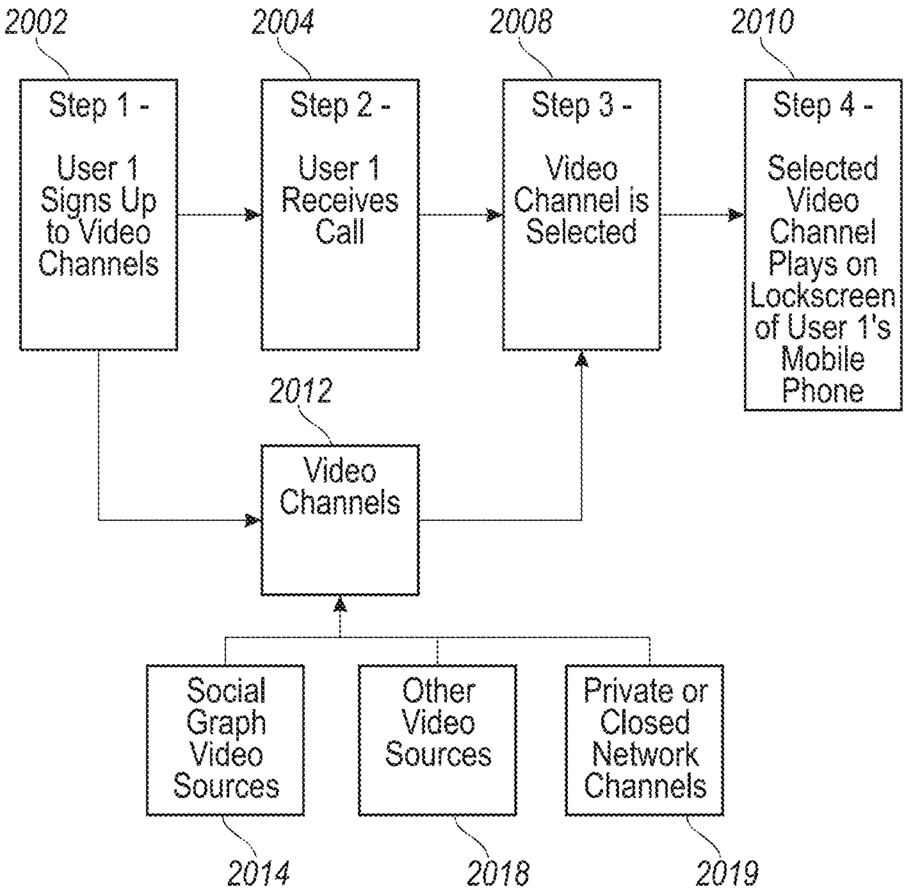

FIG. 20 illustrates an SCCMC that may be selected from a set of video content. In a first step 2002, a first user may sign up to receive content from one or more video channels 2012. Video channels 2002 may be selected from social graph video sources 2014 or other video sources 2018, such as libraries curated by editors or curated automatically, such as by one or more algorithms that identify, and aggregate content based on, for example, a defined topic of interest. Social graph video sources 2014 may be created in the SCCMC App or found in other apps from the social graph of a user, such as videos from Facebook™, Twitter™, LinkedIn™, SnapChat™, Periscope™ and the like. Other video sources 2018 may include local sports team video sources, world news video sources, trending videos in categories video sources, top music video sources and the like. Local sports team video sources may include the latest highlights from local teams, the favorite teams of the first user and the like. World news video sources may include the latest world news. Trending videos in categories video sources may include trending videos in a category such as "cats," for example. Top music video sources may include clips of trending music videos. Once a user has signed up, in a second step 2004, the first user may receive a call. In a third step 2008, a video channel may be selected after the first user receives a call. In a fourth step 2010, a video from the video channel selected in the step 2008 may play on the screen of the first user's mobile phone. In embodiments, in addition to or as an alternative to the user's social graph, there may be one or more private or closed-network channels 2019 that users may create and into which they may add their own videos. These private channels 2019 may be made available by invitation (and optionally closed to uninvited users). For example, there may be a channel #UCLA where only students who attend the university receive permission to view and participate video content within the channel, such as, in embodiments, via some combination of invitation, password, and location (such as by use of a geofence relating to a location of the university).

In the various embodiments described throughout this disclosure, an SCCMC may also be a live look video. A live look video may allow a second user to receive a live look at first user, when a first user sends an SCCMC or otherwise initiates a call to a second user. A live look may allow the second user to immediately see the face of the first user upon receipt of the SCCMC from the first user or notification that the first user is calling the second user. The live look video may play on the screen of the device of the second user, such as the lock screen, home screen, or other screens. A live look video may be generated by initiating a live video stream. A live video stream may be initiated using a live video stream generator. A live stream generator may be an application, such as Skype, Facetime, Periscope, or the like. A live video stream may also be recorded and sent as a series of small video segments. A live look video may be viewed through the window that an SCCMC app has opened on the screen of a user's mobile phone.

Figure 21:
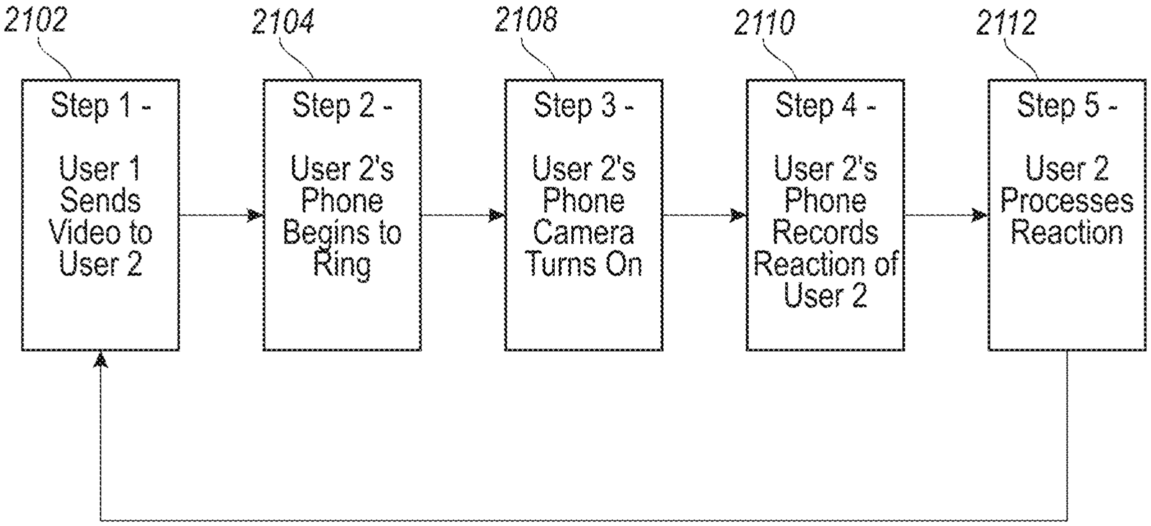

Sending an SCCMC may include automatically recording a user's reaction to an SCCMC, as illustrated in FIG. 21. In a first step 2102, a first user may send an SCCMC to a second user. The second user may receive the SCCMC from the first user in a second step 2104. The mobile phone of the second user may record the reaction of the second user in a third step 2018, such as by having the SCCMC include instructions to turn on the camera of the recipient's phone facing in the direction of the recipient. At a fourth step 2110, the recipient's phone may turn on the camera and record the reaction of the recipient. In embodiments, the second user may give permission to the second user's mobile phone to record the reaction of the second user. Permission may be given by the second user to the second user's mobile phone to record the reaction of the second user prior to receipt of the SCCMC, upon receipt of the SCCMC, before the SCCMC begins to play and the like. In a step 2112, the recipient user may be offered options to process the reaction, such as being given an option to save, upload or share the second user's reaction.

Figure 22:
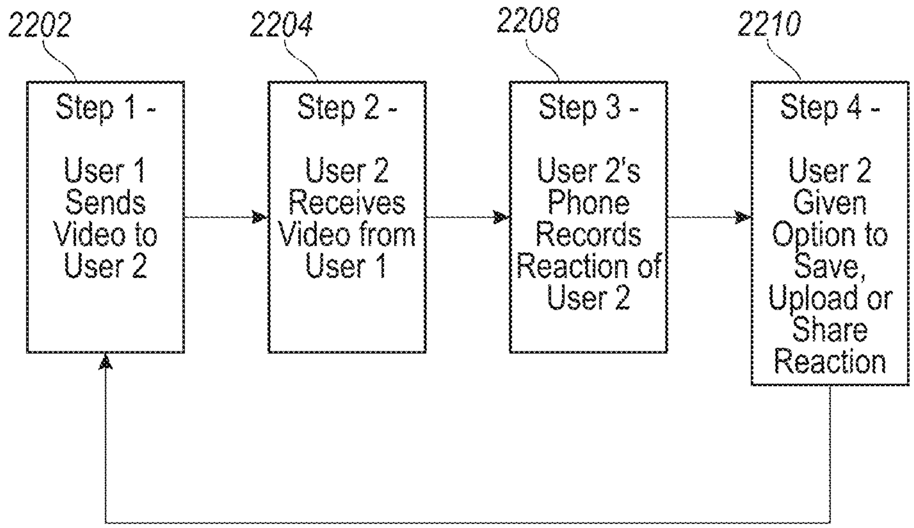
FIG. 22 illustrates a flow in which a second user's reaction to an SCCMC is recorded and shared with another party.

FIG. 22 shows an alternative embodiment of a flow for obtaining a reaction to an SCCMC. After the sender sends the SCCMC in a step 2202, the recipient receives the SCCMC at a step 2204, and the recipient's phone records the recipient's reaction at a step 2208, the recipient may be given an option at a step 2210 to save, upload, or share the reaction, such as with the sender, with the social circle of the recipient, or otherwise, including the option to store the reaction as an SCCMC, such as in a library of SCCMC content.

Figure 23:
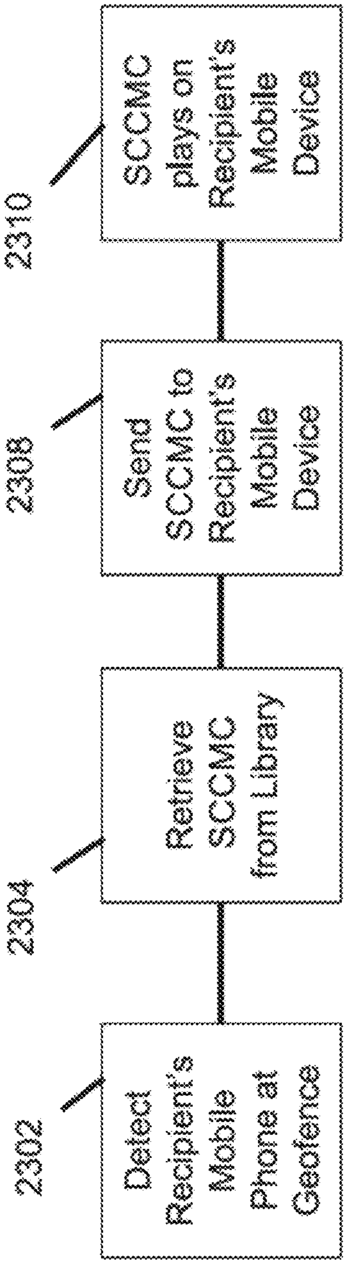
FIG. 23 illustrates a flow in which the playing of an SCCMC may be triggered by a triggering event.

FIG. 23 illustrates a flow in which the playing of an SCCMC may be triggered by a triggering event, such as entry of a recipient's mobile device into a location, such as defined by a geofence. At a step 2302, the location of the recipient's device may be detected at a location, such as defined by a geofence (or otherwise detected at a location according to various location systems known to those of skill in the art of mobile telecommunications). The geofence may surround, by way of example, a point of interest, such as a location within a museum, park, or exhibit, a store or other location relevant to promotion or sale of products or services, an educational location within a school, college, or university, or any other location for which there may be relevant content that may be presented via an SCCMC. Upon detection at the step 2302, an SCCMC may be retrieved at a step 2304, such as from a library of SCCMCs. This may include retrieving content that is associated with the location (such as content about a nearby museum exhibit or a nearby product) and may include retrieving content relevant to the recipient (such as content relating to that recipient's preferences, as indicated by selection of channels, by reactions to particular content, by the recipient's preferences as indicated by other data sources (such as purchases, interactions with content, or the social graph of the recipient), or the like. An SCCMC may be retrieved based in part on whether the recipient has visited the location before (information which may be stored by the host system or stored locally at the computing infrastructure for a geofence), so that the SCCMC may be varied for repeat visitors. The content server may retrieve an appropriate SCCMC and, at a step 2308, send it to the recipient's mobile device. Then the SCCMC may play on the device 2310 as described in connection with various embodiments described throughout this disclosure.

Figure 24:
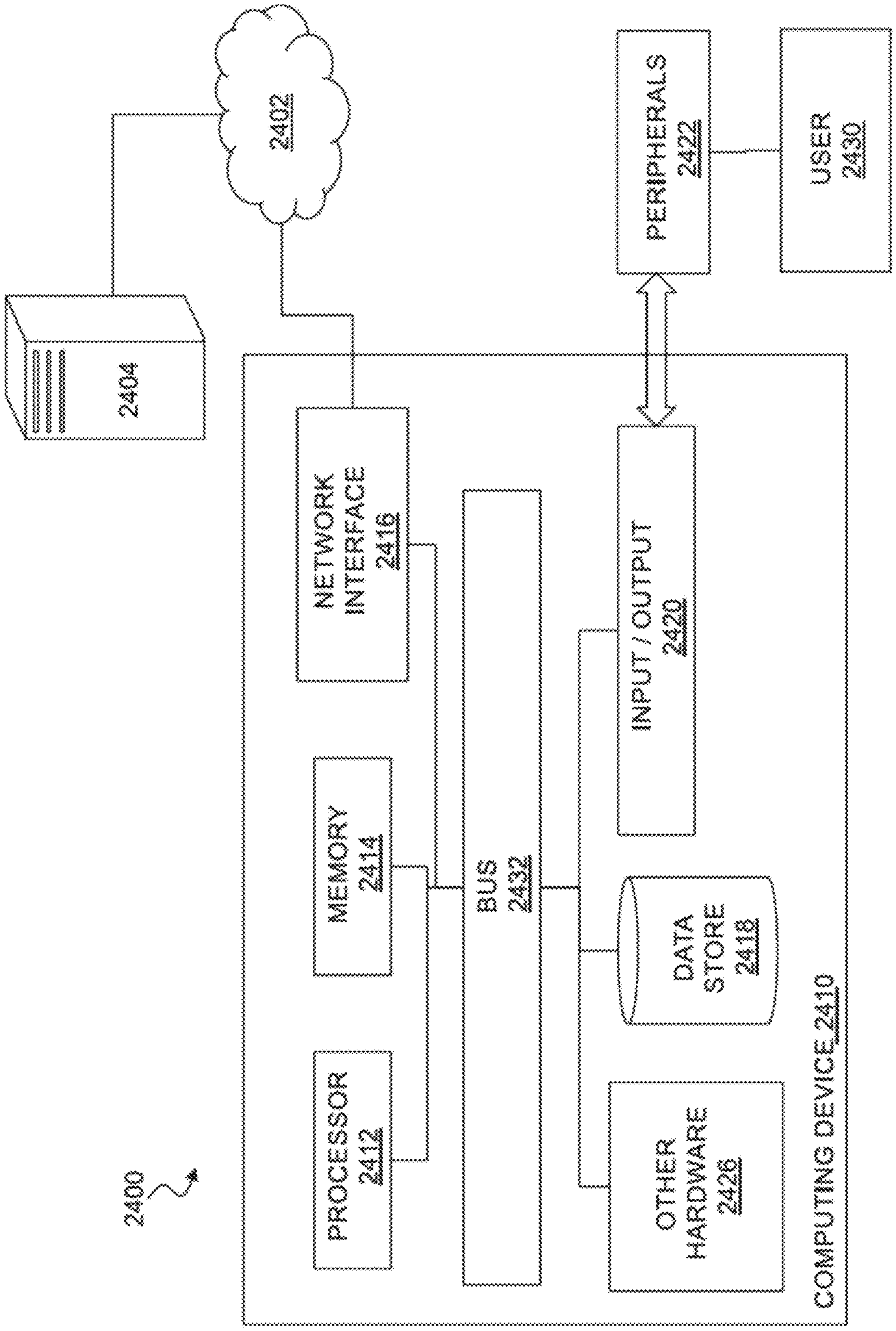
FIG. 24 illustrates a computer system.

FIG. 24 illustrates a computer system, e.g., a computer system that may be used in conjunction with the devices, systems, and methods described herein. In general, the computer system 2400 may include a computing device 2410 connected to a network 2402, e.g., through an external device 2404. The computing device 2410 may be or include any type of client or other network endpoints as described herein, e.g., a mobile device as described throughout this disclosure. The computing device 2410 may also or instead be any device suitable for interacting with other devices over a network 2402, such as a laptop computer, a desktop computer, a personal digital assistant, a tablet, a mobile phone, a television, a set top box, a wearable computer, and the like. The computing device 2410 may also or instead include a server such as any of the servers described herein.

In certain aspects, the computing device 2410 may be implemented using hardware (e.g., in a desktop computer), software (e.g., in a virtual machine or the like) or a combination of software and hardware. The computing device 2410 may be a standalone device, a device integrated into another entity or device, a platform distributed across multiple entities, or a virtualized device executing in a virtualization environment.

The network 2402 may include any network described above, e.g., data network(s) or internetwork(s) suitable for communicating data and control information among participants in the computer system 2400. This may include public networks such as the Internet, private networks, and telecommunications networks such as the Public Switched Telephone Network or cellular networks using third generation cellular technology (e.g., 3G™ or IMT-2000™), fourth generation cellular technology (e.g., 4G™, LTE™, MT-Advanced™, E-UTRA™, etc.) or WiMAX-Advanced™ (IEEE 802.16m)) and/or other technologies, as well as any of a variety of corporate area, metropolitan area, campus or other local area networks or enterprise networks, along with any switches, routers, hubs, gateways, and the like that may be used to carry data among participants in the computer system 2400. The network 2402 may also include a combination of data networks and need not be limited to a strictly public or private network.

The external device 2404 may be any computer or other remote resources that connects to the computing device 2410 through the network 2402. This may include gateways or other network devices, remote servers or the like containing content requested by the computing device 2410, a network storage device or resource, or any other resource or device that may connect to the computing device 2410 through the network 2402.

In general, the computing device 2410 may include a processor 2412, a memory 2414, a network interface 2416, a data store 2418, and one or more input/output interfaces 2420. The computing device 2410 may further include or be in communication with peripherals 2422 and other external input/output devices that may connect to the input/output interfaces 2420.

The processor 2412 may be any processor or other processing circuitry capable of processing instructions for execution within the computing device 2410 or computer system 2400. The processor 2412 may include a single-threaded processor, a multi-threaded processor, a multi-core processor and so forth. The processor 2412 may be capable of processing instructions stored in the memory 2414 or the data store 2418.

The memory 2414 may store information within the computing device 2410. The memory 2414 may include any volatile or non-volatile memory or other computer-readable mediums, including without limitation a Random-Access Memory (RAM), a flash memory, a Read Only Memory (ROM), a Programmable Read-only Memory (PROM), an Erasable PROM (EPROM), registers, and so forth. The memory 2414 may store program instructions, program data, executables, and other software and data useful for controlling operation of the computing device 2410 and configuring the computing device 2410 to perform functions for a user. The memory 2414 may include a number of different stages and types of memory for different aspects of the operation of the computing device 2410. For example, a processor may include on-board memory and/or cache for faster access to certain data or instructions, and a separate, main memory or the like may be included to expand memory capacity as desired. All such memory types may be a part of the memory 2414 as contemplated herein.

The memory 2414 may, in general, include a non-volatile computer readable medium containing computer code that, when executed by the computing device 2410 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 2414 is depicted, it will be understood that any number of memories may be usefully incorporated into the computing device 2410. For example, a first memory may provide non-volatile storage such as a disk drive for permanent or long-term storage of files and code even when the computing device 2410 is powered down. A second memory such as a random-access memory may provide volatile (but higher speed) memory for storing instructions and data for executing processes. A third memory may be used to improve performance by providing higher speed memory physically adjacent to the processor 2412 for registers, caching, and so forth.

The network interface 2416 may include any hardware and/or software for connecting the computing device 2410 in a communicating relationship with other resources through the network 2402. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that may be used to carry data between the computing device 2410 and other devices. The network interface 2416 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 2416 may include any combination of hardware and software suitable for coupling the components of the computing device 2410 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 2402 such as the Internet. This may also or instead include hardware/software for a WiMAX connection or a cellular network connection (using, e.g., CDMA, GSM, LTE, or any other suitable protocol or combination of protocols). The network interface 2416 may be included as part of the input/output devices 2420 or vice-versa.

The data store 2418 may be an internal memory store providing a computer-readable medium such as a disk drive, an optical drive, a magnetic drive, a flash drive, or other devices capable of providing mass storage for the computing device 2410. The data store 2418 may store computer readable instructions, data structures, program modules, and other data for the computing device 2410 or computer system 2400 in a non-volatile form for subsequent retrieval and use. For example, the data store 2418 may store without limitation one or more of the operating system, application programs, program data, databases, files, and other program modules or other software objects and the like.

The input/output interface 2420 may support input from an output to other devices that may couple to the computing device 2410. This may, for example, include serial ports (e.g., RS-232 ports), universal serial bus (USB) ports, optical ports, Ethernet ports, telephone ports, audio jacks, component audio/video inputs, HDMI ports, and so forth, any of which may be used to form wired connections to other local devices. This may also or instead include an infrared interface, RF interface, magnetic card reader, or other input/output system for coupling in a communicating relationship with other local devices. It will be understood that, while the network interface 2416 for network communications is described separately from the input/output interface 2420 for local device communications, these two interfaces may be the same, or may share functionality, such as where a USB port is used to attach to a WiFi accessory, or where an Ethernet connection is used to couple to a local network attached storage.

A peripheral 2422 may include any device used to provide information to or receive information from the computing device 2400. This may include human input/output (I/O) devices such as a keyboard, a mouse, a mouse pad, a track ball, a joystick, a microphone, a foot pedal, a camera, a touch screen, a scanner, or other device that may be employed by the user 2430 to provide input to the computing device 2410. This may also or instead include a display, a speaker, a printer, a projector, a headset or any other audiovisual device for presenting information to a user. The peripheral 2422 may also or instead include a digital signal processing device, an actuator, or other devices to support control or communication to other devices or components. Other I/O devices suitable for use as a peripheral 2422 include haptic devices, three-dimensional rendering systems, augmented-reality displays, magnetic card readers, and so forth. In one aspect, the peripheral 2422 may serve as the network interface 2416, such as with a USB device configured to provide communications via short range (e.g., Bluetooth, WiFi, Infrared, RF, or the like) or long range (e.g., cellular data or WiMAX) communications protocols. In another aspect, the peripheral 2422 may provide a device to augment the operation of the computing device 2410, such as a global positioning system (GPS) device, a security dongle, or the like. In another aspect, the peripheral may be a storage device such as a flash card, USB drive, or other solid-state devices, or an optical drive, a magnetic drive, a disk drive, or other device or combination of devices suitable for bulk storage. More generally, any device or combination of devices suitable for use with the computing device 2400 may be used as a peripheral 2422 as contemplated herein.

Other hardware 2426 may be incorporated into the computing device 2400 such as a co-processor, a digital signal processing system, a math co-processor, a graphics engine, a video driver, and so forth. The other hardware 2426 may also or instead include expanded input/output ports, extra memory, additional drives (e.g., a DVD drive or other accessory), and so forth.

A bus 2432 or combination of busses may serve as an electromechanical platform for interconnecting components of the computing device 2400 such as the processor 2412, memory 2414, network interface 2416, other hardware 2426, data store 2418, and input/output interface. As shown in the figure, each of the components of the computing device 2410 may be interconnected using a system bus 2432 or other communication mechanisms for communicating information.

Methods and systems described herein may be realized using the processor 2412 of the computer system 2400 to execute one or more sequences of instructions contained in the memory 2414 to perform predetermined tasks. In embodiments, the computing device 2400 may be deployed as a number of parallel processors synchronized to execute code together for improved performance, or the computing device 2400 may be realized in a virtualized environment where software on a hypervisor or other virtualization management facility emulates components of the computing device 2400 as appropriate to reproduce some or all of the functions of a hardware instantiation of the computing device 2400.

In one aspect, the computing device 2400 may be a mobile device such as that described below.

Figure 25:
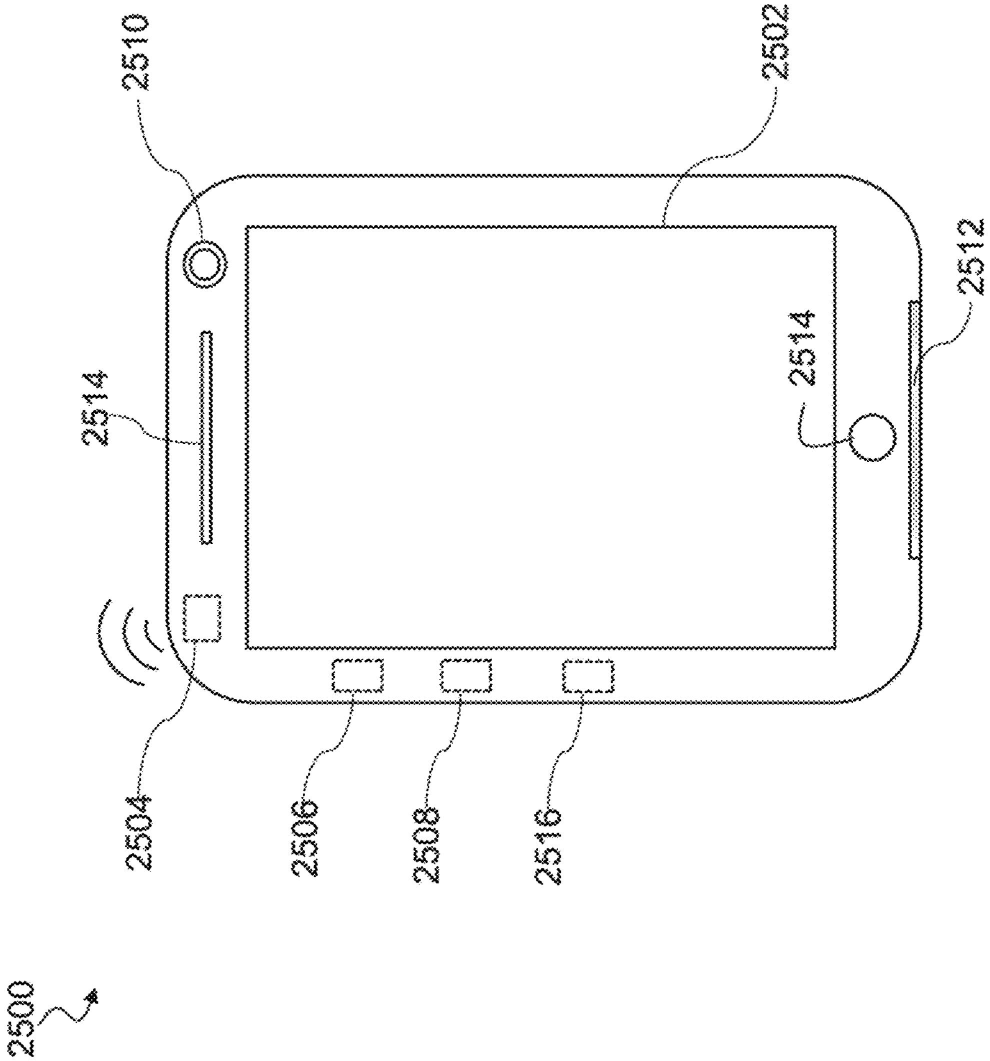
FIG. 25 illustrates a mobile device.

FIG. 25 illustrates a mobile device. The mobile device 2500 may be configured for creating, sending, or receiving an SCCMC as described herein. The mobile device 2500 may be, for example, any of the endpoints or other computing devices described above. The mobile device 2500 may be, for example, a smartphone or a tablet. In general, the mobile device 2500 may include a display 2502 (e.g., a screen), a communications interface 2504 configured to couple the mobile device 2500 in a communicating relationship with a network, a processor 2506, a memory 2508, a camera 2510, a microphone 2512, a speaker 2514, and a location tracking device 2516.

The communications interface 2504 may include hardware and software for communications using a variety of protocols such as a short-range communications protocol (e.g., Bluetooth), a wireless communications protocol (e.g., Wi-Fi, cellular network, and so on), and so forth. The communications interface 2504 may couple the mobile device 2500 to a cellular network or the like through a mobile carrier with which a user has a billing account. The communications interface 2504 may also or instead couple the mobile device 2500 to a data network through which the mobile device 2500 may access an online application store or the like. The communications interface 2504 may also or instead couple the mobile device 2500 to other mobile devices through a data network such as any of the networks described herein.

In an aspect, the memory 2508 bears computer code that, when executing on the processor 2506, performs steps for creating, sending, receiving, editing, and so on, an SCCMC data structure or the like. The memory 2508 may also or instead bear computer code that forms an application for the mobile device 2500, e.g., execution by the processor 2506 on the mobile device 2500.

The display 2502 may include a screen such as a touch screen or other user interface for receiving user input as contemplated herein, e.g., for the creation or editing of SCCMC. The display 2502 may also or instead display SCCMC for a user.

The camera 2510 may be used for capturing images or video for use in an SCCMC.

The microphone 2512 may be used for receiving a voice or audio signal as described herein.

The speaker 2514 may be used for playing audio from an SCCMC for a user. The speaker 2514 may instead include an audio output on the mobile device 2500 such as a headphone jack or the like.

The location tracking device 2516 may be used to establish a location for the mobile device 2500, e.g., for proximity services as contemplated herein. The location tracking device 2516 may include a GPS receiver or the like.

Figure 26:
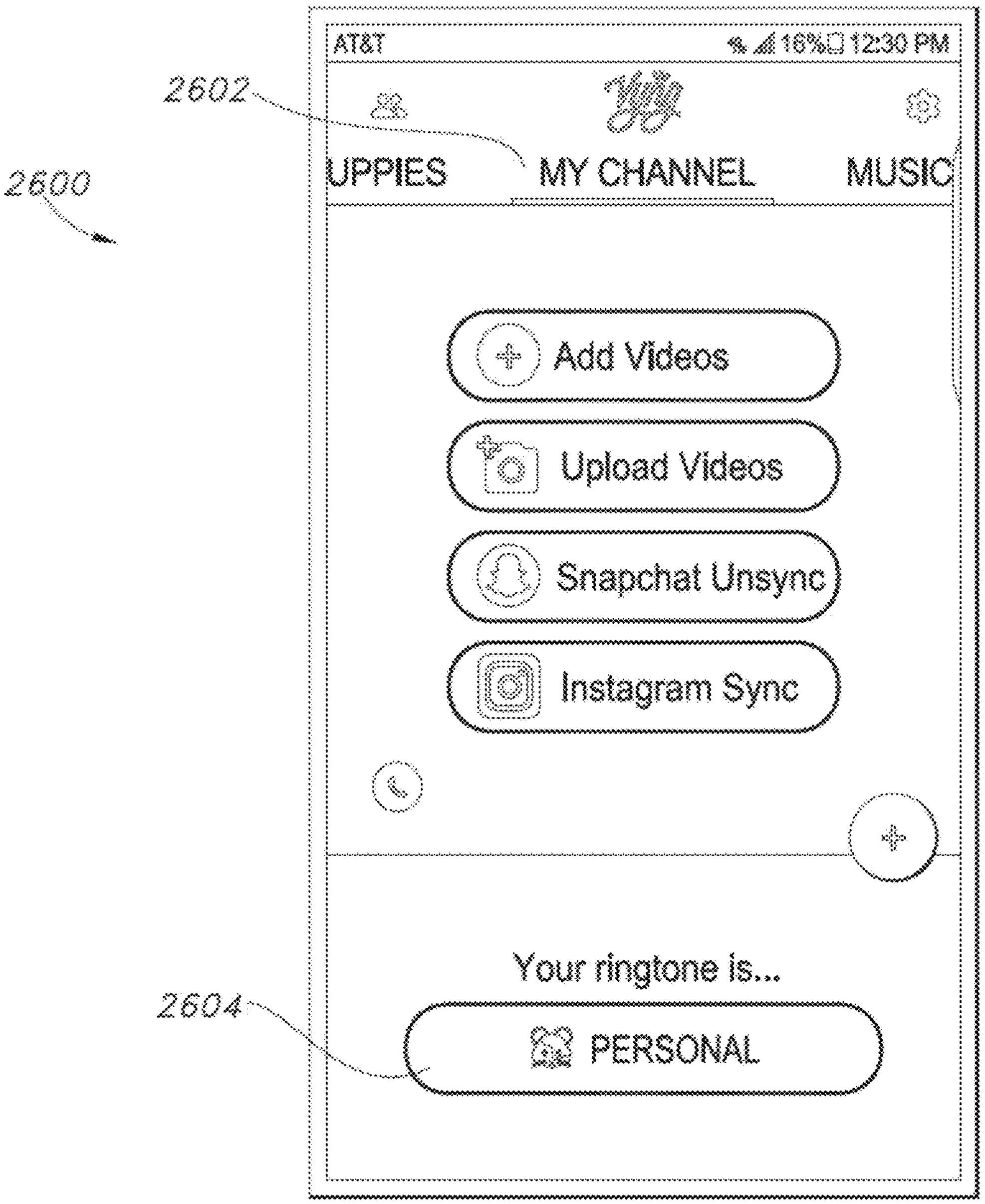
FIG. 26 illustrates a screenshot of a user interface for setting a personal channel for an SCCMC in accordance with an embodiment of the systems and methods disclosed herein.

In certain embodiments, the mobile device 2500 may be used to facilitate a user (such as a recipient) to establish a personal channel such as that shown in FIG. 26. The personal channel may enable the user to choose media content, such as video and image content, from the user's mobile device 2500 and designate it to be used for display on the user's mobile device 2500 when an incoming trigger occurs. The incoming trigger may be an incoming call, a text message, or the like from another mobile device. The user may import multiple files and organize them to play as a personal channel, either in a pre-defined order or in a randomized order.

FIG. 26 illustrates a screenshot of a user interface 2600 for enabling the user to establish such a personal channel. The user interface 2600 may be configured to allow the user to swipe or otherwise select the feature of establishing the personal channel by accessing the SCCMC App installed on the mobile device 2500. For example, the SCCMC App may enable selecting a menu feature labeled "My Channel" 2602 from the user interface 2600. On selecting the menu feature "My Channel" 2602, the user may be able to choose the media content that the user may want to use as part of the personal channel. In some embodiments, the media content may include the SCCMC that may be received from any other user, or content made or captured by the user (such as using a camera of the user's mobile phone), or a video obtained from a social networking server, such as services hosting services similar to YouTube™, Snapchat™, Instagram™ or a user-generated video platform, or from any other channels, without limitations. The media content selected by the user may be added to the user's personal channel by using a user interface element such as an action button labeled "PERSONAL" 2604 as depicted in the user interface 2600 of FIG. 26.

In certain embodiments, the personal channel created by the user may not only be played on the user's device but may also be configured to be shared with other users. In many examples, a user may curate videos or other media content into a channel, then share that channel with other users, including controlling playing of that channel as a series of SCCMC media items on phones of various recipients of the shared channel. These channels may also be customized or configured for particular users or groups of users by allowing the user to create a channel suitable for a particular friend or group of friends and containing user-generated video content showing mutual friends or topics of mutual interest or showing video content that the user believes will be of particular interest for the friend.

In embodiments, a channel shared with a friend or other user may include a wide range of media content, including an SCCMC received from other users, content made or captured by the user (such as using a camera of the user's mobile phone), content stored locally by other applications (such as social media applications), videos obtained from various social sources such as YouTube™ or other user-generated video platforms, or from any other channel. The ability to configure, customize, and share one or more channels may allow the SCCMC App to be used as a self-generated media creation and content distribution platform, where the user forms and orchestrates a wide range of experiences for friends and other users that play on the lockscreens or other contact-initiated elements of the friends' and other users' devices.

In many examples, the media content of the user's personal channel may be enabled based on the identity of another user. For example, the user may associate a video or any other media item with the name of a "friend" or a specific contact in the user's mobile device.

Figure 27:
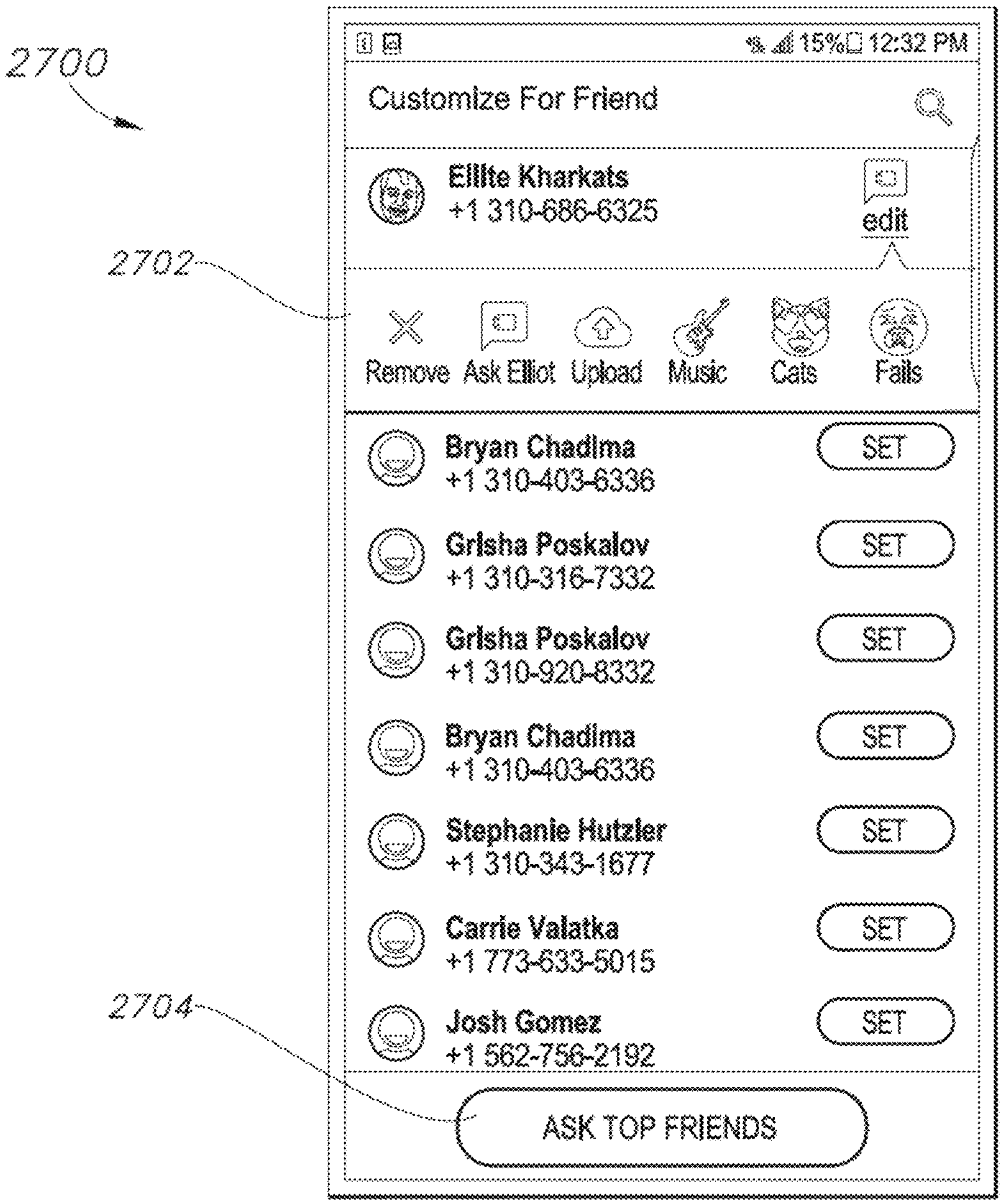
FIGS. 27 and 28 illustrate screenshots of a user interface for enabling a media content based on an identity of a user in accordance with an embodiment of the systems and methods disclosed herein.
Figure 28:
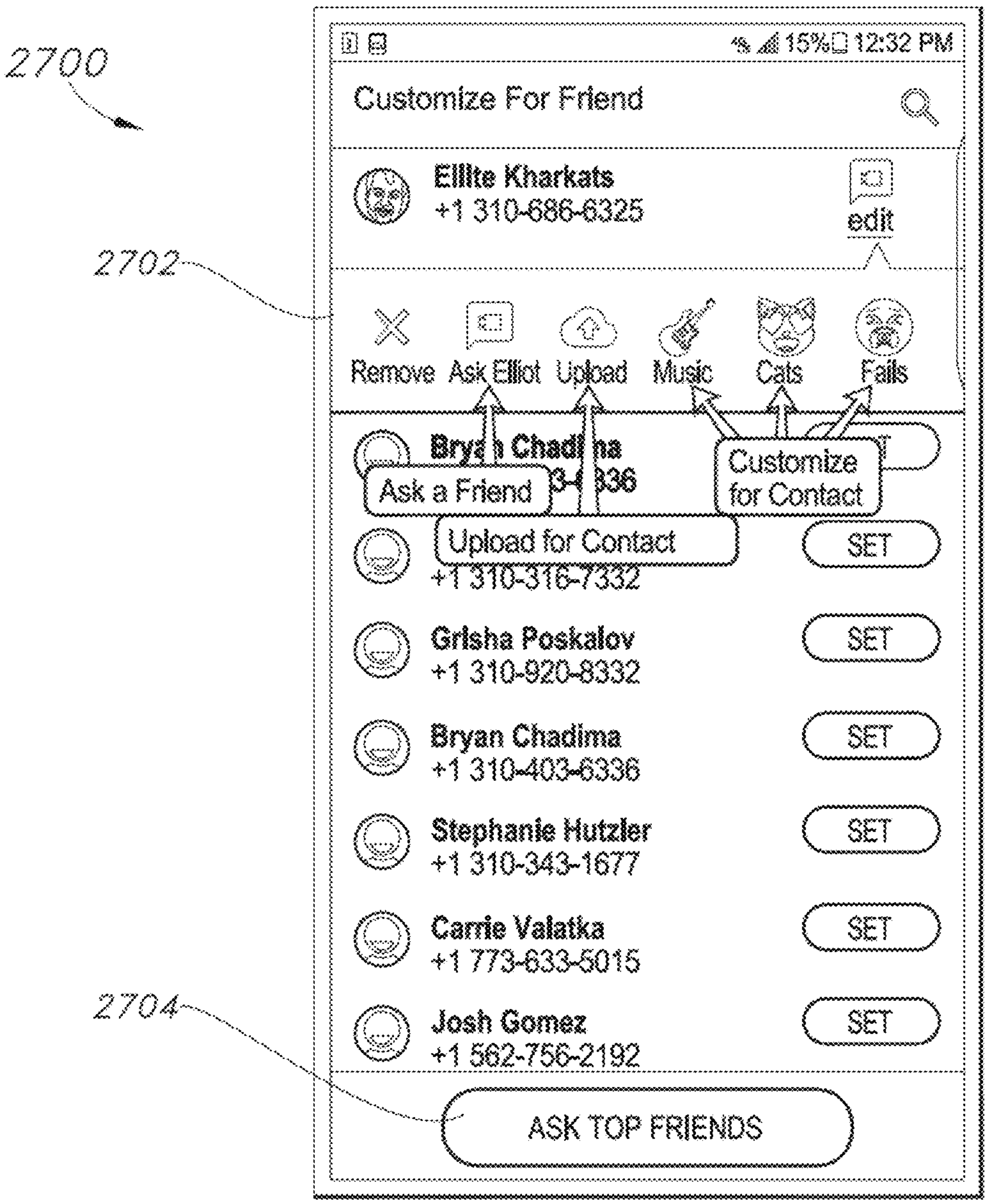

FIGS. 27 and 28 illustrate examples of screenshots of a user interface 2700 for enabling a media content based on the identity of a user. The user interface 2700 may be enabled by the SCCMC App installed on the user's mobile device. The user may open a contact list on the user's mobile phone, and a menu 2702 displayed on the user interface 2700 may provide options such as "Ask Friend", "Upload", "customize for contact", and other options that may enable setting a media content from the user's personal channel for a particular contact, based on the identity of the contact. For example, the user may set a custom video or channel for an individual contact or friend by making appropriate selections from the user interface 2700.

In various embodiments, various kinds of media content, including SCCMC received from other users made or captured by the user such as by using a camera of the user's mobile phone, videos obtained from various sources, YouTube™ or other user-generated video platforms, or from any other channel, may be set in the name of the friend. In some embodiments, the SCCMC App may enable the user to integrate the mobile device with user-generated social media applications or platforms used by the user's mobile device, such as in cases where the user has other social networking applications such as Snapchat™, Instagram™, or the like installed on the user's device. These social networking applications may enable the user to save content to a local device so that when the content is created, it may be saved in a local folder associated with each application. The SCCMC App may include a local storage monitoring component that may monitor the local folder and make the content of the local folder available for selection as an SCCMC media item that may be played in a user channel, set as content associated with a friend, or the like. This may be accomplished by importing the content into one or more locations accessed by the SCCMC App, or by tagging the local folder so that the content may be imported or played when needed from the local folder.

Once this setting is initiated, the selected or tagged content may be configured to play on the lockscreen of the user's phone when the friend calls or upon other triggers, such as upon receiving a text or email from the friend, independent of what channel the user may have selected for incoming calls or other triggers that arrive from other parties.

In embodiments, the user may select an option to "Ask Friend" 2704 (or multiple friends), where the SCCMC App may enable a feature allowing a user to choose to have a friend set a media item, such as a video that plays when the friend calls, such that the friend controls the media content item. In many examples, the feature may be enabled such as when setting custom content by the friend, as discussed in some of the previous examples, that allow the user to set the video that plays when the friend contacts the user. Upon initiating this "Ask Friend" 2704 feature, a message, such as a text message, may be initiated through the App to the friend, automatically embedding a custom link to a website where the friend may upload a media item, such as a video and the like.

In embodiments, the user may also be allowed to choose more than one of the contacts for selecting the "Ask Friend" 2704 feature from the user interface 2700. The user interface 2700 may present a list of contacts or "friends" to the user and the user may select top friends by choosing an action button, such as the button 2704, for implementing the "Ask Friend" 2704 option. In many examples, the top friends may include contacts that are most frequently contacted by the user, such as by calling or messaging. In other examples, other parameters may be used to classify a list of contacts as the top friends of the user. When the user clicks on the button 2704, the SCCMC App may enable initiating sending a message, such as a text message, through the App to each of the top friends. Initiating the message may include automatically embedding a custom link to a website where each of the top friends may upload a media item, such as a video.

Figure 29:
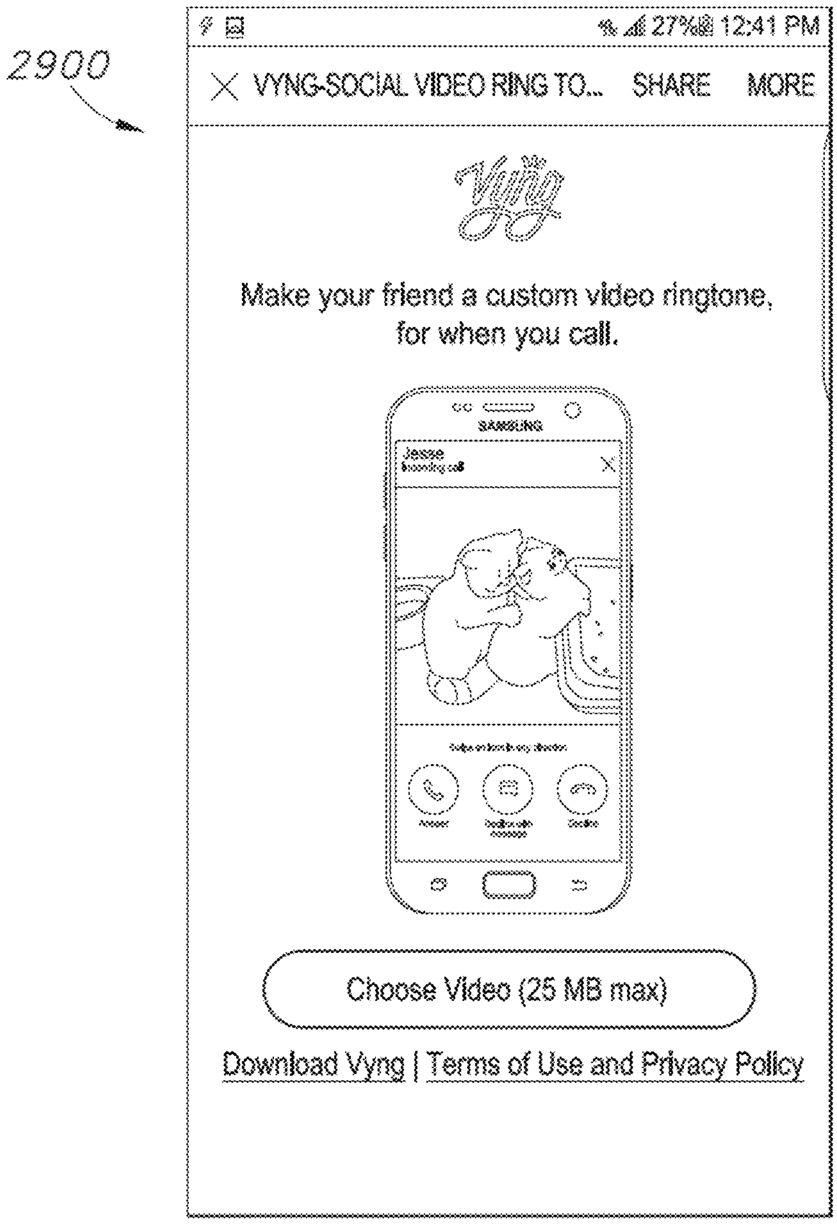
FIG. 29 illustrates a screenshot of a user interface for creating a video for an SCCMC in accordance with an embodiment of the systems and methods disclosed herein.

FIG. 29 illustrates a screenshot of an exemplary user interface 2900 that may enable the user, such as a friend contact of the sender, to create a video that may be played when the friend contact calls or initiates any contact with the user. The video created by the friend may be uploaded by the friend on the website and a link thereto may be sent to the friend, such as when the user selects a contact for the friend from the "Ask Friend" 2704 feature of the SCCMC App. The video may be one of a type of media item that may be used to set specific media types for specific contacts.

In embodiments, the media item may include the SCCMC received from other users, content made or captured by the friend or the user, such as using a camera of the friend's or user's mobile phone, videos obtained from various network sources such as YouTube™ or other user-generated video platforms, or from any other channels. In embodiments, the upload webpage by which the friend may set an item to play on the user's device may be configured to work with mobile and desktop browsers. When the friend uploads a media item, a push notification may be automatically directed to the user's device, indicating that the content has been uploaded. When the friend calls the user or optionally upon other triggering contacts, such as text, chat, or email contacts, the friend-uploaded media content item may play on the user's phone, such as on the lockscreen of the phone.

In embodiments, the user may use the "Ask Friend" 2704 feature to ask various friends to upload or select media content, such that a variety of different media content may be played based on different contacts, augmenting items that the user has set or selected for friends, or items the user has generally selected for unknown inbound contacts.

The various embodiments as discussed herein may facilitate creating, editing, deployment, and managing of media content available in the mobile phone or received from other devices or network sources and to be used as the SCCMC for establishing personalized experiences or for sharing among a group of friends and contacts for personalized experiences during any trigger events such text messaging, ring tones, and the like with the use of various menu options as enabled through the user interfaces such as those illustrated in conjunction with FIGS. 26-29.

Figure 30:
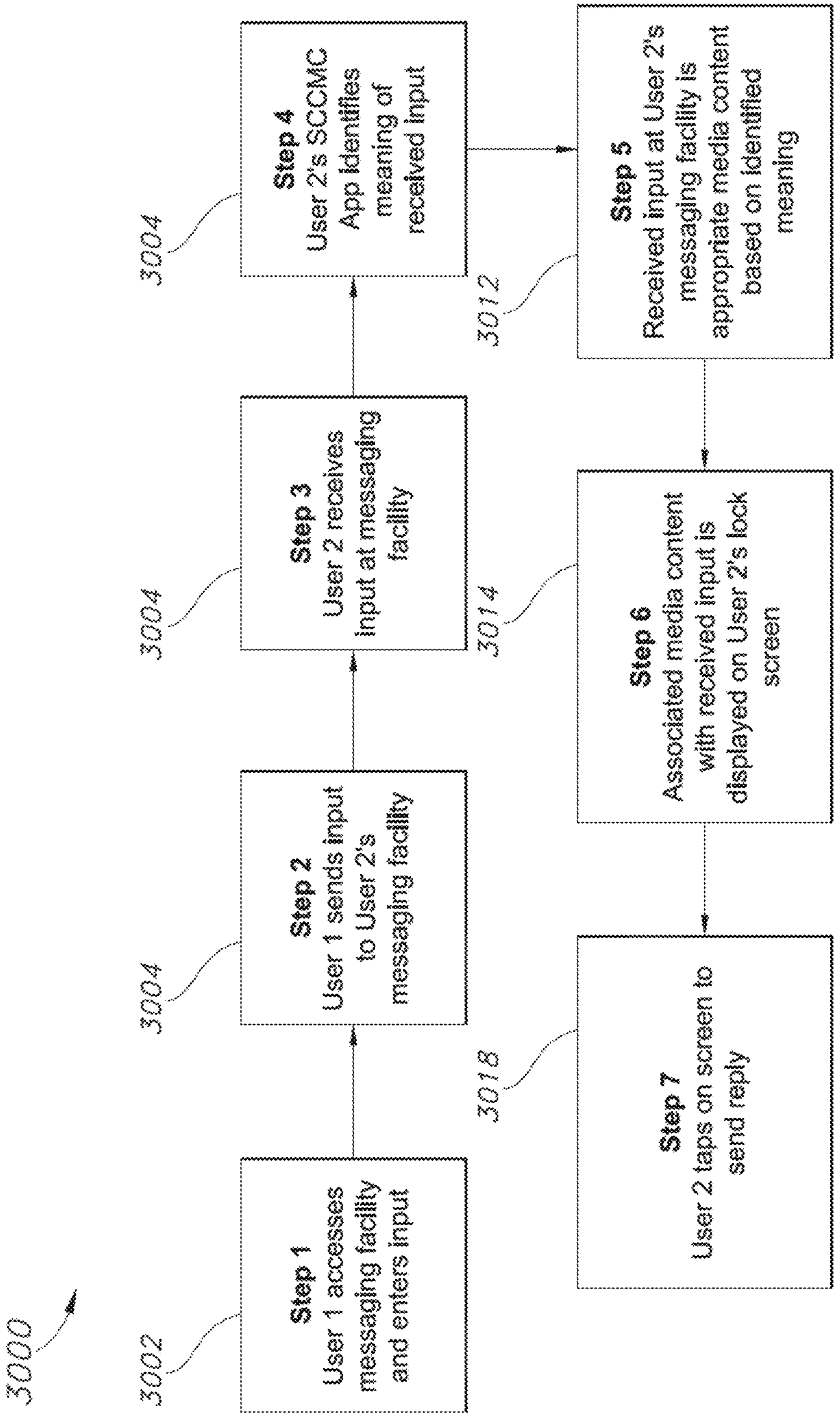
FIG. 30 illustrates a flowchart of a method for providing a setup of a contextual video message in accordance with an embodiment of the systems and methods disclosed herein.

In many examples, the SCCMC App may enable setting up media content including SCCMC. The media content may include video content that may include a contextual video message. FIG. 30 illustrates a flowchart of a method 3000 for providing a setup of a contextual video message included in SCCMC for an interaction between users.

As illustrated in FIG. 30, a User 1, such as the user of a sender mobile phone 102, may access a messaging facility at 3002. The user of the sender mobile phone 102 (FIG. 1) may be involved in a messaging interaction with another user, a User 2, such as the user of a recipient mobile phone 104 (FIG. 1). The messaging interaction may use any of the available messaging facilities such as an SMS, a chat interaction, or any of a number of messaging applications such as WhatsApp?™, iMessage™, Snapchat™, Instagram™, Messenger, and the like available on both the users' respective mobile devices. In embodiments, the app may host the entire communication exchange without relying on a third party application. At 3004, the User 1 may enter some text on an input interface of the messaging facility of the User 1's mobile device and send the text or other messages to the User 2. The input interface of the messaging facility may be configured to receive at least text input. In one example, the input from User 1 is limited to what may be keyed in or dictated text. The input interface of the messaging facility may also be configured to receive text, graphics, audio, video, and combinations thereof including emojis and other graphics that may be inserted with the input interface. The SCCMC App installed on the mobile device of User 1 may have access to the input entered on the input interface of the messaging facility. Similarly, the SCCMC App installed on the mobile device of User 2 may be configured to access the input received on the input interface of the messaging facility on the User 2's mobile device.

At 3008, the input sent by the User 1 may be received at the messaging facility of the User 2's mobile device. At 3010, the SCCMC App installed on the User 2's mobile device may be configured to take the input received on the input interface of the messaging facility of the User 2's mobile device and process the content of the input to determine the meaning of the text and to understand the context of the input. In embodiments, the SCCMC App installed on the User 2's mobile device may also be configured to take the input received on the input interface of the messaging facility of the User 2's mobile device and process the content of the input to determine the meaning of the audio, video, graphics, emojis, and the like to understand the context of the input. The processing of the input may be enabled by the use of a high-level processing facility including a natural language processing (NLP) facility that may include one or more algorithms or methodologies for determining the meaning of a body of text, such as the text received at the input interface of the messaging facility of the mobile device of User 2. It will be appreciated in light of the disclosure that in some examples one or more algorithms of the natural language processing (NLP) facility may be shown to perform more quickly when the input is limited to text and other limited characters.

In embodiments, the natural language processing (NLP) facility may also include additional algorithms or methodologies for determining the meaning of a conversation in an audio or video clip. In many examples, the NLP facility may include an NLP processing module that may be configured to execute a series of instructions, such as in accordance with the one or more algorithms and methodology to identify the meaning and/or context of the input. By way of these examples, the NLP facility may be configured to extract the words, phrases, emojis, geo-location information and sensor-derived data from the text received at the messaging facility of the mobile device of User 2. In embodiments, the extracted information from the text may then be matched to a database of content, such as a database stored in the memory unit 2414 of the computer system 2400 discussed earlier. In many examples, the NLP processing module may be a part of the processor 2412 of the computer system 2400 discussed earlier. In further examples, the NLP processing module may be a part of the other hardware 2426 of the computer system 2400.

At 3012, the meaning identified by the NLP processing module may be used by the SCCMC App installed on the mobile device of User 2 to assign media content to the input received at the input of the messaging facility of the User 2's mobile device. The media content data types discussed earlier, such as a video clip or a video channel may be appropriately linked to the input message. In many examples, media content may be selected from a curated library of the SCCMC-content types such as that discussed earlier. At 3014, the assigned media content may be displayed, in many embodiments, on the lock screen of the mobile device of User 2. At 3018, the User 2 may then tap on his or her lock screen to send the reply to the User 1. In many examples, the User 2 may send the reply directly from the lock screen of the User 2's mobile device without opening the input interface of the messaging facility on his or her mobile device.

In many examples, the User 2's camera may be activated by default while sending the reply to the User 1 and a picture or photo of the User 2 may be associated with the reply sent from the User 2 to the User 1. In further examples, the User 2's microphone may be activated by default while sending the reply to the User 1 and an audio clip the User 2 may be associated with the reply sent from the User 2 to the User 1.

In many examples, as the User 2 types a text for the reply message, some content may be automatically pulled from the database of content to match the keywords of text entered by the User 2. In embodiments, the User 2 may use the content automatically pulled from the content database or may alternately access the messaging facility to complete the text and then send the message. The message sent from the User 2 may also be processed in the same manner when received at the messaging facility of the User 1 during the messaging interaction.

Figure 31A:
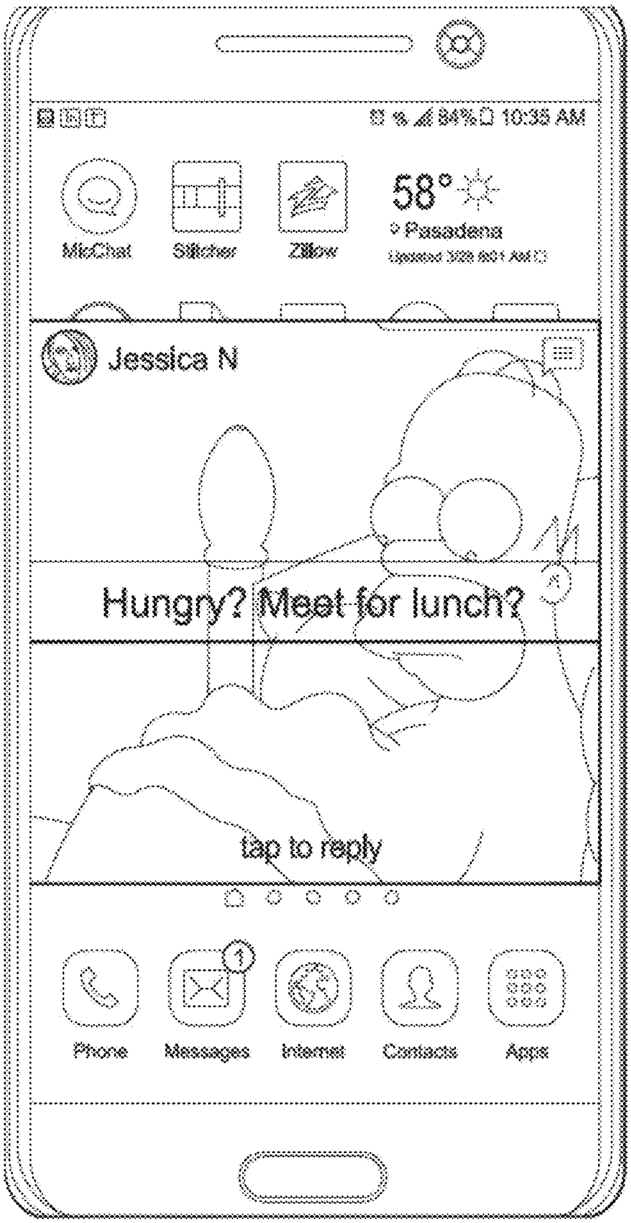
FIGS. 31A-31E illustrate screenshots of a user interface for a messaging interaction in accordance with embodiments of the systems and methods disclosed herein.
Figure 31B:

FIGS. 31A-31E illustrate an example of a messaging interaction between the User 1 and the User 2 based on the contextual video message flow discussed in FIG. 30 in accordance with the many embodiments. FIG. 31A illustrates a screenshot of a display interface 3100A of the User 2's mobile device when the User 2 receives a message with a text phrase, "Hungry? Meet for lunch?" from the User 1. The text phrase may be displayed on the User 2's mobile device along with an associated and matching video or other content. The matching of the video or other content with the text phrase may be performed based on the content of the text phrase, as discussed in the flow of FIG. 30. For example, the video in FIG. 31A displays a hungry Homer Simpson cartoon character with a bulging and shaking stomach to indicate the emotion of hunger. In an example, the video may be derived from the curated library of SCCMC-content types of the SCCMC App. Similarly, FIG. 31B illustrates a screenshot of the display screen 3100B of the User 2's mobile device when a text message phrase, "So hungryyy!!!", is received at the User 2's mobile device from the User 1. In embodiments, the text message phrase may be displayed along with a matching video/photo of the sender, such as a photo of the User 1 taken from the camera of their mobile device at the time of sending the message and emoting a feeling of hunger. In further examples, a screenshot of the display screen the mobile device of User 2 may receive an audio message that says, "I'm hungry!" from the User 1 including with a matching video/photo. In embodiments, a matching video/photo of the sender, such as a photo of the User 1 taken from the camera of their mobile device, may be sent at the time of sending the message.

Figure 31C:
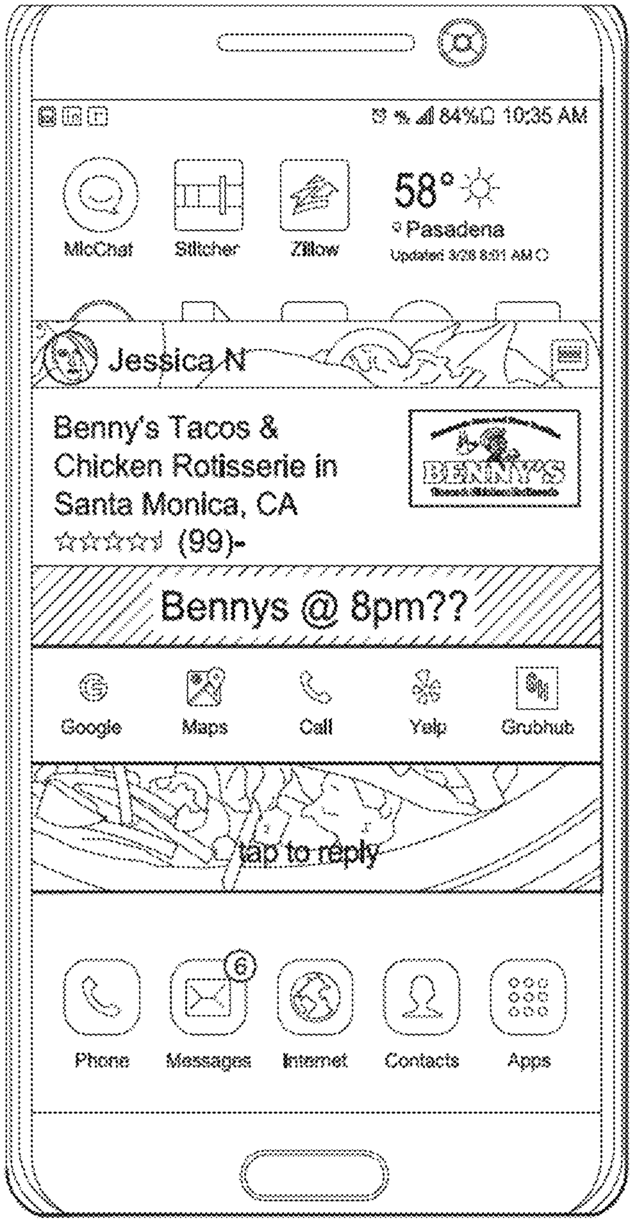

FIG. 31C illustrates a screenshot of the display screen 3100C of the User 1 when a reply message is sent from the User 2 to the User 1, such as on the lock screen of the user 1, and where the reply message contains the text phrase "Bennys@8 pm??." The text phrase is associated with a matching content such as interactive information about the restaurant name mentioned in the text, namely "Bennys." In embodiments, such information may be available even though the lock screen is in place on the mobile device. In embodiments, the interactive information may include, for example, a map of the restaurant location, the ratings for the restaurant, the restaurant's brochure, directions, tips, reviews, and other contextual advertising information associated with the restaurant name. In an example, the reply message may also or instead include information about the type of food and the matched content may be displayed accordingly. In many examples, a message that contains the phrase "want to get tacos?" may be augmented by a video or animation showing tacos. The meaning assigned to the phrase mentioned in the message may be based on a context as well as the content of other messages. By way of the above example, the initial reference to getting tacos may be used to help infer that a follow-on message proposing a name and time is a reference to a restaurant location where tacos are available. Further, the context of the message may be identified such as by using the user's history of interactions with other users, the history of use of the SCCMC App by the user or other users, the geo-location of the user, user contact data (such as stored contacts), the profile of User 1 or User 2 (or both), and many others and combinations thereof. Thus, the matching content for the text in the message may be SCCMC media content that may be automatically associated with an item of media content may be relevant to both the content of the message and the context of the message.

In many examples, the association of media content with text entered in the input message may be performed by applying one or more machine learning algorithms. In many examples, the machine learning algorithm and other methodologies may be used to interpret the body of text in the input message and identify what type of media may be associated with what type of text input. In an example, the interpretation may be based on feedback information entered into the machine learning algorithm such as a feedback information gathered directly from the users regarding the extent of satisfaction with the content recommended by the SCCMC App. Apart from the feedback information gathered directly from the users, the feedback information may also or instead be derived based on some feedback metrics associated with the SCCMC App. In many examples, the feedback information may be derived based on a metric associated with the use of the recommended content such as whether the user saves the content, shares the content, interacts with the content, and the like. The feedback information may be used to provide more relevant and relatively effective media content in response to the text received in the input message.

Figure 31D:
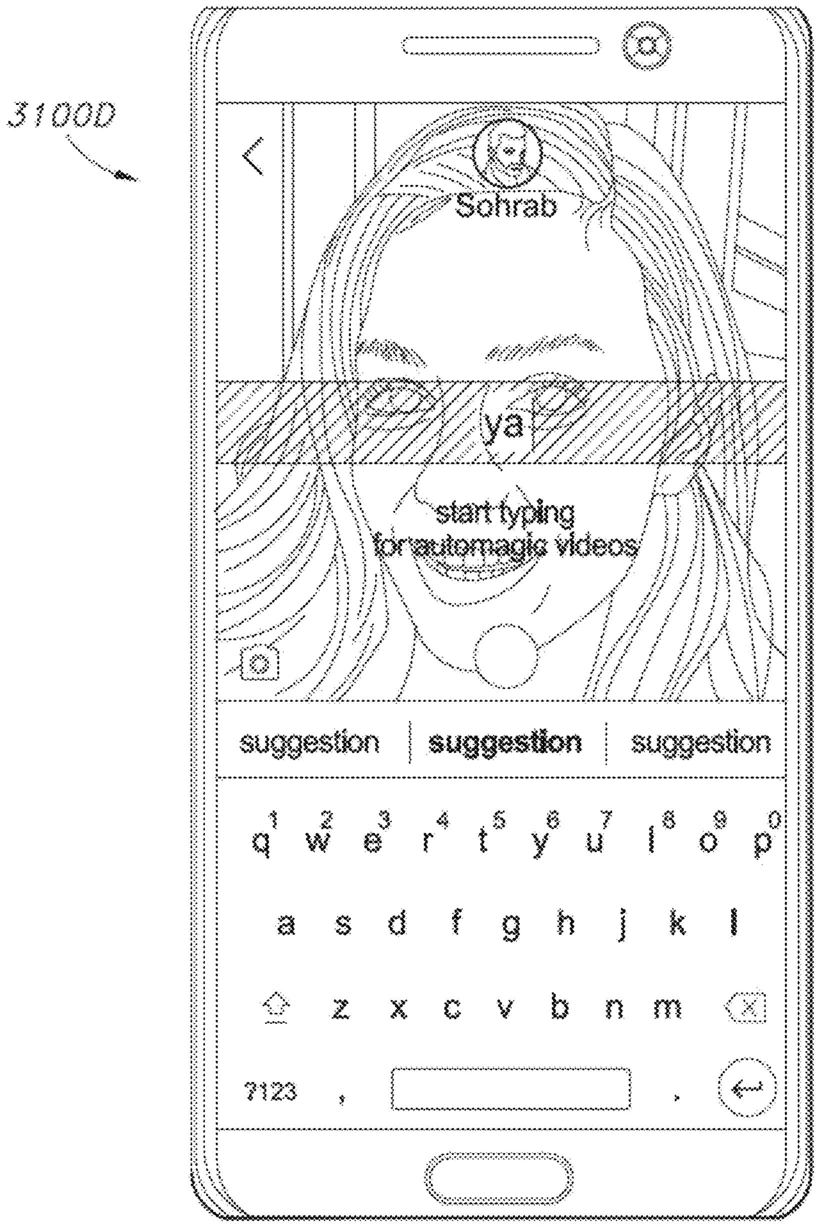
Figure 31E:
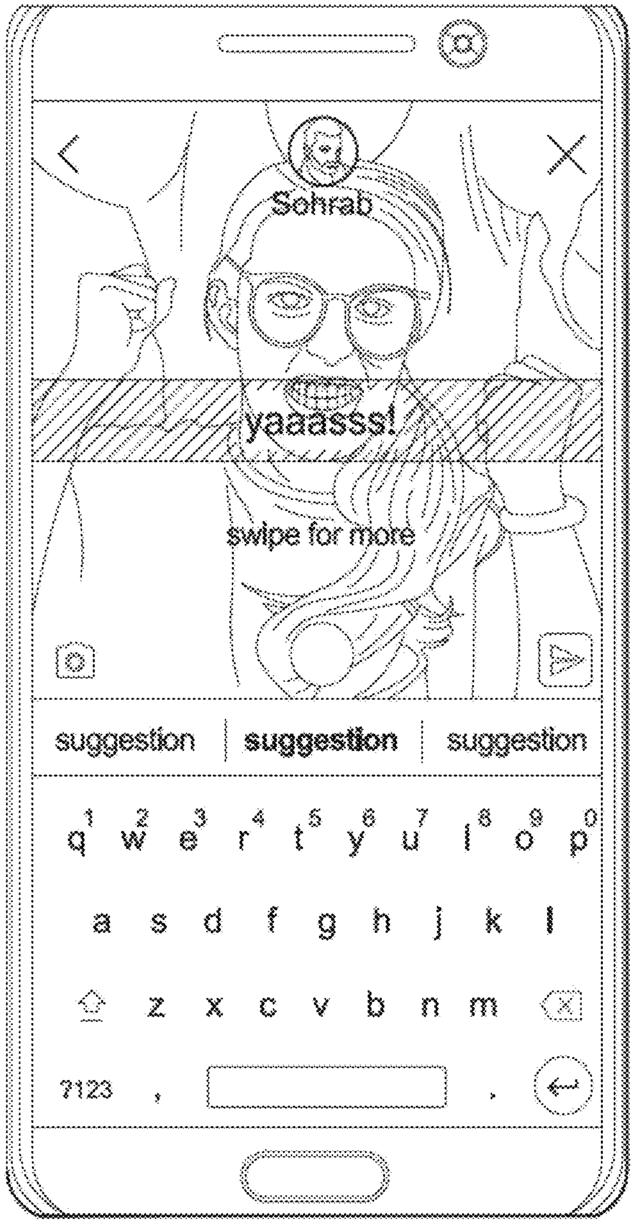

For example, FIG. 31D illustrates that a text entered by a user on their lock screen 3100D may be automatically completed and matched with the relevant media content. The completed content is illustrated in the screenshot of the display 3100E of FIG. 31E. In embodiments, the matched and completed content on the display 3100E may be used directly from the lock screen by the user or alternatively, the user may override the content. In both the scenarios, the user feedback may be used to derive the feedback information for the machine learning algorithm.

In embodiments, methods and systems described herein including SCCMC-based structures such as the SCCMC app and the SCCMC media content, may facilitate user access to or may serve as any of a variety of mobile communication capabilities or applications on a user's mobile device, e.g., text messaging, video calling, audio calling, and the like including use of various networking and transport protocols such as IP-based protocols, cellular networking protocols, or others. In embodiments, the communication capabilities or applications may be accessed directly from a user's lock screen, without requiring the user to unlock the phone or open the communication application. As such, the user need not unlock the mobile device to access the SCCMC app and its media content. In embodiments, the methods and systems may interface with one or more communication port features of a mobile device (such as ones for handling incoming IP-based messaging, ones for handling notifications, ones for handling incoming cellular messages, and the like) to effectively redirect information communicated to the mobile device that is destined for the other communication capability or application to a lockscreen capable application. In embodiments, the lockscreen capable application may operate independently of the locked or unlocked state of a phone or other mobile devices, such as when a device is locked, the screen is blank, it displays its lock screen, or the like. The lockscreen capable application may intercept information destined for or originating from a communication application (e.g., Snapchat™, Facebook Messenger™ iMessage™, WhatsApp™ and the like) or may serve in replacement of such applications as it is received by a recipient mobile device. In embodiments, the recipient mobile device may include SCCMC data structures that may perform contact media adapting functions prior to being sent from a sender mobile device including providing a user interface that operates while a phone is in lock screen mode. The user interface may include the lock screen capable application in order to facilitate a user of the mobile device receiving and responding to a communication associated with the intercepted information before delivery to the communication application, a communication associated with the intercepted information processed by the user interface directly, or the like. In embodiments, the lockscreen capable application may display a wide range of content in response to the intercepted information, such as video content, animations, or a wide range of other types of content described throughout this disclosure. In embodiments, the content may consist of a video. In embodiments, the video may be selected by the sender of the information. In embodiments, the video may be selected from a channel, where the video and/or the channel may be selected based on the content of the intercepted information and/or the context of the information such as based on the time of day, the location of the sender, the location of the recipient, the state of the recipient's device, or other factors. In embodiments, the lockscreen capable application may also interface with the target/source communication capability or application to facilitate end-to-end communication between the relevant communication capability or application on the sender mobile device and the recipient mobile device without the necessity for a third party communications applications.

Figure 32:
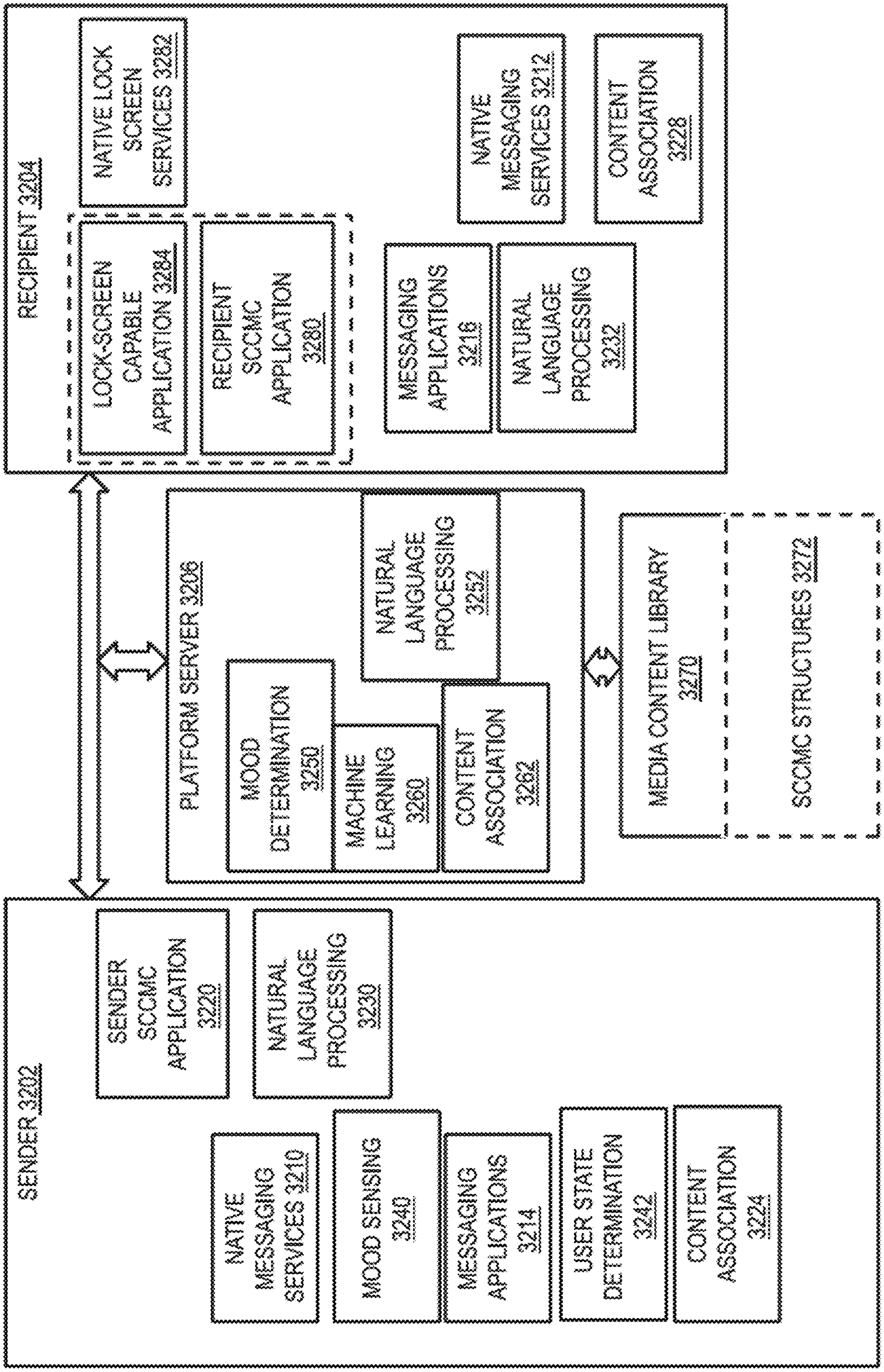
FIG. 32 illustrates a block diagram of a unified messaging platform in accordance with an embodiment of the systems and methods disclosed herein.

FIG. 32 depicts a diagram of a unified messaging platform 3200 as described herein. In embodiments, a sender 3202, such as a mobile phone or the like may communicate over an electronic medium, such as an IP-based network, cellular network and the like with a recipient 3204, such as a recipient mobile phone or the like using the methods described herein. In embodiments, communication among one or more senders 3202 and one or more recipients 3204 may include a platform server 3206. Communication among one or more senders 3202 and one or more recipients 3204 may include the use of messaging services, such as native messaging services 3210, 3212, messaging applications 3214, 3218, sender-controlled contact media content applications 3220, 3222, directly, and the like. Communication among one or more senders 3202 and one or more recipients 3204 may also include use of content association services 3224, 3228, A sender may use sender mobile phone 3202 or similar computing device configured with one or more capabilities and/or applications, such as native messaging services 3210 that may facilitate communicating with other users, such as recipients, servers and the like. In embodiments, the sender mobile phone 3202 may further be configured with messaging applications 3214, such as those mentioned and described herein for facilitating communication of text, images, video, and other electronic content among senders and recipients. In embodiments, the sender mobile phone 3202 may also be configured with one or more unified messaging applications or capabilities, such as a sender-controlled contact media content application 3220 that may work cooperatively with (or in lieu of, partially or wholly) the native messaging services and/or messaging applications of the mobile device to facilitate the sender-controlled contact media content control functions and capabilities described herein.

In embodiments, these SCCMC features include performing natural language processing (NLP) 3230, 3232 on a message prepared in any of the messaging applications including the SCCMC application 3220, 3222, and on content associated with an outgoing message as described herein. In embodiments, other features of a sender 3202 may include one or sender mood sensing 3240, sender user state determination 3242, and the like that may provide information to the SCCMC application 3220, and from other SCCMC applications. In embodiments, the features, capabilities and the like of a sender 3202 may be embodied as individual applications, local services available to an SCCMC application 3220, remote services accessed through mood sensing and/or user state determination interface capabilities of the sender mobile device and the like. In embodiments, the mood sensing 3240 may also include mood determination capabilities by interfacing with mood determination services 3250 of the unified messaging platform 3200, or may perform mood determination functions directly or partially using the processing and storage capabilities of a sender 3202 mobile phone and the like.

In embodiments, the platform server 3206 of unified messaging platform 3200 depicted in FIG. 32 may interface through a network connection or the like with at least the sender 3202 or the recipient 3204. The unified messaging platform 3200 server 3206 may further provide services, applications, and/or capabilities for unified messaging as described herein including the mood determination 3250 for determining a mood of a user of the unified messaging platform 3200 including the sender 3202 or the recipient 3204. In embodiments, the platform server 3206 may also provide natural language processing 3252 services for processing messages composed on a sender device 3202 that may be destined for or received on a recipient device 3204. In the many examples, the NLP services 3230, 3232 may be provided to any of the participants in the platform via the natural language processing capability 3252 executing on the platform server 3206. The platform server 3206 or other aspects of the platform 3200 may also provide capabilities such as machine learning via a machine learning capability 3260. The platform server may further provide content association services 3262 via a content association capability executing at least partially using the computing and/or storage features of or accessible to the platform server 3206.

In embodiments, the unified messaging platform 3200 may further include a media content library 3270 that may include or be associated with sender-controlled contact media content structures 3272. Participants on the platform 3200 one more senders 3202 may be provided access to the content library 3270 over one or more networks and when applicable, via the platform server 3206. Similarly, one or more recipients 3204 of the platform 3200 may access the media content library 3200 via a network, through the server 3206, and the like. Features, functions, and services of a media content library including association and/or integration of one or more SCCMC structures when applicable are further described herein.

In embodiments, a unified messaging platform, such as platform 3200 depicted in FIG. 32 includes recipient 3204 that may be embodied as a mobile device or the like. In the many examples, the recipient 3204 of the platform 3200 may include unified messaging capabilities that are similar to the sender 3202 capabilities, such as content association services via a content association module 3228, native messaging services via a native messaging module 3212, messaging services via messaging applications or services 3218, NLP services through a natural language processing module 3232, and the like. In embodiments, the recipient 3204 may include or have access to other capabilities, such as a recipient SCCMC application 3280 that may include functionality similar to a sender SCCMC application 3220 but also may be adapted to work cooperatively with native screen like services 3282, a lockscreen capable application 3284 and the like that may be embodied with and/or use processing and/or storage resources of the recipient 3204 computing device. Capabilities of the recipient SCCMC application 3280, including its cooperative operation with the lockscreen capable application 3284 and or its optional integration with the lockscreen capable application 3282 are described further herein.

In embodiments, the media content library 3270 may provide storage for media content and optionally for SCCMC items or may be associated with SCCMC structures as described herein. FIG. 33 depicts embodiments of the media content library 3300 that facilitate associating content items with a media type, SCCMC references (if any), one or more channels (e.g., topics of interest) and the like. The embodiments of FIG. 33 may also include an index for accessing items in a media content library 3270, SCCMC structures 3272, and the like.

Figure 34:
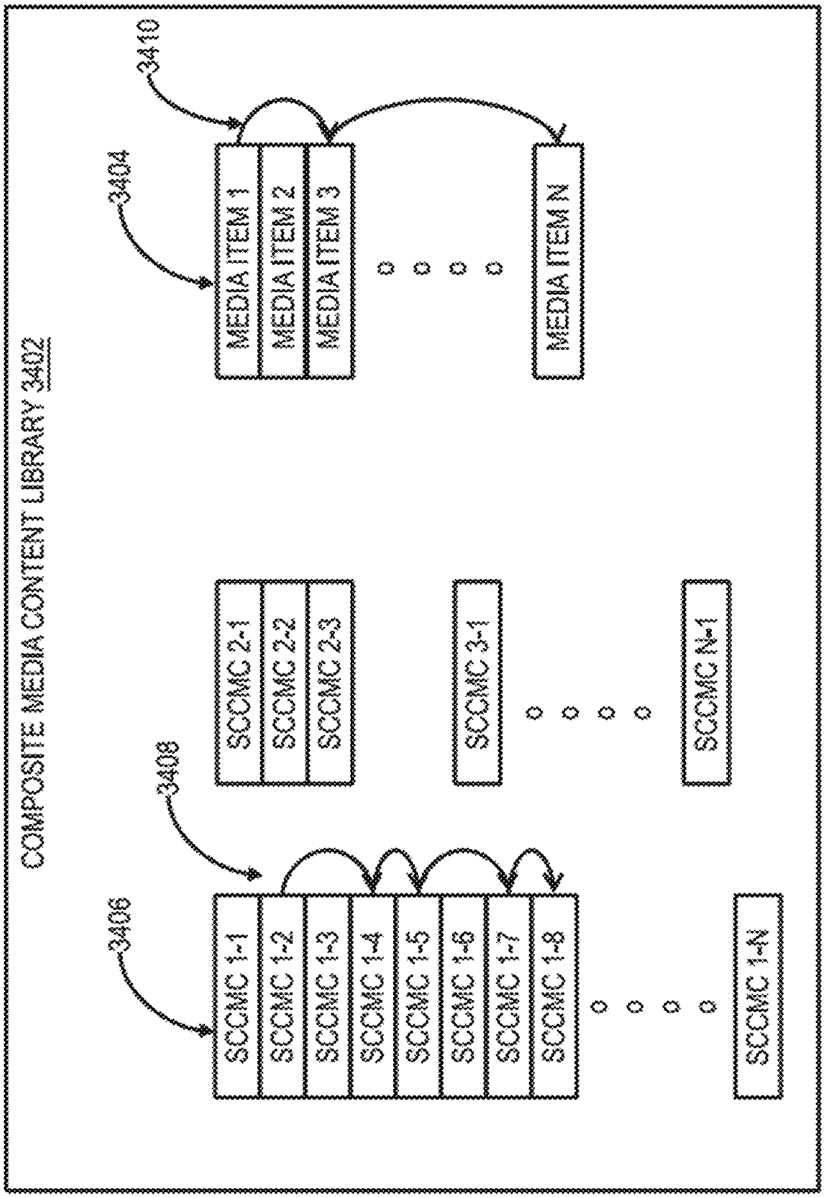
FIG. 34 illustrates an embodiment of composite media content library in accordance with an embodiment of the systems and methods disclosed herein.

FIG. 34 depicts embodiments of media content library 3402 that may incorporate media content items 3404 and SCCMC content items and/or structures 3406. As described herein for many of the embodiments, media items and/or SCCMC content items or structures 3406 may be arranged into channels, which may be based on topics of interest. In embodiments, an exemplary channel indicator 3408 for a set of SCCMC structures for a sender 1 (SCCMC 1-x) may provide a mechanism by which a sender's SCCMC structures may be accessed as a channel as described herein. In the embodiments of FIG. 34, a composite media content library 3402 may also provide access to media content items as a media channel 3410.

Figure 35:
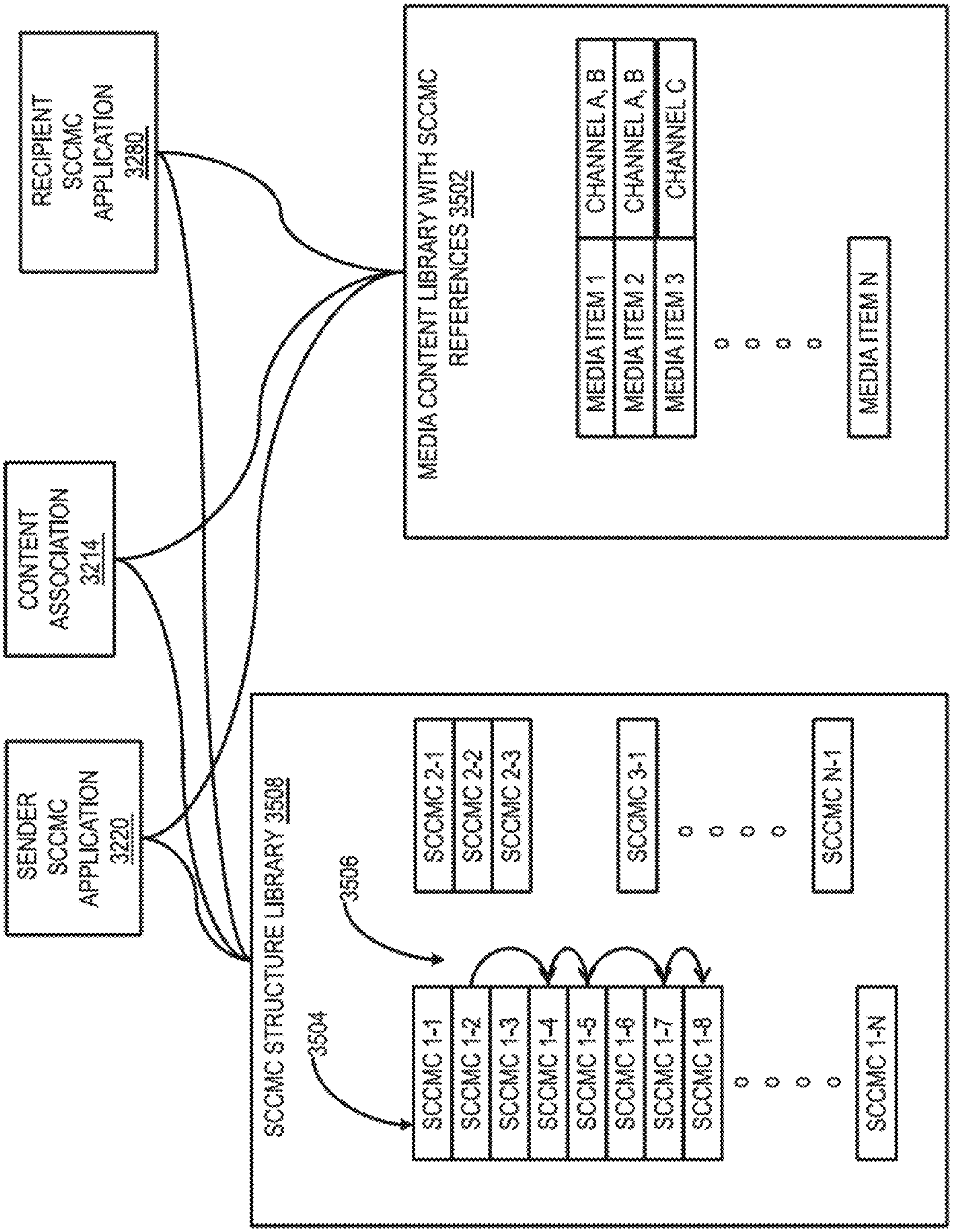
FIG. 35 illustrates an embodiment of separate media and SCCMC structure libraries in accordance with an embodiment of the systems and methods disclosed herein.

In embodiments, FIG. 35 depicts an alternate configuration of a media content library 3502 that may operate cooperatively with an SCCMC structure library 3508 to provide the services and capabilities of a unified messaging platform and the like as described herein. In the embodiments of FIG. 35, the media content library 3502 and the SCCMC library 3508 may be accessed by various functional modules of the platform, such as the sender SCCMC application 3220, the content association capability 3220 and the recipient SCCMC application 3222. In embodiments, each application or capability may determine the appropriate library to access based on the type of media being selected and/or the function being performed. Channels, as used herein, may be configured for the SCCMC library 3508 and the media content library 3502 such that the items in each library may be accessed via channel reference without requiring that each particular item is referenced directly.

Figure 36:
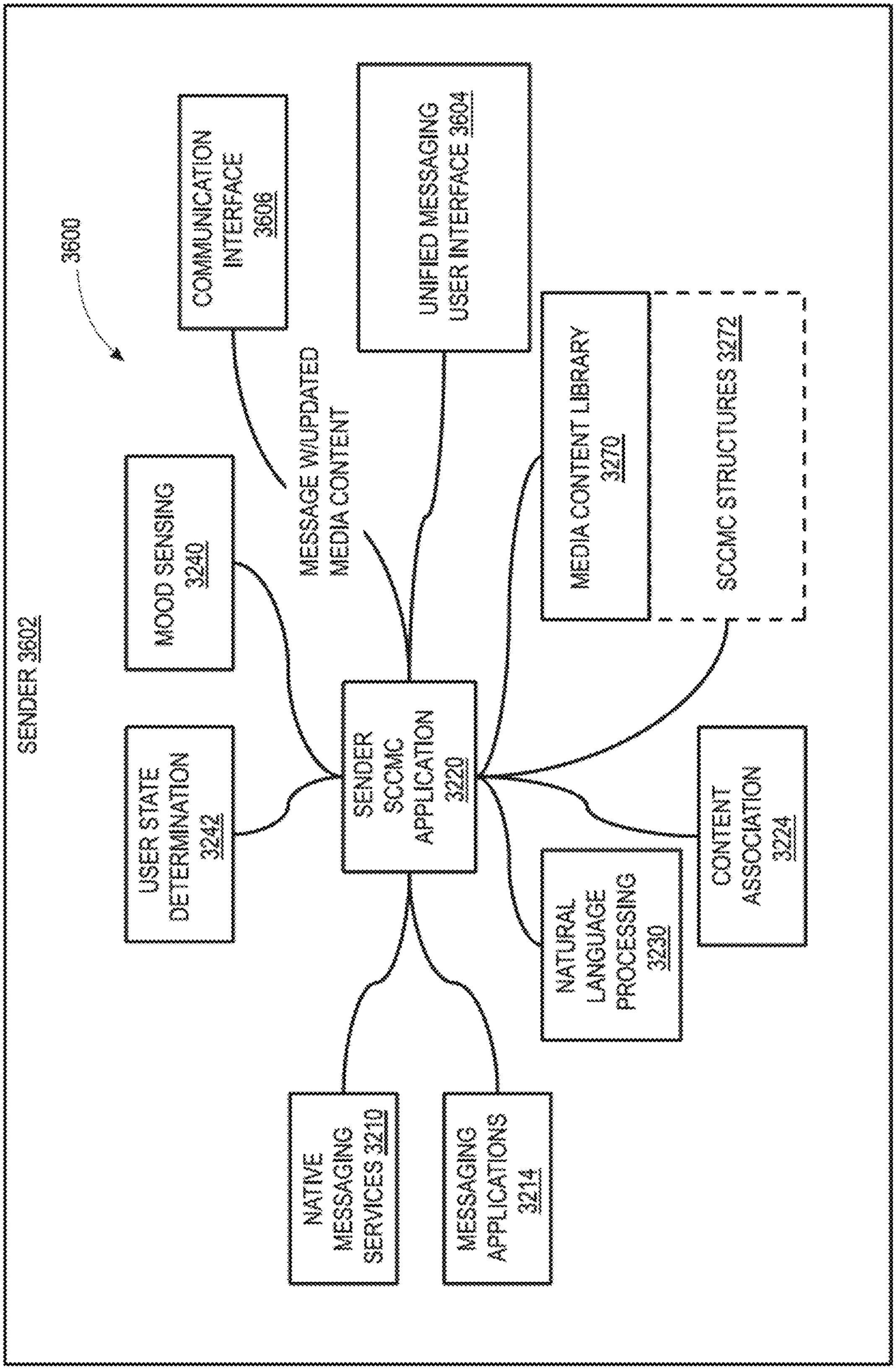
FIG. 36 illustrates an embodiment of a sender device configuration in accordance with an embodiment of the systems and methods disclosed herein.

The embodiments of FIG. 36 depict sender device elements 3600 of a unified messaging platform and flow of information among sender elements 3600. Description of the sender elements may be made with reference to FIG. 32 with the exception of a communication interface 3606 and a unified messaging user interface 3604. In embodiments, the flow of information among the elements may include one or more messaging applications 3214 or services 3210 interfacing with a sender SCCMC application 3220. The messaging applications may send information to the SCCMC application 3220, such as text or other electronic content that may be composed or selected the sender using, for example, functions of the messaging applications with or without using a user interface of the messaging applications. The sender through the unified messaging user interface 3604 via the SCCMC application 3220 may access the functions of the messaging applications. In embodiments, the SCCMC application 3220 may access user state determination facility 3218 to determine a state of the user of the mobile phone and mood sensing facilitate 3212 to determine a mood of the user. This user state and/or mood information may be used by the SCCMC application 3220 along with natural language processing capabilities 3214 to operate a content association function 3224 to associate an item of content from the media content library 3270 and/or the SCCMC structure library 3272 with content of a message from the messaging services or applications. In embodiments, the SCCMC application 3220 may reconfigure the message with the item of content and provide that to a communication interface 3606 of the sender device 3602 where it may be communicated to a recipient computing device over an IP network or the like. In the many examples, the unified messaging user interface 3604 may include features that facilitate the sender selecting among a plurality of content items that may be selected through the content association operations described herein.

Figure 37:
FIG. 37 illustrates an embodiment of a unified messaging user interface for media content selection in accordance with an embodiment of the systems and methods disclosed herein.

FIG. 37 depicts embodiments that are representative of a gallery of content items 3700 that may be suitable for use with the one or more messages being sent and received. In embodiments, a user (e.g., the sender) may operate the unified messaging user interface 3604 to select one more content item manually. In further embodiments, a content item may be automatically selected and the message may be configured with the selected content item for delivery to a recipient. Whether manually, automatically, or combinations thereof, the content items 3700 are candidate media content that may be accessed manually and/or automatically.

Figure 38:
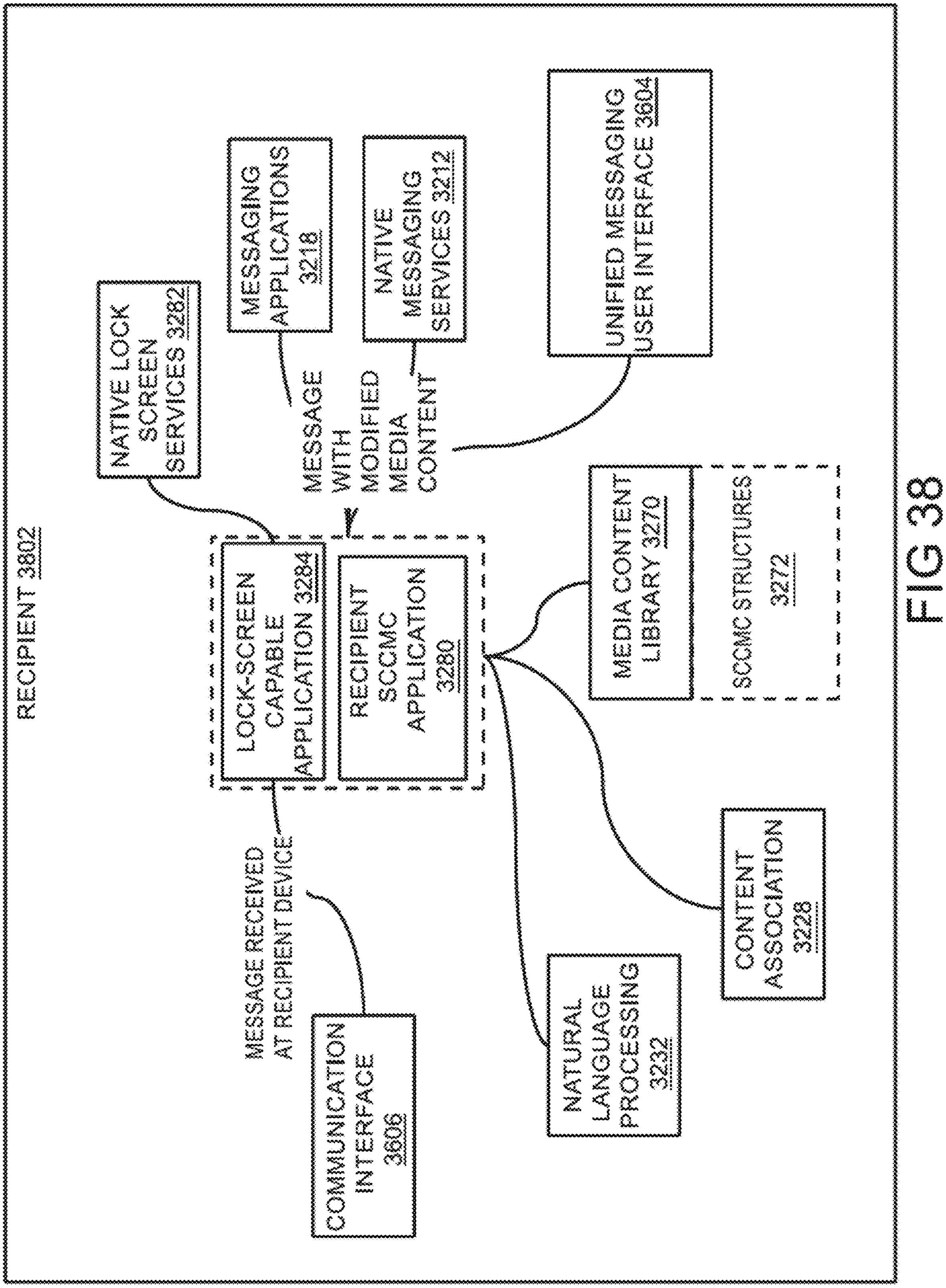
FIG. 38 illustrates an embodiment of a recipient device configuration in accordance with an embodiment of the systems and methods disclosed herein.
Figure 39:
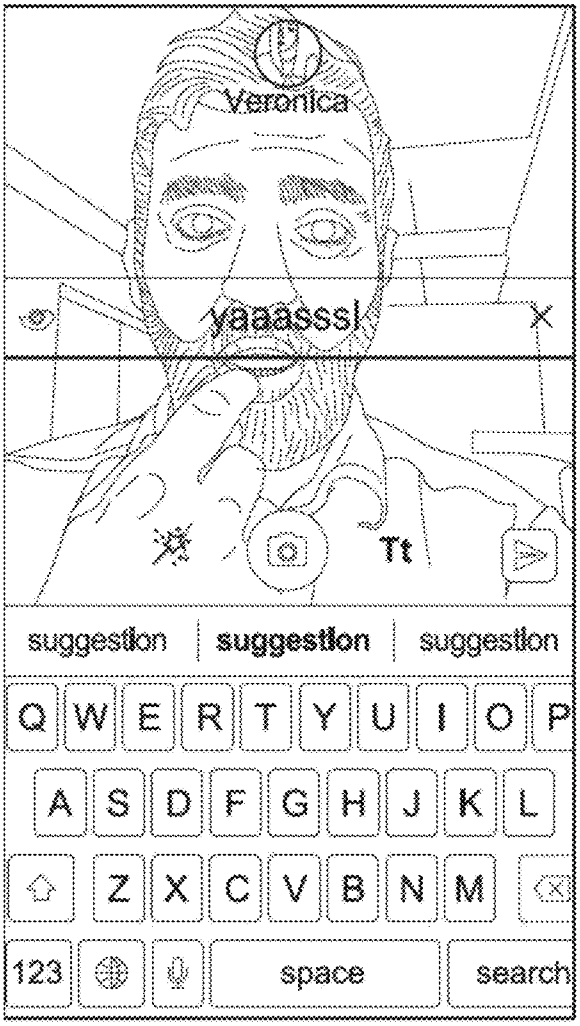
FIG. 39 illustrates an embodiment of a unified messaging interface for responding to a modified media content message in accordance with an embodiment of the systems and methods disclosed herein.

FIG. 38 depicts exemplary operations of the methods and systems 3800 for content modification of an incoming message via an interception by a lockscreen capable application and processing thereof using the methods and systems described herein to append, adapt, and/or replace a content item associated with the intercepted message. In embodiments, a message that may be received by the recipient 3802 may be intercepted by a lockscreen capable application 3284 that may include or access functions such as natural language processing 3232 and the content association services 3228. In embodiments, the message that may be received by the recipient 3802 and intercepted by the lockscreen capable application 3284 may also interface with a recipient SCCMC application 3280 to determine a content item that may be automatically or manually selected from the media library 3270, the SCCMC structures library 3272, or the like. In embodiments, the determined content item may be configured with the intercepted message and processed through the recipient SCCMC application 3280 (partially or wholly) or forwarded on to a corresponding messaging service or application. In embodiments, the modified message may be presented in a unified messaging user interface 3604 that may be made accessible by the lockscreen capable application 3284 without requiring that the lock state of the phone or connected device to be changed. The recipient 3802 may use the unified messaging user interface 3604 while the phone or connected device remains in an otherwise locked state to respond to the modified message. FIG. 39 depicts exemplary embodiments of the unified messaging user interface 3604 including a responsive modified message 3900 from the recipient 3802 to the sender 3602 and/or others in accordance with the many embodiments of the present disclosure.

In embodiments, the methods and systems related to automated gif/image/video identification based on content of a contact event, such as a text message and the like, may be beneficially applied for a wide range of languages. In particular, languages that include a large number of characters, such as some Eastern languages that may have one thousand or more characters, may benefit from the methods and systems described herein by automating annotation of typed content with at least one or more of the natural language processing approaches described herein. In addition to facilitating association of image-related content with such messages based on NLP of their text content, audio-based messages may benefit from the NLP-based image selection by adding a speech-to-text function that prepares an item of text content for the NLP. An image derived from the NLP processing of the generated text may be associated with the audio. In embodiments, an image may be tagged with the audio content so that transmitting the image to a recipient messaging application may result in the image being displayed while the audio is played back. In embodiments, more than one image may be associated with an audio message, such as based on NLP of a plurality of portions of the audio message. The more than one image may be configured in a slide show or the like that is coordinated with the audio file based on the NLP output so that each of the more than one image may be played back in a sequence that tracks with the relevant audio. In embodiments, the NLP may determine that a first portion of an audio transcribed message may embody a first theme or emotion and a second portion, that may follow the first portion may embody a second theme or emotion. A first image may be recommended and/or selected for the first portion and may be configured to display (e.g., by associating playback metadata with the image and the like) for a duration of time that is consistent with the first portion of the audio transcribed message. Likewise, the second image may be recommended and/or selected for the second portion and configured to display for a duration that is consistent with the second portion of the audio transcribed message. In embodiments, audio-associated image(s) may be recommended, selected, and exchanged as described herein between at least two users in a form of audio-messaging, such as VoIP, audio file capture and playback, and the like.

Figure 40:
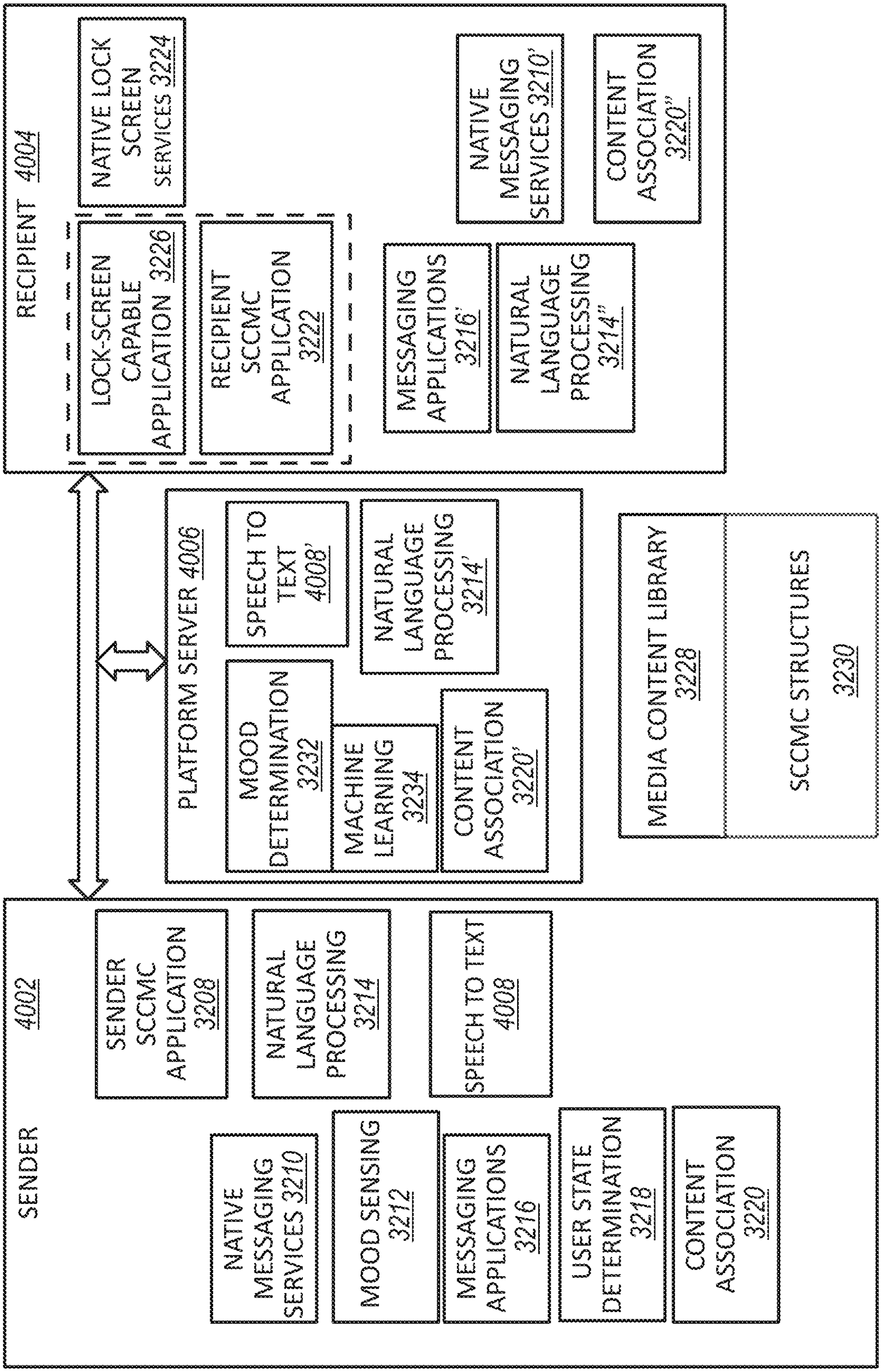
FIG. 40 illustrates an embodiment of the system of FIG. 32 further including speech to text for transcribing audio messages for use with NLP.

FIG. 40 depicts an embodiment of the platform of FIG. 32 with the addition of speech to text functionality to enable the use of natural language processing, such as for recommending candidate images to be associated with an audio message. A sender 4002 may be configured with, among other things, natural language processing 3214 as described herein. A user of a sender system 4002 may record an audio message. The audio message may be processed at the sender 4002 with a speech to text facility 4008 that may generate a text transcription of the audio recording. The NLP facility 3214 may process the transcription to determine a theme, intent, emotion, and other understanding of the audio message. As described elsewhere herein a sender SCCMC application 3208 may present the sender user with one or more recommended image contents to be associated with the audio message based on the NLP determined theme, intent, emotion or other understanding. The SCCMC application may communicate the audio message, and/or one or more of the image contents selected by the sender user, and/or the transcription to one or more of a platform server 4006 and a recipient 4004. Processing of the transcription may be performed by a natural language processing facility 3214' of the platform server 4006. Likewise, speech to text processing of the audio message may be performed by a speech to text facility 4008' of the platform server 4006. The platform server 4006 may perform speech to text and NLP and recommend one or more image contents to a sender user and the like. The platform server 4006 may combine a sender user selected image content with the originating audio file so that the image content is presented on an electronic interface of the recipient device 4004 when the audio message is played, such as on a lock screen of the recipient device 4004.

Figure 41:
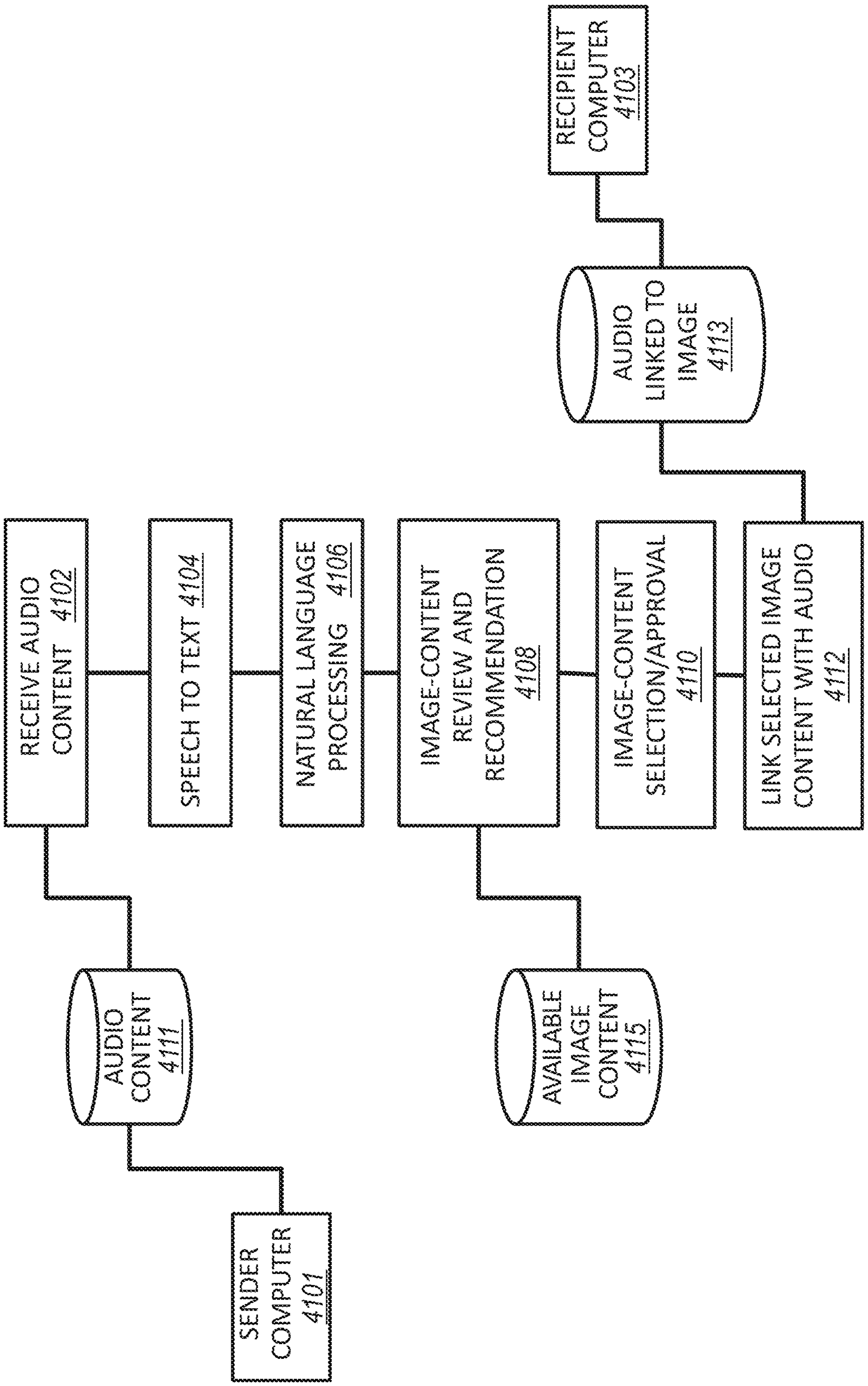
FIG. 41 illustrates a flow chart of processing an audio message with an embodiment of the platform of FIG. 40.

Referring to FIG. 41 a flowchart of audio message processing using, for example, the platform of FIG. 40 is depicted. A sender computer 4101 may generate an audio content item 4111 that may be provided to a platform where the audio content may be received 4102. Speech to text algorithms 4104 may be applied to the audio to generate a text transcription of the audio. The transcription may be processed by a natural language processing facility 4106. The output of the natural language processing facility 4106 may be processed by an image-content review and recommendation facility 4108 that may use the NLP output to select among a plurality of available content images 4115 to recommend at least one content image to a user, such as a user of the sender 4101. The user may select and/or approve of a recommended image in step 4110 image-content selection/approval. A selected image may be linked with the received audio file at step 4112, the audio content may be further linked to the selected image to facilitate coordinated playback on the recipient computer 4103.

In support of a user interface for facilitating selection of one or more images to be associated with a message, measures of user preference for the one or more images may be used when recommending images. Measuring user preference may be similar to those used in social media environments, such as providing a "thumbs up/down" function, providing a "like" function, detecting an amount of time a user dwells on an image, and the like may be used to help determine a likelihood that an image, such as a GIF, photograph, video and the like is popular. These measures of image popularity may be combined with other measures associated with the images, such as utilization of the image in messages, reuse of the image, social media activity of a message with a given image (sharing, re-sharing, reposting, re-tweeting, and the like) to form an additional degree of a likelihood of image popularity. These measures may be combined with natural language processing of text of messages that include the image to better determine if the resulting output of the NLP is consistent with social media perception of the combined text and image. As an example, NLP of text may suggest a particular image. Social media-based perception of the combination of text and the particular image may support the suggestion (e.g., social media users may indicate a preference for the combination, such as by liking the message or taking another action, such as reposting the message), or may indicate the suggested image may not be a suitable image for the text (e.g., social media users may indicate a dislike for the combined image/text, such as by disliking the message or exhibiting a lack of action such as not reposting the message). Therefore, prioritization of images may be represented as a function of user responses to the image in the user interface, social media responses to the image and/or to messages that include the image, such as Image-Prioritization=f(user interface response)+f(social media response). Additionally, in embodiments, image prioritization may be used in the platform user interface to determine an order, arrangement, image quality, image size, and the like for presenting candidate images in the user interface. Images with lower prioritization scores may be presented as smaller images, may be presented further down in a gallery of images, and the like.

Social media perception of images and/or messages that include an image may also be used as an input, such as a seed for natural language processing of text content of an image. Social media perception that may indicate that a message is popular, may facilitate determining temporal relevance of the message, which may indicate an importance of an emotion or other understanding of the message that may be derived from natural language processing of the message, and therefore temporal relevance of some of the words in the message. This temporal relevance, which may be short term or long term relevance, may be linked with one or more words in the message so that those words appearing in other messages may indicate a similar relevance or at least may indicate a relevance of an emotion and the like conveyed by the message. This information may be useful in validating and guiding for improvement natural language processing of the message.

Sources for images for the methods and systems for automated image recommendation and/or selection for inclusion with a message may include public images sources, such as publicly available social media photo galleries. In embodiments, social media and the like public galleries of participants of a message, such as a sender and a recipient, may be a source of candidate images. Through the use of tools such as face recognition, images may be organized based on detectable faces in photos. Further through the use of NLP of a text portion of a message being communicated from a sender to a recipient, a context of the message may be determined. The context of the message may be coded so that it can be used to facilitate selection of one or more candidate images from the sender's social media accessible photos, the recipient's photos, or a combination thereof. In an example, NLP may be used to analyze a message text content to generate a context or understanding of the message. In embodiments, such an understanding may suggest that a sender is inviting a recipient to dinner. The understanding may be coded into keywords, such as dinner, invitation, and the like that may be useful for indexing into a gallery of photographs of the sender and/or recipient. Images that are indicated by the keywords to be similar to the NLP understanding of the message may be suggested for use with the message.

In embodiments, the methods, systems and algorithms described herein for facilitating recommendation and/or selection of image-like content for use with a text and/or audio message, which may be based on natural language processing of the text and/or a transcript of the audio, may also be applied to other types of content than image-like content. In embodiments, messages with text may be tagged, such as with a hash tag and the like (e.g., a tweet, and the like). Hash tags may be applied across a plurality of messages, typically as an organizing tool to facilitate associating different messages that may share a common theme. Natural language processing, which may generate information about a message, such as its theme, may be applied to recommend one or more hash tags from a pool of hash tags based on the NLP-derived message theme, emotion, and the like. Hash tags may also be associated with descriptive metadata, that may be produced through use of NLP applied to the hash tag. This descriptive metadata may be useful in matching and/or recommending hash tags with content. In embodiments, NLP applied to a message text content may produce an understanding (e.g., theme, emotion, and the like) that may be coded to facilitate matching candidate hash tags from a pool of hash tags based on, for example, the hash tag itself and/or metadata associated with the hash tags. The candidate has tags may be presented in a user interface, comparable to the user interface described herein for manually selecting image content to be combined with a message text content. User interaction with the presented hash tags may be measured and used to further determine which hash tags are preferable for different types of text message content. In embodiments, a portion of the pool of hash tags may be processed with natural language processing to generate metadata descriptive of each hash tag, such as a theme, emotion, intent or understanding. This natural language processing generated metadata may be used in the selection of candidate hash tags, such as by determining a similarity of this natural language processing generated metadata with an output of the natural language processing of the message. In embodiments, the content matching platform may communicate the output of the natural language processing of the message to the messaging platform via an application programming interface.

In embodiments, an interface, such as an API, may facilitate interaction between a content matching platform that employs the methods and systems described herein and a messaging platform, such as a message platform that uses hash tags. The API or similar computer interface may facilitate the content matching platform programmatically receiving message content that it may processes, such as with NLP to develop an understanding of the message. The content matching platform may use the NLP to select among a plurality of hash tags to provide, through the API to the messaging platform for potential inclusion with the message. In embodiments, the content matching platform may provide information derived from the understanding to the messaging platform that may perform some degree of hash tag matching. In embodiments, the API may facilitate a user of the messaging platform to view candidate hash tags provided by the content matching platform. The user may view the candidate hash tags in an interface that is native to the messaging platform or that is shared with the content matching platform, such as by providing a link to a web page that contains the interface.

In embodiments, an interface, such as an API, may facilitate the exchange of message-based content and image-based content (e.g., gifs, and the like) between a messaging platform (e.g., TWITTER™) and the content-matching platform. This interface may facilitate the messaging platform providing message text content and the like to the content matching platform that may apply, among other things, natural language processing to develop an understanding of an intent of a message, such as a theme, emotion and the like. This understanding or result of other processing performed on the message text content may be used to identify one or more candidate image-type content items. The API may facilitate the transfer of these one or more candidate image-type content items from the content matching platform to the messaging platform for inclusion with the text portion of the message. In embodiments, the messaging platform may receive any of the one or more candidate image items, a coding of the understanding, a link to one or more candidate image items, a complete message including the text content provided from the messaging platform and the one or more candidate image items, and the like.

Figure 42:
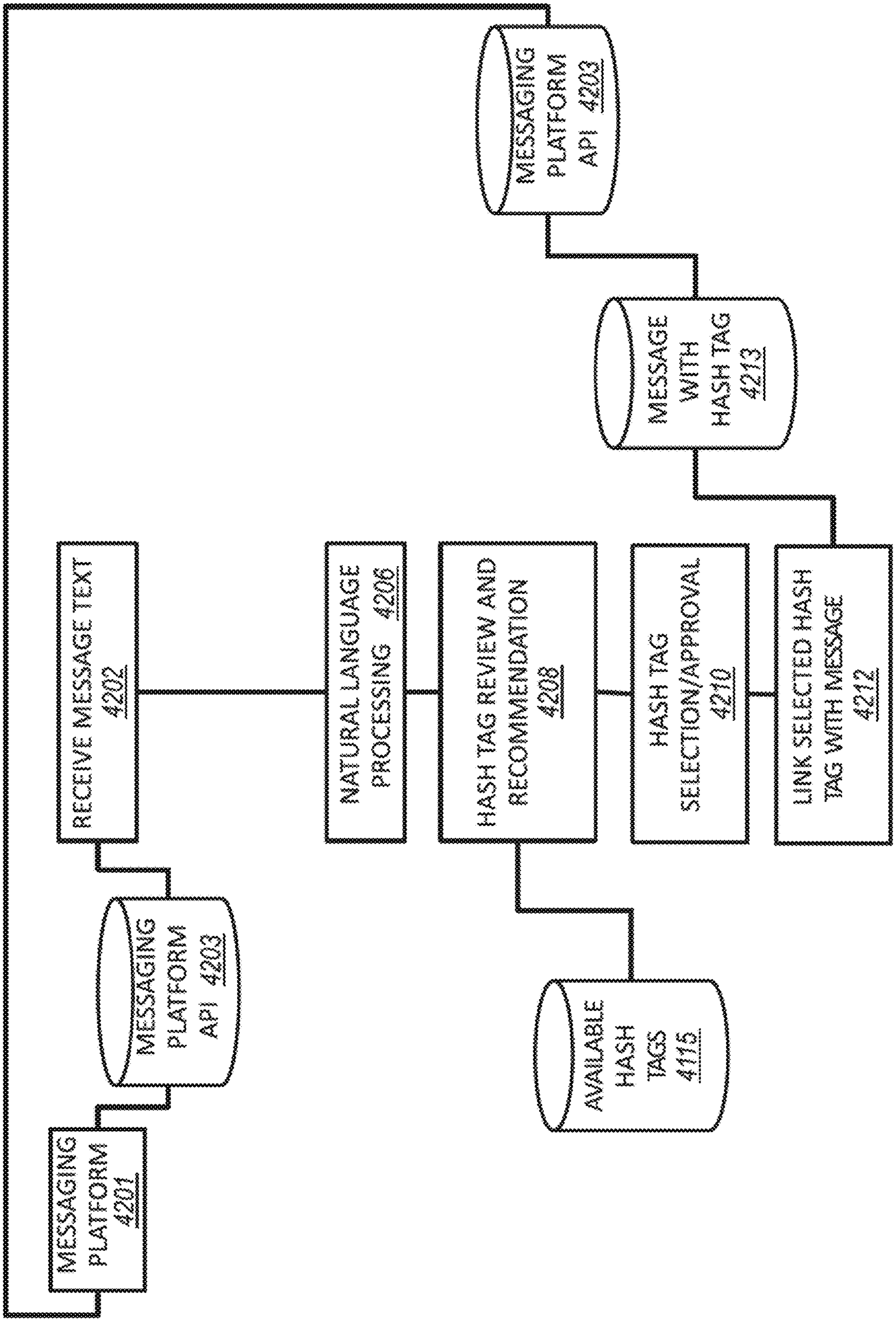
FIG. 42 illustrates a flowchart of communicating between a messaging platform via an API and a content matching platform to recommend hash tags rather than image content.

Referring to FIG. 42, a flow chart for use of natural language processing to facilitate recommendation and/or automatic selection of hash tags for use in a hash tag based messaging platform via a messaging platform interface, such as an API is depicted. Text of a message and the like may flow from a messaging platform 4201 via an inter-platform communication API 4203 to a content matching platform message reception interface 4202. The message, such as a text portion of a message, may be processed by a natural language processing facility 4206 to determine, as described herein, an intent, emotion, theme, or other understanding of the message text. The output of the NLP facility 4206 may be used to review and recommend at least one hash tag from available hash tags 4115 for potential use with the message from the messaging platform 4201. One or more recommended hash tags may be presented in a user interface 4210 that facilitates user selection and/or approval of one or more of the recommended hash tags. The hash tag(s) may be lined with the message in step 4212, which may produce a message with the selected hash tag that may be communicated through the messaging system interface API 4203 to the messaging platform 4201 where it may be handled according to the messaging platform 4201 protocols.

In embodiments, natural language processing of text content, such as a text portion of a contact event, message, and the like may produce an understanding of the text that may indicate a theme, emotion, intent, and the like of the text, which may also apply to the message that contains the processed text content. A result of NLP applied to message text content may be associated with the message as a form of descriptive metadata. The result of NLP may also be used to classify messages into categories of theme, emotion, intent, and the like. In embodiments, a messaging platform that may use hash tags to facilitate access to messages and the like may benefit from automated tagging of messages with hash tags indicative of the categories. As an example, a message in a hash tag-centric messaging platform may be processed with NLP to determine that a theme of the message is armed service personnel and an emotion of the message is respect. A hash tag indicative of this emotion-based theme may be recommended and/or automatically added to the message. The NLP-based classification hash tag may be made directly visible to users of the messaging platform, or may be hidden from the users while enabling the platform to better organize and manage messages being exchanged on the messaging platform. The NLP described herein may facilitate the creation of hash tag genres—emotion, intent, relevance, popularity, and the like.

In embodiments, in addition to facilitating a sender of a message, contact event, or the like controlling how that message is presented to a recipient on the recipient's computing device user interface (e.g., which image is displayed, ringtone is played back, video is played back and the like), a platform for providing comparable functionality may be adapted to enable collaboration among senders and recipients on how a contact event and/or message is presented on the recipient's computing device user interface. In a simplified two-user example, two users may share control of how messages and/or content events are presented on each other's user interface. Either user may have control of at least a portion of content that is presented in the user interface as a sender and as a recipient. This shared control may be implemented through the user interface features described herein that facilitate a sender determining what image, ring tone, and the like is activated on a recipient's computer interface. However, a recipient may influence, including potentially overriding what the sender has selected for playback on the recipient's computer. The user in the recipient role may configure his computing device to receive the sender's preference and messages from the sender, while ensuring that a portion of the message that the recipient has control over is defined by recipient settings or defaults a sender's settings if the recipient has not set any preferences for or opted to control the portion. In this example, a user in a sender role may indicate a first image to be presented to the recipient; however, a user in a recipient role may indicate a different image to be presented to the recipient responsive to the sender's message. Further in this example, a user may take on a recipient role and provide data to the other user's computing device that may restrict which images the other user may select among. In this example, the platform may identify a dozen candidate images based on the processing of a text portion of a message being composed by the sender. However, when the candidate images are presented to the sender for manual selection, only a subset that meets the criteria established by the recipient may be visible and/or selectable. Further in this example, a user in a recipient role may provide a specific list of images, set of images, links to a list of links to specific images to a user in a sender role that the sender's content matching platform may select from when presenting candidate images to the sender user for selection.

In examples of a recipient mobile device using the methods and systems described herein, the lockscreen capable application on a recipient mobile phone, computing device, or the like may capture incoming messages from a wide range of messaging clients (including, without limitation WhatsApp™, Facebook Messenger™, default SMS/MMS messaging apps, and the like) and use processing capabilities including natural language processing (NLP) capabilities to analyze an incoming message's content and pair it with a relevant item of content to display on the lock screen of the recipient's mobile device, such as a graphics interchange format item (a "GIF"), a video, or any other type of content noted throughout this disclosure. The paired content may then play on the lock screen as part of, or in response to, the message notification to the user. Continuing with this example, the lockscreen capable application may further allow users to respond to the messages they have received directly on the lockscreen, without having to unlock the phone or open a separate messaging application. The user interface of the lockscreen capable application on the lock screen may include a “Tap to view” button that brings users into an interface panel in which the user may begin creating a response. In embodiments, the phone may remain locked for all other purposes, so that exiting the interface panel returns the phone display to its lock screen.

By way of these examples, as the user enters text in the interface panel, one or more of at least three response modules may be activated. A plain text response module may be activated to facilitate user entry of a text response and interface with the messaging client, when applicable, to which the incoming message was intended. In embodiments, a GIF reply module may use natural language processing to automatically match relevant GIFs (or other such image files) with a user’s response while it is being typed, such as based on association of a range of GIFs (or others) with keywords, topics, or the like in a table, database, library or the like that may be accessed to retrieve an appropriate GIF (or other images) based on derivation of the keyword or topic from the natural language processing. The GIF module may also update the interface panel with potentially relevant GIFs (or other images), such as in a portion of the panel, while enabling the user to use a keyboard and also see what he or she is typing. Interface elements (such as swiping left or right, for example) may allow a user to select among the potentially relevant GIFs and/or to bring up other automatically matched GIFs (or other images). Alternatively, a gallery of GIFs (or other images) may be presented in a portion of the interface panel to facilitate easier viewing and selection from a range of automatically matched GIFs (or other images). Swiping left or right, for example, may bring additional GIFs or the like into view. A video/photo module may be activated to facilitate a user snapping a photo or video with a camera, such as a camera integrated into the phone, computing device, or the like to which the user may access through his or her mobile device including a networked camera and the like. The video/photo module may also facilitate the user accessing his or her photo/video library, third-party photo/video libraries, complete SCCMC structures, SCCMC channels, or image/photo/video content therein, and the like.

Independent of which module(s) are activated to facilitate the user responding to the intercepted message, the response may be sent back to the sender’s point of origination, optionally through the same messaging client, the SCCMC app, and the like that the originating message was targeted for. Thus, the lockscreen capable application may include capabilities for adapting outgoing communication such that it is appropriate for various channels of communication. The lockscreen capable application may also include capabilities for interfacing with and/or activating one or more communication capabilities or applications of the computing device, mobile phone, tablet, and the like without relinquishing the locked state of the device. In examples, if a message sent from a Snapchat™ client on a sender mobile device is intercepted by the lockscreen capable application, once the user indicates that a response message (with or without audio, GIFs, photos, videos, or the like) is ready to send, the lockscreen capable application may communicate with Snapchat™ application resident on the mobile device, or may generate a Snapchat™-format response message within the lockscreen capable application, to deliver the response back to the corresponding Snapchat™ application on the sender’s mobile phone, computing device, and the like. As noted, in the many embodiments the lockscreen capable application may emulate inter-device communication aspects of Snapchat™ and communicate directly back to the sender’s Snapchat™ application. After the user has completed entry and indicated that the prepared response should be sent, the user’s display on his or her computing device, mobile device, tablet, and the like may return to the lock screen.

In embodiments, the methods and systems described herein may include configuring a library of audio, video, and image content for use when processing messages and the like as described herein. The library may include items, such as images that may be configured with attributes that facilitate associating a library item with a message, such as a text message. In embodiments, configuring the attributes may be based on an understanding of messages that the lockscreen capable application may process, such as text messages processed with natural language processing to develop an understanding of a topic, a keyword, a sentiment, or the like. In embodiments, attributes may represent aspects of a message related to the intent of messages, such as an emotion being conveyed, and the like. Natural language processing of text and other messages may result in attribute values and types that may be applied to items in the library. In some examples, applying these attributes and attribute types may be done by a human who reviews the images. In many of the embodiments, they may be applied automatically by a computer executing an algorithm or other methodologies that may determine aspects of an image, such as a facial expression and the like as being associated with an emotion and the like. In embodiments, an automated determination may be developed using machine learning such as by training a machine learning system using a training set of messages for which a human has assigned attributes. In examples, an image of a user smiling may be associated with an attribute of a happy emotion. An emotion attribute of such a library item may be populated with one or more data elements representing an output of natural language processing of text strings that indicates a happy emotion meaning in the text.

In embodiments, methods and systems for creation, use, and maintenance of media content structures include sender-controlled contact media content (SCCMC) structures, and applications thereof and may further include adapting, configuring, or the like one or more media content structures that are accessible to a recipient computing device, computer, mobile device, and the like including those stored on the computing device of the recipient or provided by a server, and the like, during a contact event interaction between a sender computing device and a recipient device. A media content structure, such as an SCCMC structure, that may be accessed in response to a recipient computing device receiving a message, such as a text message and the like from a sender computing device may include or reference one or more data elements, such as an image, video, audio, text content and the like. In embodiments, prior to presenting the media content structure, such as content associated with the sender of the message to the recipient, one or more of the data elements may be adapted, configured, or replaced by another data element based on information derived from the sender’s computing device. The data element, such as an image may be adapted or replaced by another image to reflect a mood or emotion of the sender. In examples, an SCCMC for a sender may include an image of the sender with a pleasant smile. In other examples, however, the sender may be under the weather, such as due to the common cold, or the like, at the time that the sender sends the message to the recipient. Based on information indicative of the sender’s state, the pleasant smile image may be changed to an image that reflects the recipient's state. The replacement image may come from a portion of an SCCMC structure, from another SCCMC structure of the sender, from a third-party source, from the sender's computing device, and the like. Information about the sender's current mood, emotional state, health status, and the like may be sent along with the message from the sender's computing device to the recipient's computing device. In embodiments, the lockscreen capable application on the recipient's computing device may include an SCCMC application on the recipient's computing device that may process the message and accompanying information to determine what aspects of the SCCMC to adapt prior to presenting an SCCMC item that corresponds to one or more attributes of the sender.

In embodiments, a sender may use an SCCMC messaging application to create a message that may include information about his or her current mood and the like. The SCCMC application may provide a user interface with features that enable the user to designate his or her mood. Alternatively, a mood determining system, operating on the sender computing device, the recipient computing device, or in a remote location (such as in the cloud) may rely on technologies that facilitate detecting the sender's mood, such as facial recognition, speech recognition, degree of distraction of the sender, and the like. The mood determining system operating on the sender computing device or in a remote location (such as in the cloud) may rely on technologies that facilitate detecting the sender's mood contemporaneously with the sender sending a message from the sender's computing device to the recipient's computing device. The mood determining system may interact with or operate as part of an SCCMC application, a lockscreen capable application, or a combination thereof to provide mood information, which in turn may be used as an attribute, such as for selection of appropriate media content structures, such as SCCMC media structures or other media structures, such as selecting a GIF or other image or video that reflects or is consistent with the mood of the sender.

In embodiments, the lockscreen capable application is an SCCMC-based application and may be part of a platform that may intercept messages originated on a sender's computing device prior to the messages being delivered to recipient's computing device, including messages prepared in other messaging applications as described herein. In embodiments, the platform may process the intercepted messages, including processing the messages while they are being inputted by the sender on the sender's computing device independent of which messaging application the sender is using (or none at all), to offer services of the platform to the sender prior to facilitating delivery of the message to one or more recipients. In embodiments, services offered may include the inclusion of an image, GIF, video, audio, alternate text and the like. Services offered may be customized for the sender based on information known to the platform about the sender, such as the sender's level of activity with the computing device, sender's mood, sender's preferences, and the like. The services offered may be further customized through natural language processing of text portions of the intercepted message and may include suggestions for gifs, images, video, audio, text and the like to be included with or integrated into the message and the like. The platform may, automatically or in response to a sender's acceptance of one or more offered services, prepare and/or update a content media structure, such as an SCCMC structure of the sender, to transmit to the one or more recipients as part of the contact event interaction. As an example, an updated SCCMC structure or a portion thereof may be sent to a corresponding SCCMC application on the one or more recipient computing devices ahead of the message to enable the use of the updated SCCMC structure by a recipient's computing device when processing the accompanying message.

In further embodiments of a platform, a state determining system, such as operating with or as part of an SCCMC application or the like operating on a sender's computing device, may be provided with or may detect a current mood, emotional state, health state and the like of the sender and responsively prepare or update a media content structure, such as an SCCMC structure, that may be provided to potential recipients, such as currently active users of a group of which the sender is a member. Alternatively, the updated media content structure may be provided to a platform server that may store the media content structure, such as storing it as an SCCMC, such as for use when facilitating message delivery during a contact event interaction. Methods and systems for updating SCCMC structures on recipient computing devices that are described herein may be employed to update the various recipient devices.

In embodiments, a contact event handling platform is provided that intercepts messages originating on the sender computing device from messaging capabilities or applications operable on a sender's computing device, that processes intercepted messages with natural language processing and, based thereon, forwards the message with an appropriate media content structure, such as an SCCMC structure, based on the processing, and/or a result of the natural language processing. In embodiments, the contact event handling platform includes a lockscreen capable application that provides a unified messaging user interface for a recipient computing device, such as while the recipient computing mobile device is in lockscreen mode, while also delivering an adaptation of the intercepted message, such as based on the processing that is compatible with the other messaging applications to the targeted other messaging applications.

In embodiments, the contact event handling platform may intercept, on a recipient computing device, messages destined for other messaging applications operable on the recipient's computing device. The platform may process the intercepted message with natural language processing and based thereon may forward the message, and/or media content structure, such as an SCCMC structure, based on the processing, and/or a result of the natural language processing to be processed in a unified messaging user interface of the recipient computing device, such as while the recipient computing device is in lockscreen mode, while also delivering an adaptation of the intercepted message based on the processing that is compatible with the other messaging applications to the targeted other messaging applications on the recipient computing device.

In embodiments, a lockscreen capable application may facilitate interacting with a user via user's computing device display while the user's computing device is locked (e.g., conventionally only the lockscreen may be presented on a mobile device display when the user's device is locked). The lockscreen capable application may, however, facilitate interacting with a user via a user's lock screen or facilitate interacting with the user on a screen other than the user's mobile device screen, such as a nearby screen on a TV, a screen designated by the user, a default screen, and the like. In embodiments, the user may interact with the lockscreen capable application via the other screen at least using the user interaction capabilities associated with the other screen, such as a touch screen, a touch pad, voice activation, keyboard, and the like. In this way, whether or not a user's computing device may be in lock screen mode, the lock-screen capable application may provide the user with a way to view and respond to a message being processed through the lockscreen capable application.

In embodiments, a lockscreen capable application as described herein may connect to, be associated with, or be integrated with augmented reality and/or virtual reality (AR/VR) user interfaces. The lockscreen capable application may provide information, such as images, audio, video, text and the like to the AR/VR user interfaces that enable presentation of a message in the interface. The information may be based on or include at least a portion of an SCCMC that is controlled by a sender of the message. As an example, an SCCMC application operating on or communicating with a computing device in control of the AR/VR user interface may receive, such as by intercepting a message for another messaging platform as noted herein, a message that it processes to access a corresponding SCCMC structure. In embodiments, the information in the structure may include media content, such as images, audio, video, and the like that may be provided to the AR/VR user interface for integration with the AR/VR user interface presentation. In embodiments, the AR/VR user interface may incorporate active elements, such as avatars and the like that may be deployed in the AR/VR user interface in response to receiving the message information from the SCCMC application.

In embodiments, the methods and systems of sender-controlled media (SCM) and the like described herein may facilitate enhancing existing caller ID functionality with other forms of content including audio, visual, animation, and the like. Use of SCM platform functionality that facilitates rendering SCM data structure content and the like through an electronic display may be integrated with or coupled with existing call functionality of smart phones to deliver visual caller ID as a new form of caller ID. Caller ID generally comprises a number or other alpha-numeric value (e.g., a name) of a caller, such as what may be found in a conventional phone directory and the like. On smart phone devices that include two dimensional electronic display graphic screens, this information is generally rendered in an incoming call display interface. Such an incoming call interface generally provides options to the user, such as answering the call, sending the call to voice mail, declining the call and the like. Integration of SCM content rendering capabilities with incoming call interface capabilities may facilitate presenting a range of content to a call recipient, including real-time images of the caller (e.g., through use of a caller's phone's camera function and the like). In embodiments, visual caller ID may provide a rich form of caller identification while optionally retaining incoming call recipient options.

As described and depicted herein, SCM content and data structures may be created and administered by callers using an SCM content creation interface. This interface may be activated automatically in response to a user initiating a call from a phone equipped with SCM platform capabilities, such as an SCM content creation application and the like. Such an interface may be adapted to generate call-specific SCM data structures that can be shared with a recipient at the initiation of a call. Such call-specific SCM data structures may be temporary, existing only for the initiated call. However, call-specific SCM data structures may be created and stored, such as on an SCM platform server and the like, so that, for example, they can be accessed when the same recipient is called by the caller. In this way creation of a call-specific SCM data structure may in effect generate a recipient-specific SCM data structure.

In embodiments, an SCM platform may use the methods and systems of sender-controlled media (SCM) described herein and depicted in the figures herewith to, for example, send a video or other forms of media to a caller in lieu of or in tandem with traditional Caller ID information. The platform may thusly overcome an apparent lack of information delivered in a traditional caller ID message that accompanies a phone call. In examples, the video could be a profile video. The video could be a customized video based on an advertiser or retail offering. In examples, the SCM is associated with the caller ID and is linked to a profile in which filters can be set up for predetermined SCM data structure to be sent to multiple users, e.g., coordinated call campaigns for retail, affiliated groups (school/job/church calls), etc. In examples, the SCM data structure can be grouped with a prearranged set of contacts so that it can be sent out to those specific phone numbers, such as when a call is configured to be sent to those specific phone numbers in a call queue and the like. In other examples, the SCM data structure can include and/or refer to an identity photo or video to facilitate a soft authentication or otherwise establish a level of reliability of establishing a connection with the caller (e.g., increasing a comfort level of the recipient in accepting the call). In examples, the SCM data structure can include or reference a registered logo. In examples, the SCM can be a live casting of a face of a user initiating the call. In examples, the SCM data structure may include an inside joke or shared memory.

Figure 43:
FIG. 43 illustrates exemplary screens of generating and playing back visual caller ID.

Referring to FIG. 43, interface screens for the creation, activation, and presentation of visual caller ID employing the methods and systems of visual caller ID described herein are presented. In embodiments, creation screen 4302 depicts a visual caller ID creation screen in which a user is shown an image currently being captured by the user's phone camera. The screen prompts the user to hold and record a caller ID Video. The video is captured and optionally associated with an SCM data structure to be used for a call to be placed by the user. In embodiments, the screen 4302 may be activated as a result of a user initiating a call to a recipient; however, the screen 4302 may be activated separately from initiating a call. The screen 4304 presents the user with an opportunity to review the captured visual caller ID, which is a video in this example, but could be an image, a graphic, or other content. The captured video may be saved so that it can be referenced by the user when generating visual caller ID for other users. The captured visual caller ID may be set at the default visual caller ID for calls placed by the user. This may be actuated by creating an SCM data structure for the user that can be presented to the user upon initiation of an outgoing call so that the user can choose to continue with the presented visual caller ID or create a new visual caller ID as enabled by the screen 4302. The screen 4306 depicts an incoming call screen of a recipient of a call from the user. In the screen 4306, the visual caller ID is presented/rendered/played back depending on the type of visual caller ID and recipient preferences. The screen 4306 also shows traditional caller ID 4308, indicating the possibility of an incoming call screen may be controlled by a traditional caller ID display function (for presenting caller ID 4308) and an SCM-based display function for presenting visual caller ID associated with the caller for at least this call instance.

In embodiments, a visual caller generation interface, an embodiment of which is depicted in the screen 4302 may present the user with options based at least in part on call context, such as if a call has been initiated to a recipient when the interface is activated. Options during such a condition may enable the user to opt out of sending the visual caller ID, adjusting an aspect of the visual caller ID, authorizing the SCM data structure platform to adjust aspects of the visual caller ID (e.g., based on an aspect of the recipient and the like). These and other options are described elsewhere herein.

In embodiments, SCM data structures may be created and accessed for calls to groups of callers. SCM data structures and the like may be associated with a recipient parameter that may be populated with values that indicate a particular SCM data structure that should be used when the recipient is called. In embodiments, a corresponding parameter of a recipient may indicate that the member is part of a call group, such as a member of a team, employee of a company and the like.

In embodiments, SCM data structure content may be utilized in combination with or may replace conventional caller ID. A sender-controller media (SCM) data structure may include content, such as a video or image and the like, that may be used in a global caller ID profile of the caller so that the video or image may be rendered on a recipient's phone's electronic display in lieu of conventional caller ID content. In embodiments, a global caller ID profile may be stored in the cloud or to other network facilities, to a central node in a network of smartphones, or call originating devices and the like. By way of these examples, the global caller ID profile may be stored in the cloud to the central node, which in some instances can be a cloud hub, for incoming and outgoing calls. The network of smartphones can provide the central node capabilities but the central node capabilities can also be offered by other cloud network systems and providers. In embodiments, existing caller ID functionality and communication channels may be adapted to facilitate access to SCM data structure content and the like. In embodiments, one example of adapting existing caller ID functionality to accommodate SCM data structure content access may include providing a URL or other link as the conventional caller ID value. In embodiments, the SCM data structure can be delivered in a peer-to-peer fashion directly by the call or message originator to the one or more receivers of such call or message. By adapting an incoming call functionality to recognize such a link, the linked content may be rendered as visual caller ID. In embodiments, incoming call functionality may be adapted to recognize such a link and transfer control of the phone's display screen (e.g., one or both for rendering and receiving user input) to an SCM data structure processing application that facilitates accessing the linked content and rendering it for the recipient. Accessing the linked content may include referencing an SCM data structure that has been transferred to the recipient device through the SCM data structure communication methods and systems described herein. In embodiments, initiation of a call from a caller to a recipient may include sending call-specific caller SCM data structure information to an SCM data structure handling application executing on the recipient's phone. Alternatively, initiation of a call may include sending call-specific caller SCM data structure information to an intermediate server, such as a web server that holds the call-specific caller SCM data structure waiting for an access request, such as from a recipient phone that has detected a link to the call-specific caller SCM data structure in the caller ID for the initiated call.

In embodiments, visual caller ID functionality may be provided by an exemplary system that may include an incoming call handling function executing on a personal mobile device that may present content from an SCM data structure that is referenced in caller ID data associated with the call. In such exemplary systems, the caller ID data may be provided to the incoming call handling function of the personal mobile device using existing caller ID techniques and the like. The exemplary system may further include an SCM selection interface presented to the originator of the incoming call on an electronic interface of a call originating device operated by the originator. The selection interface or other visual caller ID interfaces may facilitate selection of an SCM data structure by the originator of the incoming call contemporaneously with initiating the incoming call. In embodiments, the selection interface may be activated responsive to a user initiating a call. To facilitate linking the SCM data structure selected by the call originator with the caller ID information sent to the recipient, an SCM linking function executing on a networked server that receiving a selection of an originator SCM data structure selection from the SCM selection interface (or other visual caller ID interfaces) may form a digital link based on the indication, and may update the caller ID data for the incoming call with, for example, the digital link.

In embodiments, an alternate exemplary visual caller ID system may facilitate generating visual caller identification data. A visual caller ID selection interface may be responsive to a user of the call-originating device initiating a call and causing generation of options for content for a visual caller ID to be presented in the visual caller ID selection interface. In addition to the visual caller ID selection interface an SCM linking function executing, for example on the call-originating device, may, in response to receiving an indication of the visual caller ID from the SCM selection interface (or other visual caller ID interfaces) form a digital link to an SCM data-structure based on the indication. Lastly, a caller ID field of caller ID for the initiated call may be updated with the digital link so that the visual content referenced in the SCM data structure can be presented to the recipient on an incoming call user interface; thereby providing visual caller ID content and options for handling the call to the intended recipient.

In embodiments, visual caller ID functionality may be provided through a method that may include presenting at least one item of content in an SCM selection function of an electronic display of a caller's call-placing device or other mobile devices. Responsive to the caller selecting an item of content in the SCM selection function, which may include capturing an image or video with the phone's camera interface, the caller's device may initiate a call to a recipient. Also responsive to the caller selecting an item of content, a link may be generated to an SCM data structure through which the selected item of content is accessible. Next, the generated link may be used to update caller ID data for the call, so that the link is provided to the recipient's phone as a caller ID data value. Upon receipt of the updated caller ID data value, the content from the SCM data structure referenced via the caller ID data value may be rendered in the call recipients call-receiving device electronic user interface.

In embodiments, visual caller ID functionality may be provided through a method that may include responsive to receiving an indication of a request to initiate a call from a caller, presenting at least one of an image and a video in a visual caller ID selection user interface of an outgoing call function of a call-originating device. The visual caller ID selection user interface may facilitate generating an indication of a user selection of one of the images, the video, and no selection. An SCM data structure may next be configured to reference the selection. Caller ID data for the call may next be updated to include a link to the configured SCM data structure. At the recipient's call-receiving device (e.g., a phone) and responsive to receiving a receipt of the call, the content in the configured SCM data structure may be presented on a display screen of the call-receiving device by following the link in the caller identification information.

In embodiments, the methods and systems of visual caller ID functionality described herein may be enhanced in a variety of ways, examples of which are not described. In embodiments, the visual caller ID interface of the call-originating device may facilitate capturing content to be used as the visual caller ID content with a camera function of the call-originating device. The captured content may be any of a still image and a video. The captured content may further be presented as at least one of the selectable items of visual content in the visual caller ID interface. In embodiments, a caller ID field of an initiated call may comprise a link to an SCM data structure. Such as SCM data structure may indicate an image for presentation on an electronic display of a call receiving device upon receipt of the call. As noted, an item of content to be selected for use in the visual caller ID may be an image captured by a camera function of the call-initiating device during the activation of the visual caller ID selection interface. In embodiments, the SCM data structure may indicate a video for presentation on an electronic display of a call receiving device upon receipt of the call. Also, the SCM data structure may indicate a multimedia object for presentation on an electronic display of a call receiving device upon receipt of the call. The visual caller ID comprises a profile of the caller. The visual caller ID comprises promotional content. In embodiments, a linked SCM data structure may include an image and/or a video captured contemporaneously with the initiating of the call. Also, in embodiments, the visual caller ID selection interface may further present call originating phone numbers and based on a user selection of one thereof, updating the visual caller ID SCM data structure link. Such a function may be useful for a user who operates a plurality of disjoint businesses to facilitate the user selecting a business by selecting the phone number specific to the business.

In embodiments, visual caller ID methods and systems may be influenced by aspects of a recipient of a call or contact instance, such as a context of the recipient, a name of the recipient, a group affiliation of the recipient, a characteristic that distinguishes the recipient from other recipients in a group of recipients, and the like. In embodiments, a recipient-influenced visual caller ID media content object may be an optional combination of images, text, audio, and video that a user, such as a participant of an SCM platform as described herein chooses to, for example, form a template that can be adapted based on recipient context and rendered when the recipient (e.g., another participant in an SCM platform environment) is being called by the user. Elements of such a template may include a field for the recipient's name, a field for the recipient's group, a field for a group to which the user has assigned the recipient, a portion for a visual item of content (e.g., where an image of the recipient's face might be disposed), and the like.

In embodiments, configuring and/or using recipient-influenced visual caller ID may include a computing system, such as a server, a mobile phone of a caller and the like receiving an indication of an initiation of a call from a sender to a recipient. In embodiments, the initiation may be caused by a user of a call-originating device selecting a contact in a call originating interface. Additional steps for configuring recipient-influenced visual caller ID may include determining an SCM data structure for use in configuring visual caller ID for the call based on a selection of a visual content item by an originator of the call. In embodiments, the selected item of content may be cross-referenced to a library of SCM data structures. An SCM data structure that is found to include and/or reference the selected item of content may be selected for use with the call. Alternatively, an SCM data structure generating function may gather information about the caller, optionally include information about the call (e.g., time of day, location of the caller and the like), and the selected item of content to produce an SCM data structure for use with the call. To influence the visual caller ID for the call with recipient related aspects, an SCM platform participant database may be referenced, such as with an identifier of the recipient of the call. Such an identifier may be a phone number of the recipient. Alternatively, the caller may access the SCM platform participant database and select a recipient therein, effectively explicitly identifying the recipient entry in the SCM platform participant database. With the SCM data structure for the call and the SCM platform participant information for the recipient, an adapted SCM data structure may be generated by adapting a portion of the SCM data structure based on an item of information referenced in the SCM participant database with the recipient identifier. To complete use of the recipient-influences visual caller ID for the call, the caller ID for the call may be configured with a link to the adapted SCM data structure.

In embodiments, selection of a visual content item may occur in a visual caller ID selection interface executing on the call-originating device. Such a visual caller ID selection interface may cause options for content for a visual caller ID to be presented in the visual caller ID selection interface so that the caller can complete selection of the item of content for the call. In embodiments, the options for content presented in the visual caller ID selection interface may include an image being provided by a camera of the call-originating device. To facilitate generating an image provided by a camera of the call-originating device, the visual caller ID selection interface accesses the camera and presents content imaged by the camera as one of the options for content.

In embodiments, adapting a portion of the SCM data structure to influence visual caller ID for a recipient may include adapting a recipient name element of the data structure to correspond to a name of the recipient. Adapting a portion of the SCM data structure may include adapting a recipient group affiliation element of the data structure to correspond to a group affiliation of the recipient. Adapting a portion of the SCM data structure may be based on a recipient name. Adapting a portion of the SCM data structure may alternatively be based on a group affiliation of the recipient. A call may be made to a plurality of recipients, some of whom may be part of a group. For recipients in the plurality who are not part of the group, a different visual caller ID may be preferred. Therefore, the portion of the SCM data structure may be adapted based on a correspondence of the name of a recipient to a list of exception names.

In embodiments, calls from business owners to clients, cold prospects, warm prospects, referred prospects and the like may benefit from the use of visual caller ID by tailoring portions of the visual caller ID based on the client-status of each recipient. As an example, an item of information for the recipient referenced in the SCM participant database may indicate a client-status. Based on that indication, a client message portion of the SCM data structure may be adapted. Exemplary client-status and resulting client message portion adaptations may include the recipient is an existing client so the message to this recipient would refer to an existing relationship between the caller and the recipient; the recipient may be a referral from an existing client, so the message to the recipient may reflect this referral, the recipient may be a prospect without referral so the message to this recipient may be a non-referral prospect message.

In embodiments, visual caller ID content may be adapted based on call context, such as a time of a call, a date of a call, a proximity to a holiday or other event, a proximity in time to an upcoming meeting between the caller and the recipient, a location of the caller, a location of the recipient, an intent of the call, and the like. Adapting a caller ID content, such as visual caller ID content dynamically (e.g., at time of the call) may be based on call-specific context (e.g., other than recipient context, and the like). In embodiments, a specific caller ID content may be automatically selected based on the call-specific context. Adjusting a portion of the content, such as an image, an object in an image, and the like may be based on call-specific contexts, such as time of day, time remaining before an offer ends (e.g., sales promotion), and the like.

In embodiments, methods and systems for call context-based visual caller ID content may involve performing actions related to the visual caller ID (e.g., selecting, generating, adapting, and the like) upon receiving an indication of an initiation of a call from a sender to a recipient. Alternatively, the performing the actions may be associated with configuring a call queue of recipients, such as for automated calling and the like. For time-based call context an amount of time left in an offer related to the call, such as an offer from the sender to the recipient, an offer from a third-party to the sender and/or the recipient, timing of offers available to but not specifically for the sender, recipient or both, and the like. Other related time-based aspects of a call context may be time until an upcoming event or elapsed time since a prior event, such as a public event, a private event, an event detected on a calendar of at least one of the sender and the recipient. Yet other call time-based aspects that may impact visual caller ID may include a day, date, time-of-day and the like of the call. Based at least in part on the time-related context of the call, methods and systems for call context-based visual caller ID content may involve generating an SCM data structure that may impact the visual caller ID for the call.

In embodiments, an SCM data structure may be generated from the profile and related information for one of the call participants, such as the sender and the recipient and the like. The SCM data structure may also be configured from call context information, such as a location of the sender, and/or the recipient, a time/day/date of the call, an intended duration of the call, a product or service associated with the call, a message of the call, and the like. In an example of adapting visual caller ID based on time of day, an image may be adapted to reflect a current time of day by adjusting the overall tone of the image to correspond to an amount of daylight. For daytime calls, the tone may be lightened, for evening or night calls, the tone may be softened. Generating an SCM data structure may occur contemporaneously with initiation of the call by the caller, such as by the caller using the camera function of the call-originating device to capture an image and/or video of the caller that can be used at least in part in the SCM data structure, such as a display content portion of the SCM data structure. The SCM data structure may also be generated by adapting a portion of an existing SCM data structure based on the amount of time left. To effect use of the SCM data structure content and the like as visual caller ID content, a caller ID data element for the call may be configured with a link to the generated SCM data structure. Use of the SCM data structure by a recipient call receiving device (e.g., a smartphone and the like) may be accomplished by an application executing on the recipient device accessing the SCM data structure through the received caller ID information such that the SCM data structure indicates an image, graphic, video, rendering, handwritten note, and the like for presentation on an electronic display of a call receiving device upon receipt of the call. The SCM data structure may include a multi-media object (e.g., an animated cartoon with caller voice over and the like) to be presented on the recipient's call-receiving device upon receipt of the call. In embodiments, the image may be an image captured by a camera function of a call-initiating device that was captured contemporaneously with the initiation of the call. A call time-adapted SCM data structure may include a profile of the sender (e.g., call originator, party that the sender represents, and the like), promotional content (e.g., that the caller, optionally acting as a representative, offers to the recipient), and the like.

The examples above of visual caller ID content generation, delivery and use may include functionality such as sending an SCM data structure and/or a link thereto with and/or in place of traditional caller ID information. This disclosure includes descriptions of a range of forms of SCM data structure content; any such form may be included in these methods and systems of visual caller ID. In embodiments, the methods and systems of visual caller ID may utilize some existing channels, such as a caller ID channel that conventionally is controlled by a third party, such as a telephone call service provider, and the like; however, the visual caller ID may be controlled through these methods and systems by the caller/sender rather than a third-party. This capability supports a caller communicating information such as a profile, advertisement, retailer content, and the like as a form of caller ID. As described herein, an SCM data structure used for providing visual caller ID to a recipient for a call may be linked to an existing caller ID for a caller, such that the caller ID may be used as, for example, a link into an SCM data structure database through which a corresponding SCM data structure and/or visual caller ID content may be accessed for presentation to a recipient of an incoming call. Caller ID-based access to visual caller ID SCM data structure content may support a caller selecting an originating phone number for a call that may be different than the native phone number associated with a call-originating device of the caller. In this way, for example, a caller may initiate automated calling to one or more recipients with visual caller ID content dedicated to different call-originating numbers. As an example, a broker of insurance services may select an originating phone number for a first insurance provider for a call from the broker to clients of the first insurance provider and select for a second call an originating phone number of a second insurance provider for a call to, for example, prospects of the second insurance provider. Also, as described in the examples above, visual caller ID content may be impacted by and/or combined with recipient-related information. One such example of visual caller ID impacted by recipient-related information occurs when a recipient is part of a group (e.g., member of a church, job, school, business, professional group, and the like). A group-affiliation of the recipient may be used to adapt and/or otherwise impact the generation of an SCM data structure for the call, such as changing a logo or the like presented as visual caller ID to reflect the group affiliation, and the like. For retail examples, visual caller ID may automatically be adapted based on a relationship between a caller and a recipient. A message related to the caller may be changed based on, for example, a recipient being an existing client of the caller, the recipient being a referral to the caller, the call going to a new prospect (e.g., a cold-call) and the like. In embodiments, the caller may be associated with a profile and an SCM data structure used for providing visual caller ID to a recipient for the call. By way of these examples, the caller may be associated with the profile that may be from a single phone or call originating device but that phone is associated with at least two (or multiple) subscriber identification modules, SIM cards, or other electronic devices onboard or insertable that can control the identification of the phone. In these examples, the caller may be associated with the profile that is specifically associated with multiple subscriber identification modules or the like so even though the caller may appear to have multiple phones or call originating devices, the caller with their multiple subscriber identification modules or the like can appear to be from a single source when associated with the one or more specific SCM data structures used for providing visual caller ID.

In embodiments, methods and systems of visual caller ID, such as SCM data structure-based methods and systems may support a user setting up content, such as video, audio, text, image, multi-media and the like as part of a temporary visual caller ID that expires, such as after a certain amount of time, related to an event, and the like. In embodiments, this allows users to have a visual caller ID that expresses a feeling or mood for a certain amount of time before it reverts to what previously was set as their profile visual caller ID. This temporary visual caller ID can be accessible to specific contacts, groups, or all recipients.

In embodiments, methods and systems of temporary visual caller ID content generation and use may include configuring, such as with a visual caller ID interface executing on a call-originating device, temporary content for visual caller ID for calls initiated by a user of the call-originating device. An SCM data structure with the temporary content may be generated from an existing SCM data structure by copying the existing SCM data structure and including a temporary item of visual content in place of existing visual content. An existing SCM data structure may be configured with control data fields that may facilitate marking a time/duration of a link to temporary visual caller ID content while retaining a link to the content that will be accessed and uses for visual caller ID once the temporary content expires. A function executing on, for example, the caller's call-originating phone or a server through which calls from the caller are routed, may upon receiving an indication of an initiation of a call by the caller, access the (temporary) SCM data structure for the caller and present the temporary item of visual content or an existing item of visual content as visual caller id to a recipient of the call. The function may determine which visual caller ID content to present based on a relationship between a current time, such as a time of the call and a time-limited use parameter of the temporary item of visual content. In embodiments, configuring visual caller ID comprises configuring an SCM data structure with at least one of a link to the temporary item of visual content and the temporary item of visual content. In an example, the relationship between a current time and a time-limited use parameter of the temporary item of visual content may include a time remaining for use of the temporary item of visual content. The relationship may be a use status of the temporary item of visual content. In examples, the time-limited use parameter of the temporary item of visual content may include an expiration date for use of the temporary item of visual content; the parameter may include a use start date and a use end date for use of the temporary item of visual content. Other forms of time-limited use parameter may include a calendar date, a pre-date duration of use prior to the calendar date and a post-date duration of use of the temporary item of visual content after the calendar date, a link to an entry in a digital calendar of the user of the call-originating device and the like. For embodiments in which SCM data structure content may be distributed among various servers and edge devices, such as to facilitate faster access to the content for incoming calls, the methods and systems of temporary visual caller ID content use may include updating the caller ID function system wide, such as with expiration criteria.

In examples, time of temporary items of content for visual caller ID use may be limited so that the content may be good until a duration of time from a first-use time, may be good until an event and the like. An event may be a specific time in the future, such as a scheduled meeting and the like. An event may also be based on an asynchronous trigger, such as when a user clocks out of work for the day. An event may also be described conditionally, such as based on a candidate getting elected to an office. Conditional events may be used for activating temporary content as well, such as changing the title of the caller based on a result of an election and the like. In further examples, conditional events may include locations of the caller, changes to the location of the caller, one or more reoccurrences of the caller being in certain locations, or the like. In embodiments, conditional events may include a relationship status of the caller, changes to the relationship status of the caller, time between changes of relationship statuses of the caller, changes in relationship statuses on the receiving and sending end of the call, or the like. In embodiments, conditional events may include a birthday of the caller, proximity of the caller's birthday to certain age ranges or a minimum age, a birthday used in age verification, proximity to other users with similar or identical birthdays, or the like. In embodiments, conditional events may include a holiday relevant to the caller or any caller, proximity of the caller's birthday to certain holidays, a holiday relevant to the caller's identified religious, social, or familial affiliations, proximity to other users with similar interest in a holiday relevant to the caller, or the like.

In embodiments, such as a multi-call/call group-based program, visual caller ID may be adapted for select recipients. Caller ID and related content may be configured, selected, and/or adapted, such as by editing an SCM and the like with one of several options when contacting a group to effectively configure an SCM for individual recipients in the group based on, for example, a recipient relationship to the group. In an exemplary automated calling program, caller ID content, such as visual caller ID content and the like may be adapted for select recipients. Caller ID may be adapted based on, for example, a context of a recipient's membership in the call-group, if the recipient is an SCM platform user, and the like.

In embodiments, methods and systems for recipient-specific caller ID (e.g., SCM data structure) adaptation may include, among other things, detecting initiation of a first call from a first caller to a first recipient of a recipient call group. Using at least existing caller ID delivery mechanisms, the call may cause visual caller ID content configured based on characteristics of the recipient call group to be accessible by a call receiving device of the first recipient contemporaneously with receipt of the first call by the call receiving the device. In this way, visual caller ID content that is specific to a call group, such as content described in a sender-controlled media data structure associated with the group, the caller, or the combination thereof, may be provided to at least one of the recipients in the call group. As calls to the recipients in the group progress, information about the caller, the recipient and the group may be processed for the purposes of generating recipient-specific caller ID information. In response to detecting initiation of a second call from the first caller to a second recipient of the recipient call group and based on a comparison of a characteristic of the recipient group and a corresponding characteristic of the second recipient, visual caller ID content that may be different than the group visual caller ID content may be used for the call to the second recipient. Such as action may be accomplished by indicating a first SCM data structure for the group and a second SCM data structure for recipients for whom, while members of the group, the group SCM data structure is not suitable. An example may include a group that includes adults and children. Some messages that may be suitable for adults may not be suitable for children in the group. Rather than sending a child-suitable message to all members of the group, the recipient-differentiated caller ID content methods and systems enable sending recipient differentiated caller ID content to a group of recipients.

In embodiments, the visual caller ID content may be made accessible to a call receiving device of the recipient as a link (e.g., a URL to a network-based location) to an SCM data-structure that comprises at least one of the visual caller ID content and a link thereto. For such embodiments, multiple SCM data structures may be configured at the network-based location so that the only piece of differentiating information delivered to the recipient's phone in the call is a link to the recipient-specific SCM data structure. Processing of the SCM data structure can be the same for all recipients, with the content in the recipient-specific SCM data structure being rendered for the recipient. Therefore, a link to an SCM data-structure may be provided to the call receiving device as caller ID information. To facilitate presenting the visual caller ID content for the recipient timed so that the recipient can view the caller ID content as the call connection is being requested, the visual caller ID content is made accessible to the call receiving device as a link in an SCM data-structure that is provided to the call receiving device contemporaneously with receipt of the call. As described herein, a characteristic that may distinguish a recipient from other recipients in a group may be a group affiliation identifier. To facilitate differentiating members of a group, a corresponding characteristic of the second recipient may be a status of group affiliation of the recipient with the recipient group, such as is the member a long-term member, a temporary member, a trial member, a new member, a junior member, a fee-free member, a paying member, and the like.

In embodiments, configuring visual caller ID content for the second recipient may include adjusting at least one element of the visual caller ID content that is based on the characteristics of the recipient group and further based on a result of the comparison. As an example, the element of visual caller ID content that may be adjusted may be a logo for the general group caller ID content, whereas a message in the visual caller ID content may be adjusted (optionally along with the logo) for recipients who are exceptions to receiving the group visual caller ID content. As another example, the corresponding characteristic may distinguish the second recipient from at least one other recipient in the call group. Other examples include the characteristic of the recipient group indicating business contacts and the recipient-specific distinction indicates whether the recipient is an internal or external business contact, so that a confidential message for internal contacts is not delivered as visual caller ID content to an external business contact.

In addition to recipient-to-recipient differences, the corresponding characteristic for differentiation of the second recipient may be a status of the second recipient with respect to an object of the second call; such as if the call is to recruit members to a group, prior members of the group may receive a different message than recipients who were not prior members of the group.

Generating group-specific visual caller ID content for recipients for whom the group caller ID content is suitable, may include configuring visual caller ID content based on characteristics of the recipient call group by selecting a first caller visual caller ID content and adapting the first caller visual caller ID content to reflect the characteristics of the recipient group. This is exemplified by, in embodiments, an image of a recent group meeting that may be changed for calls made to members of the group who were in that group meeting. Continuing further, configuring visual caller ID content for the second call may further be based on an identifier of a user actuating the initiation of the first call, an objective of the call, a time of the call, and/or an aspect of a call-receiving device of the recipient. In embodiments, configuring the visual caller ID content may be based on a characteristic of the call receiving device. Such a characteristic may be selected from the list of call receiving device characteristics including, without limitation, device storage capacity, device screen size, device operating mode, and availability of a sender-controlled media (SCM) application on the call receiving device.

In embodiments, in addition to conventional caller ID delivery channels, visual caller ID content may be made accessible to the call-receiving device by transporting at least one of the visual caller ID content and a link thereto over a short-message-service connection to the call-receiving device. Similarly, the visual caller ID content or a link thereto may be transported over an iMessage channel linking the first caller with the call-receiving device.

In embodiments, an SCM data structure may be adapted for recipient-specific exceptions at the recipient call-receiving device. An SCM data structure processing application may process the SCM data structure identified in the caller ID data, for example, and adapt it with recipient-specific content, such as from a profile of the recipient based on, for example certain fields in the SCM data structure being marked as optional and/or as conditional based on the recipient's relationship to a group, and the like.

In embodiments, a group SCM data structure, including visual caller ID items of content and the like may be created automatically on a computing device, such as a server that has access to group-specific information, such as a member list of members of the group, conditions for determining when a member on the member list should not receive the group visual caller ID content, and the like. A group SCM data structure may be configured, selected, adapted, and the like at a server, at a sender's call-originating device, at a recipient's call-receiving device and the like.

Other factors that may impact visual caller ID content may be related to a network over which the call is being placed, such as network speed, location of an SCM data structure relative to the recipient, user device characteristics, such as storage capacity, screen size, mode of operation, parental controls present on the device, and the like.

In embodiments, a call-originating interceptor function may allow overriding pre-arranged single profiles or contact groups established for group contact (e.g., group emails, group texts, etc.) and the like. Such an interceptor function may facilitate avoiding a classic problem of an unintended "reply all" situation. When originating the group contacts (or even a single contact) to which an existing SCM data structure is assigned or when a pre-arranged SCM data structure exists, the initiator may be directed to a specific screen that interrupts sending the prearranged SCM. The screen may be configured to require confirmation whether that SCM should be used for this call to a recipient or to all recipients in the case of multiple recipients (e.g., group texts and the like). In examples, the user may be presented with a skip button that may, for example, remove the recipient from the group contact, cancel the message when to a single user, curate the list to whom the message is to be sent, and the like. In further examples, a contact originator may be reminded of (i) the specific SCM to be used for this contact/sent to this group, (ii) the size of the group, and (iii) the option to skip the recipient, the use of caller ID, the use of the specific SCM and the like.

In embodiments, generating visual content on the fly, such as visual caller ID content for calls placed from a smartphone, computer and the like and SCM data structure content for presenting to a recipient of a digital contact, such as a message, text, video call, and the like may facilitate contact-time differentiating of contact-initiating content for one or more recipients, such as when contacting a group of recipients some of which the caller may prefer to exclude from receiving a generalized group-directed contact initiating content, such as a group text message and the like. In embodiments, generating visual contact content on the fly may be facilitated by an initiated contact interrupt function that presents to the contact originator (e.g., a contact sender, caller and the like) options for one or more recipients prior to the one or more recipients being notified of the pending contact/call. In a call-based example, such a contact interrupt process may be activated for operation on a caller's call-originating device in response to detecting initiation of a call that causes visual caller ID content to be accessible to a visual caller ID rendering function executing on a call receiving device. The interrupt process may include pausing delivery of the call until a call delivery signal is detected, such as a signal from the caller to proceed with the call using visual caller ID content selected for the call. The interrupt process may, while pausing delivery of the call, present a visual caller ID configuration user interface to the caller. The visual caller ID configuration user interface may be configured to enable selection of visual caller ID content for the call from, for example, a plurality of visual caller ID content options. By way of these examples, the visual caller ID content options may include: existing content, at least one alternate content, and generation of content via a camera and/or microphone function of the call originating device. In embodiments, the visual caller ID content options may be emojis. In embodiments, the visual caller ID content options may be gifs including gifs with embedded motion. In embodiments, the visual caller ID content options may be jpegs or other image content. In embodiments, the visual caller ID content options may be stickers, labels, and the like. By interrupting a call before it reaches the recipient, (optionally before it is initiated by the call-originating device), the caller may be able to influence the visual caller ID for the call by selecting content (or exclude content). The selection may result in a call delivery signal being generated and the selected item of content being communicated to the recipient. In embodiments, the selected item of content can be an emoji. In embodiments, the selected item of content can be a gif. In embodiments, the selected item of content can be stickers or labels. The selected item of content may be null. The selected item of content may be one of an emoji, a gif, and a sticker. The interrupt function may activate a visual caller ID configuration user interface that may use audio/video recording capabilities of the caller's device to configure the visual caller ID content. The visual caller ID configuration user interface may include an option for designating the selected visual caller ID to be used for calls made to the recipient. The interface may also present an indication of visual caller ID content in an SCM data structure as the existing content. The existing content may include content that is recipient-specific. The existing content may be adapted on the fly for the recipient via the interrupt function and optionally via the visual caller ID configuration user interface. In embodiments, existing visual caller ID content may be designated for calls made by the caller to members of a group of which the recipient is a member. In an example, the call may include multiple recipients with the existing content being designated for a caller-group comprising the multiple recipients. Other examples include single recipient calls. The interrupt function facilitates causing the user selected content option during pausing of the call to be used as visual caller ID content for a subset of the recipients. Recipients for this subset of recipients may be selected by the caller during, for example pausing of the call.

In embodiments, pausing the delivery of the call may be based on a characteristic of the recipient, such as a relationship between the recipient and a group of recipients to whom the call is directed. In embodiments, an interrupt function may include detecting initiation of the call on the caller's device; the interrupt function further causes the pausing of delivery.

Figure 44:
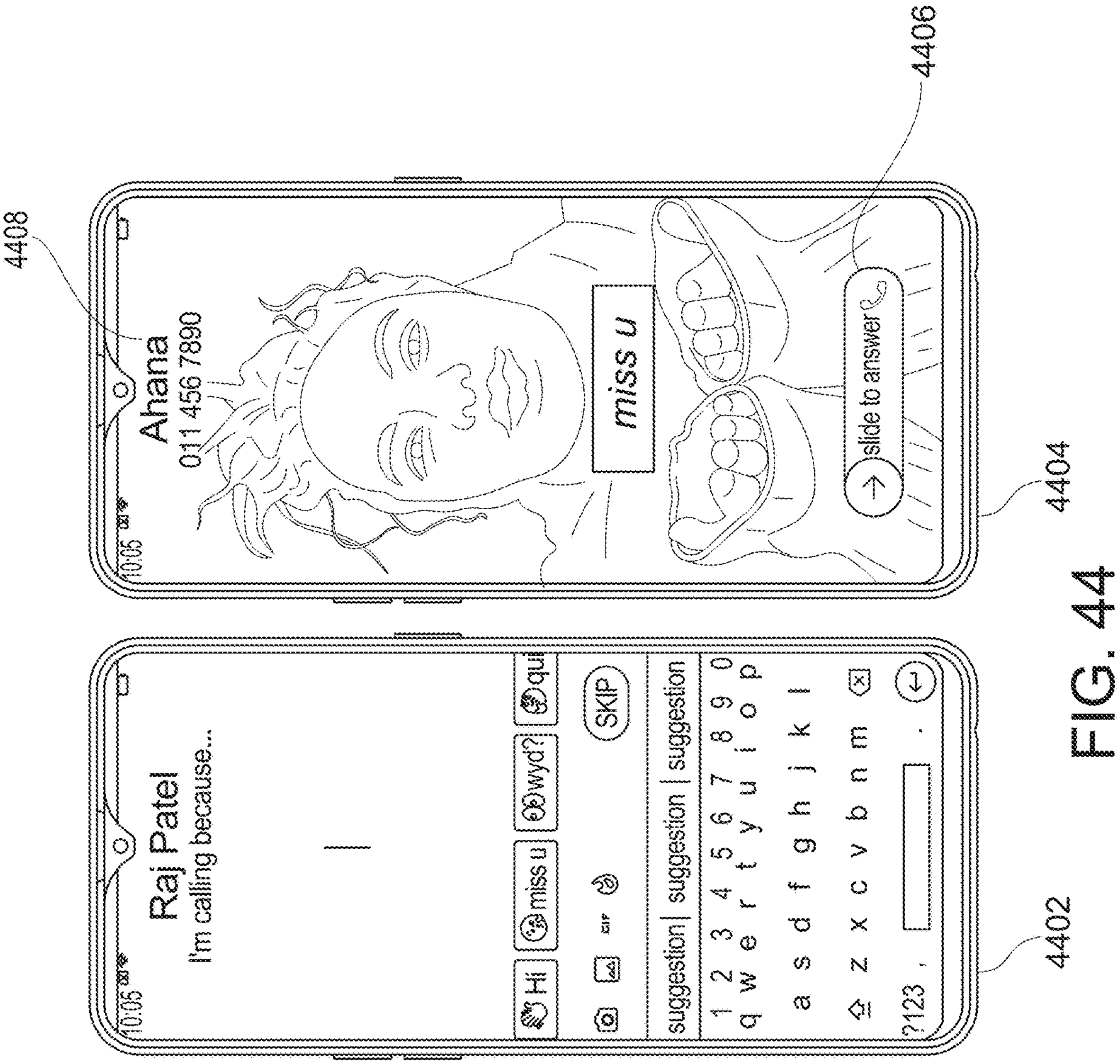
FIG. 44 illustrates exemplary screens for leaving a video voice mail.

Referring to FIG. 44, an interrupter screen is depicted for supporting the methods and systems of on-the-fly visual caller ID content adaptation, generation, and control for outgoing calls, which may include calls to a group of callers some of whom an existing visual caller ID is not suitable. While the embodiment of FIG. 44 depicts a user calling a recipient, the methods and systems of interrupting outgoing SCM data structure content delivery may apply to any type of electronic contact, including without exception emails, text messages, videocasts, video calls, and the like. The screen 4402 depicts one option for interrupting delivery of an SCM data structure to a recipient. In this option, a user has initiated a call to a recipient. This creation screen 4402 may result from (i) no SCM data structure for the caller available, (ii) the user has indicated in a prior screen of the interrupter methods and systems to generate a new, and optionally temporary visual caller ID, (iii) the user indicated or accepted a recommendation from the SCM data structure platform to not use an existing visual caller ID for this call to this recipient. The screen 4402 provides the user with several options for generating visual caller ID, such as typing a message, selecting an emoji, recording a video, and the like. The screen 4404 depicts an incoming call screen of the recipient in which visual caller ID generated and/or selected in the screen 4402 is presented to the recipient along with an option to accept the call 4406 as well as conventional caller ID 4408.

In embodiments, visual caller ID methods and systems may include generating in real time and using, as visual caller ID SCM data structure visual content that is contextual to audio/text recorded on-the-fly (e.g., during initiation of a call), such as by determining an intent of the recorded audio/text and selecting visual content based on that understanding. As an example of call content-based visual caller ID, a method may include detecting initiation of a call from a caller to a recipient and pausing delivery of the call until a call delivery signal is detected. While pausing delivery of the call, the method may include producing the visual caller ID content by a sequence of steps including: (i) capturing live content comprising at least one of audio and text input to a call-originating device by the caller; (ii) processing the captured live content to determine an intent of the live content; (iii) automatically selecting a visual element based on the intent, combining the selected visual element with the live content thereby producing the visual caller ID content; and (iv) and generating the call delivery signal for delivery of the call. Processing the captured live content may include audio to text conversion of the captured live content. The processing may further include natural language processing (NLP) of a least one of the captured text and the text converted from the captured audio to determine at least one of an intent of the call, a subject of the call and an action of the call. In embodiments, automatically selecting content may be performed by a visual content selection algorithm that performs, among other techniques, the best fit of a visual content item to the determined intent, action, or subject. The intent in such content may be based on a recipient of the call, a relationship of the recipient to a group of recipients associated with the call, such as a group of call recipients, and the like. As part of the methods and systems for generating context based on call content, pausing the call may be based on a range of aspects related to the call, such as a characteristic of the recipient, which may be a relationship between the recipient and a group of recipients to whom the call is directed.

In embodiments, a storytelling feature of the methods and systems described herein may allow users of an SCM platform who are having a conversation to receive suggestions of SCM to deliver in tandem with the conversation being exchanged by the users. Various methods and systems for understanding content, such as machine learning, natural language processing and the like may be applied to sense characteristics of the exchange that can be used as storytelling information for suggesting SCM content, such as in a paneled storyboard fashion for being added to the conversation and the like.

In embodiments, a message, such as a text message that may be part of a text exchange between users may be intercepted as it is being sent from a first user in the exchange to a second user in the exchange. Intercepting facilitates developing an understanding of the message with natural language processing, the understanding further used to facilitate making suggestions for video/image/audio of an SCCMC to be associated with the message.

Suggesting video/images/audio and the like based on an understanding of a message exchange may facilitate storytelling. Other sources of suggestions and evaluations of suggested content may include social media. In embodiments, social media-based perception of the combination of text and the particular image may support the suggestion (e.g., social media users may indicate a preference for the combination, such as by liking the message or taking another action, such as reposting the message), or may indicate the suggested image may not be a suitable image for the text (e.g., social media users may indicate a dislike for the combined image/text, such as by disliking the message or exhibiting a lack of action such as not reposting the message).

Visual content suggestions, such as videos and images as well as audio content and the like may be a result of natural language processing of an exchange among users. In an example, NLP may be used to analyze a message text content to generate a context or understanding of the message. In embodiments, such an understanding may suggest that a sender is inviting a recipient to a sporting event. The understanding may be coded into keywords, such as team, invitation, and the like that may be useful for indexing into a gallery of photographs of the sender and/or recipient. Images that are indicated by the keywords to be similar to the NLP understanding of the message may be suggested for use with the message. As an example, an image of the team mentioned, along with a schedule showing the date of the event and the competitor being played may be suggested for the purposes of enhancing storytelling.

In embodiments, the context of one or more participants in an electronic exchange between users of an SCM data structure platform may be useful on enhancing storytelling, such as by suggesting images and the like to include in the exchange. One such context is the current mood of one or more of the participants in the exchange. As described herein, sender/recipient state detection functionality may facilitate detecting a mood of a participant in an electronic exchange. Methods and systems described herein may include a method that may include adapting an SCM data structure in response to receiving an indication of a current state of a sender or a recipient in a digital exchange. The SCM data structure may be useful in facilitating storytelling by being adapted as described herein with images and the like suitable for convening, for example, the mood of the sender and/or recipient. Techniques such as facial recognition of the sender or recipient as well as processing the content of the exchange to develop an understanding may adjust content matching parameters so that rather than selecting an image of the sender and recipient smiling, selecting one where the participant without the happy mood is not smiling.

In embodiments, a platform of users, such as participants in an SCM platform may generate information about callers, such as unknown callers, that may be useful for other users of the platform when deciding how to respond to requests for connecting to an unknown caller. Information gathered about calls from the caller to other recipients may be stored in a caller identification and evaluation database that may be made available for update and use by participants in a platform or group, such as a group of uses of the SCM platform. This database may be indexed by, for example, caller ID information provided by a call connection network about the callers. The database may include public number search information, further search information derived from the results of a public number search, such as criminal records, other phone numbers, names, addresses and the like of potential callers and the like. Public number search results may be communicated to participants of the platform and the like for validation and/or determining relevance to an evaluation of the caller. Additional information, which may be gathered from platform participants may include call tracking information for prior calls from the caller. Platform participants may generate caller evaluation data, such as in response to requests for evaluation of unknown callers and the like. Caller evaluation data may include thumbs up/thumbs down regarding a usefulness, applicability, spammer status, and the like. In embodiments, enhancing information about unknown callers may include generating a profile, such as an SCM data structure, for unknown callers based on information gathered about the caller from internal and external data sources. Such a profile may be generated in response to receiving an indication that a caller who is not a participant of an SCM platform is calling a participant of the platform. This automatically generated profile may be embodied as a portion of an SCM data structure associated with the caller ID of the unknown caller. Upon subsequent calls from the unknown caller, the SCM data structure for the caller may be processed by the recipient SCM data structure processing software (e.g., an app on the recipient's phone) for the purpose of presenting visual caller ID content of the caller to a recipient; thereby providing the recipient context regarding the unknown caller that would not otherwise be readily available at the time that a call from the unknown caller is incoming.

In embodiments, when a user of an SCM data structure handling platform is receiving a phone call (text message, email and the like) from someone who is not a user of the platform, the platform can provide much information that is available and aggregate it into information delivered as an SCM data structure for the caller to the recipient. The information in the automatically generated caller-specific SCM data structure can be used to better identify the unknown caller and can include content readily available on the Internet including social media, any information available from point of sale systems associated with the platform, any information available from other caller/user interactions on the platform and the like. In examples, specific interactions with others on the platform can supplement information to identify, or at least better identify the unknown caller. In examples, this functionality enables platform users to avoid spam calls. For example, a phone call from a restaurant to a user of the platform could have caller ID for the restaurant be adapted through Internet searches of the restaurant to include a photo or video from the restaurant's website or social media presence serve as their visual caller ID. In examples, an incoming call from a ride-sharing service can cause visual caller ID content to be adapted based on an active request for the ride-sharing service that is associated with the recipient's phone number to show information from the request, such as a live map and picture of the driver with the vehicle as part of an SCM data structure referenced through the caller ID data, and the like.

In embodiments, an unknown caller information improvement method may be activated by receiving an indication that a caller who is not a participant in a sender-controlled media (SCM) platform has initiated a call to a recipient who is a participant of a sender-controlled media (SCM) platform. The information improvement method may include using caller ID information provided with the call to gather content pertaining to the caller from a plurality of sources including information available in data stores of the platform, public number search information and the like. The gathered information may be used to generate a sender-controlled media (SCM) data structure for the caller. This automatically generated SCM data structure may be delivered to a call receiving device of the recipient whereat visual content of the SCM data structure may be presented to the recipient, such as through a visual caller ID interface on the call-receiving device. By encouraging platform participants to provide their opinion and/or observations about each caller to a participant of the platform, information available in data stores of the platform may include information collected regarding calls from the caller placed to other participants of the SCM platform. This information may be used, optionally along with unverified information provided by platforms members and others about the caller to inform an SCM data structure generation process for the caller.

In an example, the information available in data stores of the platform comprises ratings of the caller made by participants of the SCM platform. Once an SCM data structure for the unknown caller is created, it may be associated with the caller so that future calls from the caller may facilitate accessing the generated SCM data structure. In embodiments, rather than sending the existing caller ID information to a recipient device, the generated SCM data structure may be provided to the call-receiving device using, for example, one or more of the visual caller ID delivery methods described herein. This may be accomplished by replacing an existing caller ID information, if any, with a link to the generated SCM data structure. As a way for enabling the recipient of a call from an unknown caller to take advantage of the information gathered and evaluations made by other platform participants, a generated SCM data structure for the caller may be provided to an SCM platform application executing on the call receiving device contemporaneously with the incoming call.

In embodiments, handling unknown callers with an SCM data structure platform may facilitate taking an action toward the caller, such as suggesting that the caller join the platform, such as by providing an audio message while attempting to complete the call, or by sending a text message to the caller contemporaneously with the call (e.g., while attempting to complete the call, while waiting for the recipient to make a decision regarding accepting the call, while the accepted call is in progress, at completion of the accepted call, at another time).

In embodiments, methods and systems for handling unknown or not-well-known callers may include generating SCM data structure content, such as an audio message that is presented to the unknown caller contemporaneously with a call being placed by the caller to a recipient. The content may be relayed to the caller's call-originating device at various times related to the call, such as prior to the call being presented to the recipient in an incoming call handling user interface of the recipient's call-receiving device (e.g., the recipient's smartphone), while the call is presented to the recipient for accepting or rejecting the call, during the call (e.g., after the recipient has indicated acceptance of the call), as a result of the recipient rejecting the call, at a time designated by the recipient during or immediately after the call ends (e.g., by the recipient indicating in an unknown caller handling interface screen to send one of a plurality of types of messages to the caller), upon conclusion of the call, and at another time, such as when the next time a call from the caller is processed by the platform.

In embodiments, a method for handling unknown or not-well-known callers may be initiated by receiving an indication that a caller who is not a participant in a sender-controlled media (SCM) platform has initiated a call to a recipient who is a participant of a sender-controlled media (SCM) platform. The call may include caller ID information that may be used to facilitate gathering content pertaining to the caller from a plurality of sources including information available in data stores of the platform and public number search information. This gathered information may be used as a basis for automatically generating a sender-controlled media (SCM) data structure for the caller, which may include visual and/or audio content, a portion of which may be delivered to a call originating device of the caller. The portion delivered to the call originating device may be delivered as a ring-back tone, as an SMS message, as an MMS message, and an iMessage, as a traditional voicemail, as visual voicemail, and the like. In embodiments, the content delivered to the caller's call originating device may include an offer and/or instructions to join the SCM data structure platform, such as to facilitate easier access to platform participants, and the like.

In embodiments, methods and systems for handling calls to platform recipients by unknown or not-well-known callers may include generating caller ID-specific SCM data structure content to be used as visual caller ID for the recipient and caller-directed content that may be structured as part of the caller ID-specific SCM data structure or a caller ID-directed SCM data structure so that the caller-directed content is delivered to the caller, such as to the caller's call-originating device. An exemplary method may be initiated by receiving an indication that a caller who is not a participant in a sender-controlled media (SCM) platform has initiated a call to a recipient who is a participant of a sender-controlled media (SCM) platform. Any caller ID information associated with the call may be used to facilitate gathering content pertaining to the caller from a plurality of sources including information available in data stores of the platform and public number search information. A first SCM data structure may be automatically generated for sending to the recipient based on the gathered content. A second SCM data structure may be automatically generated for sending the caller based on the gathered content and both the first and second SCM data structure or a content portion thereof may be delivered to the recipient and caller respectively.

The automatically generated first SCM data structure may be delivered to a call receiving device of the recipient whereat visual content of the first SCM data structure may be presented to the recipient, such as through a visual caller ID interface on the call-receiving device. By encouraging platform participants to provide their opinion and/or observations about each caller to a participant of the platform, information available in data stores of the platform may include information collected regarding calls from the caller placed to other participants of the SCM platform. This information may be used, optionally along with unverified information provided by platforms members and others about the caller to inform an SCM data structure generation process for the caller. In an example, the information available in data stores of the platform comprises ratings of the caller made by participants of the SCM platform. Once an SCM data structure for the unknown caller is created, it may be associated with the caller so that future calls from the caller may facilitate accessing the generated SCM data structure. In embodiments, rather than sending the existing caller ID information to a recipient device, the generated first SCM data structure may be provided to the call-receiving device using, for example, one or more of the visual caller ID delivery methods described herein. This may be accomplished by replacing an existing caller ID information, if any, with a link to the generated first SCM data structure. As a way for enabling the recipient of a call from an unknown caller to take advantage of the information gathered and evaluations made by other platform participants, a generated SCM data structure for the caller may be provided to an SCM platform application executing on the call receiving device contemporaneously with the incoming call.

A portion of the second SCM data structure delivered to the call originating device may be delivered as a ring-back tone, as an SMS message, as an MMS message, and an iMessage, as a traditional voicemail, as visual voicemail, and the like. In embodiments, the content delivered to the caller's call originating device may include an offer and/or instructions to join the SCM data structure platform, such as to facilitate easier access to platform participants, and the like.

Figure 45:
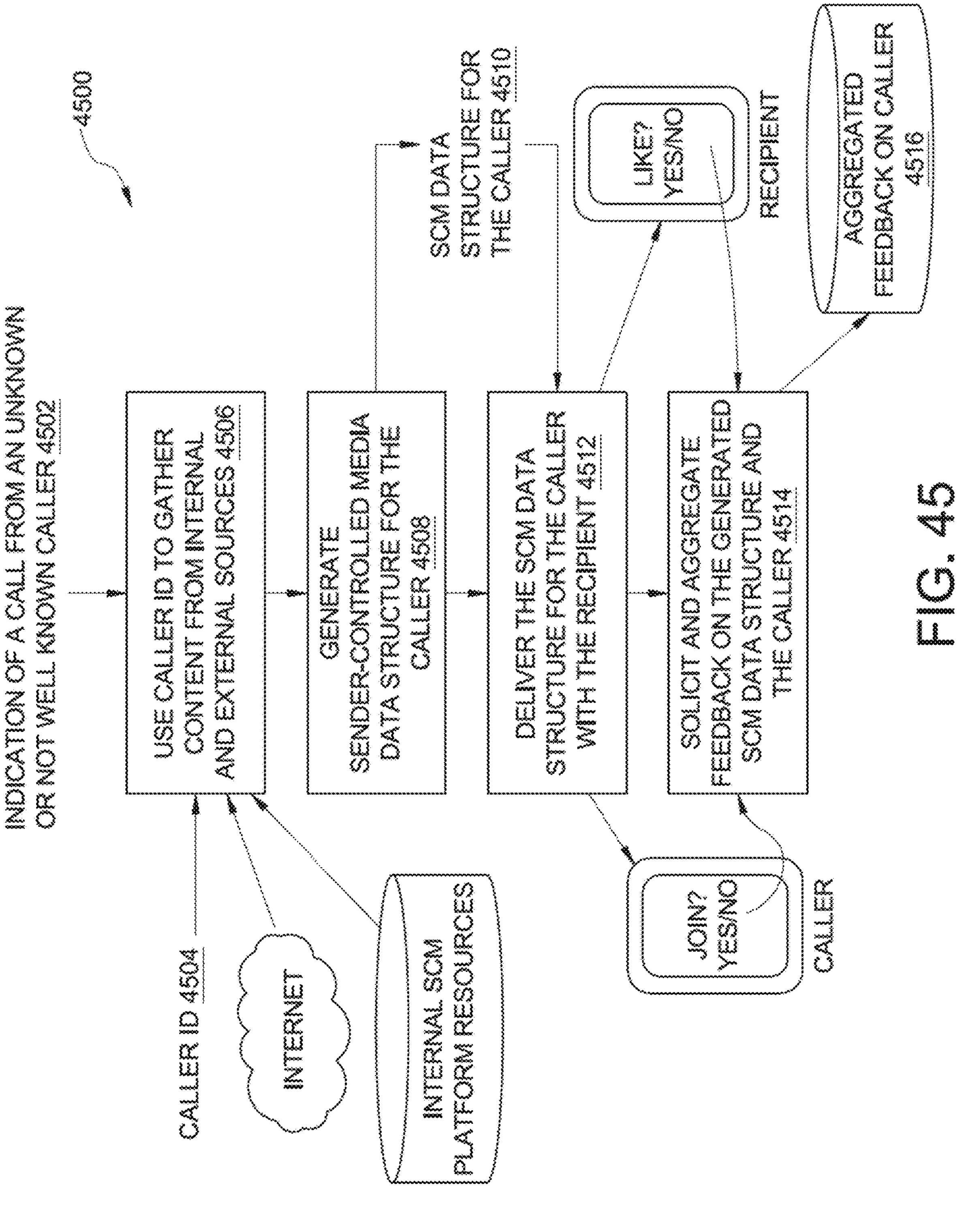
FIG. 45 illustrates a flow for handling unknown callers.

Referring to FIG. 45, a flowchart of a method for unknown caller ID visual caller ID generation and feedback aggregation. In embodiments, visual caller ID, optionally embodied as a portion of an SCM data structure may be generated for unknown callers using the flow 4500. An indication of a call from an unknown caller is detected and/or received at step 4502. The indication is provided to a content gathering function at step 4506 that uses caller ID 4504 for the call to find and gather information about the caller from external (e.g., the Internet) and internal (e.g., internal SCM platform resources). The gathered information may next be used in step 4508 to generate an SCM data structure for the caller 4510. The SCM data structure for the caller 4510 may be provided to an SCM platform communication function that may perform a step 4512 of delivering the SCM data structure to a recipient device, such as an item of visual caller ID that the recipient may accept, reject, or provide feedback on, such as whether or not the visual caller ID is helpful and the like. The SCM data structure or portions thereof, such as an item of visual content may optionally be provided to the caller. Content provided to the caller may be adapted to inform the caller of the presence of an SCM data structure platform operating on behalf of the recipient to screen/augment caller ID information, an invitation to join the platform, and the like. At step 4514 the feedback from the caller, recipient, or both may be aggregated and saved in a data structure 4516 that may be accessible to the platform as an internal platform resource and the like.

In embodiments, an after-call experience for recipients of calls may include the platform taking actions to communicate with the recipient after receipt or completion of a phone call. For calls with a business, the platform can coordinate presentation of content to a call participant (typically a consumer), such as from third-party advertisers, retailers and other partners to deliver coupons, text alerts, reviews, and other retail-based enticements to further continue with a relationship initiated or a prior relationship continued during the call. Other examples of post-call experience may include the platform pairing with partners that want to learn more from caller participants, such as follow-up comments, reviews, debrief efforts, etc. The methods and systems described herein for post call experience may facilitate a range of content delivery and interaction, both direct and real-time (e.g., by presenting interactive content in a user interface of a phone of the call participant) and indirect (e.g., texting, email and the like).

In embodiments, methods and systems of post-call experience may include using a call-in-process screen to present auto-generated interactive content, such as by use of the SCM data structure methods and systems described herein, optionally interfacing a phone call in/out application or function with an SCM data structure platform recipient/caller application. Post call experience methods and systems that interface with existing phone call applications may provide post call (and/or active call) experienced by, for example configuring a sender-controlled media (SCM) application to receive SCM data-structures from sender participants of an SCM platform. In examples, a sender participant may be any user of the platform, but may preferentially be a party that is interested in gathering further input and/or establishing/continuing a relationship between a sender/caller and a recipient established or referenced in a call. With an SCM data structure application configured, the post-call experience may be activated by interfacing the SCM application with a phone screen control portion of a phone application so that content in the received SCM data structure is provided to the phone application as content to be presented on an electronic display of the phone while the phone call is in progress. Essentially the effect of this to a user is content (e.g., images, text, video, moving content, and the like) may be presented in an in-process call screen on the call participant's smartphone, and the like. Feedback and/or input from a call participant on whose screen the content is displayed may be captured by monitoring, such as with the SCM application, user actions in association with the electronic display (e.g., user clicks, swipes, scrolls, dismissal actions, or simply no action at all) while content is presented during or after the call. To the extent that the user actions may impact what is being presented, there may be a need for updating the SCM data structure for affecting the electronic display responsive to the monitored user actions (such as changing to a "thank you" screen, and the like). Interfacing an SCM data structure application with a phone application may be directed at a phone screen control portion of the phone application. In embodiments, the SCM data structure application, or at least a portion useful for post-call call-participant interaction, may have the phone screen control portion of the phone application integrated into it. In embodiments, the SCM data structure application, or at least a portion useful for post-call call-participant interaction may be integrated into the phone application. Such a portion may include functionality for receiving and processing SCM data structures. Other forms of interfacing an SCM data structure application with a phone application may include, without limitation configuring a real-time channel of communication between the SCM application and the phone application through which SCM content is provided to the phone application and user actions with the phone screen are provided to the SCM application.

Figure 46:
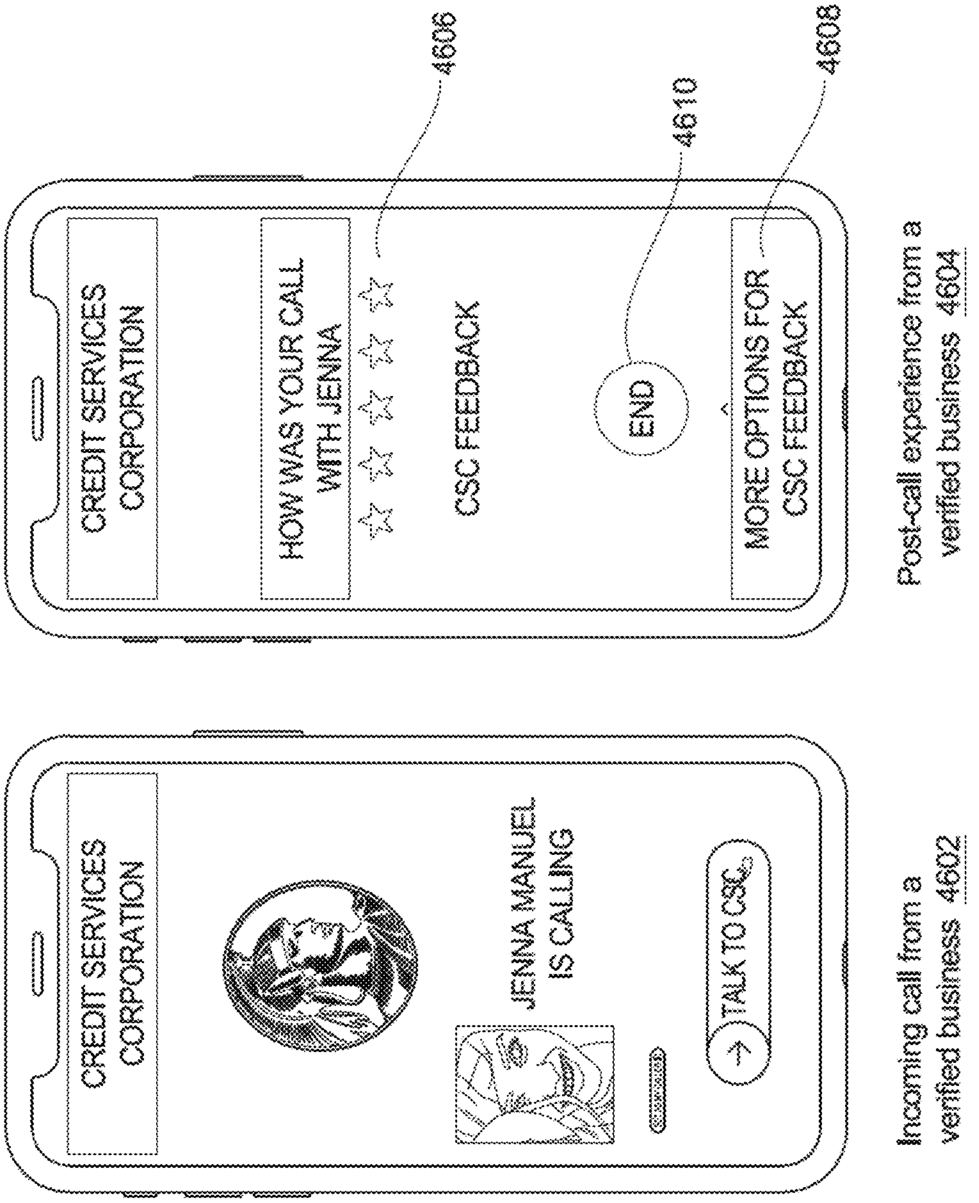
FIG. 46 illustrates post call experience user screens.

Referring to FIG. 46 user screens for post call experience methods and systems are presented. An incoming call may include caller identification features, such as those exemplarily presented in the screen 4602 in which a vendor, Credit Services Corporation (CSC) is placing a call to a recipient. The caller identification features may be presented in association with the methods and systems of visual caller ID presented herein as well as in association with the methods and systems of source-controlled media data structure operation described herein. Upon indication that, for example, a call between CSC and the recipient has ended, but optionally before the phone is returned to its mode of operation prior to the call, a post call experience screen 4604 may be presented to, among other things, gather feedback about the call, such as about the recipient's call with the CSC representative. In embodiments, the context from the caller identification screen, such as the name of the representative may be used in the post-call experience screen to more effectively personalize the post call experience. A portion of the post call experience screen 4604 may include a rating option 4606 for the call, an option to provide more feedback 4608, and an option to end the post call experience 4610, such as without providing feedback.

In embodiments, post-call experience may include determining and/or using an intent or understanding of in-process call content, such as a conversation between call participants using, for example, audio natural language processing, audio-to-text and text natural language processing, machine learning, artificial intelligence and the like to generate content, optionally content in an SCM data structure, that is contextually relevant to the call content and presenting the generated (SCM data structure-optional) content to at least one of the call participants, such as an originator of the call (e.g., a caller) and a call receiver (e.g., a recipient). Call intent-based post call experience may be affected by a process that includes gathering call context for an active call between a caller and a recipient and developing an understanding (e.g., during or after completion of the call) of the call that may include at least one of a call intent, a call participant, and a call-related action (e.g., an action of or associated with a call participant) based on content exchanged between the caller and recipient and optionally context of the call (e.g., time of call and the like). This understanding may be utilized by content suggesting algorithms that determine candidate items of content (e.g., a video, image, photo from a gallery and the like) that are relevant to at least one of the participants of the call based on the applicability of the content items to the understanding. Content suggesting algorithms, methods and systems that may be applied in examples are described elsewhere herein. With the suggested content in hand, a next step may be to present at least one of the candidate items of content to at least one of the caller and the recipient during (or after) the call in an electronic interface of a device in use during the call. In examples, discussion during a call may be about a product. An understanding developed from the call may be that a first participant uses the product and the second does not. Content suggested may include images from the first participant's social media posting of the first participant using the product. This image may be presented to the first participant for approval of sharing it with the second participant. Based on feedback from the first participant, the content may be configured into an SCM data structure that is delivered to and SCM data structure application of the second participant's phone. The delivered SCM data structure may activate the SCM application on the second participant's phone to present, optionally through a screen control portion of a phone application, the item of content approved by the first participant. Therefore, in embodiments, the electronic interface of the device is adapted to facilitate selection by a first call participant of one of the presented items of content for sharing with a second call participant.

In embodiments, understanding of call content may be based on natural language processing of call audio and/or of a transcript of the call audio, such as a real-time transcript stream, and the like.

In embodiments, call context may optionally be used to enrich an in-call and/or a post call experience. Call context may also be a form of machine-based understanding, such as an understanding of at least one prior call between the caller and the recipient, an understanding of at least one other call made by the caller, and an understanding of at least one other call received by the recipient. Other ways in which other calls of the participants may impact post call experience may include using call context gathered from at least one prior call between the caller and the recipient. The call context may be related to a call participant's use of an SCM data structure platform, such as the context may include sender-controlled media communicated to the recipient contemporaneously with the call, a sender-controlled media platform profile of the caller, a sender-controlled media platform profile of the recipient, and the like.

In embodiments, providing in-call or post-call experience may include configuring a smartphone application that overtakes control of a call-in-process screen. Control of the screen may be taken during the call connection, upon detection of termination of the call, prior to releasing the phone function of the phone, and the like. Such in- or post-call processing may include monitoring call in-process status of a call-participant device, such as a smartphone. Upon detection of call-in-process status indicating, for example, that a call in process has terminated, activating a post-call application of the device, the activating causing a screen update of the device. In embodiments, the screen update could include any content but may preferably include a call to action by the call-participant or informational content pertinent to the call. The call in-process status may indicate instead that control of the phone screen is permitted, such as after an initial period of time while the recipient accepts the call. Example of a call to action may include at least one selectable element presented in the screen that when selected by the call-participant causes an update of a database associated with the call to action based on the at least one selectable element that is selected. As an example, a call to action might be to agree to terms of business between the call participants or to disagree. Based on the call participant's acceptance or rejection of the terms, the database would be updated differently. In embodiments, activating a post-call application may cause a call function of the phone that was active during the call to remain active (essentially hold the phone call function from allowing another call to be initiated or received) until either the screen update is acknowledged by the call-participant (e.g., by the call participant selecting an element in the updated screen), a screen update timer expires, and the user dismisses the updated screen. In embodiments, a screen update may be acknowledged by the call participant when the call participant selects a selectable element presented in the screen update or the call participant dismisses the screen update. The post call screen update application may continue to present the updated screen until the screen update is acknowledged by the call-participant or a screen update timer expires.

In embodiments, methods and systems for effecting a post-call experience may include signaling to a post-call application to take control of the user interface screen of a phone upon detection of an indication of a call ending. The indication may be based on the content of the call (e.g., words spoken during the call) or based on a connection status (e.g., the call network signaling that the connection over which the call was being made has been terminated). An exemplary method thereof may include responsive to receiving an indication that a call in process is ending, activating a post-call application of a call-participant device, which causes a screen update of the device that includes content relevant to the callers or a content of the call and may include a call to action, information and the like. The indication received about the call in process status that indicates an ending is based on the connection status as noted above. however, the indication may be provided by a call function of the device, such as when a user of the device touches the "end" function. However, as noted above, an indication that a post call experience may be activated may be based on the content of the call. In embodiments, the content of the call may be processed with speech analysis of the audio in near-real time as it is being spoken, such as by detecting a call ending word, such as "goodbye" and the like. Other forms of call content analysis may be employed, including natural language understanding and the like that may indicate that a call is coming to an end, or at least a conversation on the call is winding down.

In embodiments, the content provided by the post-call application may include a call to action. Exemplary calls to action may include an offer for a product or service to the call-participant, asking the call-participant their review of the call, soliciting comments about the call, capturing call-participant feedback on one of the call-participants regarding a spammer status of the other of the call-participants, collecting call-participant feedback on an SCM data structure or more likely its content related to the call (e.g., visual caller ID and the like) and the like.

In embodiments, a post call application may update a screen to include content from a sender-control media (SCM) data structure for an originator of the call that is automatically generated based on the call in process. The update and/or call to action may facilitate collecting call-participant feedback on the automatically generated SCM data structure content. In embodiments, another type of feedback that may be collected through a post call experience may include feedback regarding an originator of the call, a good or service referenced during the call, and the like. When one or more of the call participants utilizes SCM data structure methods and systems described herein, the screen update may include visual content provided by one of the call-participants, such as from a sender-controlled media (SCM) data structure associated with one of the call-participants.

In embodiments, methods and systems of call-community influenced caller handling may facilitate protecting recipients of the call community when receiving phone calls from users outside the platform. A form of call/contact firewall may be configured based on the confidence of other users completing phone calls or other communication on the platform to assess whether the unknown caller (unknown message sender) is spam, "bad businesses," other a caller to avoid. In examples, call community members can provide reviews and contribute to confidence intervals of a "safe" caller that can be determined from those reviews and metrics based on "successful" calls relative to spam calls.

Figure 47:
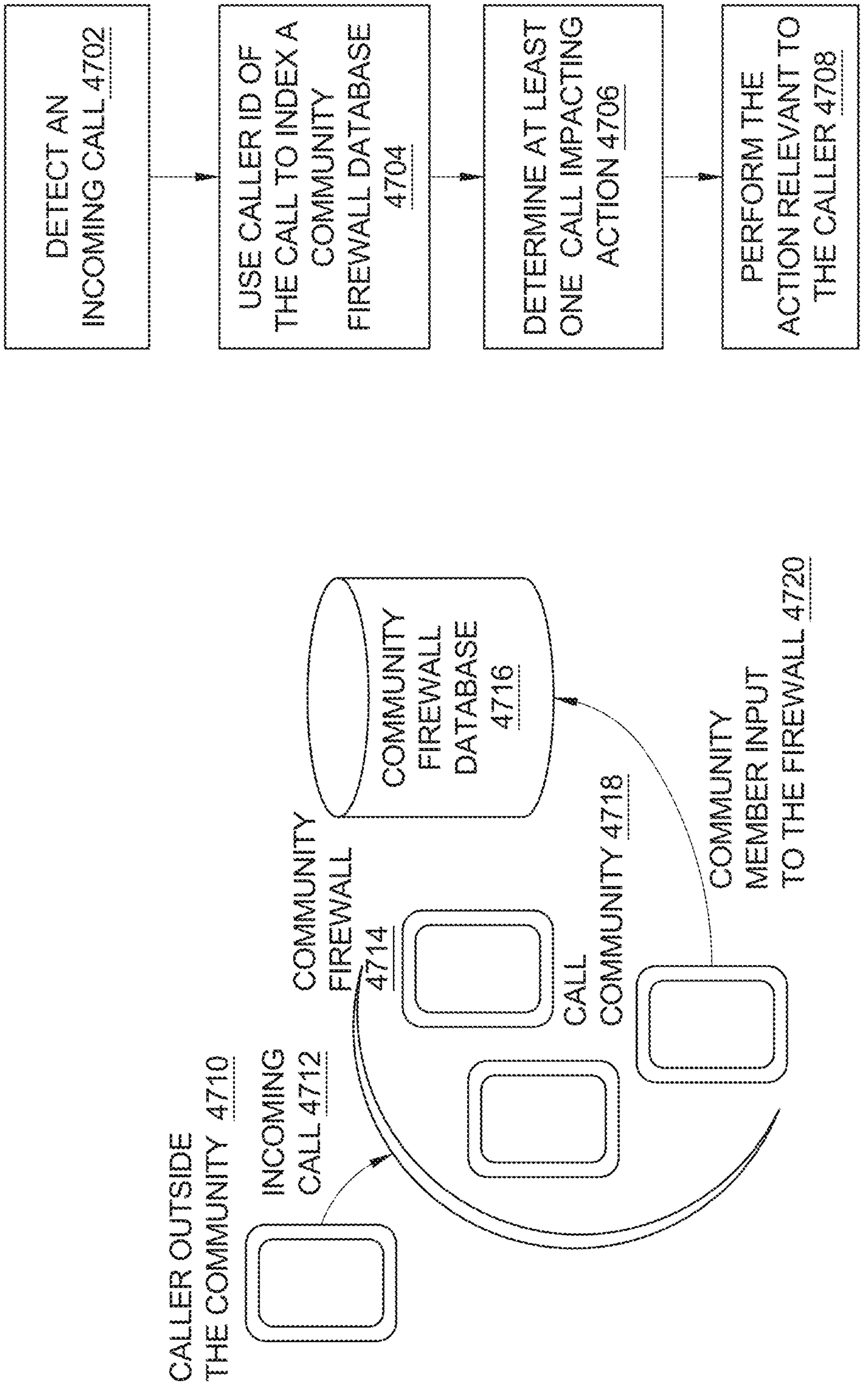
FIG. 47 illustrates an architecture and a flow for a call community firewall.

Referring to FIG. 47, a block diagram of call community firewall configuration and a flow charge of a process for handling calls by the firewall are depicted. A call community firewall process may include detecting an incoming call at step 4702. Such an incoming call 4712 may be caused by a call from an outside caller 4710, such as caller who is not part of the community. The community firewall 4714 may act as a proxy or filter for such incoming calls 4712 for at least a portion of the members of the community 4718. Caller ID information for the caller 4710 may be used to identify one or more entries in a community firewall database 4716 at step 4704. Based on the information contained in the database 4716, such as input from community members 4720 regarding the caller and/or the member's preferences regarding the firewall operation on behalf of the member(s), at least one call impacting action may be determined at step 4706. Performing call impacting actions at step 4708 may include, for example allowing the call to be passed along to the recipient, augmenting the call with visual caller ID information, providing a SCM data structure for the caller to the recipient's phone, terminating the call, providing an item of content back to the caller (e.g., a voice response), and many other such call impacting actions.

In embodiments, a call/message/contact firewall may activate firewall action(s) on calls destined for or received at a recipient phone of a participant of the firewall. The firewall action(s) may be based on caller ID-based criteria derived from firewall participant experience/feedback with the caller. In embodiments, a call community contact firewall may include a caller ID capture function that retrieves caller ID data (e.g., provided by a call network) for a call (e.g., being placed over the call network) to a recipient who is a member of the call community. The firewall may include a caller ID lookup function that retrieves firewall status from a firewall status database linked through the retrieved caller ID data (e.g., a phone number of the caller). The firewall status database links caller ID data with call community ratings of the caller (e.g., of prior calls associated with the caller ID data) that were received by members of the call community. A firewall action function then performs at least one call impacting action based on the retrieved firewalls status. In embodiments, call impacting actions may include terminating the call, connecting the call to the recipient, redirecting the call to voicemail, redirecting the call to an automated response system.

In embodiments, call impacting actions may include providing call-action recommendations to the recipient and based on the recipient's response thereto taking at least one other call impacting action. Actions that may be taken by or as a result of activating the firewall action function may include generating a multi-media profile based on the caller ID data and delivering that to the recipient. The multi-media profile may be configured into a sender controlled media (SCM) data structure. In embodiments, delivering this form of profiler may include communicating about the profile with an SCM interface function of a call-receiving device of the participant. In embodiments, a multi-media form of the profile may be delivered via a multimedia messaging service (MMS). A caller in this scenario may also be contacted. As an example, a multi-media profile based on the caller ID data may be generated and delivered to a phone number indicated in the caller ID of the call as a multimedia messaging service (MMS) message. Another type of content that can be provided to the caller may include an audio message that can be played for the originator of the call in lieu of placing the call to the recipient. Call actions may further include redirecting the call to a quarantine module, redirecting the call to law enforcement, and the like. In embodiments, the multi-media profile may be configured into a sender controlled media (SCM) data structure but may be accomplished (wholly or partially) with a third-party web application through the SCM that can be created and uploaded through a webapp, application programming interfaces, other links, and the like. By way of these examples, the SCM data structure can be created in and delivered from a third-party portal or a system outside of the platform but then imported into the platform for use as the SCM data structure. In embodiments, a business with many locations and even those still with landlines can establish the SCM data structure to extend an associated multi-media profile during calls or messages to users on the platform. In doing so, a single number may be used for outreach as the caller ID number while more geographically-specific call back numbers can be provided during the call or during post-call experiences and follow-up. In examples, a barbershop with many locations can establish content for the SCM data structure to extend a barbershop related multi-media profile during calls or messages to users on the platform. In embodiments, in call or in message experience can include linking to local barbershops and offering coupons to barbershop locations that are close to each caller or message recipient in the group call and/or message from the barbershop. In embodiments, post-call or post-message experience can also be used to link to local barbershops and other entities to offer coupons, feedback and various post call or post message offerings.

In embodiments, building a contact firewall action set, which may be a data structure, for a caller and/or for protecting one or more recipients may be based on call-community (e.g., SCM platform participant) experience with the caller. Third-party provided and/or publicly accessible information about a sender/caller may also be used in constructing the call-community firewall. A contact firewall for protecting participants of a sender-controlled media (SCM) platform may be generated when a call is received by a participant or when an indication that a sender who is not a participant in a sender-controlled media (SCM) platform has initiated contact with a recipient who is a participant of a sender-controlled media (SCM) platform. Sender information associated with the contact instance (e.g., caller ID, source IP address, recorded name and the like) may be used to pole participants of the platform regarding a spammer status value for the sender, essentially asking the participants if they think the caller is worth passing through to the recipient. In embodiments, the information and poll results may be aggregated across many calls by the caller to members of the platform. The aggregated information may be processed (e.g., summed, averaged, or otherwise analyzed and may produce a spammer value that can be compared to a spammer threshold. If the threshold is exceeded or the aggregation of poll results otherwise indicates that the caller should be blocked, future contacts from the sender can be rejected by the platform so that the sender is blocked from contacting participants of the platform. Such a firewall may be for phone calls, emails, text messages, and any other form of electronic contact. In embodiments, such a firewall may be applied to services that receive and scan hard copy mailings that are then delivered as an electronic contact (e.g., as a daily or weekly email and the like).

In embodiments, a contact firewall for protecting participants of a call group may be generated when a call is received by a member or when an indication that a sender who is not a member has initiated contact with a recipient who is a member. Sender information associated with the contact instance (e.g., caller ID, source IP address, recorded name and the like) may be used to poll members regarding a spammer status value for the sender, essentially asking the members if they think the caller is worth passing through to the recipient. The information and poll results may be aggregated across many calls by the caller to members. The aggregated information may be processed (e.g., summed, averaged, or otherwise analyzed and may produce a spammer value that can be compared to a spammer threshold. If the threshold is exceeded or the aggregation of poll results otherwise indicates that the caller should be blocked, future contacts from the sender can be rejected so that the sender is blocked from contacting the members. Such a firewall may be for phone calls, emails, text messages, and any other form of electronic contact. In embodiments, such a firewall may be applied to services that receive and scan hard copy mailings that are then delivered as an electronic contact (e.g., as a daily or weekly email and the like) to members of the call group.

As noted herein, a contact firewall may take a contact impacting action including terminating the contact, forwarding the contact to the participant, offering the participant the option of accepting the contact, redirecting the contact to an automated response system, redirecting the contact to an off-line message service, such as voice mail or facilitating the sender to leave a text, image, or video message and the like. The firewall may provide additional control to the recipient by providing call-action recommendations to the recipient and based on the recipient's response thereto taking a call impacting action.

In embodiments, actions that may be taken by or as a result of activating the firewall action function may include generating a multi-media profile based on the caller ID data and delivering that to the recipient. The multi-media profile may be configured into a sender controlled media (SCM) data structure. Delivering this form of profiler may include communicating about the profile with an SCM interface function of a call-receiving device of the participant. In embodiments, a multi-media form of the profile may be delivered via a multimedia messaging service (MMS). A caller in this scenario may also be contacted. As an example, a multi-media profile based on the caller ID data may be generated and delivered to a phone number indicated in the caller ID of the call as a multimedia messaging service (MMS) message. In embodiments, another type of content that can be provided to the caller may include an audio message that can be played for the originator of the call in lieu of placing the call to the recipient. Call actions may further include redirecting the call to a quarantine module, redirecting the call to law enforcement, and the like. In embodiments, an action by the firewall may include delivering an audio message to an originator of the call. Such an action may be performed in lieu of placing the call to the recipient.

In embodiments, call community firewall methods and systems may include gathering call originator feedback from members of the community for each call originator originating a call to members of the community. The call community firewall methods may further include storing the feedback from the members in a contact firewall data structure indexed by call originator identification information, such as caller ID and the like. Also, a contact firewall function may be configured that intercepts a call to a member of the group while determining if the feedback in the contact firewall data structure for an originator of the call indicates that an action to impact the call should be taken.

In embodiments, the firewall may operate on calls routed through a VoIP channel and the firewall may be processed on a cloud server. The cloud server may be acting as a call-receiving proxy for the recipients.

In embodiments, sender-controlled media (SCM) platform methods and systems may facilitate authentication of participants in a contact instance (e.g., a phone call, customer service text exchange and the like). In embodiments, a retailer or other third-parties may rely on the platform to communicate and/or authenticate its users. In examples, a credit card provider, such as American Express can use the platform methods and systems to develop its own SCM data structure that may be communicated to customers engaged with an electronic exchange/contact instance to facilitate trusting the parties. In examples, customers using SCM data structure applications and the like on a digital device, such as a mobile phone can interact with the SCM data structure content presented as a technique for establishing a form of authentication. In examples, the SCM data structure can include information about the participants, including information that may only be known to the participants, such as an authentication key, a picture, a picture of a face, a quiz to establish indemnity, choice of spelling for difficult names, and other media with which interaction can be used to authenticate the user, the retailer, and/or the communication channel. In examples, when a retailer/credit card provider's agent is working with a client (e.g., via phone, text, etc.), the agent can verify identity, name, address or other information by displaying content visually on the client's screen, such as on a locked screen of the client device, optionally using SCM data structure rendering functions described herein. The agent can use this interface to show relevant tutorials, videos photos or other media to enhance the conversation or customer support experience.

Figure 48:
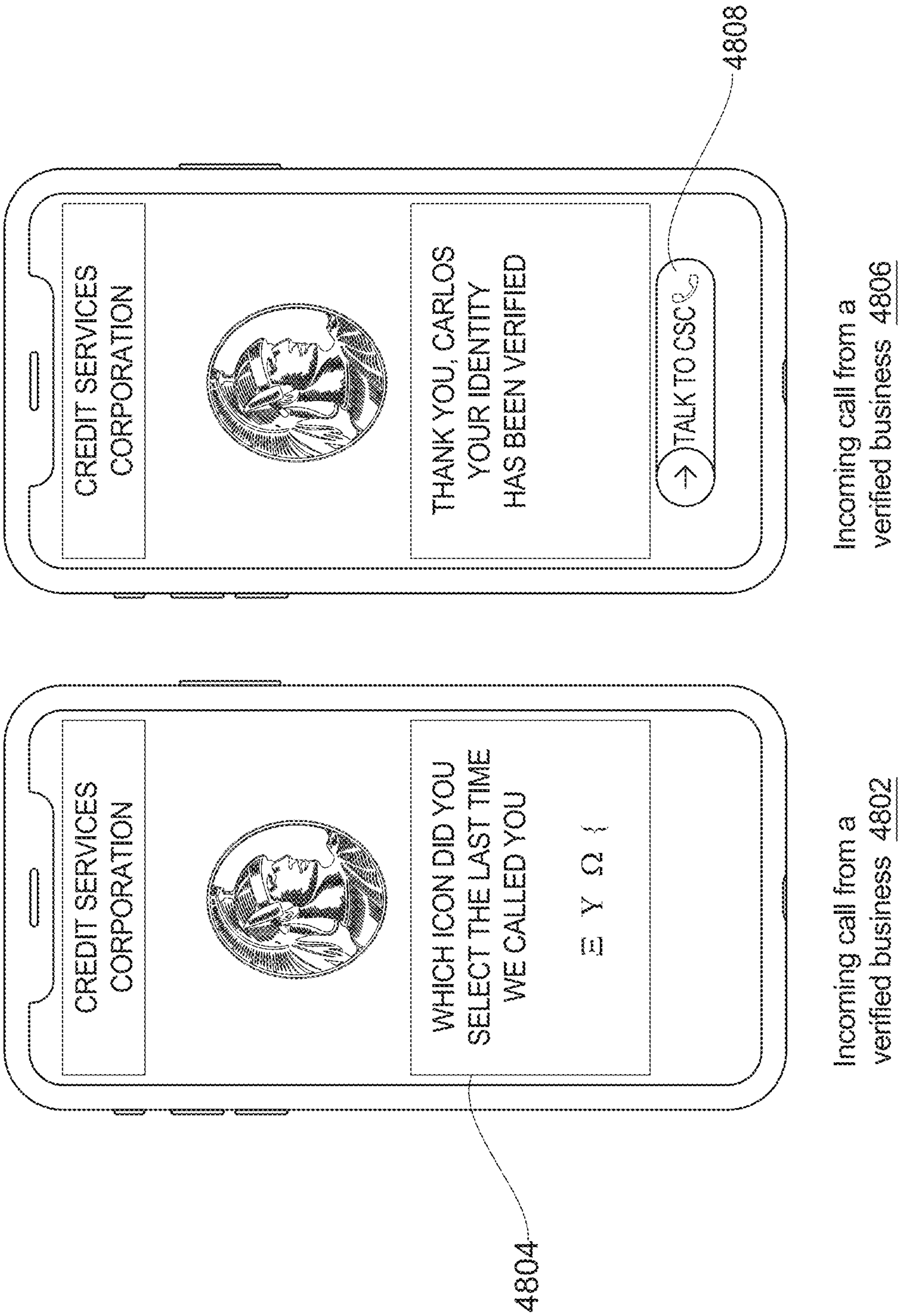
FIG. 48 illustrates call participant validation user screens.

Referring to FIG. 48, a call participant authentication screens that use the SCM data structure methods and systems for providing content to a recipient of a call contemporaneously with a call and other such methods as described herein are depicted. In embodiments, an incoming call from a business may include a call participant verification screen 4802 that may further include an interactive item of content 4804 to facilitate at least partial verification of a recipient of the call. Upon selection of a valid response in the interactive item of content 4804, a second caller identification screen 4806 may be presented to the recipient with the option to talk with the caller 4808.

In embodiments, an authentication system may use user-generated SCM data structure content to authenticate the user for current or future actions. Such an authentication system may affect user authentication by accessing with a processor an instance of a sender-controlled media (SCM) data structure, the structure optionally is secured with encoding and other techniques, of a first contact participant in a digital contact/exchange between the first contact participant and a second contact participant. In examples, a user contacting a vendor may have created an SCM data structure that contains information useful for the vendor authenticating the user such as a password and the like that a person using the user's phone might not know. The exchange may require the user providing a response to SCM data structure content presented in the user interface portion of the digital exchange. Based on the response, real-time content captured through the interface may be used to update the context of the digital exchange (e.g., a real-time captured image of the phone user's face). In embodiments, algorithms may process the updated digital exchange context in an attempt to validate the first contact participant by, for example comparing the real-time content with another portion of the secure SCM data structure. In examples, the real-time captured image of the phone user's face may be matched to a stored image of the validated user's face. Thus, based on a result of the validating, sending a digital signal to the second contact participant that the first contact participant is or is not an authenticated participant. In examples, the content exchange may occur via SCM data structure applications or functions operating on one or both of the user's phone (or computer, laptop, tablet and the like) and the other participants computing system. Optionally algorithms for securely managing access to SCM data structure content for the participants may be executing on a third server that controls access to SCM data structures.

In embodiments, the real-time content is an image captured through a camera interface of the digital device; the image may be a face of a user proximal to the digital device. In embodiments, the real-time content may include audio captured through a microphone interface of the digital device that may produce an audio recording of a user proximal to the digital device. Further, the audio may be a voice recording of a word spoken into the microphone of the digital device. Validation may be based on a comparison of the spoken word with a copy of that spoken word identified in the SCM data structure. The validation may be based on comparing audio files, transcripts of audio files, and a combination thereof. Alternatives for real-time captured content may include a biometric indicator captured through a biometric interface of the digital device, such as a fingerprint, retinal scan, multi-biometric factor metric and the like.

In embodiments, after receiving no answer to a text message or a phone call, a user can generate and submit to the platform for delivering a video follow-up, such as a video message. The video message may be delivered instead of just a voicemail or text message. In examples, the follow-up may be configured as content in an SCM data structure and can be a video "voicemail," follow up details (e.g., notes of the call, transcript of the call, URL, document link and the like), location information, call history, etc. Delivery of the follow-up content may be performed through the SCM platform methods and system described herein or through a third-party communication channel.

Figure 49:
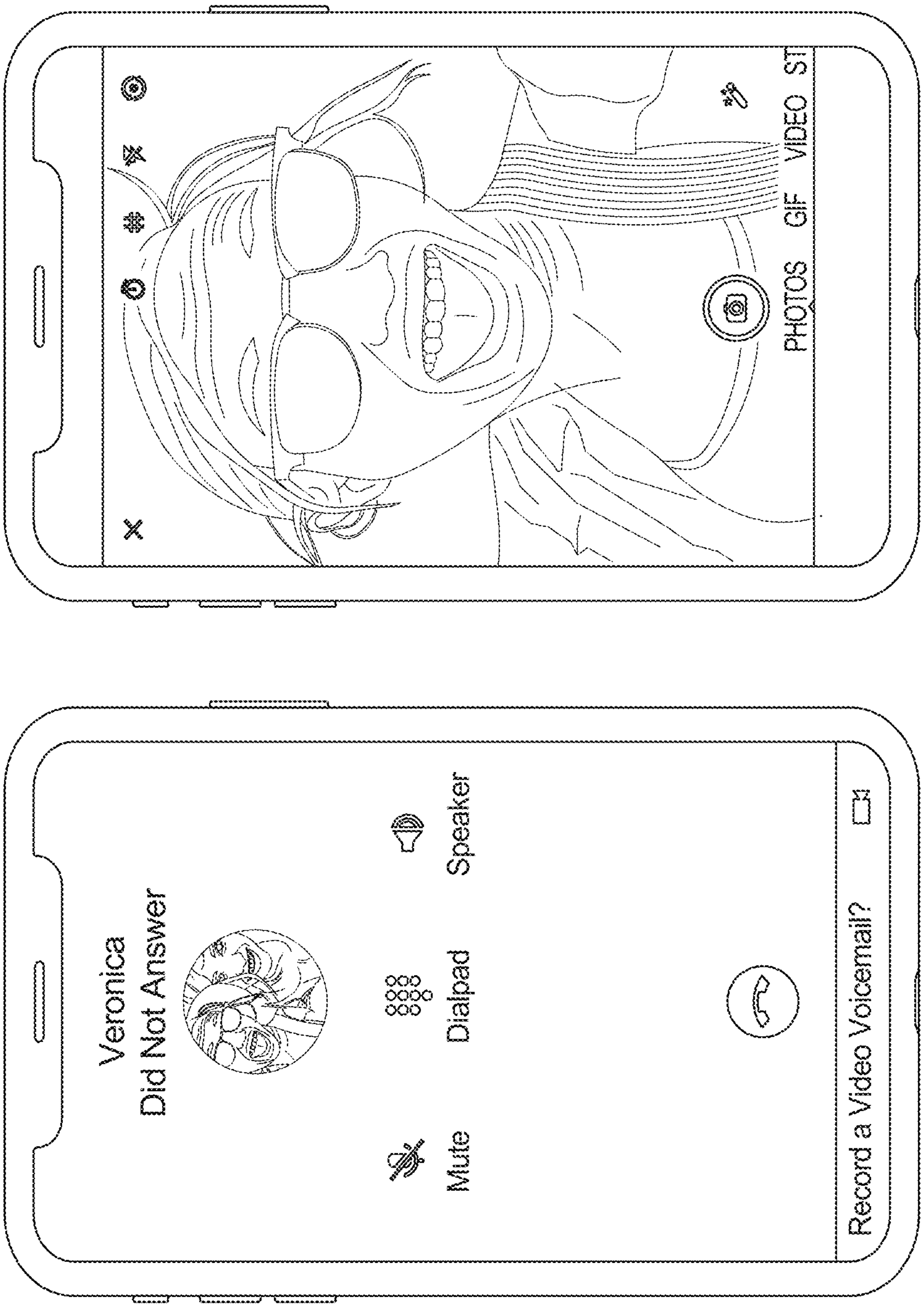
FIG. 49 illustrates user screens for saving and playing back visual/video voice mail.

Referring to FIG. 49, screens for producing and viewing visual/video voice mail are depicted. In response to a recipient not answering a call, visual voicemail screen 4902 may be presented to the caller on the caller's call originating device screen. The screen 4902 may include options for recording a voice mail, recording a video, capturing a new image, selecting an existing image, typing a text message, and combinations thereof as well as ending the call without leaving any message. In embodiments, the recorded video may be communicated to the voice mail handling function of the recipient, such as a voice mail system that supports playback of audio recordings left by callers. In embodiments, the recorded video may be accessible via an SCM data structure that was created or modified based on the recorded video. A link to a corresponding SCM data structure may be forwarded to the recipient in addition to or in lieu of an audio message. When a call message handling function of the recipient encounters an indication of an SCM data structure being left by the caller, an SCM data structure handling application, a portion of which may execute on the recipient's phone, thereby causing the caller's visual/video message to be played back on the recipient's phone. Such playback is depicted in the video voicemail playback screen 4904.

In embodiments, upon receiving an indication of no-answer by a recipient of a phone call placed from a caller who may be a participant in an SCM data structure platform, a portion of platform, such as a call interface of the caller's phone, may activate an SCM data structure content selection/generation interface on the caller's phone through which the caller can cause to be generated content for use in a follow-up message to the recipient. The generated content may then be delivered to the recipient's phone and/or to the recipient's message storage queue (e.g., voice mail queue). Upon retrieval from the phone message storage queue, an SCM data structure platform interface executing on the recipient's phone, optionally in cooperation with a companion function executing on a server, presents/plays back the content through the user interface of an electronic device through which the recipient accessed the phone message storage queue.

No-answer methods and systems for generating a video message may include receiving an indication of no-answer by a recipient of a call placed from a caller to the recipient. Responsive to that indication, a sender-controlled media (SCM) content selection/generation interface may be activated on the caller's phone so that the caller can generate an item of content, such as a video recording that can then be delivered to the recipient. In embodiments, the SCM content selection/generation interface facilitates capturing content with a camera function of the caller's phone. The content may include at least one of a still image and a video. In embodiments, the generated item of content is an image captured by a camera function of the caller's phone during use of the SCM content selection/generation interface.

In embodiments, producing video content to a caller responsive to the caller receiving an indication of no-answer by a recipient of a call may include activating a sender-controlled media (SCM) content selection/generation interface on the caller's phone through which is caused to be generated an SCM data structure comprising an item of content selected by the caller. Delivering the generated item of content may include delivering at least one of a link to the SCM data structure and the SCM data structure to the recipient's call message storage system, wherein the SCM data structure is linked to the missed call. When the recipient retrieves the stored item of content, such as by retrieving a link to an SCM data structure referencing the item of content, an SCM data structure rendering function of a phone of the recipient may render the content indicated in the retrieval on a display screen of the recipient phone or through any electronic device through which the retrieval is performed. Therefore, a user may retrieve his phone messages with a tablet and can see the video message left by the caller.

In embodiments, standard functions, such as voice mail access functions may work cooperatively with video message generation and delivery functions so that a call message access function executing on a computing device (e.g., voice mail menu in a phone app) causes (optionally automatically) activation of an SCM content playback function thereby rendering the content referenced in the voice mail access retrieval. The SCM content playback function and/or the voice mail access function may access a portion of the SCM data structure content from a networked server.

The generated content may exemplarily include a video captured by the caller through the SCM content selection/generation interface, a location of the caller, a location related to the recipient, an existing SCM data structure of the caller (e.g., a caller SCM data structure profile and the like).

In embodiments, methods and systems of no answer handling may include a replacement for or companion to visual voice mail that determines at least an intent, an object, and an action of a voice mail message and uses the determined information to generate an SCM-based data structure of audio, text, and image-based content, a link to which is stored in the recipient's voice mail queue and may be linked to or used in place of a corresponding voice mail message. Accessing the link with a recipient's voice mail handler app may cause the handler app to activate an SCM platform user interface that takes control of the recipient's phone to present at least one of visual and audio content of the SCM-based data structure.

In embodiments, a method for automatically generating visual content from a voice mail recording may include processing a voice mail recording or transcription thereof with machine learning functions responsive to receiving an indication of the voice mail being recorded. The understanding of the new voice mail by may be accomplished by applying at least one of machine learning and natural language processing to the new voice mail. A visual content selection function may select an item of visual content that is consistent with the understanding and link it to an SCM data structure that facilitates programmatically linking the voice mail to the item of visual content.

In embodiments, a real-time method for automatically generating visual content from a voice mail may include developing an understanding of audio content of a voice mail message being played back on a computing device by applying at least one of machine learning and natural language processing to the playback. Based on the developed understanding, operating a content selection function that facilitates selecting at least one item of visual content that is consistent with the understanding. The visual item of content may then be presented on a display screen of the computing device contemporaneously with the playback. Therefore, while a user is listening to a voice mail message, a visual item of content, such as an image, a video, a photo selected from a user's photo gallery, visual content from the Internet, and a wide range of other sources may be automatically matched to an understanding of the message. In embodiments, the understanding of the audio content may be determined to be an intent of the call, an object of the call, and an action associated with at least one of a caller leaving the message and an intended recipient of the message, and the like. The understanding may be an intent that is based on an intended recipient of the message; it may also be an intent based on a relationship of the intended recipient to a caller leaving the message. In embodiments, selecting is performed by a visual content selection algorithm that performs a best fit of a visual content item to the understanding.

The methods and systems of the present disclosure include receiving an indication of an initiation of a call from a sender to a recipient; determining an SCM data structure for use in configuring visual caller ID for the call based on a selection of a visual content item by an originator of the call; referencing an SCM participant database with an identifier of the recipient; generating an adapted SCM data structure by adapting a portion of the SCM data structure based on an item of information referenced in the SCM participant database with the recipient identifier; and configuring caller ID for the call with a link to the adapted SCM data structure.

In the methods and systems, the selection of a visual content item occurs in a visual caller ID selection interface that when executed on a call-originating device causes, responsive to a user of the call-originating device initiating a call, options for content for a visual caller ID to be presented in the visual caller ID selection interface.

In the methods and systems, the selection of a visual content item occurs in a visual caller ID selection interface that when executed on a call-originating device causes options for content for visual caller ID to be presented in the visual caller ID selection interface.

In the methods and systems, at least one of the options for content comprises an image being provided by a camera of the call-originating device In the methods and systems, the visual caller ID selection interface accesses a camera of the call-originating device and presents content imaged by the camera as one of the options for content.

In the methods and systems, adapting a portion of the SCM data structure comprises adapting a recipient name element of the data structure to correspond to a name of the recipient.

In the methods and systems, adapting a portion of the SCM data structure comprises adapting a recipient group affiliation element of the data structure to correspond to a group affiliation of the recipient.

In the methods and systems, adapting a portion of the SCM data structure is based on a recipient name.

In the methods and systems, adapting a portion of the SCM data structure is based on a group affiliation of the recipient.

In the methods and systems, adapting a portion of the SCM data structure is based on a name of a recipient referenced in the SCM participant database corresponding to a list of exception names.

In the methods and systems, the item of information referenced in the SCM participant database determines a client-status message portion of the SCM data structure.

In the methods and systems, based on the item of information, the client-status message portion is configured as one of an existing client message, a referral client message, and a cold-call client message.

The methods and systems of the present disclosure include receiving an indication of an initiation of a call from a sender to a recipient; determining an amount of time left in an offer from the sender to the recipient; generating an SCM data structure by adapting a portion of the SCM data structure based the amount of time left; and configuring caller ID for the call with a link to the generated SCM data structure.

In the methods and systems, the SCM data structure indicates an image for presentation on an electronic display of a call receiving device upon receipt of the call.

In the methods and systems, the image is an image captured by a camera function of a call-initiating device captured contemporaneously with the initiation of the call.

In the methods and systems, the SCM data structure indicates a video for presentation on an electronic display of a call receiving device upon receipt of the call.

In the methods and systems, the SCM data structure indicates a multi-media object for presentation on an electronic display of a call receiving device upon receipt of the call.

In the methods and systems, the SCM data structure comprises a profile of the caller.

In the methods and systems, the SCM data structure comprises promotional content.

In the methods and systems, the linked SCM data structure comprises at least one of an image and a video captured contemporaneously with the initiating of the call.

The methods and systems of the present disclosure include receiving an indication of an initiation of a call from a sender to a recipient; determining call context comprising at least one of a day, date, and time-of-day of the call; generating an SCM data structure by adapting a portion of the SCM data structure based the determined call context; and configuring caller ID for the call with a link to the generated SCM data structure.

In the methods and systems, the SCM data structure indicates an image for presentation on an electronic display of a call receiving device upon receipt of the call.

In the methods and systems, the image is an image captured by a camera function of a call-initiating device captured contemporaneously with the initiation of the call.

In the methods and systems, the SCM data structure indicates a video for presentation on an electronic display of a call receiving device upon receipt of the call.

In the methods and systems, the SCM data structure indicates a multi-media object for presentation on an electronic display of a call receiving device upon receipt of the call.

In the methods and systems, the SCM data structure comprises a profile of the caller.

In the methods and systems, the SCM data structure comprises promotional content.

In the methods and systems, the linked SCM data structure comprises at least one of an image and a video captured contemporaneously with the initiating of the call.

The methods and systems of the present disclosure include configuring, with a visual caller ID interface executing on a call-originating device, visual caller ID for calls initiated by a user of the call-originating device comprising a temporary item of visual content; and upon receiving an indication of an initiation of a call by the user, providing at least one of the temporary item of visual content and a permanent item of visual content as visual caller id to a recipient of the call based on a relationship between a current time and a time-limited use parameter of the temporary item of visual content.

In the methods and systems, configuring visual caller ID comprises configuring an SCM data structure with at least one of a link to the temporary item of visual content and the temporary item of visual content.

In the methods and systems, the relationship comprises a time remaining for use of the temporary item of visual content.

In the methods and systems, the relationship comprises a use status of the temporary item of visual content.

In the methods and systems, the time-limited use parameter comprises an expiration date for use of the temporary item of visual content.

In the methods and systems, the time-limited use parameter comprises a use start date and a use end date for use of the temporary item of visual content.

In the methods and systems, the time-limited use parameter comprises a calendar date, a pre-date duration of use prior to the calendar date and a post-date duration of use of the temporary item of visual content after the calendar date.

In the methods and systems, the time-limited use parameter comprises a link to an entry in a digital calendar of the user of the call-originating device.

The methods and systems of the present disclosure include detecting initiation of a first call from a first caller to a first recipient of a recipient call group, the call causing visual caller ID content configured based on characteristics of the recipient call group to be accessible by a call receiving device of the first recipient contemporaneously with receipt of the first call by the call receiving device; and in response to detecting initiation of a second call from the first caller to a second recipient of the recipient call group, configuring visual caller ID content for the second call based on a comparison of a characteristic of the recipient group and a corresponding characteristic of the second recipient.

In the methods and systems, the visual caller ID content is made accessible to the call receiving device as a link to an SCM data-structure that comprises at least one of the visual caller ID content and a link thereto.

In the methods and systems, the link to an SCM data-structure is provided to the call receiving device as caller ID information.

In the methods and systems, the visual caller ID content is made accessible to the call receiving device as a link in an SCM data-structure that is provided to the call receiving device contemporaneously with receipt of the first call.

In the methods and systems, the characteristic of the recipient group is a group affiliation identifier.

In the methods and systems, the corresponding characteristic of the second recipient is a status of group affiliation with the recipient group.

In the methods and systems, configuring visual caller ID content for the second recipient comprises adjusting at least one element of the visual caller ID content configured that was based on the characteristics of the recipient group based on a result of the comparison.

In the methods and systems, the corresponding characteristic distinguishes the second recipient from at least one other recipient in the call group.

In the methods and systems, the characteristic of the recipient group indicates business contacts and wherein the distinction indicates whether the second recipient is an internal or external business contact.

In the methods and systems, the corresponding characteristic of the second recipient is a status of the second recipient with respect to an object of the second call In the methods and systems, causing visual caller ID content configured based on characteristics of the recipient call group is performed by selecting a first caller visual caller ID content and adapting the first caller visual caller ID content to reflect the characteristic of the recipient group.

In the methods and systems, configuring visual caller ID content for the second call is further based on at least one of an identifier of a user actuating the initiation of the first call, an objective of the call, a time of the call, and an aspect of a call-receiving device of the recipient.

In the methods and systems, configuring visual caller ID content is based on a characteristic of the call receiving device selected from the list of call receiving device characteristics consisting of device storage capacity, device screen size, device operating mode, and availability of a sender-controlled media (SCM) application on the call receiving device.

In the methods and systems, causing visual caller ID content to be accessible to the call-receiving device comprises transporting at least one of the visual caller ID content and a link thereto over a short-message-service connection to the call-receiving device.

In the methods and systems, causing visual caller ID content to be accessible to the call-receiving device comprises transporting at least one of the visual caller ID content and a link thereto over an imessage channel linking the first caller with the call-receiving device.

The methods and systems of the present disclosure include detecting initiation of a call from a caller to a recipient, wherein the call causes visual caller ID content to be accessible to a visual caller ID application executing on a call-receiving device of the recipient; pausing delivery of the call until a call delivery signal is detected; while pausing delivery of the call, presenting a visual caller ID configuration user interface on a call-originating device of the caller, the visual caller ID configuration user interface facilitating providing the visual caller ID content for the call by enabling selection from a plurality of visual caller ID content options to the caller, wherein the visual caller ID content options include: existing content, at least one alternate content, and generation of content via a camera function of the call originating device; and responsive to a user selection of one of the visual caller ID content options, generating the call delivery signal for delivery of the call.

In the methods and systems, the visual caller ID configuration user interface uses audio/video recording capabilities of the caller's device to configure the visual caller ID content.

In the methods and systems, detecting initiation of the call is performed by a caller ID interrupt function of the caller's device that further causes the pausing of delivery.

The methods and systems of the present disclosure further comprising an option in the interface for designating the selected visual caller ID to be used for calls made to the recipient.

In the methods and systems, the interface presents an indication of visual caller ID content in a sender-controlled media data structure as the existing content.

In the methods and systems, the existing visual caller ID content is recipient-specific.

In the methods and systems, the existing visual caller ID SCM content is adapted on-the-fly for the recipient.

In the methods and systems, the existing visual caller ID content is one of an emoji, a gif, and a sticker.

In the methods and systems, the existing visual caller ID content is designated for calls made by the caller to members of a group of which the recipient is a member.

In the methods and systems, the call includes multiple recipients and the existing content is designated for a caller-group comprising the multiple recipients and the user selected option is used as visual caller ID content for a subset of the recipients, wherein the subset of recipients is selected by the caller in the interface.

In the methods and systems, pausing the delivery of the call is based on a characteristic of the recipient.

In the methods and systems, the characteristic is a relationship between the recipient and a group of recipients to whom the call is directed.

The methods and systems of the present disclosure include detecting initiation of a call from a caller to a recipient, wherein the call causes visual caller ID content to be accessible to a visual caller ID application executing on a call-receiving device of the recipient; pausing delivery of the call until a call delivery signal is detected; and while pausing delivery of the call, producing the visual caller ID content by a sequence of steps comprising: capturing live content comprising at least one of audio and text input to a call-originating device by the caller; processing the captured live content to determine an intent of the live content; automatically selecting a visual element based on the intent, combining the selected visual element with the live content thereby producing the visual caller ID content: and generating the call delivery signal for delivery of the call.

In the methods and systems, processing comprises audio to text conversion of the captured live content.

In the methods and systems, processing comprises natural language processing (NLP) of a least one of the captured text and the text converted from the captured audio to determine the intent.

In the methods and systems, processing comprises natural language processing (NLP) of a least one of the captured text and the text converted from the captured audio to determine a subject of the call.

In the methods and systems, processing comprises natural language processing (NLP) of a least one of the captured text and the text converted from the captured audio to determine an action of the call.

In the methods and systems, automatically selecting is performed by a visual content selection algorithm that performs a best fit of a visual content item to the determined intent.

In the methods and systems, the determined intent is based on the recipient.

In the methods and systems, the determined intent is based on a relationship of the recipient to a group of recipients associated with the call.

In the methods and systems, pausing the delivery of the call is based on a characteristic of the recipient.

In the methods and systems, the characteristic is a relationship between the recipient and a group of recipients to whom the call is directed.

The methods and systems of the present disclosure include configuring a sender-controlled media (SCM) data structure to include content selected in response to an understanding of digital content captured by a call originating device, comprising: capturing content by the call originating device comprising at least one of audio, video and text input to a call-originating device by the caller; processing the captured live content to determine an intent of the live content automatically selecting at least one visual element based on the intent; presenting the at least one visual element in an electronic user interface of the call originating device; and based on a selection of at least one of the at least one visual element combining the selected visual element with the live content thereby producing a caller story: and forwarding the caller story to a recipient.

An unknown caller method comprising: receiving an indication that a caller who is not a participant in a sender-controlled media (SCM) platform has initiated a call to a recipient who is a participant of a sender-controlled media (SCM) platform; using caller ID information of the call to gather content pertaining to the caller from a plurality of sources including information available in data stores of the platform and public number search information; generating a sender-controlled media (SCM) data structure based on the gathered content; delivering the generated SCM data structure to a call receiving device of the recipient; and presenting content from the generated SCM data structure to the recipient in a visual caller ID interface on the call-receiving device.

In the methods and systems, the information available in data stores of the platform comprises information collected regarding calls from the caller placed to other participants of the SCM platform.

In the methods and systems, the information available in data stores of the platform comprises unverified information provided by platforms members about the caller.

In the methods and systems, the information available in data stores of the platform comprises ratings of the caller made by participants of the SCM platform.

In the methods and systems, the generated SCM data structure is associated with the caller in the platform.

In the methods and systems, the generated SCM data structure is provided to the call-receiving device instead of the caller ID information.

In the methods and systems, caller ID information for the call is replaced with a link to the generated SCM data structure.

In the methods and systems, the generated SCM data structure is provided to an SCM platform application executing on the call receiving device contemporaneously with the initiated call.

An unknown contactor method comprising: receiving an indication that a sender who is not a participant in a sender-controlled media (SCM) platform has initiated contact with a recipient who is a participant of a sender-controlled media (SCM) platform; using sender information associated with the contact instance to gather content pertaining to the sender from a plurality of sources including information available in data stores of the platform and public search sources; generating a sender-controlled media (SCM) data structure based on the gathered content; delivering the generated SCM data structure to a contact-receiving device of the recipient; and presenting content from the generated SCM data structure to the recipient in an SCM interface on the contact-receiving device.

In the methods and systems, the information available in data stores of the platform comprises information collected regarding contact by the sender to other participants of the SCM platform.

In the methods and systems, the information available in data stores of the platform comprises unverified information provided by platforms members about the sender.

In the methods and systems, the information available in data stores of the platform comprises ratings of the sender made by participants of the SCM platform.

In the methods and systems, the generated SCM data structure is associated with the sender in the platform.

In the methods and systems, the generated SCM data structure is provided to the call-receiving device.

In the methods and systems, the generated SCM data structure is provided to an SCM platform application executing on the contact receiving device contemporaneously with the initiated contact.

The methods and systems of the present disclosure include receiving an indication that a caller who is not a participant in a sender-controlled media (SCM) platform has initiated a call to a recipient who is a participant of a sender-controlled media (SCM) platform; using caller ID information of the call to gather content pertaining to the caller from a plurality of sources including information available in data stores of the platform and public number search information; generating a sender-controlled media (SCM) data structure based on the gathered content; and delivering a portion of the SCM data structure to a call originating device of the caller.

In the methods and systems, the portion of the SCM data structure is delivered to the caller's call originating device as a ring-back tone.

In the methods and systems, the portion of the SCM data structure is delivered to the caller's call originating device as an SMS message.

In the methods and systems, the portion of the SCM data structure is delivered to the caller's call originating device as an MMS message.

In the methods and systems, the portion of the SCM data structure is delivered to the caller's call originating device as an imessage.

In the methods and systems, the portion of the SCM data structure is delivered to the caller's call originating device as visual voicemail.

In the methods and systems, the portion of the SCM data structure is delivered to the caller's call originating device as a voicemail.

In the methods and systems, the portion of the SCM data structure comprises an offer to join the platform.

The methods and systems of the present disclosure include receiving an indication that a caller who is not a participant in a sender-controlled media (SCM) platform has initiated a call to a recipient who is a participant of a sender-controlled media (SCM) platform; using caller ID information of the call to gather content pertaining to the caller from a plurality of sources including information available in data stores of the platform and public number search information; generating a recipient sender-controlled media (SCM) data structure based on the gathered content; delivering the generated recipient SCM data structure to a call receiving device of the recipient; presenting content from the generated recipient SCM data structure to the recipient in a visual caller ID interface on the call-receiving device; generating a sender (SCM) data structure based on the gathered content; and delivering a portion of the sender SCM data structure to a call originating device of the caller.

In the methods and systems, the information available in data stores of the platform comprises information collected regarding calls from the caller placed to other participants of the SCM platform.

In the methods and systems, the information available in data stores of the platform comprises unverified information provided by platforms members about the caller.

In the methods and systems, the information available in data stores of the platform comprises ratings of the caller made by participants of the SCM platform.

In the methods and systems, the generated recipient SCM data structure is associated with the caller in the platform.

In the methods and systems, the generated recipient SCM data structure is provided to the call-receiving device instead of the caller ID information.

In the methods and systems, caller ID information for the call is replaced with a link to the generated recipient SCM data structure.

In the methods and systems, the generated recipient SCM data structure is provided to an SCM platform application executing on the call receiving device contemporaneously with the initiated call.

In the methods and systems, the portion of the sender SCM data structure is delivered to the caller's call originating device as a ring-back tone.

In the methods and systems, the portion of the sender SCM data structure is delivered to the caller's call originating device as an SMS message.

In the methods and systems, the portion of the sender SCM data structure is delivered to the caller's call originating device as an MMS message.

In the methods and systems, the portion of the sender SCM data structure is delivered to the caller's call originating device as an imessage.

In the methods and systems, the portion of the sender SCM data structure is delivered to the caller's call originating device as visual voicemail.

In the methods and systems, the portion of the sender SCM data structure is delivered to the caller's call originating device as a voicemail.

In the methods and systems, the portion of the sender SCM data structure comprises an offer to join the platform.

The methods and systems of the present disclosure include configuring a sender-controlled media (SCM) application to receive SCM data-structures from sender participants of an SCM platform; interfacing the SCM application with a phone screen control portion of a phone application so that content in the received SCM data structure is provided to the phone application as content to be presented on an electronic display of the phone while the phone call is in progress; monitoring with the SCM application user actions in the electronic display while content is presented during the call; and updating the SCM data structure for affecting the electronic display responsive to the monitored user actions.

In the methods and systems, interfacing comprises integrating the phone screen control portion of the phone application with the SCM application.

In the methods and systems, interfacing comprises integrating SCM application functionality for receiving and processing SCM data structures into the phone application.

In the methods and systems, interfacing comprises configuring a real-time channel of communication between the SCM application and the phone application through which SCM content is provided to the phone application and user actions with the phone screen are provided to the SCM application.

The methods and systems of the present disclosure include gathering call context for an active call between a caller and a recipient; developing an understanding during the call of at least one of a call intent, a call participant, and a participant action based on content exchanged between the caller and recipient and the call context; applying content suggesting algorithms that determine candidate items of content that are relevant to at least one of the participants of the call based on applicability of the content items to the understanding; and presenting at least one of the candidate items of content to at least one of the caller and the recipient during the call in an electronic interface of a device in use during the call.

In the methods and systems, the electronic interface of the device is adapted to facilitate selection by a first call participant of one of the presented items of content for sharing with a second call participant.

In the methods and systems, the understanding is based on natural language processing of call audio.

In the methods and systems, the understanding is based on natural language processing of a transcript of the call audio In the methods and systems, the call context comprises an understanding of at least one prior call between the caller and the recipient.

In the methods and systems, the call context comprises an understanding of at least one other call made by the caller.

In the methods and systems, the call context comprises an understanding of at least one other call received by the recipient.

In the methods and systems, the call context comprises sender-controlled media communicated to the recipient contemporaneously with the call.

In the methods and systems, the call context comprises a sender-controlled media platform profile of the caller.

In the methods and systems, the call context comprises a sender-controlled media platform profile of the recipient.

In the methods and systems, the call context comprises call context gathered from at least one prior call between the caller and the recipient.

The methods and systems of the present disclosure include monitoring call-in process status of a call-participant device; and upon detection of call-in-process status indicating that a call-in process has terminated, activating a post-call application of the device, the activating causing a screen update of the device that includes at least one of a call to action by the call-participant and informational content pertinent to the call.

In the methods and systems, the call to action comprises at least one selectable element presented in the screen that when selected by the call-participant causes an update of a database associated with the call to action based on the at least one selectable element that is selected.

In the methods and systems, activating further causes a call function of the phone that was active during the call to remain active until at least one of the screen update is acknowledged by the call-participant and a screen update timer expires In the methods and systems, the screen update continues until at least one of the screen update is acknowledged by the call-participant and a screen update timer expires In the methods and systems, the screen update is acknowledged by the call-participant comprises at least one of the user selecting a selectable element presented in the screen update and the user dismisses the screen update.

The methods and systems of the present disclosure include activating a post-call application of a call-participant device responsive to receiving an indication that a call-in process is ending. The activating causes a screen update of the device that includes at least one of a call to action by the call-participant and informational content pertinent to the call.

In the methods and systems, the indication that a call-in process is ending is connection-based.

In the methods and systems, the indication that a call-in process is ending is provided by a call function of the device.

In the methods and systems, the indication that a call-in process is ending is call content-based.

In the methods and systems, a call content-based indication of a call-in process ending is based on speech analysis of call audio.

In the methods and systems, speech analysis of call audio detects at least one call ending keyword spoken by at least one of the call-participants.

In the methods and systems, the call to action comprises an offer for a product or service to the call-participant.

In the methods and systems, the call to action comprises asking the call-participant their review of the call.

In the methods and systems, the call to action comprises soliciting comments about the call.

In the methods and systems, the call to action facilitates the capture of call-participant feedback on one of the call-participants regarding a spammer status of one of the call-participants.

In the methods and systems, the screen update comprises content from a sender-control media (SCM) data structure for an originator of the call that is automatically generated based on the call-in process.

In the methods and systems, the call to action of the screen update facilitates collecting call-participant feedback on the SCM data structure content.

In the methods and systems, the screen update facilitates collecting call-participant feedback regarding an originator of the call.

In the methods and systems, the screen update facilitates collecting call-participant feedback on a good or service referenced during the call.

In the methods and systems, the screen update comprises visual content provided by one of the call-participants.

In the methods and systems, the visual content is retrieved from a sender-controlled media (SCM) data structure associated with one of the call-participants.

The methods and systems of the present disclosure include a call community contact firewall that includes a caller ID capture function retrieving caller ID data provided by a call network for a call being placed over the call network to a recipient who is a member of the call community; a caller ID lookup function retrieving firewall status from a firewall status database based on the retrieved caller ID data, the firewall status database linking caller ID data with call community ratings of prior calls associated with the caller ID data that were received by members of the call community; and a firewall action function that performs at least one call impacting action based on the retrieved firewalls status.

In the methods and systems, the at least one call impacting action comprises terminating the call.

In the methods and systems, the at least one call impacting action comprises connecting the call to the participant.

In the methods and systems, the at least one call impacting action comprises redirecting the call to voicemail In the methods and systems, the at least one call impacting action comprises redirecting the call to an automated response system.

In the methods and systems, the at least one call impacting action comprises providing call-action recommendations to the recipient and based on the recipient's response thereto taking at least one other call impacting action.

In the methods and systems, the firewall action function further facilitates generating a multi-media profile based on the caller ID data and delivering that to the recipient.

In the methods and systems, the multi-media profile comprises a sender controlled media (SCM) data structure and delivering to the recipients comprises communicating about the profile with an SCM interface function of a call-receiving device of the participant.

In the methods and systems, the multi-media profile is delivered via a multimedia messaging service (MMS).

In the methods and systems, the firewall action function further facilitates generating a multi-media profile based on the caller ID data and delivering that to a phone number indicated in the caller ID of the call as a multimedia messaging service (MMS) message.

In the methods and systems, the multi-media profile comprises a sender controlled media (SCM) data structure and delivering to the recipients comprises communicating about the profile with an SCM interface function of a call-receiving device of the participant.

In the methods and systems, the call impacting action comprises delivering an audio message to an originator of the call in lieu of placing the call to the recipient.

A method of generating a contact firewall for protecting participants of a sender-controlled media (SCM) platform, the method comprising: receiving an indication that a sender who is not a participant in a sender-controlled media (SCM) platform has initiated contact with a recipient who is a participant of a sender-controlled media (SCM) platform; using sender information associated with the contact instance to pole participants of the platform regarding a spammer status value for the sender; aggregating the spammer status values received in the pole; and based on a comparison of the aggregated spammer status values with a spammer threshold, causing future contacts from the sender to be rejected by the platform so that the sender is blocked from contacting participants of the platform.

A method of generating a contact firewall for protecting members of a call group, the method comprising: receiving an indication that a sender who is not a member of the call group has initiated contact with a recipient who is a member of the call group; using sender information associated with the contact instance to pole members of the call group regarding a spammer status value for the sender; aggregating the spammer status values received in the pole; and based on a comparison of the aggregated spammer status values with a spammer threshold, causing future contacts from the sender to be acted upon by the contact firewall to facilitate unwanted callers being blocked from contacting members of the call group.

In the methods and systems, the contact firewall acts upon contacts from the sender by taking at least one call impacting action.

In the methods and systems, the at least one call impacting action comprises terminating the call.

In the methods and systems, the at least one call impacting action comprises connecting the call to the participant.

In the methods and systems, the at least one call impacting action comprises redirecting the call to voicemail In the methods and systems, the at least one call impacting action comprises redirecting the call to an automated response system.

In the methods and systems, the at least one call impacting action comprises providing call-action recommendations to the recipient and based on the recipient's response thereto taking at least one other call impacting action.

In the methods and systems, the at least one call impacting action further facilitates generating a multi-media profile based on the caller ID data and delivering that to the recipient.

In the methods and systems, the multi-media profile comprises a sender controlled media (SCM) data structure and delivering to the recipients comprises communicating about the profile with an SCM interface function of a call-receiving device of the participant.

In the methods and systems, the multi-media profile is delivered via a multimedia messaging service (MMS).

In the methods and systems, the at least one call impacting action further facilitates generating a multi-media profile based on the caller ID data and delivering that to a phone number indicated in the caller ID of the call as a multimedia messaging service (MMS) message.

In the methods and systems, the multi-media profile comprises a sender controlled media (SCM) data structure and delivering to the recipients comprises communicating about the profile with an SCM interface function of a call-receiving device of the participant.

In the methods and systems, the at least one call impacting action comprises delivering an audio message to an originator of the call in lieu of placing the call to the recipient.

The methods and systems of the present disclosure include for each call originator originating a call to members of a call group, gathering call originator feedback from the members; storing the feedback from the members in a contact firewall data structure indexed by call originator identification information; and configuring a contact firewall function that intercepts a call to a member of the group while determining if the feedback in the contact firewall data structure for an originator of the call indicates that an action to impact the call should be taken.

In the methods and systems, call originator identification information comprises caller ID data;

In the methods and systems, the action to impact the call comprises terminating the call.

In the methods and systems, the action to impact the call comprises connecting the call to the participant.

In the methods and systems, the action to impact the call comprises redirecting the call to voicemail.

In the methods and systems, the action to impact the call comprises redirecting the call to an automated response system.

In the methods and systems, the action to impact the call comprises providing call-action recommendations to the recipient and based on the recipient's response thereto taking at least one other call impacting action.

In the methods and systems, the action to impact the call further facilitates generating a multi-media profile based on the caller ID data and delivering that to the recipient.

In the methods and systems, the multi-media profile comprises a sender controlled media (SCM) data structure and delivering to the recipients comprises communicating about the profile with an SCM interface function of a call-receiving device of the participant.

In the methods and systems, the multi-media profile is delivered via a multimedia messaging service (MMS).

In the methods and systems, the action to impact the call further facilitates generating a multi-media profile based on the caller ID data and delivering that to a phone number indicated in the caller ID of the call as a multimedia messaging service (MMS) message.

In the methods and systems, the multi-media profile comprises a sender controlled media (SCM) data structure and delivering to the recipients comprises communicating about the profile with an SCM interface function of a call-receiving device of the participant.

In the methods and systems, the action to impact the call comprises delivering an audio message to an originator of the call in lieu of placing the call to the recipient.

The methods and systems of the present disclosure include accessing with a processor an instance of a secure sender-controlled media (SCM) data structure of a first contact participant in a digital exchange between the first contact participant and a second contact participant; updating the instance with real-time content captured through an interface of a digital device through which the first contact participant participates in the digital exchange; validating with the processor the first contact participant by comparing the real-time content with another portion of the secure SCM data structure; and based on a result of the validating, sending a digital signal to the second contact participant that the first contact participant is an authenticated participant.

In the methods and systems, the real-time content comprises an image captured through a camera interface of the digital device.

In the methods and systems, the image is a face of a user proximal to the digital device.

In the methods and systems, the real-time content comprises audio captured through a microphone interface of the digital device.

In the methods and systems, the audio is a voice recording of a user proximal to the digital device.

In the methods and systems, the audio is of a voice recording of the word spoken by a user proximal to the digital device, the work identified in the SCM data structure.

In the methods and systems, the real-time content comprises a biometric indicator captured through a biometric interface of the digital device.

In the methods and systems, the biometric indicator is a fingerprint.

The methods and systems of the present disclosure include receiving an indication of no-answer by a recipient of a call placed from a caller to the recipient; in response to receiving the indication, activating a sender-controlled media selection/generation interface on the caller's phone through which is caused to be generated an item of content; delivering the item of content to the recipient's call message storage system, wherein the item of content is linked to the missed call.

In the methods and systems, the SCM content selection/generation interface facilitates capturing content with a camera function of the caller's phone, the content comprising at least one of a still image and a video.

In the methods and systems, the generated item of content is an image captured by a camera function of the caller's phone during use of SCM content selection/generation interface.

In the methods and systems, causing an item of content to be generated comprises accessing a camera function of the caller's phone through which at least one of an image and a video is captured as the item of content.

The methods and systems of the present disclosure include receiving an indication of no-answer by a recipient of a call placed from a caller to the recipient; in response to receiving the indication, activating a sender-controlled media (SCM) content selection/generation interface on the caller's phone through which is caused to be generated an SCM data structure comprising an item of content selected by the caller; delivering at least one of a link to the SCM data structure and the SCM data structure to the recipient's call message storage system, wherein the SCM data structure is linked to the missed call.

In the methods and systems, the item of content comprises a video captured by the caller through the SCM content selection/generation interface.

In the methods and systems, the item of content comprises a location.

In the methods and systems, the location is a location of the caller.

In the methods and systems, the location is a location to which the recipient is directed.

In the methods and systems, the item of content comprises an SCM data structure of the caller.

The methods and systems of the present disclosure include receiving an indication of a new digital voice mail message; developing an understanding of the new voicemail by applying at least one of machine learning and natural language processing to the new voicemail; selecting an item of visual content that is consistent with the understanding; and generating a sender-controlled media (SCM) data structure that facilitates linking the voice mail to the item of visual content.

In the methods and systems, the understanding of the audio content comprises an intent of the call, an object of the call, and an action associated with at least one of a caller leaving the message and an intended recipient of the message.

In the methods and systems, selecting is performed by a visual content selection algorithm that performs a best fit of a visual content item to the understanding.

In the methods and systems, the understanding comprises an intent that is based on an intended recipient of the message.

In the methods and systems, the determined intent is based on a relationship of the intended recipient to a caller leaving the message.

The methods and systems of the present disclosure include developing an understanding of audio content of a voice mail message being played back on a computing device by applying at least one of machine learning and natural language processing to the playback; selecting at least one item of visual content that is consistent with the understanding; and presenting the at least one item of visual content on a display screen of the computing device contemporaneously with the playback.

In the methods and systems, the understanding of the audio content comprises an intent of the call, an object of the call, and an action associated with at least one of a caller leaving the message and an intended recipient of the message.

In the methods and systems, selecting is performed by a visual content selection algorithm that performs a best fit of a visual content item to the understanding.

In the methods and systems, the understanding comprises an intent that is based on an intended recipient of the message.

In the methods and systems, the determined intent is based on a relationship of the intended recipient to a caller leaving the message.

Figure 50:
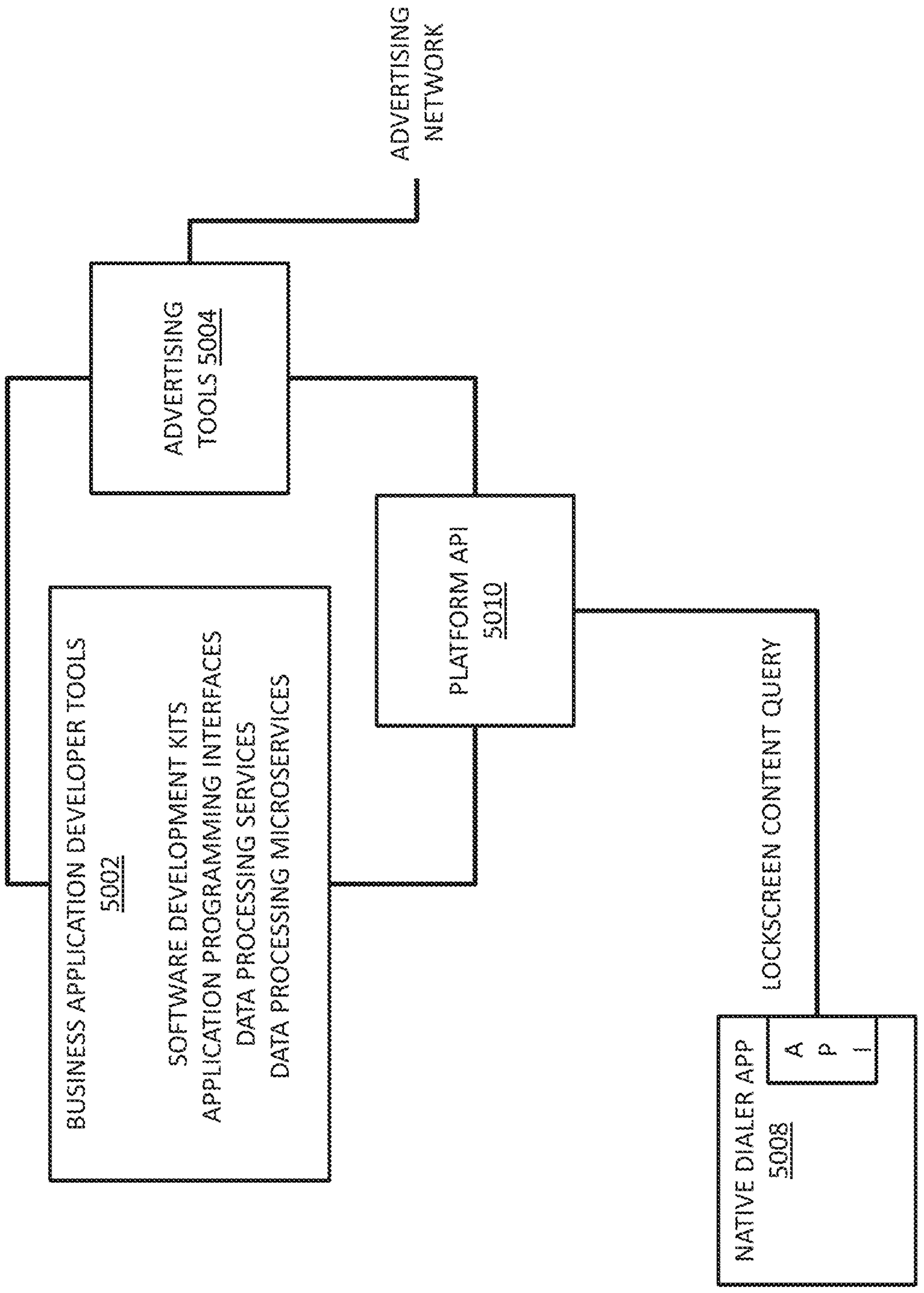
FIG. 50 illustrates embodiments of business application development tools for use with the architecture.

In embodiments, an SCCMC event or other communication according to the embodiments disclosed herein may involve a set of interactions between a business and a customer, a consumer, a prospective customer, client, a prospective client, or the like (collectively referred to herein as a "customer"). The interactions may involve a worker for or on behalf of the business (such as an employee, agent, contractor, consultant or the like) and/or for or on behalf of another business that is involved in the set of interactions (such as a service provider, partner, agent, distributor, value added reseller, licensee, retailer, manufacturer, supplier, vendor, delivery service, fulfillment provider, or the like). FIG. 50 depicts such embodiments including the architecture 100 that enables handling of SCCMC communications, where a sender can control or influence the content that is presented on the lockscreen of a recipient's mobile device. Such embodiments may include a set of business application developer tools 5002 (such tools optionally including a set of software development kits (SDKs), a set of application programming interfaces (APIs), a set of services (e.g., microservices) for data processing and handling, and the like) for enabling a business application or service to deploy SCCMC content lockscreens of mobile devices, such as to workers, customers and other individuals involved in a set of interactions involved in the application or service.

As one example among many possible examples, a delivery interaction from a merchant to a customer may be announced by an SCCMC that displays audiovisual content (e.g., a video, graphic or animation that includes the merchant's logo or brand and/or plays music or audio associated with the brand) and displays or plays a message such as "your driver is arriving with your pizza now" on the lockscreen of a customer's phone. Via the developer tools 5002, the merchant's application or service can be adapted such that outgoing phone calls (such as from the driver to the customer in the case of the delivery of an item to the home of the customer) pull appropriate content from a merchant-specific channel of SCCMC content, associate the SCCMC content with the call, and cause display of the SCCMC on the customer's mobile device.

In embodiments, the developer tools 5002 may include a set of APIs, services, SDKs and the like that provide a merchant with a white label version of an SCCMC application (such as based on a reference application that is appropriate for the business of that type of merchant) to enable lockscreen experiences for the merchant when workers make calls to customers on behalf of the merchant.

In embodiments, the architecture 100 may include developer tools 5002 that enable interactions via a complete embedded application (e.g., where a white label application is provided for a merchant (with an appropriate skin or branding using the merchant's audiovisual content) by the host of the platform and is embedded on the mobile device of a customer, such as to enable communications and other interactions between the customer and the merchant).

In other embodiments, the architecture 100 may include developer tools 5002 whereby a business can interact with the platform via a set of APIs, such that the capabilities of the platform described herein are engaged via the APIs when a call is dialed on behalf of the business, while the workflows for SCCMC content management, channel management, and the like continue to be managed and provided by the host of the platform. In such embodiments, a native dialer application 5008, such as one on a phone used by an application or service of a business may (such as by an API of the dialer application 5008) ping an API 5010 of the architecture 100 to determine whether the platform currently hosts appropriate lockscreen content that can be delivered to the lockscreen of a recipient's mobile device, such as upon the initiation of a phone call by the native dialer application 5008 (e.g., indicating the purpose for the call), during the phone call (such as to deliver call-related content or information), and/or after completion of the phone call (such as to get feedback or suggest a further action).

Channels of SCCMC content can be configured to support various types of interactions; for example, a business calling a customer may have a variety of reasons for calling that preferably come with different audiovisual interactions. Among many examples, these may include interactions around late payments, credit offers, appointments, deliveries and many others. In embodiments, developer tools 5002 enable a code to be recognized, such as one that is automatically entered by a dialer application based on a workflow (such as from a business portal that is used to dial phone calls) or one that is entered by the worker before dialing a number as an indicator of the type of call the worker is initiating. In embodiments, the code may be processed by the platform, such as by components of the architecture 100 that manage channels of SCCMC content, to automatically pull the correct SCCMC content for the upcoming interaction and link it to the call that was dialed, so that it is displayed on the lockscreen as the call comes in, during the call, and/or after the call ends.

In embodiments, merchant-specific SCCMC audiovisual content can be created by or on behalf of the merchant and stored in a repository (such as in the cloud) as a channel of content for the merchant's interactions with customers. As noted above, SCCMC items may be selected from a merchant channel by a predetermined code; however, in embodiments, SCCMC items may be selected based on other parameters or contextual factors, such as category, by location, by interaction type, or by many other factors. Using the developer tools 5002, the channel of SCCMC content for a merchant may be populated metadata, tags, or the like, such as to enable selection of appropriate SCCMC content by a business application or service based on recognition of a particular workflow, situation, context, or event; for example, the channel may include location-specific SCCMC content (such as a display of content for a store location in a given city or part of a city), such that the location-specific SCCMC content is pulled for display when a call is recognized to be made from a mobile phone in a given location, to a mobile phone in a given location, or the like. Channels may be configured for selection and delivery of content based on various parameters, such as business location, customer location, interaction type (e.g., item delivery, a service call, a sales call, or the like), customer type, product type, service type, or many others. In embodiments, the developer tools 5002 may include menus, user interfaces, workflows, and the like to enable configuration of the merchant-specific channel of SCCMC content items such that particular inputs (e.g., events that are delivered from a business application or service, such as events logged in connection with a workflow of the application or service) are recognized by the platform described herein, triggering the delivery of the SCCMC to the lockscreen of a mobile device having a given phone number.

The developer tools 5002 may include tools for embedding an SCCMC workflow into or integrating an SCCMC workflow with the workflow of an application or service of a business, such as where the SCCMC workflow is triggered upon an outbound communication event (e.g., dialing a phone call), resulting in delivery of SCCMC content to the lockscreen of the user's phone, and responses to the SCCMC (e.g., a user interaction on the lockscreen, such as selecting a menu option, replying to a text, or the like) are delivered back to the application or service of the business for further processing.

Business interactions that can be accompanied by SCCMC content that is selected from a merchant-specific channel for delivery to a lockscreen of a mobile device of a customer, worker, or other individual may include delivery interactions (such as announcing the arrival of a delivery, announcing that delivery is on the way, and the like); rideshare interactions (such as announcing the arrival of a driver, displaying a video showing the driver's face and/or a video of the vehicle, displaying the customer's face to the driver, showing content from the customer if the customer call the driver, or the like); service or maintenance interactions (such as announcing the timing of the arrival of a service person); health-related interactions (such as announcing that a prescription is ready, that lab results are available, or the like); appointment-related interactions (such as confirming an appointment, reminding a customer of an appointment, or the like); solicitation interactions (such as requesting donations for a non-profit); collections interactions (such as to collect past due amounts); offering-related interactions (such as offering extended warranties, upgrades, exchanges, or the like); call-center interactions (such as when a call center worker returns a call from a customer or responds to a request by a customer for a call); support-related interactions (such as to help customers with questions on how a product works, what offering to select, or the like); feedback-related interactions (such as requesting response to a survey, requesting rating of an interaction, or the like); political interactions (such as delivering content related to an issue or candidate); and many others. In each case the developer tools 5002 may include components appropriate for configuration of the architecture 100 to enable triggering of SCCMC content by the business application or service workflow (such as by recognizing of logged events or the like) and return of a signal to the business application service or workflow to enable it to continue with its native workflow.

In embodiments, business interactions accompanied by SCCMC content, such as SCCMC content that is selected from a merchant-specific channel, may be configured for delivery to an outgoing call lockscreen of a mobile device, such as where SCCMC content appears on the outgoing call lockscreen of a customer, worker, or other individual when a call is made to a business and/or by a person on behalf of a business. For example, SCCMC content may be configured to appear on the outgoing call lockscreen of a customer's mobile device when the customer calls a business. Continuing the example, when a customer calls, e.g., a restaurant, the customer may see a commercial, logo, video, offer, coupon, or other content for the restaurant on the outgoing call lockscreen of the customer's mobile device. Additional content of various types can appear on the lockscreen post-call, such as a coupon for a next order.

As another example, SCCMC content may be configured to appear on the outgoing call lockscreen of a worker when the worker makes a call for the business; for example, a driver may see content on the outgoing call lockscreen that relates to a delivery that the driver will make for the business, such as an image of the customer, the customer's order, a destination to which a customer is to driven, an offer for the customer, a script for a conversation, or other content.

In such embodiments, once an outgoing call is picked up by the receiving party, the lockscreen that appears during the outgoing call could turn into a fully interactive menu. In embodiments, the interactive lockscreen can be used for customer interaction, such as for customer service interactions. In embodiments, content to support interactive menus can be streamed to a mobile phone for display on the lockscreen over cellular networks, such as a 5G network.

In embodiments, a set of business interactions may also include advertising interactions, where the SCCMC content in a channel includes advertising content for display on lockscreens of mobile devices of customers. Advertising channels may include ads for a variety of publishers, merchants, and the like, where SCCMC content is selected for display to a set of mobile devices based on a variety of contextual factors, such as device type, display type, location, customer demographics, customer psychographics, interaction type, geography, timing factors (time of day, time of week, seasonal factors and the like), and many others. Thus, the platform described herein and related architecture 100 and developer tools 5002 may include a set of advertising tools 5004 for enabling an advertising network for lockscreen-delivered SCCMC advertisements.

In embodiments, an SCCMC content item serves as a visual caller ID that enhances a customer's experience in an interaction with a business. In embodiments, the business caller can provide specific content that can be rendered on the incoming call notification screen (e.g., a portion of the lock screen) of a target recipient, including interactive content. In embodiments, interactions may be enabled based on available permissions and/or preferences of the recipient, such as indicated by past interactions with a business.

In embodiments, relationships between and among the business callers and consumer recipients can factor into the content, permissions, and the like. For example, direct inquiries by a customer can result in one set of interactions and/or content, while indirect interactions (such as involving referrals or cold-calling) involve a different set of interactions (e.g., different SCCMC content channels, interaction types, timing, and the like). Interactions may include follow-up interactions, such as post-call follow-up and post-transaction follow-up (in which case the SCCMC content may be based in part on an understanding of what occurred in a transaction, such as where a customer is known to involve purchase of a product and the call relates to providing more information about the product).

In embodiments, information known for a specific recipient or abstracted from similar recipients can be used to determine visual caller ID content. This may include selecting a channel of SCCMC content or particular SCCMC content based on a profile of a customer, demographic information, location information, psychographic information, past purchase information, behavioral information, and the like, as well as based on clustering a customer with other like individuals, such as by collaborative filtering, similarity-based clustering, and the like.

In embodiments, an interceptor of the architecture 100, as described elsewhere herein, may provide a mechanism by which visual caller ID can be implemented within a digital calling application environment. It can leverage all of the aspects of the SCCMC platform to facilitate building a visual caller ID audiovisual experience on-the-fly. Embodiments may include the interceptor integrated with and into a digital marketing (e.g., business call placement) platform that is operated by or on behalf of a business and/or an advertising or marketing company.

In embodiments, such an interceptor can be applied to digital content (e.g., websites, business product/service/sales goals/regional goals/offers and other sources, such as competitor pricing, to determine an SCCMC for a call program, a specific call and the like.

In embodiments, the platform may provide enhanced information to a recipient where a call is from an unknown caller. Instead of an unknown phone call, the recipient can see the company of the caller and audiovisual information indicating the purpose of the call as the call comes in.

In embodiments, platform users can use developer tools 5002 of the platform to allow customers to tailor what they receive from unknown callers, such as based on what other platform users have received and their ratings about that content.

In embodiments, callers may register with the architecture 100 so that, among other things, a caller may exert some control over content (e.g., call or caller identifying content) presented to a call recipient when the caller initiates a call or other communication to the recipient. Caller registration may indicate the caller ID to be used by the caller and content for display to the recipient. Methods and systems described herein provide several options for how call and caller identifying display content can be sourced (e.g., based on a call reason/code), and various types of content, among other factors impacting use of the content. In embodiments, the caller registration with the architecture 100 may include designating one or more target recipients for which the call or caller identifying content should be used. By sharing recipient information (e.g., a phone number of a recipient, an identifier of the recipient, such as an account number, user name and the like, and other recipient identifying data), the specified call or caller identifying content can be provided to the recipient device prior to or contemporaneously with an incoming call for which the identifying content is needed.

Figure 51:
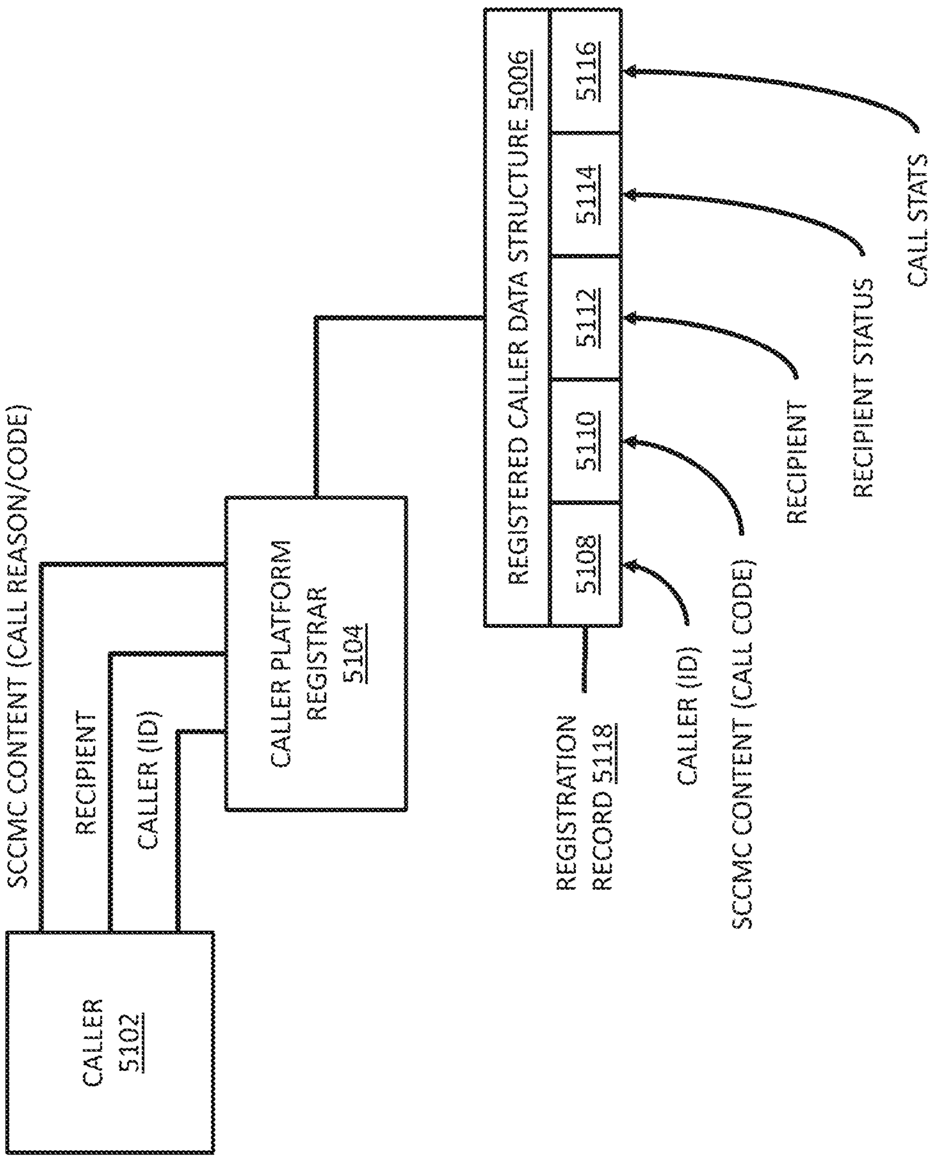
FIG. 51 illustrates exemplary embodiments of caller registration.

Referring to FIG. 51, exemplary embodiments of caller registration with the architecture 100 are depicted. Generally, registration may include preliminary activities, such as verification of caller identification information, financial information, and the like, which are described further herein. With these preliminary activities in mind, FIG. 51 details embodiments of a caller providing content to an architecture 100 that registers the information into a data structure that may facilitate use of the content by the architecture 100 and/or recipients thereof. A caller 5102 may determine that content, such as SCCMC content and/or an SCCMC data structure or portions thereof is desired to be available for use when the caller contacts a recipient. The caller 5102 may provide an indication of this content, such as a call code and the like, which may include without limitation, information this is at least in part descriptive of an intended purpose for the call. Examples found here may include a range of business call objectives, such as a sales call, a service call, a reply to a customer inquiry, a call-back and the like. As noted herein, the caller, during exemplary SCCMC configuration/registration activities of FIG. 51, may also identify at least one target recipient associated with the content. In embodiments, a caller architecture registrar 5104 may facilitate receipt and pre-processing of the caller 5102 registration information, such as by ensuring that information in the registration request is proper (e.g., a bon-a-fide recipient phone number and the like). The architecture registrar 5104 may facilitate updating and/or constructing a registered caller data structure 5106. Such a registered caller data structure 5106 may include information that facilitates identification of the caller (e.g., caller ID 5108), the content/call intent (e.g., call code 5110), and at least one target recipient (e.g., recipient 5112). The registrar 5104 may further configure additional fields in a registration record 5118, such as recipient status 5114 and call statistics 5116. By way of these examples, these additional fields may be configured initially with values such as for recipient status 5114 "recipient architecture participation status", and call stats 5116 "call pending", and the like. These additional fields may be deployed or omitted in embodiments of a registration record 5118.

When a caller registers with the architecture 100, the caller can provide information that may be provided to the target recipient device so that a next call from the caller will rely on the provided information. The methods and systems described herein detail examples of call-by-call registration processes, as a caller may update SCCMC content and the like at any time, so that a call made by the caller after the updated SCCMC content is registered with the architecture 100 can rely on the updated content. In embodiments, a caller may, therefore, provide information to the architecture 100 for a specific upcoming call (e.g., a next call) to a target recipient, as opposed to providing information that is applicable to all future calls to the target recipient. In embodiments, a caller may provide "upcoming" call context when updating SCCMC content via registration with the architecture 100. For example, a caller may indicate a time frame in which the updated content is to be used by the target recipient device. Based on this registration call context, the architecture 100 may adapt how and when it communicates with a target recipient device. Further in these time frame context examples, the architecture 100 may, upon receipt of a registration by the caller for a call to occur in a future time frame (e.g., "tomorrow", "next week", "after a scheduled event", and the like) update the target recipient device so that a call from the caller before a start of the future time frame will be handled by, for example, as an unexpected call or by an unknown caller and the like.

In embodiments, the architecture 100 may further update the target recipient device (e.g., send an updated SCCMC data structure and the like) approximately at the start of the future start time, so that an incoming call from the caller can be handled as intended by the caller's registration with the architecture 100. At an end of a time frame designated by the caller during registration, the architecture 100 may again update the target recipient device so that a subsequent call from the caller will be handled with the most up to date details, information, and the like.

In addition to a caller specifying (or agreeing to) a time frame for use of the call registration information, the architecture 100, in embodiments, may implement default rules for handling registration information that may further enhance use thereof. For example, methods described herein may enable use of at least the call stats field 5116 of the registration record 5118 for adapting how the registered content and the like is used by the architecture 100 and by the target recipient device. The call stats field 5116 may be updated based on incoming call activity at the target recipient device, such as indicating that a call from the caller has been received. The architecture 100 may rely on this information, such as by detecting a change in the information from "pending" to "received" to connect with the target recipient device (e.g., to an architecture app on the device and the like that is described herein) to invalidate the SCCMC content and the like previously provided by the architecture 100 for the caller.

Actions associated with a caller registration that is conditional are described above from the perspective of the architecture 100. Similar actions could be undertaken by an architecture app or device phone app that is adapted to perform at least a portion of architecture app call handling functions when executing on the target recipient device. The device phone app (for example) may operate responsive to the architecture providing the target recipient device with relevant information derived from the caller registration. The architecture may provide the relevant information in, for example, a metadata portion of the SCCMC data structure, such as a start time and end time of a future time frame that may be based on information provided by the caller during registration. This time frame information may be accessed by various incoming call handling applications, some of which are described herein, of the target recipient device and relied upon when processing incoming calls, so that, for example, a call from an identified caller that occurs before a start time for use of the SCCMC downloaded content may be treated appropriately by the device without relying on the architecture to manage time frame and other conditional call registration information.

Further, a call code 5110 and the like may include, as described herein, various reasons for calling. In embodiments, examples of reasons for a call may include interactions around late payments, credit offers, appointments, deliveries and many others. This call code 5110 is further described in embodiments for use with SCCMC channels that may facilitate providing content for the upcoming interaction and link it to the call, such as when the call is dialed.

Yet further, call registration, although generally described herein as a discrete action separate from a call (e.g., a caller can register with the architecture for a future, upcoming call) may merely be part of a call function of the caller. Various embodiments of the architecture 100 support such forms of registration and myriad variations thereof. Additional examples include calls that are routed from the caller through a server of the architecture 100. By way of these examples, the caller may either, automatically or manually, provide to the server a call reason (e.g., code 5110) for the call. This may be a form of caller registration that may result in the target recipient device receiving, for example an SCCMC data structure update contemporaneously with the initiated call so that the device call handling functions treat the call as expected, from a verified caller, or merely presenting the caller initiated content, such as content conveyed by the code provided with the call.

Figure 52:
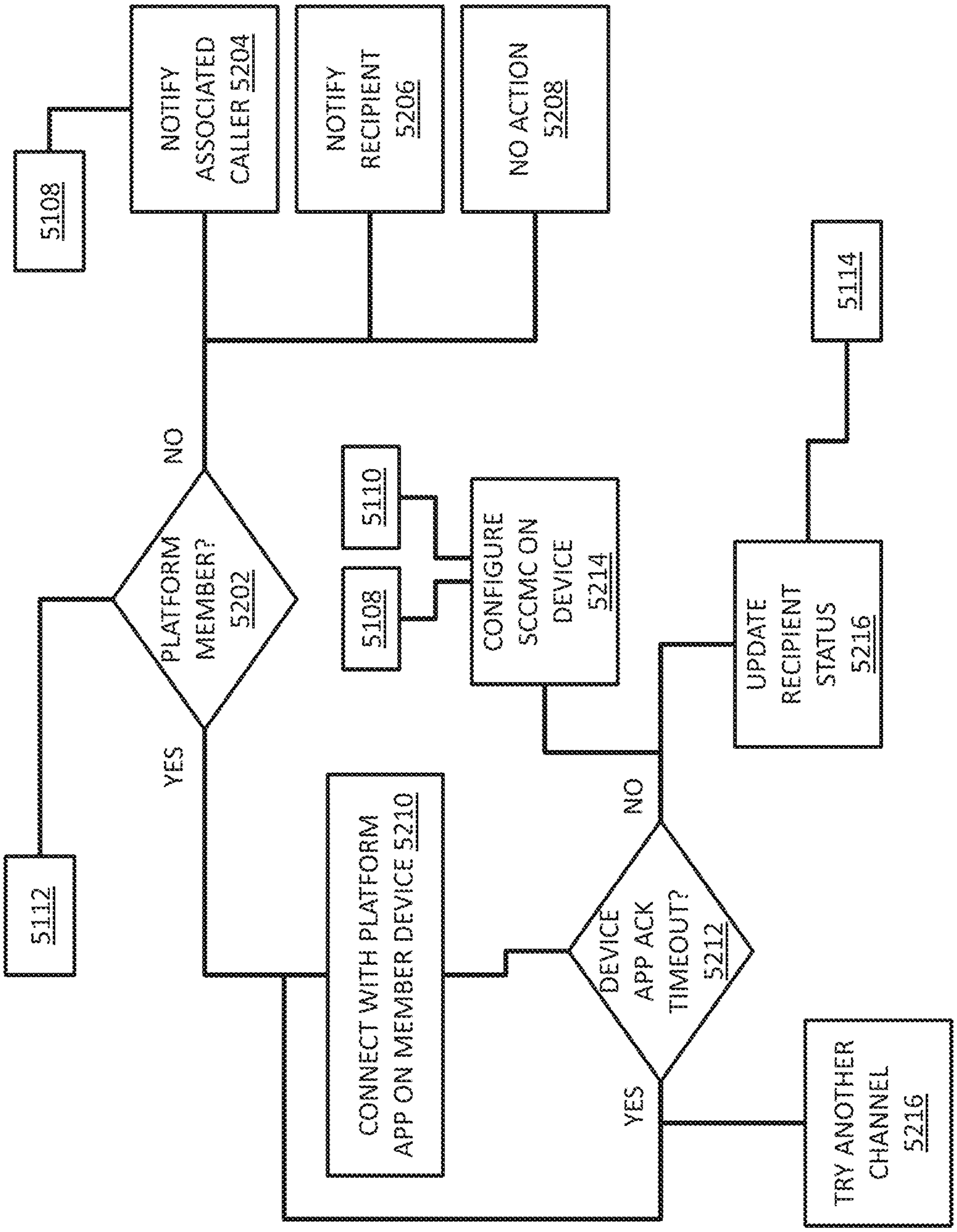
FIG. 52 illustrates exemplary actions responsive to caller registration.

FIG. 52 depicts a flow chart of possible actions taken by the architecture 100 responsive to caller registration, such as caller registration described in association with FIG. 51 hereof. A target recipient 5112 designated during call/caller registration, such as caller registration of FIG. 51 and the like, may be evaluated by the architecture 100, such as to determine if the recipient is an architecture member (e.g., the recipient has opted in, either by default or intentionally, to using the architecture 100 features, such as call/caller registration and the like). Architecture 100 membership is described elsewhere herein and may be dependent on a range of factors separate from the specific use described in association with the registration of FIG. 51. However, determination of a member 5202 may identify recipient specific opt-in for use of call/caller registration content and the like. In examples of architecture member determination 5202, a phone number of a target recipient, such as one designated in the caller registration process of FIG. 51 may be compared to a list of phone numbers that have opted in for this service. Alternatively, the target recipient number may be compared to a list of phone numbers for which this service is not to be provided, such as phone numbers that have opted out of this service. As noted herein, opting in and/or out of a registered caller service, such as the service associated with caller registration in FIG. 51, may be independent of use of other architecture services by the target recipient phone number.

A target recipient 5112 that has been determined in step 5202 to be an architecture member for purposes of caller/call registration content services may be contacted by the architecture 100. In embodiments, the architecture 100 may connect with an architecture app 5210 on the member device associated with the target phone number. If no response is received from the target recipient architecture app 5210 so that the connection times out after a timeout duration 5212, the architecture 100 may opt to retry connecting with the architecture app 5210 or may try accessing the app and/or recipient through another channel 5216, such as via text message, and the like. Once the connection has been established, the architecture 100 may work cooperatively with, for example the target recipient architecture app 5210 to configure 5214 SCCMC like content (e.g., caller ID 5108, call content 5110, and the like) on the recipient device. Upon receipt of an acknowledgement from the target recipient device-based architecture app (as depicted by the "NO" path out of timeout determination step 5212), a recipient status update process 5216 may be performed, such as by the architecture 100, so that the recipient status 5114 is reflective thereof, such as "recipient ready to receive a call from the caller" and the like.

If a result of architecture member determination 5202 indicates that the target recipient 5112 has not opted in (or has opted out), the architecture 100 may take one or more of several target recipient-specific actions. Such actions include without limitation: (i) updating the recipient status to indicate that no further action 5208 should be taken; (ii) notifying 5202 the recipient, such as through a communication to the recipient based on the target recipient phone number (e.g., sending a text message, leaving a phone message, placing a phone call and the like); (iii) notifying 5204 the associated caller 5102 that the target recipient 5108 has not opted in to this service; (iv) another action that may benefit one or more of the caller, the target recipient and an owner/operator of the architecture 100. The actions that the architecture 100 takes may be dependent on a range of factors including, without limitation, recipient preferences, caller preferences, architecture preferences, architecture-caller arrangement (e.g., service level agreed for use of the architecture for call/caller registration and the like).

Figure 53:
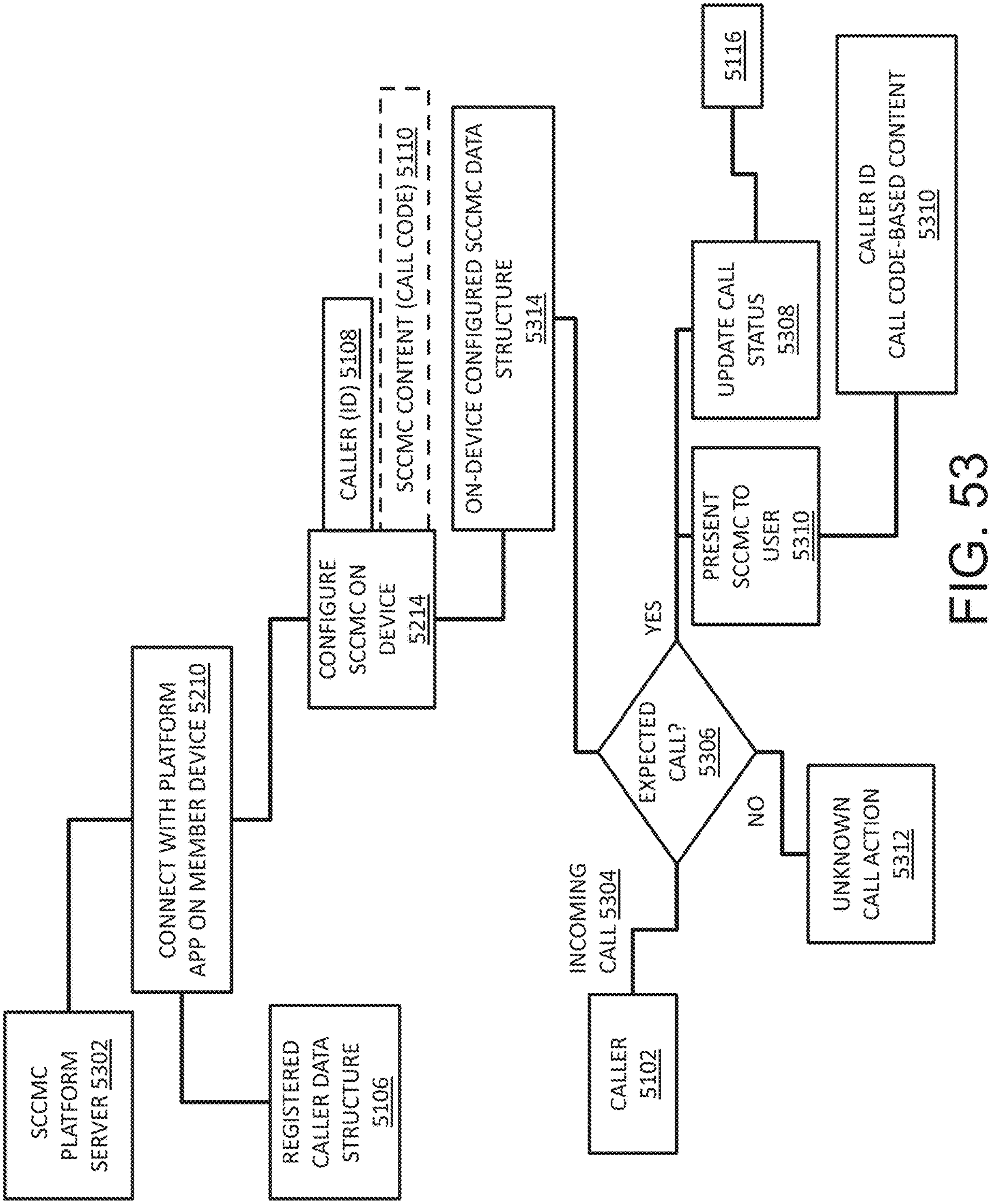
FIG. 53 illustrates on-device functional flow responsive to caller registration.

In embodiments, the on-device configured SCCMC data structure, or relevant portions thereof may be used by one or more applications that are executable on the target recipient phone, such as an architecture app, a device native call function, an adapted device call function, a supplemental device call application and the like. Referring to FIG. 53, an on-device functional flow responsive to the call/caller registration process of FIG. 51 is depicted. In the embodiment of FIG. 53, an architecture server, such as an SCCMC architecture 100 server 5302 may instrument a connection with the target recipient device, such as an architecture app 5210 and the like. This connected on-device app may access specific content of the registered caller data structure 5106, such as call record 5118 for which connection by the architecture 100 server 5302 was initiated. Mechanisms and systems by which the call record 5118 are accessed may be independent of how it is used herein. Those mechanisms and systems may include without limitation: (i) being pushed to the device app 5210 from the server 5302; (ii) broadcast by the server 5302; (iii) provided in response to a query by the device app 5210; (iv) accessed over a network by the device app 5210. With a goal of configuring a SCCMC or similar record 5214 on the target recipient device, at least caller ID 5108 or similar of a caller is configured into an on-device configured data structure 5314 that may optionally include at least an indication of caller-designated content 5110. Described elsewhere herein, an SCCMC data structure may include a range of call and/or caller-related metadata in addition to displayable content. Any portion(s) of such content not intended for display may be configured into the registered caller record 5106, the on-device SCCMC data structure 5314 and the like so that it is available for use on-device in association with calls, such as incoming calls from a caller 5102 and the like. In embodiments, only the caller ID 5108 may be configured in the data structure 5314. In embodiments, call code 5110, call and caller metadata and other content may optionally be configured into the data structure 5314. In later embodiments, alternate versions of how the call record 5118 and the like may be used on-device are described.

In embodiments, the target recipient device may determine if a call is expected 5306, such as by determining if caller ID of an incoming call 5304 that identifies a caller 5102 is present in the on-device data structure 5314. Determination of a call being expected may include other factors, such as if an entry in the on-device data structure 5314 is indicative of the call being expected (e.g., the call code/SCCMC content may indicate a time factor for the call). If a result of determining if the call is expected 5306 is that the call is not expected (e.g., "NO" output of decision 5306), unknown caller/unexpected call action(s) 5312 may be initiated. These call action(s) 5312 may be described elsewhere herein.

Figure 57:
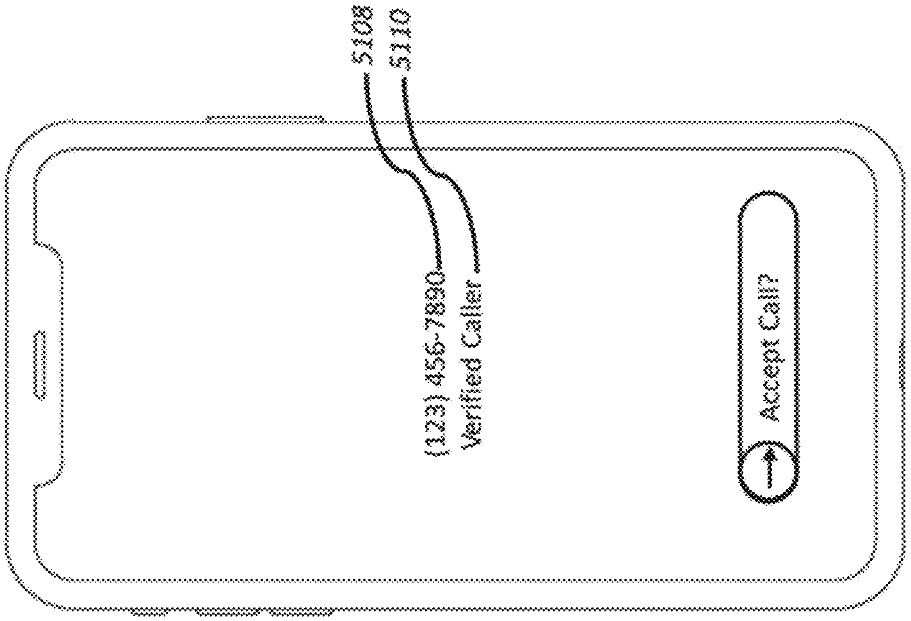
FIG. 57 illustrates an embodiment of an incoming call presented on a screen of a target recipient device.

In embodiments, a result of the expected call determination 5306 may lead to expected call-related actions optionally including, without limitation, presenting 5310 some portion of the SCCMC data structure 5314 for the specific call, such as caller ID call code-based content 5310 and the like, to the target recipient device user, such as on a lock screen of the device, on an interface of a call app of the device, on an interface of a call verifier all of the device, and the like. The information presented, which may include a portion of the data structure 5314 may be determined by, for example using the caller ID of the incoming call 5304 to identify an entry in the data structure 5314. While many options exist for display for an expected incoming call 5304, FIG. 46 herein depicts one such exemplary option of presenting call content for an expected incoming call from a verified business 4602. Another exemplary option is depicted in FIG. 57 herein. An additional and/or optional expected call-related action may include signaling 5308 to the architecture 5302 to update call status 5116 in the corresponding call record 5118 and the like. An exemplary updated call status may include without limitation, "call received", "call declined", "call accepted", "call attempted" and the like. While not required for performance of the method described in association with FIG. 53, an architecture 5302 may use the updated call status for a range of administrative purposes, including without limitation notifying the caller, invalidating the call record 5118, removing the call record 5118 from the registered caller data structure 5106, and the like. Other actions may include statistics generation, data aggregation, and the like.

Figure 54:
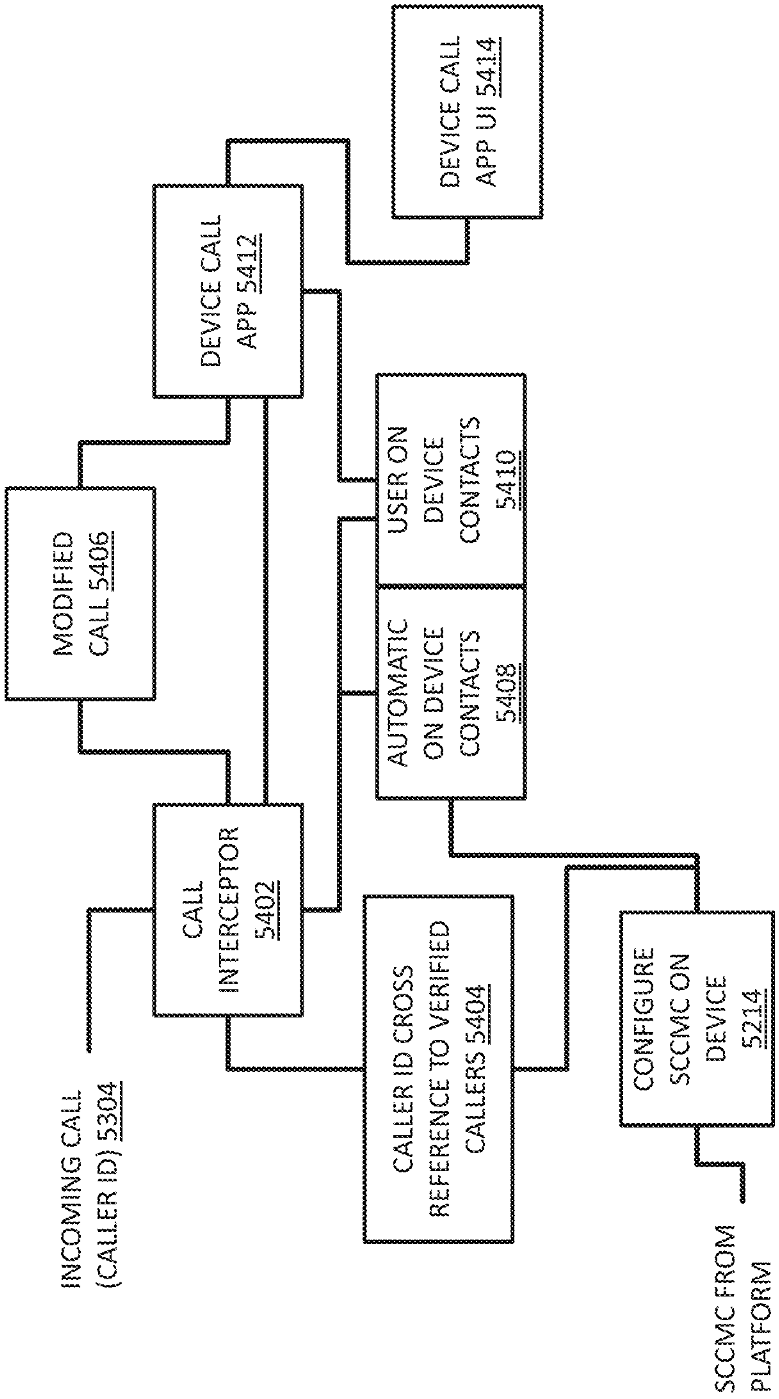
FIG. 54 illustrates an exemplary process associated with an unknown caller or unexpected call.

When a call is not expected (follows the "NO" path out of decision 5306), an unknown caller/unexpected call action or actions 5312 may be take. FIG. 54 depicts an exemplary process associated with an unknown caller/unexpected call.

Referring to FIG. 54 an exemplary flow for handling, among other things unknown callers on a target recipient device is depicted. A target recipient device, such as a personal mobile phone and the like may be configured with an architecture app, such as a call interceptor app 5402 that may operate cooperatively with a communication/calling/phone app 5412 on the device, such as a native phone app or a third-party phone app and the like to handle at least incoming calls. In embodiments, functionality of a call interceptor app 5402 may be incorporated into a device call receiving app 5412. Calls or other communications that are received by the device, such as an incoming call 5304 may be directed to the call interceptor app 5402 for handling, among other things unknown callers and/or unexpected calls and the like. A call interceptor app 5402 may distinguish between unknown callers and/or unexpected calls by referencing various caller ID cross reference sources available to the target recipient device. Sources of caller ID cross reference 5404 may be configured on the device individually. They may also subsume and/or be associated with an on-device contacts list 5410, a list of verified callers that may be embodied as automatically added on-device contacts 5408, an on-device SCCMC data structure, such as data structure 5314 described herein, and the like.

Sources of caller ID cross reference may be based on several different sources that may facilitate identifying a caller ID. As described herein, an SCCMC data structure that may reference caller ID information, content to be displayed on a recipient device screen in response to the caller making a call that is identified by the caller ID to the recipient device, meta data that may be descriptive of the caller, a call from the caller, use of the content, and the like. A version of a SCCMC data structure may be configured 5214 on the target recipient device. Such a configuring 5214 may take a few forms. Exemplary forms are depicted in FIG. 54. One exemplary form is a caller ID cross reference 5404 that may be used to aid the call interceptor 5402 with its duty of determining whether a call should be presented to the user of the device. This form may include at least a list of caller IDs that, based on the configuring 5214 are known for the purposes of handling the call. The configuring 5214 may also update contacts on the target device. In embodiments, users of most contemporary mobile device operating systems can instruct the device to perform functions, such as automatically updating contacts when new information about the contact is learned, such as when a caller who has registered with the architecture 100 indicates a specific recipient to receive at least a portion of SCCMC data structure so that, for example, a next call by the caller can be identified and presented to the user of the target recipient device. These automatic on-device contacts 5408 may be relied upon by the call interceptor 5404 and/or the device call app 5412 when determining if a caller is unknown or a call is unexpected. Existing on-device contacts 5410 may also provide a source of caller ID cross reference for an incoming call.

The caller interceptor app 5402 or the like may receive an incoming call 5304 and may rely on the caller ID cross reference 5404 to update a caller ID of the incoming call 5304 to generate a modified call 5406 that may include not only the caller's call originating phone number, but it may also include any relevant content sourced for the caller from the configuring of SCCMCs on the device. Several examples of SCCMC display and/or audio content that may be configured with an incoming call are described herein. In a simplified example, a modified call may include a caller ID of the caller and a text string that identifies the caller, such as a caller business name, a caller call purpose, a note that the caller is a verified caller, and the like. In the exemplary embodiment of FIG. 54, an on-device call app 5412 may receive the call with the optionally modified caller ID data and based thereon, present the call in a device call app user interface 5414, which may include a lockscreen interface. In the examples of FIG. 54, a call interceptor app 5402 may provide features beyond that of an on-device call app 5412 that may rely only on presence of an on-device contact 5410 that includes the caller ID of the incoming call. Additional call interceptor app-like capabilities are described herein for embodiments including unknown caller handler app 5504.

In the methods and systems described herein for handling unknown or not-well-known callers and unexpected calls, an audio message may be presented to the unknown caller contemporaneously with a call to be placed by the caller to a recipient. The caller may respond to the audio message in a variety of ways including accepting a SCCMC data structure that is prepared contemporaneously with the call from the unknown caller, take a registration action with the architecture 100, respond within the intercepted call to the audio message, and the like. An embodiment of communicating, such as through audio messages with a caller within a call that is placed by the caller to a recipient is depicted in FIG. 55 and described herein.

Figure 55:
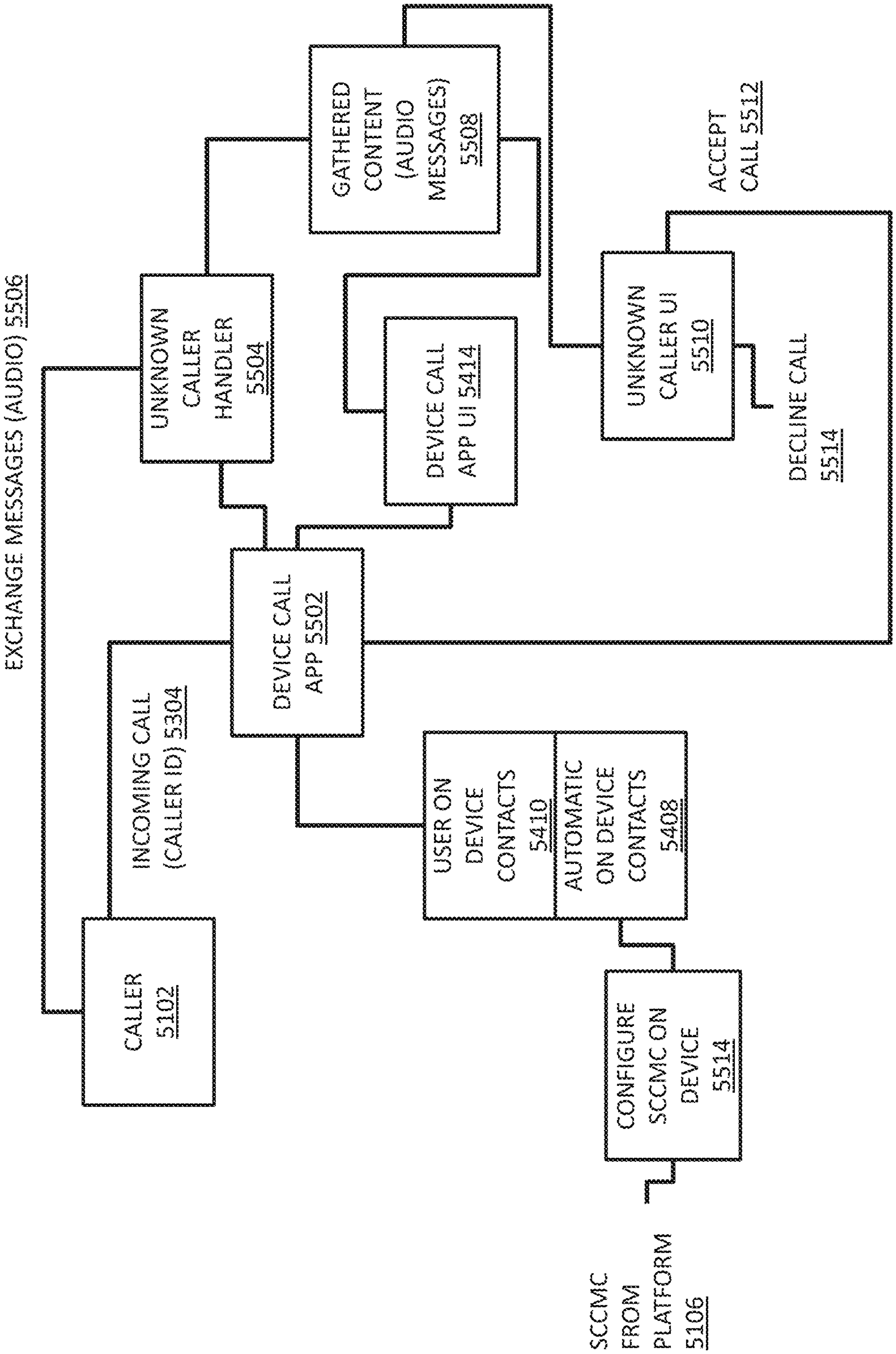
FIG. 55 illustrates communicating with a caller via audio messaging.

Referring to FIG. 55, a caller 5102 may place an incoming call 5304 to a target recipient device that may receive the incoming call with a device call app 5502. A common function for a device call app 5502 is to determine if the incoming call is from a known caller. This may include attempting to match an originating phone number of the caller that may be presented in the caller ID content associated with the incoming call to a set of user contacts, such as on-device user contacts 5410. As described herein for FIG. 54, an optional step of configuring 5214 an SCCMC on a target recipient device can be based on, for example, information provided by the caller during registration with the architecture 100. The methods and systems described herein further teach many other sources of SCCMC content for a caller, including a caller who registers with the architecture 100. Any source of SCCMC content for a caller may be suitable for user in embodiments. The device call app 5502 may attempt to match the call originating number found in the caller ID of the incoming call 5304 with not only the user contacts 5410, but also with the automatically configured on-device contacts 5408. In embodiments, SCCMC data structures may, through a configuring step 5214, be adapted during the configuring to conform with on-device contacts form, structure, content constraints, and the like, thereby allowing SCCMC-based content (e.g., for callers who have registered with the architecture 100 and the like) to be available to a device call app 5502, such as a native call app, a third-party call app and the like. For calls that are determined by the call app 5502 to be from a known caller, relevant information, which may be as simple as the caller ID from the incoming call may be presented in a call device app user interface 5414.

Calls that are not identified as being from unknown callers, not-well-known callers, unexpected calls (e.g., from a known caller but due to other call-specific conditions, such as a call after business hours and the like, are not expected), either through the device call app 5502 process describe herein or another process, such as the call interceptor 5402 process for the embodiments detailed by FIG. 54, may be handled by an unknown call handler process 5504. An unknown caller app 5504 may be a distinct on-device app, a function of a device call app 5502 (e.g., a function that may be added to a call device app 5502 via an update/upgrade process and/or an add-on process and the like) or a service (e.g., via an API call and the like) that is accessible to, for example a device call app 5502 and the like.

In addition to using the caller ID information to gather information about the caller from various sources, an unknown caller handler 5504 may capture content directly from the caller within the call via audio messages exchanged during the call. The unknown caller handler 5504 may handle calls by, as described herein for embodiments, such those depicted at least in part by FIG. 45 that may include, as described herein communicating with the caller via audio messages with the caller contemporaneously with handling the call on the target recipient device, including without limitation seeking instructions from a user of the target recipient device regarding accepting the call. Examples of seeking instructions from the user include presenting to the user of the target recipient device the audio messages sent to the caller and a caller's response thereto. In embodiments, presenting may include activating a speaker or audio playback interface of the device (e.g., a headset port, a Bluetooth port and the like) so that the audio of the intercepted call is available for the device user to hear. In embodiments, the audio of the call, which may include the audio message(s) sent to the caller, may be forwarded through the device call app user interface 5414. In embodiments, the audio of the call, which may, as described herein be presented to the user via a different interface, such as a voice mail interface and the like. In the embodiment of FIG. 55, the audio message(s) of the call may be gathered into a gathered call content data structure and made available to a user via an unknown caller user interface 5510 of the device. The unknown caller user interface 5510 may be a feature of the device call app 5414 through which a user of the device may choose to accept the call 5512 or decline the call 5514. In embodiments, the unknown caller user interface 5510 may be an undeployed or later deployed feature of the device call app 5414. A user action to accept the call 5512 may trigger a call acceptance function of, for example, a device call app 5502 to connect the caller with the device user. Possible actions to take in response to a device user declining such a call 5514 are described herein and may include capturing the audio messages as a voice mail message and the like.

In embodiments, unknown callers, not-well-known callers, and unexpected calls may by handled by a process depicted in FIG. 45 here that includes a step of gathering content based on the caller ID from internal architecture and external sources. Such external sources, as describe herein for the embodiments of FIG. 45 and FIG. 55 include audio of the call itself. Methods for utilizing this gathered information to determine a perspective of the unknown-like caller that is depicted in FIG. 56 is now described.

Figure 56:
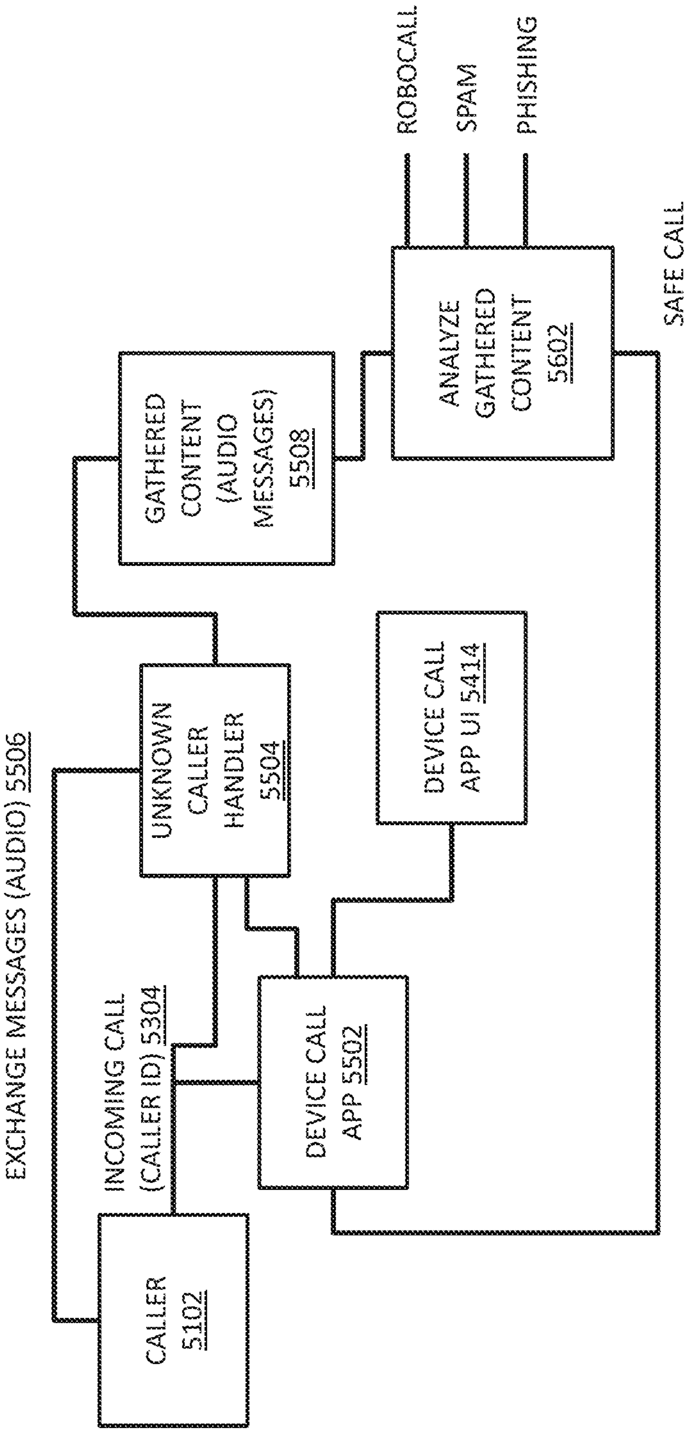
FIG. 56 illustrates techniques for determining a perspective of an unknown caller or unexpected call.

Referring to FIG. 56, a caller 5102 may initiate a call 5304 that may be deemed to be from an unknown caller, from a not-well-known caller, or may be an unexpected call. The unknown caller handler 5504 may, as described herein for the embodiments of FIG. 55 gather content associated with the caller including audio content of the call, such as audio messages and the like. In embodiments, such gathered content may be analyzed by a call content analyzer 5602. In embodiments, a call content analyzer 5602 may analyze a range of content types, such as audio, video, text, images and the like. In an example, gathered audio content of a call from an unknown caller may be analyzed by speech processing, including natural language processing and other types of speech processing, including content timing, content matching, and the like.

In embodiments, such analyses may facilitate determining if a call is from a robocaller. These determinations may be based on detecting standard responses to an audio message delivered to the caller by the unknown caller handler 5504, such as "Is Nancy There". These determinations may also be based on a response to an audio message being inconsistent with an expected response and the like. These determinations may further be based on voice signatures of the responses. These examples of analyzing audio content of a call handled by an unknown caller handler 5504 may include any other types of audio content analyses, and the like.

In embodiments, these analyses may facilitate determining whether a call is a spam-type call using such analyses and techniques like those for robocall detection, even if the caller is not a robot.

In embodiments, these analyses and techniques may further facilitate determining whether a call is a phishing type call based, for example, on clues detected in the audio, such as keywords, key phrases and the like.

In embodiments, these analyses and techniques may be shown to produce a perspective of the caller, including that the caller, although unknown is not likely to be any of a robocaller, spammer, or phishing caller and therefore may be deemed to potentially be a safe caller. In embodiments, calls from potentially safe callers may be handed off to a device call app 5502 for further processing, including by the methods and systems described herein for incoming calls 5304.

FIG. 57 depicts an incoming call 5304 presented in a user interface screen of a target recipient device, which may be a lockscreen of a target recipient device. The incoming call 5304 may be processed by SCCMC-based architecture methods and systems, such as those described herein. In embodiments, the user interface screen of FIG. 57 depicts presenting a caller ID 5108 and information derived from SCCMC data structures, such as a caller identifier, a caller status (e.g., a verified caller), and the like.

In embodiments, a business system that may facilitate performing a range of workflows may include a workflow that involves contact with a customer. A customer contact workflow may cover a range of contact outcomes, including outcomes where contact is attempted but not executed, such as if a customer does not answer the call. Methods and systems for sender controlled media (SCM) as described herein may be accessed by and/or integrated with or into a business system to, for example, enrich customer contact events. SCM method and systems as described herein may include configuring content for a call recipient as well as for a call initiator (caller). Techniques for enabling a business system to leverage the capabilities of an SCM platform, many of which are described herein, may include using computer interfaces, such as application programming interfaces (APIs) and the like to exchange content, descriptive data (e.g., metadata), workflow controls, customer identification data (e.g., a phone number of a customer to be called), and the like between the business system and the platform. Business systems may also access the capabilities of an SCM platform through a service architecture that may include the SCM platform publishing access to capabilities as services, such as web services and the like. As an example, an SCM platform may have a caller information service that provides information known to the platform about a customer of the business system using information provided by the business systems, such as the customer's phone number. When a customer is known to the SCM platform, and further has opted in to accept SCM content for use when a caller associated with the SCM content calls the customer, greater depth of information can be used by the SCM platform and/or the business application to enrich the customer contact activity in the relevant workflow.

In an exemplary scenario, a business system and an SCM platform entity may act collaboratively, such as by interacting via the techniques described herein and elsewhere to inform the business application about the customer, including for example, presenting customer information to a caller initiating the customer contact action. In the scenario, the SCM platform may also receive information descriptive of the customer and, dependent on an existing relationship between the customer and the SCM platform, enrich the customer's contact experience through the SCM visual caller ID and other capabilities of an SCM platform as described herein.

A business system may be configured to execute a customer contact workflow. The workflow may generally be supportive of contact with any type of customer of the business, such as an existing customer, a former customer, a target prospect, a not well known customer (prospect for example), and the like. In embodiments, the type of customer, which may also be part of an understanding of a relationship between the customer and the business, may influence aspects of the contact event, such as, without limitation, content being presented to the business representative making the contact and/or content associated with the contact event and with a contact device (e.g., a mobile phone of the customer) being presented to the customer. The workflow may facilitate control and/or operate collaboratively with portions of the business application for setting up a contact activity, such as gathering information known to the business application about the customer. This information, which may extend beyond mere contact specifics (name, phone number, e-mail, and the like) to include a wide range of other details, such as business history, related customers/entities, and the like may be used by functions of the business system to configure databases, display screens, optional data in scripts, and the like in advance of placing the call. This and other information about the customer, the business, context of an upcoming call, public information (e.g., business profile of the customer, business and/or personal networking profile and the like) may also be leveraged among the business system and the SCM platform to enrich the customer contact experience, such as to present relevant and contextual content on a dialer application of a phone screen of a business caller making the contact and other relevant and contextual information on a call receiving function (also called a dialer app generally) of the customer. The methods and systems for connecting an SCM platform with a call receiving function of a target recipient device are described herein variously.

Various approaches for configuring aspects of the business system and associated equipment, such as a display for a business representative making the contact, are contemplated. Exemplary, non-limiting scenarios are presented here.

In a first scenario, a business application operating and/or being operated by the workflow may prepare for a customer contact event at a step within the workflow prior to the contact event step by reaching out to an SCM platform via an API or other interface or by accessing an SCM service, such as to gather content options for presenting to at least one of a caller and a recipient of the customer contact action. In this first scenario, the business application may reach out to the SCM platform by registering the upcoming contact event with the platform. The business application may send customer identifying information, contact purpose information, merchant content channel identification information, contact context (e.g., time/date planned for the contact action, type of contact—call, text, etc.), and the like to the platform. Other options for reaching out to the SCM platform may include performing a pseudo-call that the SCM platform responds to (e.g., due to the SCM platform using its call interceptor capability) by providing to the business system in response to the pseudo-call, information that the SCM platform would use to determine a type and form of content to be presented to a customer for whom an actual version of the call would be intended. Information such as caller identification information, caller instructions to the SCM platform regarding delivery of SCM content, call receiving preferences (e.g., ignore calls from unknown callers, ignore calls that are deemed not worth connecting based on ratings from other customers and the like) may be included. In embodiments, a pseudo-call may be a call placed along with a call purpose code that signifies the call as a data gathering event rather than an actual call for connecting.

In this first scenario, information returned from the SCM platform, which optionally may be accessible through a link returned rather than a data structure that holds the information, may be processed by workflow contact event step setup algorithms, which may include giving a user of the business application the option of selecting among content options and/or confirming content to be sent to the customer as part of the contact activity. A user of the business system interacting with the workflow setup activities may be presented with one or more options of content to be presented to the customer, such as visual and/or audio content to be presented at the start of the contact to, for example, provide the customer with information about the call. Once the content to be presented to the customer is selected and/or confirmed through the business application (e.g., through exchanges between the business application and the SCM platform using one or more APIs and the like), the SCM platform may interact with an SCM platform mobile application of the customer's mobile phone using the methods and systems herein for configuring a mobile phone to have access to the selected/confirmed SCM data structures. When the workflow is activated to perform the customer contact for the specific customer, the business application may initiate contact with the customer (e.g., place a phone call to the customer).

If the customer has established a relationship with the SCM platform, using the methods and systems described herein for opting in to take advantage of the SCM platform capabilities, including without limitation displaying sender-controlled media content on a lockscreen of the customer, the selected/confirmed SCM content will appear on the customer's device display screen. If the customer has not established a relationship with the SCM platform, the universal caller ID system may be leveraged by including in the outgoing call information that triggers the caller ID system to present at least a name and number of the merchant who initiated the contact.

This first scenario may also include communicating among interfaces to the business application, the SCM platform, and an outgoing call/contact device of a merchant representative performing or taking responsibility for contacting the customer. Information available to the business application, including any information retrieved through the SCM platform about the customer may be relied upon to configure SCM content to be presented in a display screen of a dialer application on the outgoing call/contact device. In embodiments, if the outgoing contact/call device is a mobile phone, such as a mobile phone in use by the person making the contact, then the methods and systems of SCM content presentation on a dialer screen (optionally a lockscreen) of an outgoing call as described herein may apply. These methods and systems may be adapted however to account for business system aspects, such as a business system may automatically and optionally dynamically identify a mobile phone to be used for the outgoing call. This added layer of redirection may require the outgoing device SCM content to be delivered to a mobile phone that may have a different incoming phone number than the phone number designated in the caller ID for the outgoing call. Fundamentally, the methods and systems for presenting content on an outgoing call device remains the same; just the device may be dynamically defined at call time. In embodiments, an outgoing call device may effectively be a computer terminal that is connected to a call system of the merchant. In such embodiments, the outgoing device display screen content may be provided by the SCM platform to the business application, such as through one or more computer interfaces, such as the APIs and the like that may be adapted for such exchange of information. The business application that receives the SCM content, data structure, or link thereto may adapt at least a visual content portion thereof as needed to properly display it on the outgoing call device screen.

In embodiments, the SCM platform, or at least portions thereof may be integrated with or into the business system. As an example, customer status and related content collection and determination features may be integrated, at least in part, with the business application. In such an example, a customer status function may be adapted to provide merchant-specific information about merchant customers to the business application. This adapted function may further limit access by the business system to only specific customers. This adaptation may be done on an instance of the relevant portion of the SCM platform that is dedicated to operate for the merchant, such as a callable function within the business system. Alternatively, this adaptation may be effected through an API of the SCM platform that is configured to provide access to merchant-specific customer data and to perform a subset of platform services on that data. The API may be integrated into or with the business application, thereby forming a dedicated, merchant-specific interface to the SCM platform. In embodiments, many such APIs may be configured so that individual business systems (e.g., for distinct merchants, or business operations of a single merchant and the like) may each have access to a dedicated merchant-specific version of the SCM platform.

In embodiments, a second scenario in which a business application may operate a workflow that may include a contact event/step may include preconfiguring customer-specific workflow instances that may be activated by the business application to support a range of operating models, such as single threaded/single contact models, multiple contactor dedicated models that may include assigning a set of preconfigured workflow instances to each of a plurality of contactors (essentially a plurality of contactor-specific workflow queues), multiple contactor distributed models that may include having a central set of preconfigured workflow instances that are served to contactors based on an availability-type model, and the like. This second scenario may beneficially leverage the features of an SCM platform or service in a batch-type mode that could be time-differentiated from the actual contact events. An example of this second scenario may involve a call campaign to reach out to existing customers about their experiences with a service, or a call campaign to contact prior donors ahead of an annual donor event, such as the Pan Mass Challenge where many donors make donations each year, but are contacted to do so rather than merely establishing recurring donations. An aspect of the methods and systems described herein for activating and interacting with sender content media through a recipient call receiving (e.g., dialer app) function of a smart phone involves ensuring that the recipient dialer app of the target recipient smart phone has access to the necessary visual content to be rendered on a display screen of the recipient smart phone device. By processing a batch of contact events, phone calls in this example, the SCM platform can proactively ensure that SCM content for the call campaign is made available to the recipient devices well ahead of any call in the campaign being made.

A set of services may be configured to perform functions to enable such pre-configuration without requiring the workflow of the business application to be activated until the call campaign is performed. In an example, a service may be configured to access the list of customers, sharing at least a customer identifier, such as a phone number, email, or another contact identifier with the SCM platform. In embodiments, the SCM platform may further be provided with call campaign-specific metadata, such as a link to a business-specific channel of SCM content or the like, that may facilitate the SCM platform either identifying existing SCM content (e.g., from the business-specific channel) or to generate new SCM content data structures (e.g., based on specific content provided by the business and/or content gathered based on the shared metadata and the like) to be configured and delivered to the customer SCM-compatible dialer app on the individual customer smart phones. In an example, a content channel may include a range of visual content associated with the call campaign. The SCM content items in the range may be differentiated based on customer data, such as information descriptive of a customer relationship with the business (e.g., recent new customer, long term customer, top 10 customer, free-service customer, paying subscriber-customer, and the like). The SCM platform may use the customer and call campaign information to select one of the SCM content items in the channel for each customer and communicate with the customer's smart phone, such as over a network such as the Internet or other channel, to ensure that the dialer app on the customer's smart phone has access to the selected SCM content item. The set of services may record an encoding or indicator of the selected SCM content item in the call campaign customer data set so that it is available to the business application during workflow execution for a contact event.

In embodiments, a service in the set of services, may coordinate activity between the business application and the SCM platform to facilitate the business application having access to source content to be displayed on a screen of an outgoing call device for each outgoing call during the customer contact activities. In embodiments, methods and systems of an SCM platform described herein that generate and coordinate presentation of content on a call initiator's dialer app screen may be relied upon, such as during the pre-configuration of a set of call events for a customer contact activity, such as a call campaign, to generate at least a set of data, optionally referred to herein as an SCM data set that would be used by an adapted dialer app of an outgoing customer contact device to present contact event relevant data to a business representative making the customer contact. The set of data for the screen of the contact representative may be stored so that it is accessible to the SCM platform, to the business application, to the dialer app of the representative's contact device, to at least one of the set of services for facilitating access thereto by the business application and/or the dialer app of the business representative.

The SCM platform may rely on context of a contact event to determine at least a portion of content for use by the dialer app of the contact representative. In embodiments, the business application and the SCM platform may collaborate, such as through a service of the set of services and the like on the generation of the source content. As an example, the business application may contribute business-specific and/or customer contact event-specific content to be included in the data set, such as by providing the content directly or by indicating an identifier of the content, such as a business-specific content channel identifier and the like that the SCM platform (again optionally through a service of the set of services) may have access to.

In this second scenario, during a call campaign or similar customer contact business activity that relies on SCM-type content to facilitate contact with customers, a business application may access a preconfigured customer contact database that may be adapted or created for use during the contact activity. The business application may retrieve a customer record and initially validate that the record indicates that relevant SCM content for the contact event has been made available (or at least attempted to be made available) to the customer's target contact/call receiving device, such as by checking that the set of services used to preconfigure the customer data set for the contact activity has stored an encoding/indicator of the selected SCM content. Upon validation, such as if the selected SCM content field of the customer data record is not null, the business application may activate a contact event by selecting a contactor/caller (e.g., a business representative or the like) to handle the customer contact. This may include delivering, or making available, relevant source content to be displayed on a dialer app or other screen of a contact originating computing device (e.g., a display screen of a cell phone of the business representative, a display screen of a computer through which the contact is being performed, and the like). In an example, a business representative may use a computer that displays business application and contact event information to the representative as a step in a contact activity workflow. The business representative may have a headset attached to the computer through which she can communicate with the customer. Upon review of the displayed source information (e.g., customer name, relationship to the business, call objective, and the like), the representative may initiate the customer contact, such as by placing a call to the customer.

In another example, that makes use of the call interception methods and systems described herein, the business application, guided by the customer contact event workflow, may cause a call to be made from the representative's calling device to the customer. The call interceptor, such as a service of the SCM platform and the like, may provide information about the call, such as the caller ID of the caller and the customer phone number to the SCM platform. The SCM platform may use the caller ID to determine (e.g., select preconfigured content that may be provided to the SCM platform by the business application) source content and provide it for display on the screen of the representative (e.g., by use of the methods and systems for displaying content on a caller's dialer app screen described herein). The SCM platform may use the caller ID and the customer phone number to validate that the SCM content previously identified as part of the call campaign batch setup process for rendering by the customer's dialer app on the lockscreen display has been successfully accepted by the customer's call receiving device, and take necessary steps to ensure that the content is accessible to the dialer app of the customer's call receiving device. The SCM platform may, optionally based on an action taken by the representative after viewing the source content, attempt to complete the call. In embodiments, a channel may be established between the business application and the SCM platform, such as through a service of the set of services, through which call-specific information may be communicated about a call being made. Information about the call may be delivered over this channel, for example, when the business application configures the business representative's outgoing contact screen. The information may be useful to the SCM platform, and or to a call interceptor as may be implemented in determining what actions to take. In embodiments, the information may include a call code that may be used by the interceptor and/or the SCM platform to facilitate identifying SCM customer and/or caller content for use during the call.

In addition to exchanges between the representative and the customer (e.g., a verbal dialog), the methods and systems for SCM content rendering herein support rendering interactive content. Actions made by a customer, for example, in response to presented content in the dialer app/lockscreen interface, such as declining the call, and the like may be passed by the SCM platform to the business application, such as through one of the set of services that facilitates coordinating activities of a business application and an SCM platform as described herein. These actions may be delivered, such as through an API of the business application in real time or near real time for use by the business application control logic to adjust the workflow, and optionally to provide the business representative with additional ways of addressing the contact event. In an example, a customer may observe information about the pending call from the business and choose an entry in the content to decline the call. This decline selection may be routed back to the business representative who may choose to adjust the information presented on the customer's screen to include an incentive for answering the call. Optionally, this decline selection may be automatically responded to with the answering call incentive content. In embodiments, the SCM platform may automatically provide the answering call incentive content. In embodiments, the dialer app or equivalent operating on the customer's smart phone may automatically provide the answering call incentive content. Also, the business application, through the various services and/or APIs described herein may cause the answering call incentive content to be presented. Customer actions, generally considered contact recipient actions, made in the SCM content user interface (e.g., the dialer app of the customer's phone, the screen lock adapted app of the customer's phone and the like) may occur before a call is accepted, during a call, and after a call has concluded. Independent of when the customer action occurs, it can be communicated to the business application where it can be used for adjusting customer display content, adjusting caller content (e.g., adjust a script), adjusting workflow actions, and the like.

In the scenarios, above and elsewhere herein, services, sets of services and the like may be used as exemplary embodiments; however, other techniques for communicating between and among business applications, SCM platforms and the like may be similarly employed, such as by use of Application Programming Interfaces (APIs) and the like. Similarly, business applications, services, SCM platforms and the like may be adapted through use of a set of business application developer tools, such as APIs, SDKs, and the like to facilitate establishing means for communicating contact event and related information.

In embodiments, such developer tools may facilitate adapting a business system (e.g., a data processing workflow and the like) to pull business-specific content from a content channel, associate the content with a customer contact event, and cause display, optionally through interfaces with the SCM platform, of the SCM content on a customer's contact device, typically a smart phone. Developer tools may facilitate generating business-specific version of a generic SCM content handling app on a mobile device, so that there could be many business-specific versions of the generic SCM content handling mobile device app on a mobile device. This would enable the SCM content from a business to be presented to its corresponding mobile app (e.g., a business-specific mobile app), not to a generic SCCMC handling app.

A dialer app of a business device (e.g., smart phone) can be adapted by the developer tools to communicate (outside of the call process) with the SCM platform (e.g., via an API of the SCM platform) to determine if SCM content suitable for use with the pending call exists and activate it if it does. Activation may be conditional and may occur before the call is dialed, while the call is in progress, and after the call is complete. The dialer app may include an API that may be configured to send a code (e.g., SCM-specific content identifier) to the SCM platform API when the call is initiated. The code may be used to match to metadata that characterizes business-specific SCM content that is accessible to the SCM platform.

In embodiments, a dialer app of a business device can be adapted by the developer tools to establish a side channel of communication with an SCM platform through which the call is about to be placed. Developer tools can be used to generate this side channel and determine how communication through it works to configure and activate SCM content for a specific call—e.g., based on a code or codes provided to the SCM platform that are linked to the call being processed through the platform. This may address the integration of SCM content handling in a business system and SCM content app interactions (business-specific).

Figure 58:
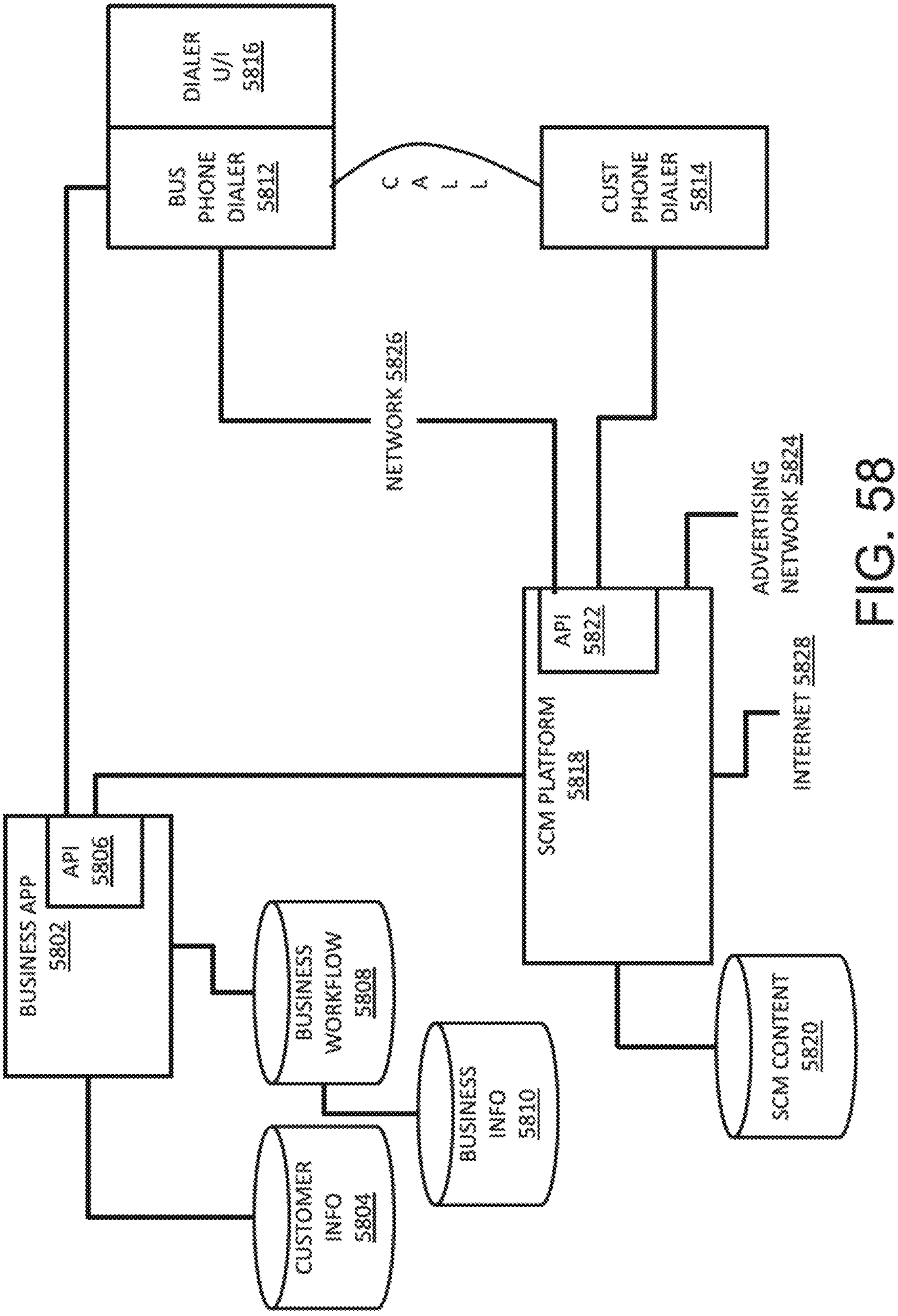
FIG. 58 illustrates an embodiment of an SCM platform operating with a business system.

Referring to FIG. 58, an exemplary embodiment of the methods and systems for use of an SCM platform with a business application is depicted. A business application 5802 may be configured to perform various business functions, including a business workflow 5808 that may include customer contact workflow activities. The business application 5802, optionally thorough the workflow 5808 may have access to business info 5810 and customer info 5804. The business application 5802 may, for example, execute a customer contact version of the workflow 5808 that may rely, at least in part, on the customer information 5804 (e.g., a customer contact data, such as a phone number and the like) and the business information 5810 to facilitate enriching customer contact events. The business application 5802 may further be configured with an interface, such as a business Application Programming Interface (API) 5806, for interfacing with other business elements, such as a Sender Controlled Media (SCM) platform 5818, a business phone dialer application 5812 and the like. The other business elements may communicate with the business application 5802 by complying with the interface requirements of the business API 5806. Likewise, the business application 5802 may communicate with, for example the SCM platform 5818 through the business API 5806 to exchange information regarding one or more customer contact events, such as an upcoming event, a prior event, and a currently active customer contact event.

A phone or other customer contact device (e.g., text messaging device and the like) may be configured with a dialer application 5812 that may facilitate incoming and outgoing contact, such as placing a call to a customer and the like. The business phone dialer application 5812 may interface with the business application 5802, optionally through the business API 5806 to access various business information items 5810, customer information 5804 and the like. In embodiments, the business application 5802, optionally through its business API 5806, may exchange customer-specific information (e.g., a phone number, name, relationship to the business, and the like) with the business phone, typically with the business phone dialer application 5812. The business phone dialer application 5812 may present information, such as call-specific information and the like through a dialer user interface 5816. The interface 5816 may further be used to receive device user (e.g., a business representative making a phone call to a customer) selections, such as selection of interactive icons for performing various functions associated with customer contact events (e.g., dialing a phone number, confirming receipt of customer information in the user interface 5816, and the like).

Further in the embodiments of FIG. 58, an SCM platform 5818 may be configured to communicate with the business application 5802 and to further communicate with one or more of a business phone dialer application 5812 and a customer phone dialer application 5814. In embodiments, communication among these elements may be over a network 5826, such as the Internet and the like. Like the business application 5802, the SCM platform 5818 may optionally include or have access to an SCM application programming interface 5822 that may optionally be used for communicating with the business phone dialer app 5812, the customer phone dialer app 5814, and the like. The SCM API 5822 may also be used to interface with the business application 5802, an advertising network 5824, and other networks, such as the Internet 5828. The SCM platform 5818 may also reference an SCM content data set 5820 that may include data, including visual content, that may be rendered for display to a device user by one or more of the dialer applications 5812 and 5814 in association with a call being placed between a business phone and a customer phone. In embodiments, the SCM content 5820 may include data sourced from a wide range of sources, including the Internet 5828, the advertising network 5824, the business application 5802 (and any sources to which that application has access, such as a business information data set 5810), and the like. Techniques for generating and curating SCM content 5820 are described elsewhere herein; all such techniques apply in the embodiments of FIG. 58.

The elements depicted in FIG. 58 may be created, adapted, deployed, modified, maintained, developed, and updated using the business application developer tools depicted in FIG. 50 and its accompanying description. In an example, the business API 5806 may be developed and deployed using the developer tools 5002 and the like. Functions, such as advertising network functions that may be accessible to, included with or integrated into the SCM platform, may be developed, deployed, maintained, etc. by a set of advertising tools 5004. Interfaces among elements in FIG. 58, such as SCM platform API 5822 may also be developed, deployed and maintained by the developer tools of FIG. 50. In an example, FIG. 50 depicts a version of the SCM platform API 5010 being impacted by at least one of the developer tools 5002 and the advertising tools 5004.

Figure 59:
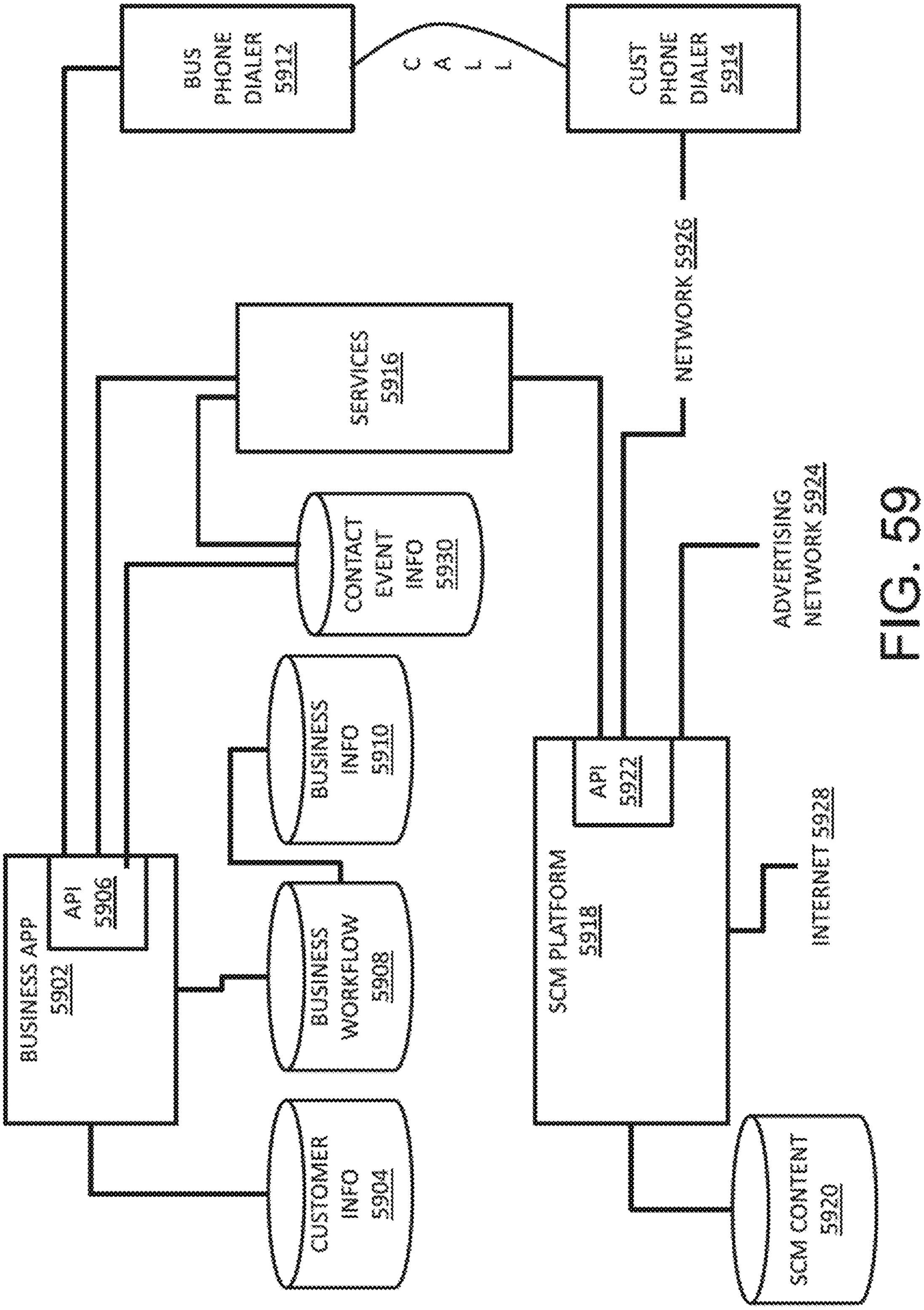
FIG. 59 illustrates an embodiment of an SCM platform operating through a set of services with a business application.

Referring to FIG. 59, an exemplary embodiment of the methods and systems for use of an SCM platform with a business application and a set of services is depicted. A business application 5902 may be configured to perform various business functions, including a business workflow 5908 that may include customer contact workflow activities. The business application 5902, optionally thorough the workflow 5908 may have access to business info 5910 and customer info 5904. The business application 5902 may, for example, execute a customer contact version of the workflow 5908 that may rely, at least in part, on the customer information 5904 (e.g., a customer contact data, such as a phone number and the like) and the business information 5910 to facilitate enriching customer contact events. The business application 5902 may further be configured with an interface, such as a business Application Programming Interface (API) 5906, for interfacing with a set of services 5916 that may further provide coordinated access to other business elements, such as a Sender Controlled Media (SCM) platform 5918. In embodiments, a business phone dialer application 5912 may communicate with the business application 5902, optionally through business API 5906. The set of services 5916 may communicate with the business application 5902 by complying with the interface requirements of the business API 5906. Likewise, the business application 5902 may communicate with, for example the SCM platform 5918 through the set of services 5916, such as to exchange information regarding one or more customer contact events, such as an upcoming event, a prior event, and a currently active customer contact event.

The set of services 5916 may be constructed to facilitate interoperation of the business application 5902 and the SCM platform 5918. In embodiments, at least one service of the set of services 5916 may provide for exchange of call information associated with execution of a customer contact workflow by the business application 5902. The set of services 5916 may ensure that activity on the business application 5902 that impacts or would benefit from interacting with the SCM platform 5918 is properly and timely communicated to the SCM platform 5918. Also, the set of services 5916 may ensure that activities occurring in the realm of the SCM platform 5918, such as interactions by a customer with SCM content that is managed by the SCM platform 5918 and presented on the device are provided to the business application 5902. In embodiments, the set of services 5916 may monitor such interactions and inform the business application 5902 when interactions that may impact aspects of execution of a workflow are detected, such as a customer declining to receive a phone call from the business. The set of services 5916 may also facilitate batched operations between the business application 5902 and the SCM platform 5918. A batch operation may include providing a set of customer identifiers (e.g., phone numbers, email addresses, messaging system handles, and the like) and call purpose information (e.g., a description or other metadata that indicates an objective or purpose for performing customer contact) from the business application 5902 to the SCM platform 5918 and returning SCM content data structures (or indications thereof, such as a SCM content data structure identifier) to the business application 5902. The set of services 5916 may also access a contact event information data structure 5930, that may optionally be configured by the business application 5902 with a set of customer identifiers for an upcoming contact event, such as a call campaign and the like. The set of services 5916 may update various fields for customer-specific records in the contact event data set 5930 to indicate status of the activities performed by the SCM platform 5918 associated with preparing for a contact event, such as a status of a customer identifier from the SCM platform's perspective. This customer status information may be useful to the business application 5902 in that a customer of the business that is unknown to the SCM platform 5918 may be treated differently than one that is known to the platform 5918 at least because SCM content intended for the customer may not be accessible by the customer's phone dialer application 5914. This may occur if a business customer has not opted in to using the SCM platform 5918 visual caller ID and other visual content services. A business application may adjust the contact event information 5930 to avoid placing a call to the customer until the customer has opted into the SCM platform services. In embodiments, the SCM platform 5918 services may be automatically enabled on a customer phone, (e.g., by downloading a customer phone dialer application 5914 adapted to interoperate with the SCM platform) when a customer becomes a customer of a business that uses the SCM platform 5918 services as described herein.

A phone or other customer contact device (e.g., text messaging device and the like) may be configured with a dialer application 5912 that may facilitate incoming and outgoing contact, such as placing a call to a customer and the like. The business phone dialer application 5912 may interface with the business application 5902, optionally through the business API 5906 to access various business information items 5910, customer information 5904 and the like. In embodiments, the business application 5902, optionally through its business API 5906, may exchange customer-specific information (e.g., a phone number, name, relationship to the business, and the like) with the business phone, typically with the business phone dialer application 5912. The business phone dialer application 5912 may present information, such as call-specific information and the like through a dialer user interface. The interface may further be used to receive device user (e.g., a business representative making a phone call to a customer) selections, such as selection of interactive icons for performing various functions associated with customer contact events (e.g., dialing a phone number, confirming receipt of customer information in the user interface, and the like).

Further in the embodiments of FIG. 59, an SCM platform 5918 may be configured to communicate with the business application 5902 and to further communicate with a customer phone dialer application 5914. The SCM platform 5918 may further be configured to communicate with a business phone dialer application 5912 via the services 5916 and further through the business application 5902. In embodiments, communication among these elements may be over a network 5926, such as the Internet and the like. Like the business application 5902, the SCM platform 5918 may optionally include or have access to an SCM application programming interface 5922 that may optionally be used for communicating with the set of services 5916, the customer phone dialer app 5914, and the like. The SCM API 5922 may also be used to interface with an advertising network 5924, and other networks, such as the Internet 5928. The SCM platform 5918 may also reference an SCM content data set 5920 that may include data, including visual content, that may be rendered for display to a device user by one or more of the dialer applications 5912 and 5914 in association with a call being placed between a business phone and a customer phone. In embodiments, the SCM content 5920 may include data sourced from a wide range of sources, including the Internet 5928, the advertising network 5924, and the business application 5902 via the set of services 5916, along with any sources to which the set of services 5916 or the business application 5902 has access, such as a business information data set 5910, and the like. Techniques for generating and curating SCM content 5920 are described elsewhere herein; all such techniques apply in the embodiments of FIG. 59.

Figure 60:
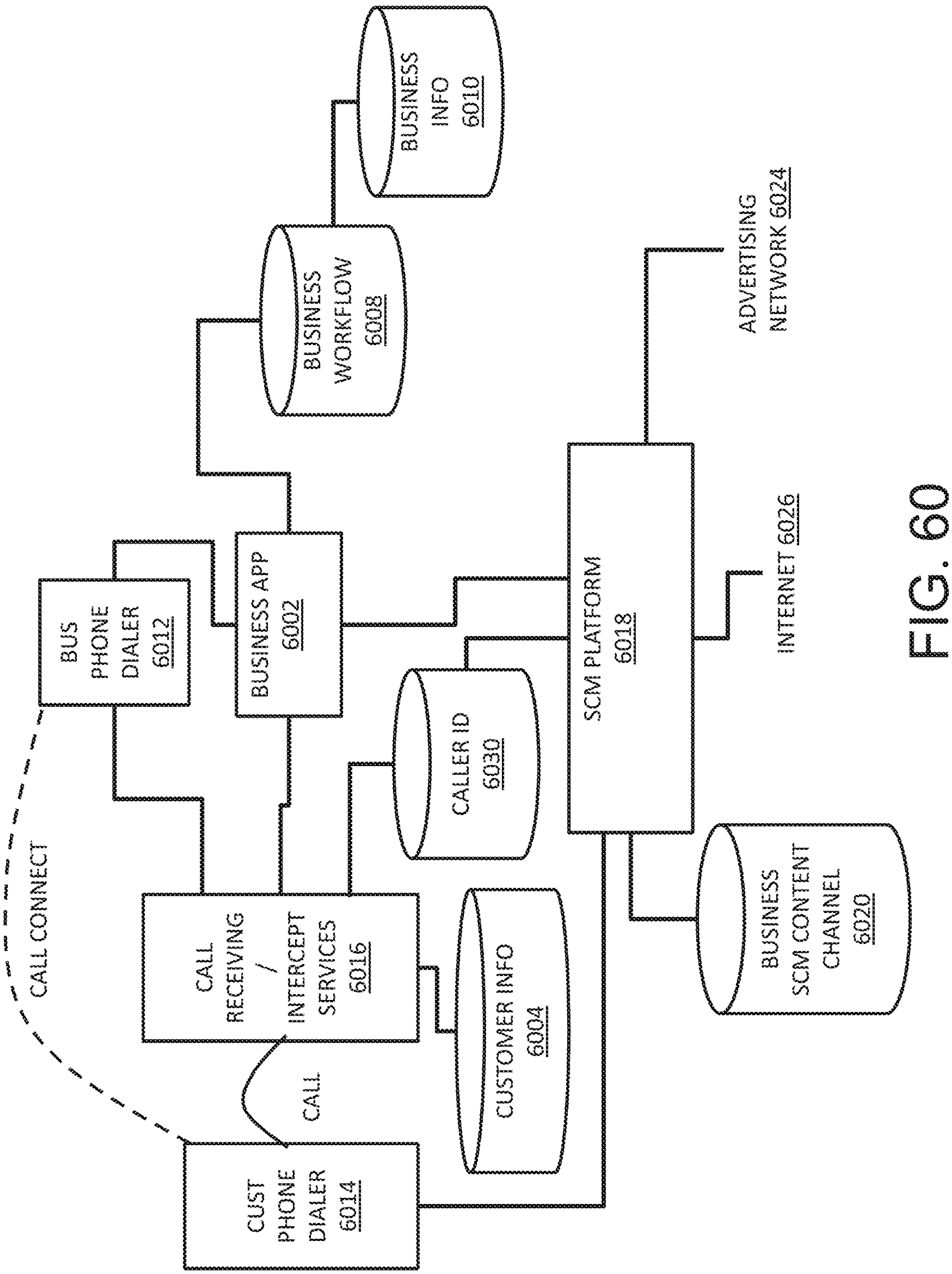
FIG. 60 illustrates an embodiment of an SCM platform operating with a call receiving interceptor and with a business application.

Referring to FIG. 60, an exemplary embodiment of the methods and systems for configuration of an SCM platform with a business application and call receiving/interrupt services is depicted. The embodiments of FIG. 60 may include, without being limited to scenarios in which a customer makes contact (e.g., places a call) to a business. In embodiments, a business application 6002 may be constructed and configured similarly to business applications 5802 and 5902 as described herein. Similarly, business workflow 6008 and business info 6010, along with corresponding business application interconnections may be like workflow 5808, 5908 and business information 5810 and 5910 of the embodiments of FIGS. 58 and 59. The business application 6002 may further interface with an SCM platform 6018, which may be similar in function to the SCM platform 5818 and 5918 of FIGS. 58 and 59. A customer phone dialer 6014 may initiate a call to a business, such as a business for which business application 6002 operates. The business may be configured with a call receiving/intercepting service 6016 that handles incoming calls prior to connecting them to a business representative. The call receiving/intercepting service 6016 may be integrated with or into business application 6002 or may be separate therefrom. Optionally the call receiving/intercepting service 6016 may be integrated with or into an SCM platform 6018 and the like. Without limiting the integration options, the call receiving/intercepting service 6016 may execute on a computing server that is distinct from a computing server on which any of the business application 6002, SCM platform 6018 or other functions of the embodiment of FIG. 60 execute.

In embodiments, the call receiving/intercepting service 6016 may not only intercept a call from a customer dialer app 6014, but may interact therewith, such as through exchange of audio messages and the like. The receiving/intercepting service 6016 may further interact with a business phone dialer app 6012, such as to facilitate connecting an intercepted call. The call receiving/intercepting services 6016 may, through interfacing with the business application 6002 and the SCM platform 6018 (optionally via a caller ID service 6030 and the like), facilitate enhancing a customer's call experience by informing the SCM platform 6018 of the caller ID 6030. Caller ID or other caller information, including call context and the like, may be provided to the business application 6002 in response to intercepting a call. In embodiments, the call receiving/intercepting service 6016 may have access to customer information 6004 of the business to perform functions, such as detecting known customers of the business (e.g., caller IDs that include a number or other information included in the caller ID that match to the customer information data set 6004), likely customers of the business (e.g., based on caller ID indicating a phone number of the caller being similar to a phone number of an existing customer, such as when only the last 4 digits of the number are different, indicating a different line of an existing customer). The business application 6002 may further communicate with the SCM platform 6018 so that a SCM content data structure, including visual content, may be generated and optionally provided to the customer's phone dialer application 6014. Methods and systems for presenting content on a dialer screen of a device from which a call has been placed are described elsewhere herein. These methods and systems may be applied in the embodiments of FIG. 60.

The call receiving/intercepting service 6016 may be configured with SCM handling features comparable to a dialer application as variously described herein. In embodiments, such a configured service 6016 may use the caller ID of the incoming call to identify an SCM data structure associated with the caller ID. The service 6016 may have direct access to SCM data structures that are identifiable by caller ID. Alternatively, the service 6016 may operate similarly to a recipient phone in the various embodiments described herein so that it retrieves, responsive to receiving the call, visual content, and optionally an SCM data structure or link thereto through cooperative operation of the SCM platform. That SCM data structure, or an identifier thereof, may include enhanced customer identification and handling data, including visual content that may be provided to the business application 6002 where it may be further enriched with business-specific information and applied to a workflow for handling the call. Optionally, at least a portion, such as the visual portion of the SCM data structure may be passed from the business application 6002 to a business phone dialer app 6012 to which the call is targeted for connection. This at least visual content portion of the SCM data structure may optionally be provided from the service 6016 to the business phone dialer app 6012 directly.

In an exemplary instance of operation of the system depicted in FIG. 60, a call destined for a business may be received by the call receiving/intercepting service 6016. The service 6016 may examine the caller ID of the call against business customer information 6004 and determine that the caller is a customer of the business. The receiving intercepting service 6016 may forward at least the caller ID 6030 to the SCM platform 6018. Optionally, other information may be provided to the SCM platform 6018, such as call context, caller-to-business relationship and the like.

The call receiving/intercepting service 6016 may provide a result of customer lookup in the customer information set 6004 to a business application 6002. In the current example, the caller ID 6030 of the intercepting call indicates that the caller is a customer of the business. The business application 6002 may configure a business phone dialer app 6012 to receive content from and interact with a business workflow 6008, an instance of which may be configured for the identified customer and executed through the business application 6002. The business application 6002 may, responsive to receiving the caller information from the service 6016, provide context regarding the caller and the business to the SCM platform 6018 for further enhancing the sourcing of visual and other SCM data structure content for use in association with the intercepted call.

The SCM platform 6018 may source visual content for the call based on the information provided to it, such as caller ID, targeted business ID, which may enable access to business-specific content controls, such as a business-specific SCM content channel 6020 and the like. The methods and systems described herein for sourcing visual content and the like for use in handling calls may be applied in this example. In embodiments, the SCM platform 6018 may access visual content within a business SCM content channel 6020 selected based, for example, on information provided to the platform 6018 by the business application 6002, and the like. The SCM platform 6018 may identify the customer as a user or subscriber of the SCM platform tools for rendering visual content on dialer screens/lockscreens of computing devices. The SCM platform 6018 may then communicate in near real time, such as over a network like the Internet and the like with the customer phone dialer app 6014 to facilitate presenting visual content pertinent to the caller, business, and optionally caller relationship with the business. In embodiments, the content may be configured with interactive elements that represent data elements of a workflow for the call that the business application 6002 may be prepared to execute. Interactions with those elements, such as a list of departments in the business for which the caller may be making the call, may facilitate routing of the intercepted call to a suitable customer service representative and selecting a suitable instance of the workflow 6008. The call receiving/intercepting service 6016 may remain in communication with the business application 6002 and the like while the SCM platform 6018 interacts with the calling customer.

Based on various context of the call, such as if the caller performs an interaction with content rendered for the caller that indicates the call should be connected, the call receiving/intercepting services 6016 may cause to be activated a connection between the caller and a business representative, such as a business representative operating a business phone on which call-relevant content is rendered and the like. The call receiving/intercepting services 6016 may continue to attend to the content of the call, such as by monitoring user interactions with rendered content, performing analysis of audio exchanges between the caller and the business representative and the like to provide additional context for the business application 6002 and/or the SCM platform 6018 to further enhance the caller experience with visual content. In an example, natural language processing of the audio exchanges may indicate the customer is discussing a product of the business, or an order made by the customer. This context may be converted into actionable data for the business application 6002 to adapt and/or control the workflow to better meet the customer's needs. In an example, the purpose or tone of the call can be determined and relied upon to adapt the visual content being presented to either the caller or the business representative or both. As the tone of a conversation is detected, the call receiving/intercepting service 6016 may provide a description of this tone to the SCM platform 6018 and/or to the business application 6002 for further contextual processing.

The various techniques described herein (e.g., APIs, intervening services, and the like) for interfacing among elements of such a system (e.g., among a business application, SCM platform, call receiving/intercepting service and the like) may be applied in this example to ensure ongoing, timely communication among the elements before, during and after the call.

Figure 61:
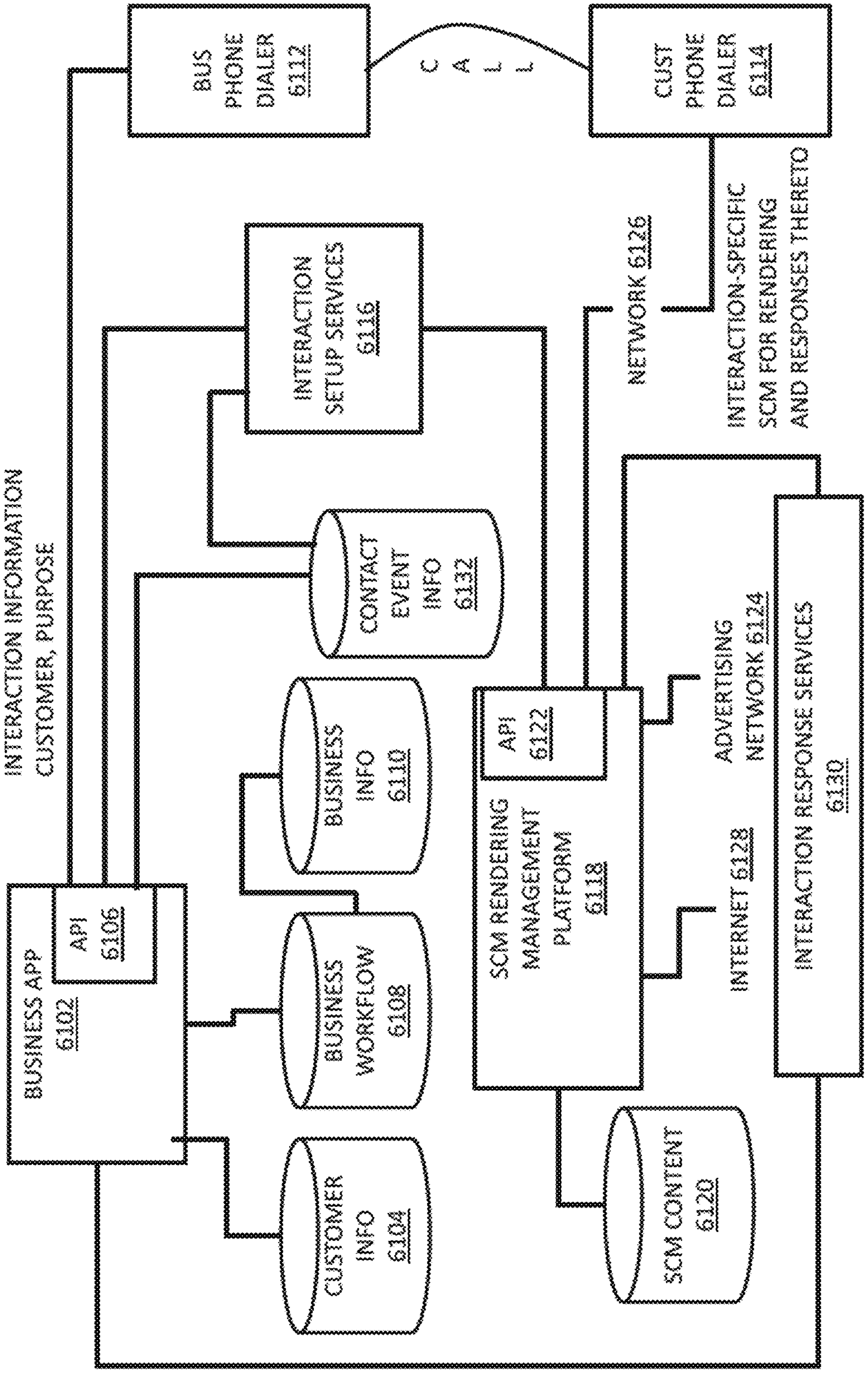
FIG. 61 illustrates an embodiment of an SCM platform operating through a set of interaction setup services and a set of interaction response services with a business application.

Referring to FIG. 61, alternate embodiments of the methods and systems for adapting and integrating business applications to operate with call visual content rendering management, such as those depicted in FIGS. 58, 59, and 60 is depicted. In the embodiments of FIG. 61, customer interaction setup services 6116 may facilitate interactions between a business application 6102 and an SCM Platform 6118, for example to setup customer contact events based on visual content and another call/caller/customer context. In embodiments, setup services 6116 may coordinate using various methods and systems of the SCM platform 6118 to configure visual content and access thereto prior to a call being made between a business representative (e.g., via a business phone dialer app 6112) and a customer (e.g., via a customer phone dialer app 6114). In embodiments, interaction setup services 6116 may facilitate data flows between the platform and business application, such as to enable the business application 6102 updating of an SCM content data structure 6120 that is accessible through the SCM platform 6118 and the like. Similarly, the interaction setup services may ensure that content for rendering on a business phone dialer app 6112 of the business is directed to the business application 6102 with relevant context, such as a business phone identifier and the like.

Referring again to FIG. 61, a business application 6102 may be configured to perform various business functions, including a business workflow 6108 that may include customer contact workflow activities. The business application 6102, optionally thorough the workflow 6108 may have access to business info 6110 and customer info 6104. The business application 6102 may, for example, execute a customer contact version of the workflow 6108 that may rely, at least in part, on the customer information 6104 (e.g., a customer contact data, such as a phone number and the like) and the business information 6110 to facilitate enriching customer contact events. The business application 6102 may further be configured with an interface, such as a business Application Programming Interface (API) 6106, for interfacing with a set of interaction setup services 6116 that may further provide coordinated access to other business elements, such as a Sender Controlled Media (SCM) platform 6118. In embodiments, a business phone dialer application 6112 may communicate with the business application 6102, optionally through business API 6106. The set of interaction setup services 6116 may communicate with the business application 6102 by complying with the interface requirements of the business API 6106. Likewise, the business application 6102 may communicate with, for example the SCM platform 6118 through the set of interaction services 6116, such as to exchange information regarding one or more customer contact events, such as an upcoming event.

The set of interaction setup services 6116 may be constructed to facilitate interoperation of the business application 6102 and the SCM platform 6118. In embodiments, at least one service of the set of interaction setup services 6116 may provide for exchange of upcoming call information associated with execution of a customer contact workflow by the business application 6102. The set of interaction setup services 6116 may ensure that activity on the business application 6102 that impacts or would benefit from interacting with the SCM platform 6118 is properly and timely communicated to the SCM platform 6118 for customer interaction setup. Also, a set of interaction response services 6130 may ensure that activities occurring in the realm of the SCM platform 6118, such as interactions by a customer with SCM content that is managed by the SCM platform 6118 and presented on the device are provided to the business application 6102. In embodiments, the set of interaction response services 6130 may monitor such interactions and inform the business application 6102 when interactions that may impact aspects of execution of a workflow are detected, such as a customer declining to receive a phone call from the business.

During a call and after a call (e.g., a post-call period), a set of interaction response services 6130 that may be configured by the business application developer tools described herein, may facilitate conversion/interpretation/encoding of customer interactions with rendered content for use by a business application 6102. In an example, visual content rendered on a customer's phone dialer application user interface 6114 (optionally through a lockscreen of the phone) may include interactive elements that the customer may select in the phone's user interface. While these interactive elements may be defined as generic action buttons in the content, a business application may require data indicative of the specific action button with which the customer is interacting to reliably take suitable action. Likewise, a user interaction with a location on a user interface may mean different things based on the content being presented. Interaction response services 6130 may facilitate conversion or encoding of customer interactions with rendered content so that they are actionable by the business application 6102.

The set of interaction setup services 6116 may also facilitate batched operations between the business application 6102 and the SCM platform 6118. A batch operation may include providing a set of customer identifiers (e.g., phone numbers, email addresses, messaging system handles, and the like) and call purpose information (e.g., a description or other metadata that indicates an objective or purpose for performing customer contact) from the business application 6102 to the SCM platform 6118 and returning SCM content data structures (or indications thereof, such as a SCM content data structure identifier) to the business application 6102. The set of interaction setup services 6116 may also access a contact event information data structure 6132, that may optionally be configured by the business application 6102 with a set of customer identifiers for an upcoming contact event, such as a call campaign and the like. The set of interaction setup services 6116 may update various fields for customer-specific records in the contact event data set 6132 to indicate status of the activities performed by the SCM platform 6118 associated with preparing for a contact event, such as a status of a customer identifier from the SCM platform's perspective. This customer status information may be useful to the business application 6102 in that a customer of the business that is unknown to the SCM platform 6118 may be treated differently than one that is known to the platform 6118 at least because SCM content intended for the customer may not be accessible by the customer's phone dialer application 6114. This may occur if a business customer has not opted in to using the SCM platform 6118 visual caller ID and other visual content services. A business application may adjust the contact event information 6132 to avoid placing a call to the customer until the customer has opted into the SCM platform services. In embodiments, the SCM platform 6118 services may be automatically enabled on a customer phone, (e.g., by downloading a customer phone dialer application 6114 adapted to interoperate with the SCM platform) when a customer becomes a customer of a business that uses the SCM platform 6118 services as described herein.

A phone or other customer contact device (e.g., text messaging device and the like) may be configured with a dialer application 6112 that may facilitate incoming and outgoing contact, such as placing a call to a customer and the like. The business phone dialer application 6112 may interface with the business application 6102, optionally through the business API 6106 to access various business information items 6110, customer information 6104 and the like. In embodiments, the business application 6102, optionally through its business API 6106, may exchange customer-specific information (e.g., a phone number, name, relationship to the business, and the like) with the business phone, typically with the business phone dialer application 6112. The business phone dialer application 6112 may present information, such as call-specific information and the like through a dialer user interface. The interface may further be used to receive device user (e.g., a business representative making a phone call to a customer) selections, such as selection of interactive icons for performing various functions associated with customer contact events (e.g., dialing a phone number, confirming receipt of customer information in the user interface, and the like).

Further in the embodiments of FIG. 61, an SCM platform 6118 may be configured to communicate with the business application 6102 and to further communicate with a customer phone dialer application 6114. The SCM platform 6118 may further be configured to communicate with a business phone dialer application 6112 via the interaction setup services 6116 and further through the business application 6102. Like the business application 6102, the SCM platform 6118 may optionally include or have access to an SCM application programming interface 6122 that may optionally be used for communicating with the set of interaction setup services 6116, the interaction response services 6130, the customer phone dialer app 6114, and the like. The SCM API 6122 may also be used to interface with an advertising network 6124, and other networks, such as the Internet 6128. The SCM platform 6118 may also reference an SCM content data set 6120 that may include data, including visual content, that may be rendered for display to a device user by one or more of the dialer applications 6112 and 6114 in association with a call being placed between a business phone and a customer phone. In embodiments, the SCM content 6120 may include data sourced from a wide range of sources, including the Internet 6128, the advertising network 6124, and the business application 6102 via the set of interaction setup services 6116, along with any sources to which the set of interaction setup services 6116 or the business application 6102 has access, such as a business information data set 6110, and the like. Techniques for generating and curating SCM content 6120 are described elsewhere herein; all such techniques apply in the embodiments of FIG. 61.

Figure 62:
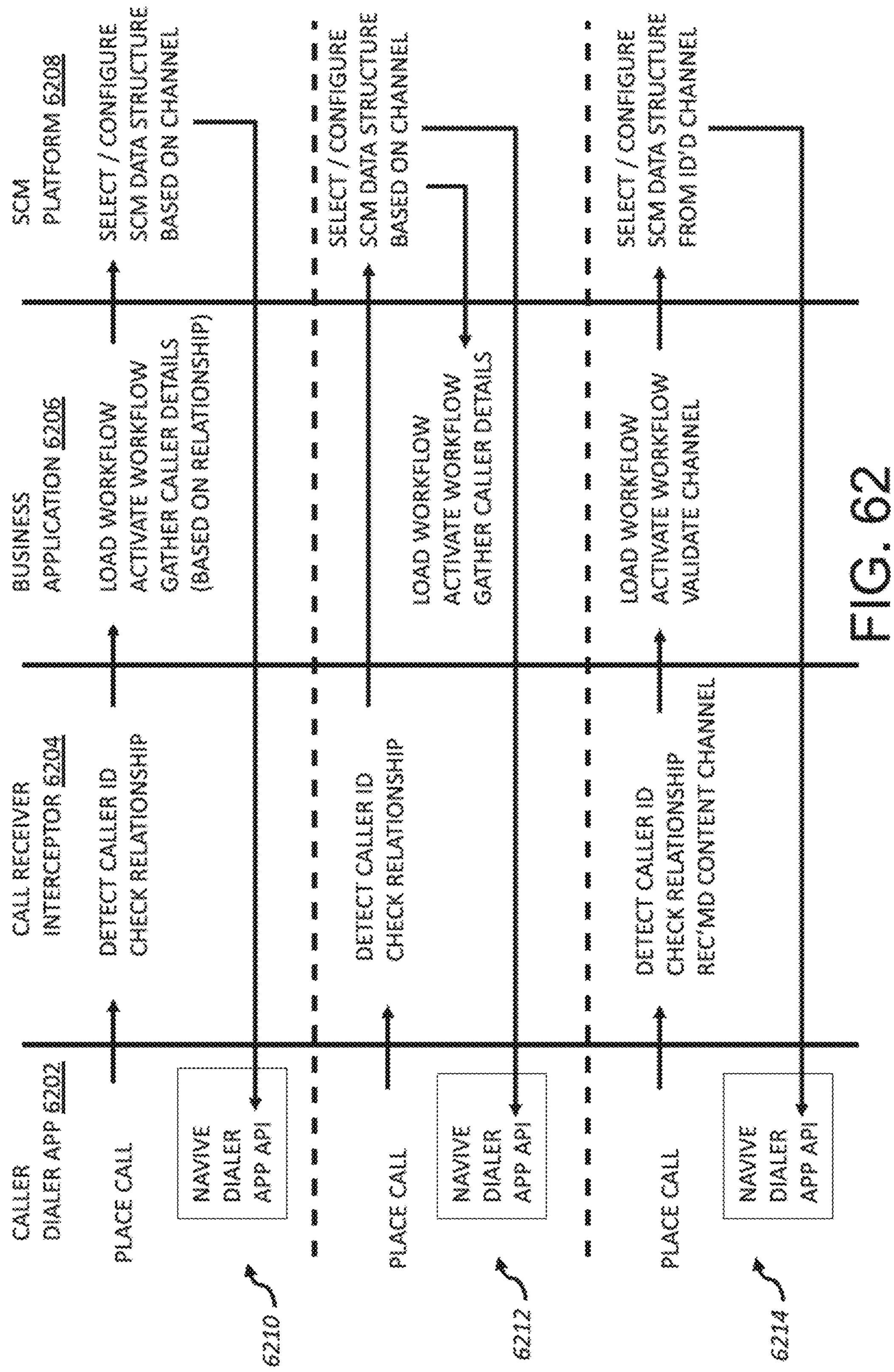
FIG. 62 illustrates multiple customer call data and control flow scenarios for operating a business application with an SCM platform.

Referring to FIG. 62, exemplary control flow scenarios for operation of a business application in response to a customer placing a call to the business that is handled by a call receiver/interceptor. In embodiments, the exemplary flow scenarios include data flows and control through an SCM platform.

In embodiments, a first scenario involves data and control flowing from the interceptor to the business application to the SCM platform and then to the caller's dialer device app. In the first customer, call-in scenario 6210, a native dialer app 6202 of a customer call device (e.g., a mobile phone and the like) may initiate a call to a business. The initiated call may be received by a call receiver/interceptor 6204 that may detect a caller ID associated with the call and check a relationship of the caller based on the detected caller ID with the business. The call receiver/interceptor 6204 may communicate at least the detected caller ID and caller relationship information with a business application 6206 of the business. The business application may, responsive to the communication regarding the call load a workflow, activate the workflow, gather caller details and send a signal to an SCM platform 6208 regarding the call and caller. The signal may include information on which the SCM platform 6208 can act, such as caller identification information that may facilitate the SCM platform 6208 determining if the caller is a participant of (e.g., has opted in to) the SCM content management, rendering, and interaction functions of the platform. The signal may further include information that the SCM platform 6208 may use to select and/or configure an SCM data structure based on, for example, a business content channel to which information in the signal may direct the platform. In embodiments, at least a mobile device rendering portion of the SCM content data structure may be communicated to the caller's dialer app 6202 via an API of the native dialer app. The native dialer app 6202 may render visual portions of the communicated SCM data structure in an interface of the caller's device, such as a user interface screen of the dialer app and the like. In embodiments, the native dialer app 6202 may further be adapted to facilitate rendering the visual content and/or interacting with the SCM platform as described herein. At an appropriate time during this flow, such as after the native dialer app renders the visual portion of the SCM content data structure, the call may be connected to a business representative who may be responsible for performing the activated workflow.

In embodiments, a second scenario involves data and control flowing from the interceptor to the SCM platform and to both the business application and the caller's dialer device app. In the second customer, call-in scenario 6212 a caller dialer app 6202 may place a call to a business that may be intercepted by the receiver/interceptor 6204 that may detect a caller ID associated with the call and check a relationship of the caller based on the detected caller ID with the business. The call receiver/interceptor 6204 may communicate information on which the SCM platform 6208 may act, such as the detected caller ID and caller-business relationship information with the SCM platform 6208. The information on which the SCM platform 6208 can act, such as caller identification information that may facilitate the SCM platform 6208 determining if the caller is a participant of (e.g., has opted into) the SCM content management, rendering, and interaction functions of the platform. The SCM platform 6208 may use the caller-business relationship information, for example, to select and/or configure an SCM data structure based on, for example, a business content channel to which business-related information in the communication about the call may direct the platform. The SCM platform 6208 may communicate information determined about the caller, such as the caller relationship with the business and the caller relationship with the SCM platform to the business application 6206 of the business. The business application may, responsive to the communication regarding the call load a workflow, activate the workflow and gather caller details for use during the call.

In embodiments, at least a mobile device rendering portion of the SCM content data structure may be communicated by the SCM platform 6208 to the caller's dialer app 6202 via an API of the native dialer app. The native dialer app 6202 may render visual portions of the communicated SCM data structure in an interface of the caller's device, such as a user interface screen of the dialer app and the like. In embodiments, the native dialer app 6202 may further be adapted to facilitate rendering the visual content and/or interacting with the SCM platform as described herein. At an appropriate time during this flow, such as after the native dialer app renders the visual portion of the SCM content data structure, the call may be connected to a business representative who may be responsible for performing the activated workflow.

In embodiments, a third scenario involves alternative data and control flowing from the interceptor to the business application to the SCM platform and then to the caller's dialer device app. In the first customer, call-in scenario 6214, a native dialer app 6202 of a customer call device (e.g., a mobile phone and the like) may initiate a call to a business. The initiated call may be received by a call receiver/interceptor 6204 that may detect a caller ID associated with the call and check a relationship of the caller based on the detected caller ID with the business. The receiver/interceptor 6204 may further recommend a business-specific content channel based on, for example context of the call, the caller-business relationship, and any other call processing rules that may be associated with handling calls to the business. The call receiver/interceptor 6204 may communicate at least the detected caller ID, caller relationship information, and recommended content channel to the business application 6206 of the business. The business application may, responsive to the communication regarding the call load a workflow, activate the workflow, validate the recommended channel (e.g., based on business goals, activities, and the like that may be encoded into or associated with an activated workflow) and send a signal to an SCM platform 6208 regarding the call and caller. The signal may include information on which the SCM platform 6208 can act, such as caller identification information that may facilitate the SCM platform 6208 determining if the caller is a participant of (e.g., has opted in to) the SCM content management, rendering, and interaction functions of the platform. The signal may further include information that the SCM platform 6208 may use to select and/or configure an SCM data structure based on, for example, the validated business content channel. In embodiments, content from the validated content channel may be configured into or at least linked to the SCM data structure. In embodiments, at least a mobile device rendering portion of the SCM content data structure (e.g., a portion from the validated content channel) may be communicated to the caller's dialer app 6202 via, for example an API of the native dialer app. The native dialer app 6202 may render visual portions of the communicated SCM data structure in an interface of the caller's device, such as a user interface screen of the dialer app and the like. In embodiments, the native dialer app 6202 may further be adapted to facilitate rendering the visual content and/or interacting with the SCM platform as described herein. At an appropriate time during this flow, such as after the native dialer app renders the visual portion of the SCM content data structure, the call may be connected to a business representative who may be responsible for performing the activated workflow.

In embodiments, the native dialer app 6202 API may be constructed by the business developer tools described herein. In embodiments, the communication between the receiver/interceptor 6204 and the business application 6202 may be performed via one or more APIs of these elements. In embodiments, the signaling between the business application 6206 and the SCM platform 6208 may be performed via one or more APIs of these elements. As described elsewhere herein, any of the APIs may be constructed, adapted, and maintained using the business application and related developer tools described herein. Likewise, any of the elements depicted in the scenarios of FIG. 62 may be adapted using the developer tools described herein to facilitate communication therewith and between such elements.

The distinct elements depicted, such as a call receiver/interceptor 6204, a business application 6206, an SCM platform 6208 may indeed be distinct physical elements, such as servers and the like; however, each may operate as part of an integrated system that may involve at least a portion of any one element operating as part of a system comprising at least a portion of any other element. Therefore, in embodiments, aspects of the call receiver/interceptor 6204 (e.g., a function to determine a relationship between the caller and the business) may be integrated with aspects of the business application 6206 (e.g., a data set that relates customer identifiers, such as caller ID and the like, with customer records that facilitate determining such a relationship). Also, in embodiments, aspects of a call receiver/interceptor 6204 (e.g., a function to recommend a content channel) may be integrated with aspects of the SCM platform 6208 (e.g., organizational and indexing functions of a set of business content channels).

Figure 63:
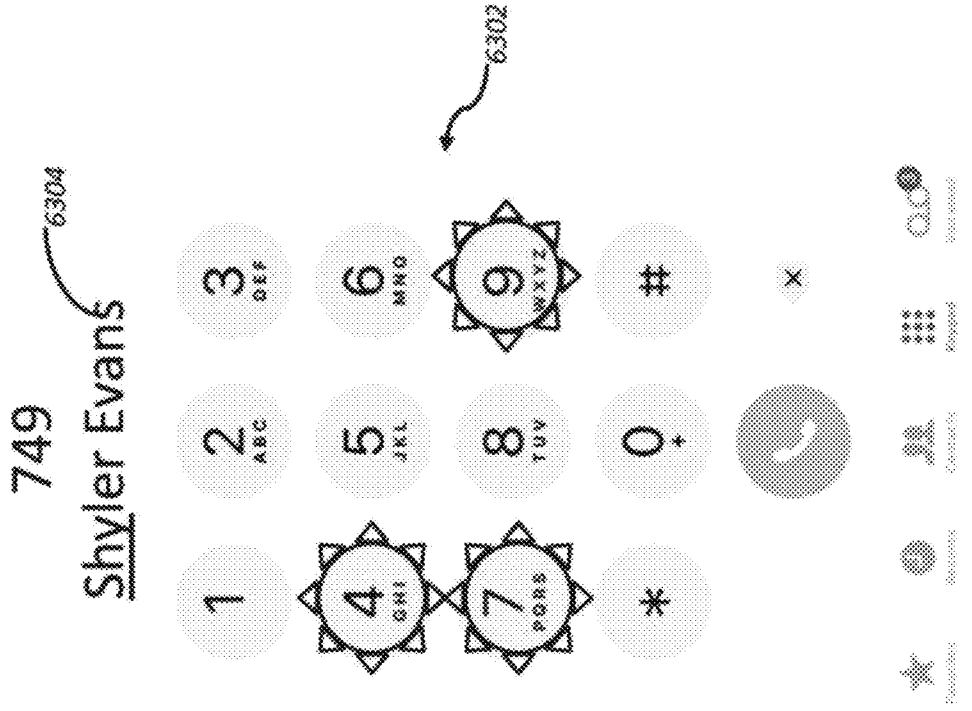
FIG. 63 illustrates searching from a dial pad.

Dialer apps have various operational modes and may offer different screens for user interaction with the dialer app in these modes, such as dialing numbers, searching through contacts to find and dial an existing contact, redialing a previously dialed/received number, and the like. However, a standard convention of dial pads for phone dialers (mobile and fixed) is to match letters from the alphabet with individual keys, as shown in FIG. 63. Yet, when presented with a dialer app screen 6302 as depicted in FIG. 63, all that is generally available to a user is to enter numbers (or special characters # and *) by selecting an element in the dialer pad. If those numbers, in the order that they are selected match an existing contact, the contact name 6304 may appear in the dialer window. Some dialer apps may communicate with email and other apps on the phone to suggest contacts from those apps that match a phone number entered in such a dialer app screen. What is needed is a dialer app that permits use of the dialer dial pad to make use of the alphabet letters mapped to keys as they are typed to provide much greater contextual access to consumers and businesses independent of a consumer or business being an existing or recently used contact.

In embodiments, a name/word forming service (also referred to herein as a phrase forming circuit and a candidate contact recommendation facility) may take a sequence of dial pad entries (e.g., keys touched/typed in a specific order) and suggest parties or categories of parties to contact. The name/word forming service may progressively form a word/name with each successive dial pad entry, which may be presented to the name/word forming service as a stream of dial pad selections. Such a name/word forming service may rely on a range of resources to identify and/or suggest candidate parties/contacts, such as existing contacts, suggested contacts, dictionaries, company directories, social media connections (e.g., FACEBOOK™ friends, TWITTER™ following/followers, and the like), resources with a determinable relationship with the dialer, such as through common affiliation (e.g., people who work in the same business, same last name, same business field, fans of the same sports teams, and the like). In embodiments, a common affiliation may be determined from aspects of the dialer app, such as a third-party platform with which the app is associated. A dialer app may be constructed and/or updated/extended to work collaboratively with a third-party platform, such as an SCM platform as described elsewhere herein. Suggestions from the name/word forming services may be influenced by such association with a third-party platform. As an example of dialer app determined affiliation, an original equipment compatible dialer app provided by the phone provider (herein an OEM or generic dialer app) may be adapted through use of an SDK to work with the third-party platform. This adaptation may influence the types of words/names formed by the word/name forming services. In embodiments, the adaptation of the dialer app may be through an API of the OEM dialer app. As another example, a user may have opted in to download and use a customized dialer app that is constructed to extend the generic dialer app functions to include, for example name/word forming services or interfaces thereto, use of an SCM or other third-party platform for call/contact related enrichment, and the like. Such a customized dialer app may be preconfigured to form names/words using information/rules/constraints of the third-party platform.

In addition to using data resources of a third-party platform for word/name forming, such as a list of users of an SCM platform, such a name/word forming service may have access, such as through an SCM platform, to other resources, including without limitation contact sponsoring capabilities, search engine capabilities (e.g., candidate entity search engine capabilities), including general (e.g., Internet) search engine capabilities and domain-specific search engine capabilities, such as search engines adapted to search for specific categories (e.g., products or news) or to search within particular fields or content types (e.g., images, videos, maps, legal research, patents, scientific literature, or the like). Additionally, a name/word forming service may interface, optionally directly or through a third-party platform with other contact/search apps, such as restaurant searching apps (e.g., YELP™), activity searching apps (e.g., MEETUP™), professional service groups (e.g., US NAVY), educational institutions and the like. These third-party apps may execute on the same mobile device as the dialer app. These third-party apps may have portals, such as APIs and the like through which programmatic entry of search terms can be entered and responses provided.

A name/word forming service may be constructed to provide contextually relevant candidates for a range of dial pad entries. While entering a single dial pad number (e.g., the number 4 that corresponds in a U.S.-based dialer app to the letters G H and I) may generate many candidate parties or categories, rules for word/name forming may be applied to reduce the number of candidates to a more manageable number. Rules may be applied that adapt the resources used for forming a name/word based on the degree of detail detectable from the dialed entries. As an example, when a single number is entered (e.g., number 4), a word/name forming rule may limit the resources used to only currently known contacts. In this example, when the number 4 is entered, only contacts or categories with names or other descriptive data that begins with any of the letters G, H, and I may be suggested as candidates for contacting. Further refining rules, such as prioritizing recently called contacts in this candidate set over seldom used or contacts that have not been contacted in a while may also be applied. Rules may be improved by machine learning, such as on a training set of actual contacts by a set of users when engaging with the dial pad after having been presented with various combinations of contacts and categories upon entry of various dial pad entry combinations.

Other techniques for refining candidate entries at any level of entered detail (one or more dial pad entries) may include reference to context of a dialing event. In embodiments, a dialer app screen, such as that depicted in FIG. 63, may have an interactive element that, when activated, informs the dialer app and/or the name/word forming app to bypass generally known contacts and instead access an Internet search engine to suggest a name or word being formed. Whether determining to use an Internet search engine is explicit or implicit, the word/name forming service may pass partially formed words to a search engine to gather further context of potential words/names.

The word/name forming service may be constructed to use a dictionary to determine candidate words/names. In embodiments, typing a sequence of 7 (P Q R S), 4 (G H I), 9 (W X Y Z) may facilitate looking up candidate words in a dictionary (e.g., PIZ, SIX, SHY, PIX, and others). Using contextual clues, the word/name forming service may, in this example, suggest the word PIZZA. Contextual clues may include a user's preferences, dial pad-based search history, frequency of occurrence of the candidate words, profile information (e.g., demographic, psychographic, geographic or similar information, including profile information generated with user participation, such as through surveys and/or collaborative filtering), behavioral history (e.g., content preferences, shopping behavior, search behavior, and the like), and the like. Generally, candidate words that more readily relate to a resource to contact, such as a local pizza shop (PIZ) as opposed to the unaffiliated candidate word QHW may be favored and offered first to a user making the dial pad entries.

The operation of a dialer app in association with a name/word forming service and searching capabilities may be implemented with the methods and systems for Sender Controlled Media (SCM) described herein. The SCM methods and systems described herein, generally referred herein to as an SCM platform, facilitate rendering visual and audio content through a dialer app screen of a device through which a user of the device is making a phone call. Further the SCM capabilities herein facilitate both rendering content and receiving user interactions therewith, such as selecting a rendered item of content (e.g., an icon or another action-element) and the like. Therefore, in embodiments, an SCM-equipped dialer app may work cooperatively with an SCM platform that may optionally include a name/word forming service or at least provide access to such a service to cause the search by dial pad methods and systems described herein.

Figure 64:
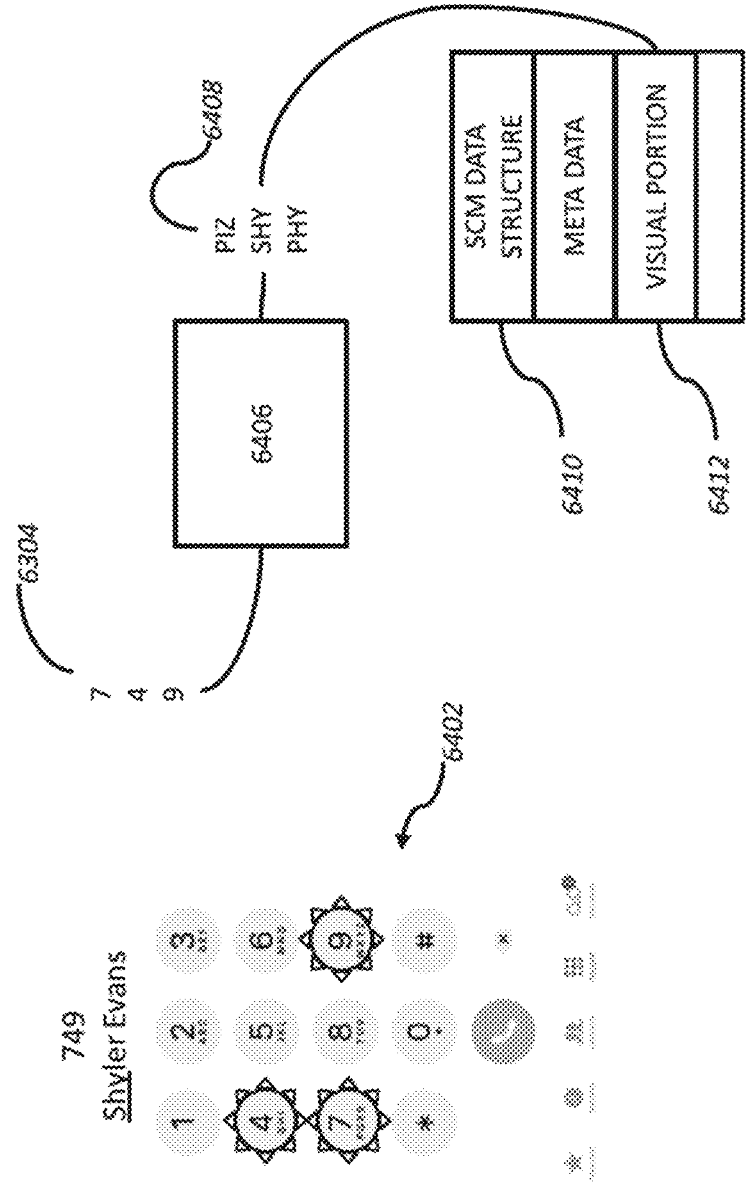
FIG. 64 illustrates data flow for forming words/names with a dial pad for use in an SCM content data structure.

An exemplary flow diagram for such embodiments is depicted in FIG. 64. As a user enters (e.g., touches/swipes, and the like) numbers on a dialer app keypad 6402, the data is collected 6404, such as through the dialer app and/or the SCM platform. The collected dial pad entry/entries are shared with the word/name forming service 6406 to quickly arrive at one or more suitable candidate name/words 6408. The SCM platform, in coordination with the word/name forming service may configure a call-specific SCM content data structure 6410 including a visual portion 6412 of the suitable candidate name/words. The SCM platform may use the SCM content rendering management functionality described herein for rendering on a user's screen at least a visual portion of the configured call-specific SCM content data structure. This may involve the SCM platform sending at least a portion (e.g., a visual portion) of the configured call-specific SCM content data structure to the dialer application that is active on the user's phone via an IP-based communication channel that is distinct from a dial-out channel of the OEM dialer, such as through an API of the dialer app and the like. Continuing with use of the dial pad number 4 as an exemplary dial pad entry, the visual SCM content structure may include the potential name/words that are most highly prioritized for this dial pad entry, such as PIZ possibly for pizza, SIX possibly for a restaurant name and the like. The dialer app may send additional user interactions with the dialer app user interface to the SCM platform, such as an additional dial pad entry (e.g., to refine the presented candidate results), a selection of a visual item of content rendered from the call-specific SCM content data, and the like.

Continuing this example, the user selects the rendered content PIZ, which is refined by, for example the word/name forming services into the word pizza. A next SCM content data structure may be configured so that the word(s) formed from the selected content (PIZ) is/are rendered in the user's dialer app user interface (e.g., the word "Pizza" is rendered). With at least one candidate word/name formed and presented to the user, the SCM platform or other service may cause an Internet search to be performed using the presented word as a search term. Optionally, the SCM platform may hold off initiating a search until the user selects the at least one refined candidate word in the user interface. In an example, the user may opt to continue making dial pad entries as a way of refining the candidate word. With the word "Pizza" presented, the user may begin to select further dial pad entries to form a name of a pizza shop, or other attribute, such as a preferred zip code for the pizza shop, and the like. In embodiments, the name/word forming service may adapt the existing formed candidate word(s), extend them, or start a new word to be added to the existing formed candidate word(s) for refining search engine results.

In embodiments, the methods and systems for collecting and generating visual content for use in an SCM content data structure may identify candidate businesses (e.g., all local pizza shops) based on the selected refined word. The candidate businesses may be identified through various approaches, including Internet search results. Other candidate business identification approaches may include selecting among a set of businesses with which the SCM platform or an operator/owner thereof has a referral or co-marketing agreement. In embodiments, businesses may opt to participate in the SCM platform to gain the benefits of the sender controlled media management and rendering support capabilities for business-to-customer and customer-to-business interaction (e.g., phone calls and the like). This participation may extend to referral and/or co-marketing benefits, such as presenting, in the example above, pizza shops participating in the SCM platform. In embodiments, candidate businesses that are presented to a user in this way may garner an owner or operator of the SCM platform benefits, such as compensation for presenting the business to a user, for connecting a phone call from the user to the business, for referral when the user transacts with the presented business, and the like. Other businesses may also be presented as contact candidates based on the refined candidate word(s), such as through performing a search using other resources, (e.g., YELP™ and many others described herein). In addition to identifying candidate businesses (or people, organizations, education institutions, government agencies, and the like), the methods and systems for word/name forming and content presentation may go beyond a basic Internet type search to retrieve relevant content about the candidate businesses. In embodiments, content descriptive of candidate businesses or other candidate resources that participate in the SCM platform may be retrieved from SCM content data structures, business-specific content channels and the like that are managed by operations of the SCM platform. The SCM platform and service may also interact with a web presence (e.g., websites, public data structures, and the like) of the candidate business to gather further details of the business, such as location, times of operation, product offerings, product costs and others. In embodiments, the business-specific content may be gathered by interacting with APIs of the candidate businesses. Also, results of Internet or other searches may be ranked or otherwise further refined (e.g., based on user preferences and the like) to facilitate presenting relevant search results first in what is often limited display screen real estate. Again, relevance of search results may be based on a multi-dimensional relevance factoring approach that may incorporate user, platform, and device preferences, history, business agreements, user-to-user similarity, and the like. The gathered content may yet again be structured into a visual content portion of an SCM content data structure that is shared with the dialer app of the phone on which the user is dialing. Further user interactions with this content, such as selection of one of the presented local pizza shops may result in a call being placed to the pizza shop. In embodiments, the selection of a local pizza shop may result in the phone number for the shop being passed to the dialer app (e.g., as a form of metadata in an SCM content data structure) so that the dialer app can place the call.

While user interaction with the content displayed is described above as through an interactive user interface, such as a touch screen of a mobile phone, other forms of interaction are contemplated for use herein. A user may tap a few digits and then use voice commands to refine the formed name/word, such as "Yes pizza, please" or "Do not dial my friend Shyler", and the like. In embodiments, a user may merely speak digits into a voice command interface of the dialer app to activate the name/word forming service.

Figure 65:
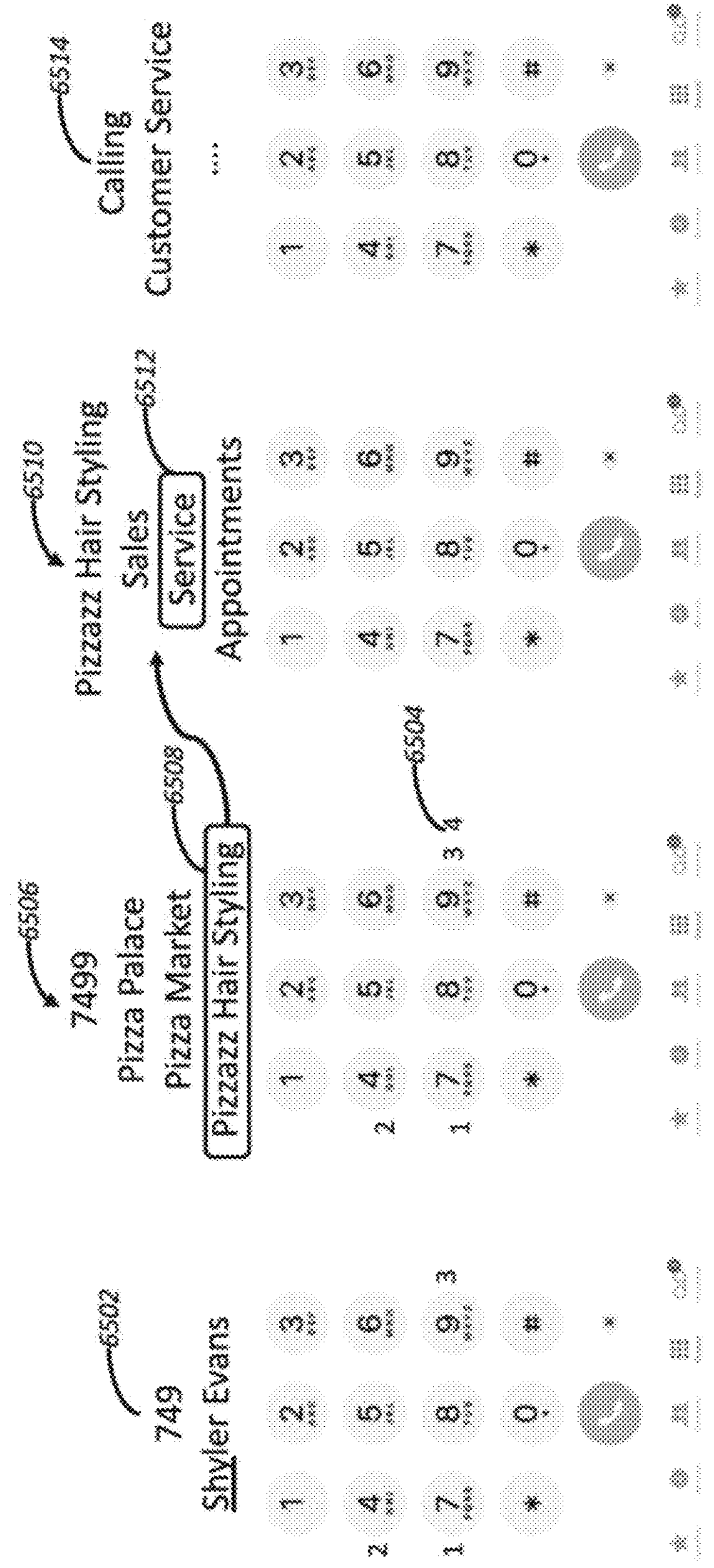
FIG. 65 illustrates use of a dial pad and Internet search capabilities to contact a department of a business.

Referring to FIG. 65, an example of a phone dialer app constructed and/or extended to facilitate searching through search term (e.g., word/name) forming using the methods and systems described herein is illustrated. A user may start entering digits to contact customer service for a business. Through the dialer app interactions noted above (e.g., using SCM content management data structures and the like), the user may be initially presented with a contact 6502, but through continued dial pad entries 6504 may be presented with a choice of candidate businesses 6506. The user may select the business name 6508 from a list of candidate businesses 6506 based on the digits entered. Using the Internet and other search techniques described, such as accessing contact and other information for a business using an API of the business, a list of popular departments 6510 may be rendered on the dialer app user interface screen as depicted in FIG. 65. Based on user selection of a customer service department 6512 for the business, a contact event (e.g., a phone call activity) may be initiated 6514 through the dialer app. Prior to initiating the contact event, or in parallel with that event, an SCM content data structure may be selected and accessed, such as by a server of the SCM platform for the customer service department, from a set of such data structures. This selection may be based on the phone number of the customer service department to be (being) dialed. If no SCM content data structure is available for the customer service phone number, one may be generated using the methods and systems for dynamic SCM content data structure generation described herein.

In embodiments, at least a visual portion of the data structure may be made available to the customer's dialer app for rendering on the display of the user's phone, such as in the dialer app user interface. The data structure may further include metadata, such as URLs and other links that may be associated with visual content items so that a user selection of one of the visual content items may activate access to content through the associated link. In this example, the user may be presented with options for proceeding with a customer service interaction, such as by continuing to talk with a customer service representative, switch to an on-line chat with a representative, request a call back and the like. The content presented via the dialer app may include links to customer service features of the business, such as a schedule of services and costs, a link through which data can be exchanged between the customer and the business (e.g., for authentication, service tips, help manuals, and the like).

In embodiments, the methods and systems of sender controlled media (SCM) herein may include dialer apps of smart phones and the like that may be constructed and/or adapted to render visual and/or audio content through a user interface of a smart phone responsive to receiving a call. The rendered content may supplement or take place of the information typically presented in a call answer screen of a standard dialer app. In business use cases, this pre-call rendering may provide benefits to the business conducting the call and to the recipient that enrich and facilitate an improved contact experience. A business may place a call, such as to a customer and the like to conduct some business with the customer. Through use of the methods and systems for SCM management described herein, the business representative may present on the recipient's call answer screen, which optionally may be a lockscreen of the device, information such as why the recipient is being called, (e.g., their order is ready for delivery scheduling) and who is placing the call (e.g., the name/department of the business and/or the name of the business representative making the call). Examples and embodiments herein that may facilitate providing this functionality are described with respect to methods and systems of call registration, call purpose and the like described at least in association with FIGS. 51-53.

In addition to call context information being rendered in a call answer screen, actionable content may be presented, such as options for taking action related to the incoming call. In an example of such action options, a user may be presented with contact continuation options, such as to answer the call and have a verbal dialog with the caller, to activate video and conduct a video call with the caller, to open a chat channel and continue the call by text chat with the caller or other business representative, to request a call back at a different time (which may be scheduled by a menu presented on the screen of the recipient), to forward the call to another recipient, to decline the call, to send a message to the caller, such as to request more information, and the like. In embodiments, sending a message to the caller may include sending a standardized text reply, sending a customized text reply, activating the camera and/or the microphone of the phone to record a brief reply message, and the like. Other action options may include automatically activating an SCM data structure of the recipient (such as one from a channel or library of the recipient and/or one that is determined by processing the content and/or origin of the incoming call as described elsewhere in this disclosure), and the like. In embodiments, replying to the caller may also include accessing an SCM data structure with the dialer app and/or the call answer screen interface and directing that data structure to the caller's phone's dialer app where it can be rendered in the caller's dialer app user interface screen.

In embodiments, call context that may be rendered in a call answer screen of a call recipient's phone may be enhanced with other context associated with the caller (e.g., a business entity that the caller, typically a representative of the business is representing) and/or the recipient. In addition to call context such as a name of a business and a purpose of the call being presented, information about, for example a relationship status of the business and the recipient may be included. As an example, if a business calls a long-term customer, the content rendered may include a reference to the number of years of loyalty of the customer. If a business places a call to a person who does not have a clearly definable relationship with the business (e.g., a prospective customer), a different set of criteria may be used to determine content to render. In embodiments, a call (e.g., to a prospect or otherwise non-customer) may include sending rendering content that includes an offer of compensation for going forward with the call. As an example of an offer of compensation, a user may have posted a recent purchase of camping gear for an upcoming trip on social media. The methods and systems for SCM content rendering management when applied in a business calling scenario may access a social media feed of a prospective customer to identify a form of commonality with the business. An SCM content data structure may be configured with an incentive offer, such as a discount or redeemable coupon to be applied to a subsequent purchase of camping gear as compensation for talking with the business representative for a few minutes. Similarly, a call being placed to a long-term customer may include a reference (e.g., selectable URL or other link) to a reward that is available to the customer in recognition of his/her long-term loyalty.

In embodiments, a pre-call experience may further be enhanced by presenting content that emphasizes the personal nature of the call event, such as a short video of the business representative who is making the call, asking to talk with a customer. This content may be made available to the recipient's dialer app for rendering in a call answer user interface screen using the SCM content management methods and systems described herein. Such personalization may improve the call experience for the recipient by seeing a friendly face of a human, rather the anticipation of having to deal with an automated response system after answering the call.

Beyond merely presenting call context and options for proceeding with the customer contact, the dialer app may be adapted to facilitate further interaction and conditional rendering based thereon. An adapted dialer app may render content in a call answer screen user interface and respond to actions in that call answer screen user interface by rendering replacement or supplemental content responsive to the user activity. This follow-on rendering may be based on metadata and additional rendering content in an SCM data structure provided to the dialer app for use during the incoming call. Optionally, the dialer app may activate other applications on the phone, such as a customer service portal app for the calling business responsive to a recipient action in the call answer screen. This may be preferable to continuing the call directly via the dialer app so that the user's phone function can be freed up while the customer service contact event proceeds.

The examples herein for business-centric pre-call recipient experience are merely representative of the capabilities of a dialer app/call answer capability of a smart phone that is adapted and/or constructed to support enhanced content rendering as part of an incoming call experience. These and similar capabilities may be applied to other types of incoming calls, such as calls from entities other than commercial businesses, such as educational institutions, government agencies, political organizations, and the like. While the examples are generally business-centric, similar capabilities may be applied to incoming personal calls. In an example of an incoming personal call, a pre-call experience may include offering the recipient options for continuing, such as answering the call, switching to a video call, exchanging text messages, activating a different contact app, with such as WHATSAP™ and the like, recording and sending a video reply, and the like.

In addition to enriching a customer's pre-call experience when receiving a call from a business, the methods and systems for SCM content rendering management may enrich an in-call experience, for example by rendering actionable content in an active call screen of the recipient's phone during the call. For example, links to or content from external resources, such as help manuals, user account screens, product offering screens, and the like may be communicated from a server of the business to the recipient's dialer app during an active call between the business and the user for rendering in an active call screen thereof. In this way, a user may not need to switch from the active call screen to another form of messaging app (e.g., an email app or the like) to receive links to information that is pertinent to business being conducted during the call. This integrated rendering approach benefits the caller as well by bypassing an additional step, such as verifying that the recipient has access to their email and the like. Further in-call experience may itself provide a degree of security once the recipient has been sufficiently verified. With this verification, links to confidential content or the confidential content itself, such as account details (e.g., amounts due from the customer to the business) may be delivered through the dialer app/active call screen to the user.

Like pre-call and in-call content rendering with a suitably adapted dialer app, post-call interactions may be enhanced and enriched using the SCM platform methods and systems described herein. Rather than conventional approaches to post-call experience, such as emailing surveys, or asking for feedback via a separate form of contact (e.g., via text messaging and the like), calling the customer back to respond to an automated call quality survey and the like, content may be provided through the active call screen of the customer's adapted smart phone dialer app that provides opportunities for post-call actions. In embodiments, post-call actions, such as rating the call quality, may be presented during the active call, or preferably near an anticipated end of the active call to present the opportunity for feedback while the recipient is still engaged with the call, or as the call is ending. Post-call visual content rendered in a dialer app user interface screen, contemporaneously with an end of a call, may also include actionable visual content items, such as an option to be connected to a supervisor, request a call back from a supervisor, request a copy of a recording or transcript of the call, ordering a product or service, scheduling a follow-up call, and the like. By maintaining the engagement with the customer for collecting post-call feedback and further actions, there is a greater likelihood of the customer's participation than if the post-call follow-up occurs later.

Described elsewhere herein is a system in various embodiments that use software and/or services that are constructed to support operation of the SCM content rendering and interaction management capabilities of an SCM platform and the like. In these embodiments, SCM compatible applications operating on user's phones are constructed to enrich the phone call experience through capabilities that include capturing, generating, and rendering visual and audio content as part of the phone call experience. Those applications also provide capabilities for preconfiguring sender controlled media (SCM) content data structures and propagating those structures so that they are available to all participants of an SCM platform for use when one participant of the platform calls another participant of the platform. Those applications further include functionality for handling calls from non-participants of the platform. In embodiments, those applications may rely on centralized services of the SCM platform to perform their rendering and response actions. While this system of connected applications on phones and servers provides a wide range of capabilities, at least a portion of those capabilities may be made available for use by non-participants of the platform, such as by using software development tools, such as software development kits and the like to enhance off-the-shelf and third-party smart phone dialer applications with certain call-initiated content rendering capabilities.

A software development kit for adding SCM functionality to a phone dialer may be referred to herein as an SCM SDK. SCM related functionality that may be enabled in smart phone dialer apps via an SCM SDK may include without limitation: (i) rendering content other than generic caller ID content in a call answer screen of a dialer app; (ii) access to content other than generic caller ID content for rendering in response to an incoming call; (iii) matching incoming call identification (e.g., conventional caller ID) to a content data structure that includes visual content for rendering; (iv) coordinating rendering with call connection; (v) support for user interaction with rendered content; (vi) access to phone audio/video capture capability for capturing content for delivery to a recipient of a call; (vii) storage of captured content; (viii) replacing standard caller ID content for an outgoing call with custom content, such as a link to content to be rendered; (ix) access to a library of Sender Controlled Media (SCM) dialer app functions, and other capabilities.

In a simple example of adding capabilities to a dialer app, an SCM SDK may adapt a dialer app to cause phone system generated caller ID content (e.g., phone number of the caller and a name of the owner of the phone number) to be replaced with custom content, such as stickers, images, and the like. A basic version of this capability may simply be to provide ASCII characters in the replacement caller ID string that a standard dialer app would render. The standard dialer app would attempt to render characters consistent with the provided ASCII values, which would result in other than standard characters, such as stickers like a smiley face and the like being rendered in place of or in addition to a caller's phone number and name. A more capable version of this capability may be to replace the caller ID rendering function of a dialer app with a rendering function that supports content other than caller ID data, such as images, audio playback and the like.

To enable a portion of sender controlled media capability of an SCM platform may involve modifications, such as through an SCM SDK to both the caller and the recipient's dialer apps. Such an SCM SDK may add secondary communication channel capabilities to the dialer apps that support transfer of content types other than those compliant with phone system supported caller ID. Access to this secondary channel may be enabled through alternate use of the caller ID fields of a call, such as by the caller sending a URL or other cross-network link in the caller ID field that the recipient dialer app uses to establish communication between the two dialer apps. When combined with enhanced rendering capabilities, enhanced content for rendering may be exchanged over this secondary channel at least at the initiation of a call so that content other than generic caller ID content may be rendered on the recipient's mobile device incoming call answer screen, which optionally may be a lockscreen of the device. As an alternate embodiment that does not require establishing a full communication channel between the caller and recipient dialer apps, the recipient dialer app may be adapted to follow a link encoded into the caller ID fields to retrieve content for rendering using an enhanced content rendering capability. This alternate embodiment may further include adapting a dialer app for the caller to force the encoded link into the caller ID fields. In embodiments, for simplification of modifications to the dialer apps, each dialer app may be associated with a dedicated content sharing link that is encoded in the caller ID fields of calls made from the dialer app. An external companion application may be provided for creation, maintenance, and amending content stored at the dedicated content sharing location.

In embodiments, an SCM SDK may facilitate causing a request to execute the dialer app, such as in response to the phone hardware detecting an incoming call or the user activating the call dialer icon, to instead execute a SCM compatible dialer app. This approach avoids complications associated with adding functionality to or replacing functionality of an existing dialer app.

In embodiments, dialer apps, such as OEM and third-party dialer apps, may be configured with interface capabilities, such as APIs and the like that may be leveraged by an SCM SDK to provide some SCM like capabilities as described above herein.

In embodiments, call-specific metadata that may be transmitted with a phone call may be configured to include features that facilitate authentication of the caller. Conventional caller ID metadata may include variable fields that are typically populated with an identifier of the caller such as a geographic location of an originator of the call (typically the caller, but in cases a location of a business that the caller is representing rather than the location of the caller who might be a remote caller) and a phone number from which the caller purportedly is calling. This metadata, optionally configured as a set of call-specific metadata may be populated by the phone system from which the call originates or may optionally be populated by the call originating device/system. Therefore, without a form of validation of the caller ID information, there may be little opportunity to ensure that the metadata provided is accurate. As standards and regulatory requirements for compliant use of caller ID advance, call-specific metadata may be adapted to include features, such as source encoding of the call-specific metadata and automatic population of caller ID data and the like. These advancements may include providing content access features in the call-specific metadata, such as a configurable link field that may be used for providing access by smart phones that receive the calls to digital resources, such as on-line content that may be associated with the call. This configurable link may be used to enable a call initiating entity, such as a caller or a computing system through which the call is being placed to make call-specific, caller-specific or other call-related content available to devices, networks and/or service providers who facilitate routing the call to a recipient. This configurable link, optionally adapted as the call-specific metadata passes through various call routing networks, may further be available to the recipient computing device that receives the call for the recipient (e.g., a smart phone and the like). In embodiments, the call-specific metadata may be encoded and secured, such as with a secure token and the like to prevent unauthorized third parties from accessing its contents, such as the configurable link, and making unauthorized changes or access thereto. A variety of encoding/decoding techniques may be applied here, such as without notification private/public key-based encoding/decoding.

Devices that receive a call with encoded call-specific metadata, such as a call routing server or an endpoint smart phone of the intended recipient, may rely on the decoded call-specific metadata to facilitate validating alignment of the caller ID content with the actual source of the call (e.g., a purported phone number of the call originator) by, for example, comparing the actual call originator number with the caller ID designated call originator number. Other techniques for attempting to validate the source of an incoming call may include use of community intelligence and experience with calls that include the caller ID metadata of the incoming call. An example of community intelligence is presented herein at least with the disclosure of FIG. 47 related to community firewall and platform participant-driven caller ratings of FIG. 46, and the like.

The configurable link may be encoded with other call-specific metadata to provide a layer of security.

In embodiments, the configurable link may facilitate access of web content, such as a website associated with an entity associated with the call, an advertising network, and the like. The configurable link may be received for use by an incoming call function of the receiving endpoint device, such as the dialer app of call recipient's smart phone. In embodiments, a dialer app may retrieve content through a URL provided in the configurable link for rendering, for example, in a lockscreen of the recipient's smart phone or the dialer app user interface screen and the like. In addition to a URL or other network address-type content in the configurable like providing access to web content, the configurable link may provide access to a set of services, such as web services and the like that may be activated by the dialer app or the like accessing the URL.

Figure 66:
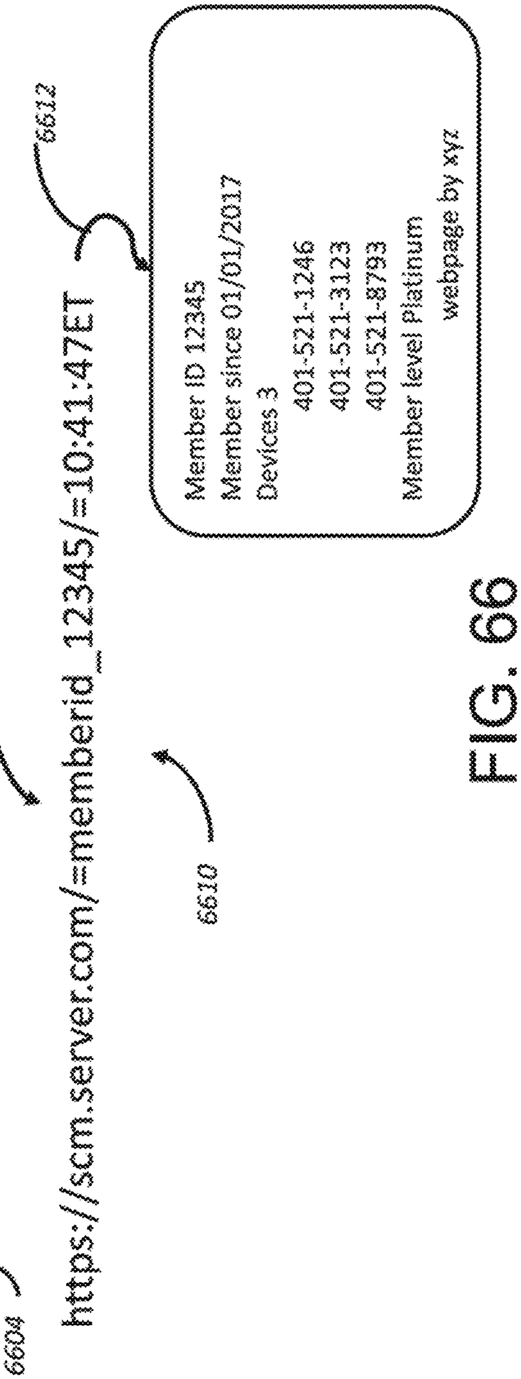
FIG. 66 illustrates an enhanced caller ID configurable link field and use thereof.

In embodiments, use of the configurable link may include gathering or referencing contextual information about the recipient's smart phone and integrating it with the existing information in the link to form a customized URL and the like. Referring to FIG. 66, the content in the configurable link 6604 in call-specific metadata 6602 may include one or more variable fields 6606, such as fields of a URL 6608 that the dialer app can populate 6610 prior to activating 6612 the URL. This variable field may, for example, contemporaneously with the call being received, be populated with a phone user-specific value (e.g., phone user's name), a phone-specific value (e.g., presence/absence of a specific app on the phone), call instance-specific value(s) (e.g., time of the call, location of the recipient when the call is received, and the like), and any other value or values. One such value may indicate if the recipient has opted-in and/or is a participant in a sender controlled media (SCM) platform. This SCM platform participant value may facilitate access to the SCM content management techniques and functions described herein.

In embodiments, the configurable link may identify another app on the phone to be activated, such as an SCM platform-enabled application and the like. Another class of apps that may be activated include communication apps, such as chats, texting, and the like that may facilitate multi-modal communication associated with the incoming call. In an example, a call may have originated from a customer service department of a business. The configurable link, when populated and used by, for example, the dialer app of the customer's phone, may cause a customer service chat-type application to be activated on the phone. Information in the link may be passed from the dialer app to the chat-type app to enable automatically connecting the customer with a customer service individual chat queue (e.g., the customer service person conducting the phone call). Communications, interactions, and data transfer via the activated chat-type app may occur in parallel with the ongoing phone call, such as over a channel via a network, such as through the Internet, that is separate from the phone call channel. This multi-modal/multi-channel connection between the customer and the business may support data, images, and other content being sent back and forth, while keeping open the phone call connection. As an example, a customer service representative may provide information from a customer support database (e.g., troubleshooting information for a product) through the activated chat-type channel without requiring the customer to switch to another application, such as email and then a web browser to access the content. In embodiments, the dialer app that receives the call may interact with the recipient through a lockscreen of the recipient's device. In embodiments, the lockscreen may further be shared with the chat-type app; thereby maintaining the phone in a locked state. In embodiments, the chat-type or other interaction-type app may be activated as a service of the dialer app that may share its screen for interfacing with the phone user (optionally a lockscreen of the phone).

In an example of use of configurable link content by a call receiving device, the configurable link may not be accessible to software on the recipient's smart phone, including without limitation the dialer app, unless the encoded call-specific metadata, or at least the caller ID portion thereof, is decoded and validated. Restricting use of the configurable link in this exemplary way may facilitate mitigating the possibility of data breaches or other types of intrusions resulting from use of a configurable link has been compromised or presents an unacceptable risk of being fraudulent. This requirement for validating the call-specific metadata may be enforced by the dialer app and/or by a caller identity validation function that is activated when the web resource (e.g., URL) of the configurable link is accessed. In embodiments, the dialer app or other service of the recipient smart phone may attempt to decode the encoded call-specific metadata. In a public/private key encoding scenario, if using public key information for a call originating service, such as a cell phone network provider, the call-specific metadata cannot be decoded, then the content would be deemed tainted. This may, based on construction and configuration options of such a dialer app, at least prevent access to the URL. In embodiments, the caller identification validation function may, upon activation through accessing a URL in the configurable link, reference the call-specific metadata, perform any required decoding, and validate at least that the caller ID information in the call-specific metadata matches the call originating phone number that may also be contained within the call-specific metadata.

In embodiments, a URL in a configurable link may provide access by a dialer app on a recipient's call receiving smart phone or other call receiving device (e.g., a smart watch, and the like) to a content control resource, such as a web server that facilitates managing content and interactions with a call recipient in the dialer app user interface/recipient device lockscreen.

In embodiments, information provided in the configurable link may indicate that the call originator is a participant in a caller identification authentication platform, such as an SCM platform; thereby signaling that the call originator and/or call originating entity is known to the platform.

In embodiments, information provided in the configurable link may be leveraged to facilitate providing sponsored content, such as advertisements, offers, opportunities for compensation and the like that may be preconfigured or selected to be targeted to recipients through a currently active interface of the dialer app, which optionally may be the lockscreen of the call receiving device.

In embodiments, the functionality associated with handling, decoding, processing and use of call-specific metadata, including without limitation information in a configurable link in the call-specific metadata may optionally be handled by a call receiving service, such as a web server or a server of a business, an alternate application on a smart phone, and the like rather than by the dialer app. A call receiving service, which may be embodied as a call interceptor as described herein, such as in association with the embodiments of FIGS. 54 and 62, may be constructed to execute on the recipient's call receiving device, on a web server, as part of a business system, a firewall appliance, a 5G cell appliance, or other computing device that has access to the Internet and to telephone call networks. In embodiments, such a call interceptor may bypass the dialer app on the recipient's smart phone by communicating with a different app that may have some features comparable to a dialer app (e.g., contact lookup and the like), yet may provide greater functionality, such as immersive interactions (e.g., direct access to audio/video recording capabilities of the phone), rich video rendering (e.g. high resolution multimedia output), alternate modes of human interface (e.g., haptic, tactile, motion-based), integration with lifestyle aspects of a recipient's personal mobile device use environment (e.g., upcoming life events, calendar activity, current user digital activity, social media knowledge) and the like.

In embodiments, a call interceptor-type service may adapt telephone-type connections typically handled by a dialer app of a smart phone to Internet-protocol-based connections between a caller device and a recipient device. This may optionally be enabled by the call interceptor detecting, in a call-specific metadata configurable link of a call placed by the caller, information indicative of the caller being configured to support such a connection. In embodiments, rudimentary examples of such connection-enabled applications may include messaging applications, such as SKYPE™, WHATSAP™ and the like. However, it is envisioned that a call interceptor may facilitate use of applications and application architectures with substantively greater capabilities, such as TEAMS™ and the like.

Through use of enhanced incoming call handling capabilities with, such as variants of caller ID, visual caller ID and the like, including without limitation Sender Controlled Media (SCM) methods and systems, user behavior around an incoming call can be substantively enriched over existing solutions. Incoming call handling may be performed by a call handling function that may optionally be integrated with or into a dialer app of a smart phone. In embodiments, a call handling function may be server-based with appropriate communication to a target recipient device. An initial challenge that the use of SCM methods and systems as described herein overcomes is a lack of providing a target recipient of a call with call-specific contextually relevant information. Using the methods and systems various embodied herein, a target recipient of a call from a business (for example) may be better informed of who the caller is (e.g., what business is making the call) and what the call may be about (e.g., a description or visual indication of the purpose of the call). In addition, these methods and systems may provide the target recipient with a wider array of call handling options and interactive capability to better refine a purpose of a call prior to the user accepting the call. While these features enrich a target recipient's incoming call handling experience, more can be offered in this pre-call period to increase the value of accepting the call to the target recipient. A challenge to businesses attempting to make contact with current or potential customers and third-parties generally is that there is little specific incentive for a target recipient of a call to accept the call. While the methods and systems described herein substantively enrich this experience, tangible incentives that may be available to consumers for other business activities, such as offering in an email invitation to compensate an individual for participating in an on-line survey and the like, do not exist in a call placement scenario.

The methods and systems of Sender Controlled Media (SCM) content management may be enhanced with recipient-targeted call-based incentives. Incentives may be provided prior to the call being accepted to motivate a recipient to accept a call. Incentives may be provided during an active portion of the call to encourage further participation in the call, and at termination of a call, such as compensation for providing feedback on the call experience. A business attempting to talk via a phone call with a potential customer may determine that the value of talking with the potential customer is substantively greater than calls that get rejected without being accepted. In general, it is known that even a little information conveyed in a safe, no pressure environment person-to-person has a greater impact on "conversions" than almost any form of written or visual content. Therefore, incentivizing a target recipient (e.g., through immediate/guaranteed compensation or other forms of incentive) to accept a call and spend a modest amount of time interacting with a business representative may have great value to a business. In an example of incentivizing call answering, a business desiring to sell a product or service, such as timeshare properties, may use the SCM methods and systems to populate a target recipient's incoming call user interface screen with informative content as well as an offer of compensation (e.g., 20 USD) for the recipient accepting the call and talking with the representative for a minimum amount of time, such as 10 minutes. In another example, a pizza shop may make a series of calls to potential customers, offering an incentive for accepting the call, such as a message that conveys the incentive, such as "One free large cheese pizza for the first five users who pick up this call."

In embodiments, execution of such an incentive may be administered by a business system through which the call was originally placed. Optionally execution may be administered through the business representative who interacts with the recipient upon accepting the call. Administration of the incentive presented using the SCM methods and systems described herein may include linking an incentive program with SCM content to be presented to targeted recipients. This may involve configuring SCM content data structure(s) to be used when a call is placed to a target recipient who is a participant of an SCM content management platform, such as a smart phone user who has configured his/her smart phone with a dialer app that includes SCM content rendering and interaction capabilities as described herein. Administering may further include notifying an incentive management system that a recipient has performed at least the act of accepting the call. Recipient compliance with further incentive requirements, such as duration of call, providing compensation delivery instructions, and the like may be aided by use of the SCM content management and rendering capabilities, such as presenting interactive visual content in a dialer app screen during the call, such as a countdown timer that indicates the remaining time required for the call to be active to activate the incentive or a link to a web page or other function where the user can enter compensation delivery information and the like. Other incentive program administration functions, such as facilitating incentive redemption, tracking incentive redemption and the like may be aided with further in-call and post-call visual content rendering. As an example of aiding incentive redemption, a business system administering the incentive program may configure target-recipient specific SCM content data structures that indicate when a recipient has redeemed the incentive and apply those data structures to a follow-up call to the incentive redeemer.

In embodiments, the methods and systems for incentivizing target recipient call-handling behavior described herein may also enable monetizing such call enrichment capabilities. An entity in control of an SCM platform may arrange with a business offering incentives to receive compensation for performing various services associated with using the SCM in the incentive program. As an example of monetizing a target recipient behavior influencing program, such as an incentive program: each incentive-based call that is placed using the SCM platform may accrue a portion of compensation for the platform entity; each incentive-based call that is answered by a target recipient may accrue further compensation; when a recipient completes incentive requirements, such as attending a call for 10 minutes, additional compensation may accrue. Accrued compensation to the platform entity may be aggregated and settled with a business administering the incentive program.

Figure 67:
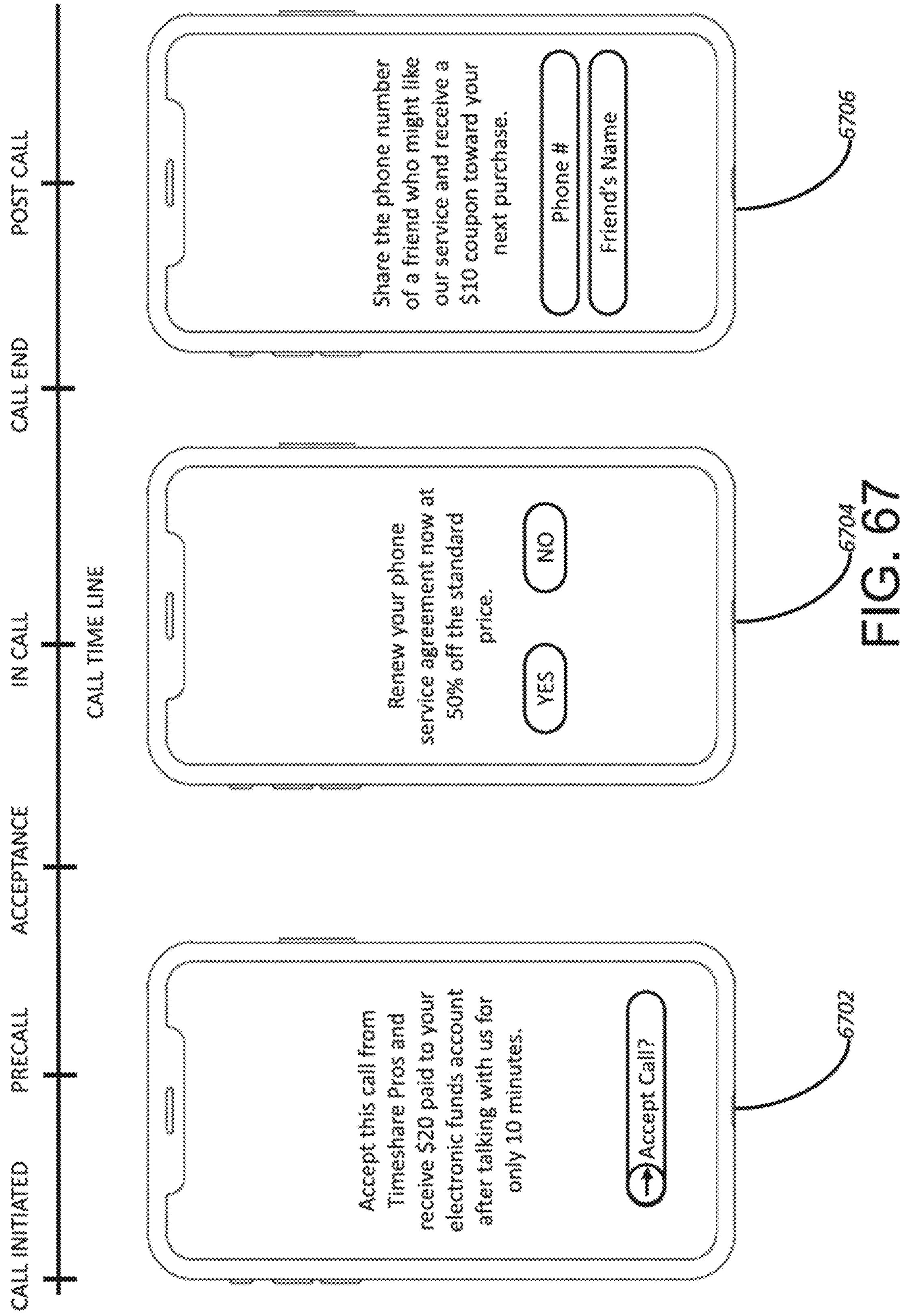
FIG. 67 illustrates pre-call, in-call, and post-call incentivizing examples.

Referring to FIG. 67, embodiments of pre-call, in-call, and post-call incentive offerings using the methods and systems for Sender Controlled Media as described herein are depicted. A pre-call incentive screen 6702 indicates an incentive to a target recipient to accept a call. An in-call incentive screen 6704 indicates an incentive to renew a service agreement for a product being discussed. A post-call incentive screen 6706 indicates an incentive to enter a friend's phone number to be contacted by the business in exchange for the current recipient receiving compensation.

In embodiments, the platform described herein may reward users for performing activities of the platform, such as placing a phone call, receiving a phone call, remaining on a phone call, referring a friend to join the platform, completing a survey, clicking on a link, reviewing content, and the like, including any of a wide range of activities involving the sender-controlled lockscreen content described herein. Rewards may be accumulated and retained in a user reward account that may be managed by modules of the platform. Rewards may be denominated in points, tokens, or the like, including cryptocurrency tokens. The platform may also provide users with services regarding these rewards, such as automatic reward granting, earning chances to gain rewards, redeeming rewards accumulated in the user's reward account, sharing rewards with other users, donating rewards and the like. Activities that may enable a user at least a chance to earn rewards include, without limitation; placing a phone call (e.g., a first phone call of the day, placing a bonus call on a user's birthday, anniversary, election day, and the like); sending a referral link to non-platform user (e.g., a friend) to join the platform and optionally to perform some platform-related task, such as filling out a profile and the like; send a bonus call credit to another user on the platform so that the other use may earn rewards when the other user places a second call of the day; a non-platform user accepting a referral to join the platform (and optionally configure a reward account and the like); setting a custom user profile video or photograph; suggest a photo or video for another platform user (e.g., a friend or frequently called user, and the like); providing an email (e.g., a primary or backup email); completing a survey (e.g., demographics-like content); signing up for an external wallet (e.g., with a platform-approved wallet provider, optionally via a signup link); watching content displayed on the platform user's phone lockscreen; and others as may be offered from time to time.

Rewards may be provided in the form of points. While some platform activities may be rewarded with a predetermined amount of points (e.g., completing a survey may reward the user with 100 points), others (e.g., first call of the day) may be rewarded with a variable amount of points (e.g., ranging from 10 to 5000 points) that may be dynamically determined by a reward engine based on a range of platform context, such as user calling activity and the like so that the reward engine complies with a reward plan of the platform that is explained below. Rewards may be denominated in cryptocurrency tokens, such as Bitcoin™, Ethereum™ or the like, and references to "points" throughout this disclosure should be understood to encompass examples where the points are denominated amounts of tokens. Rewards and other account information for a user may be tracked using a distributed ledger and/or blockchain. Transactions involving collection, transfer, redemption or the like of rewards may be governed by a smart contract.

Figure 68:
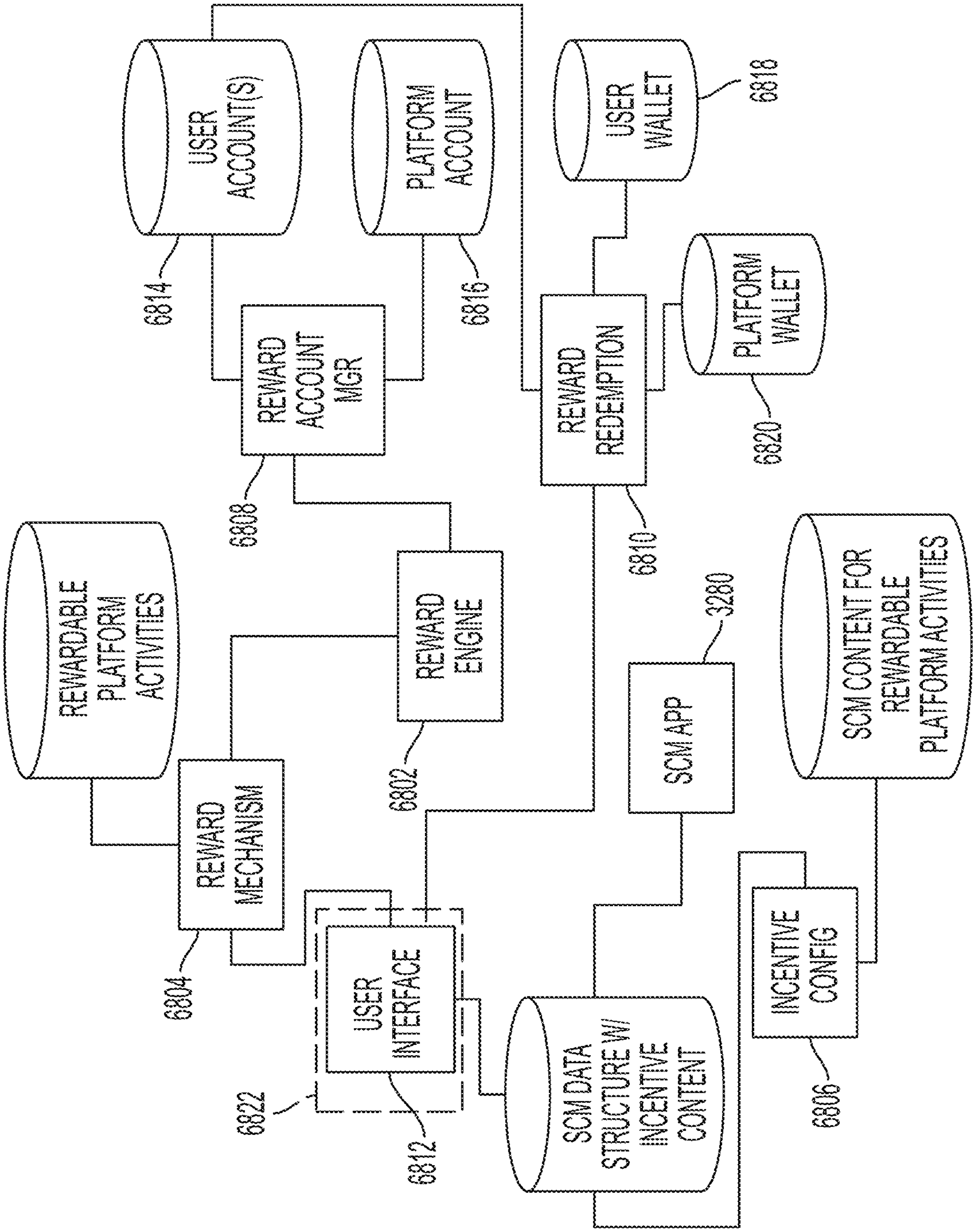
FIG. 68 illustrates a system diagram for incentivizing and rewarding users to perform rewardable platform activities.

Referring to FIG. 68, an SCM platform 6800 may include a reward engine 6802 that calculates an amount of points to be rewarded to a user for performing a platform activity, a reward mechanism module 6804 that handles user requests for a rewardable platform activity, a reward incentive configuration module 6806 that configures SCM content for enabling users to request a rewardable platform activity, a reward account manager 6808 that interfaces with at least the reward engine for accumulating points, a points redemption facility 6810 for facilitating a user redemption of points, user and platform accounts 6814, 6816, and user and platform wallets 6818, and 6820, and various data structures to support operation of these and other system elements. In example embodiments, transactions of points and/or redemptions may be written to a distributed ledger, such as a Blockchain-based distributed ledger.

In example embodiments, the reward engine 6802 performs a probabilistic determination of a reward total based on a range of platform-related factors (e.g., first-call activity of other platform users). Platform-related factors are explored below. A reward total may be calculated to be at least a variable minimum value and no more than a maximum value that may be adjusted based on the platform-related activity. Each reward is calculated so that over a plurality of reward calculations, an average reward total approaches a target average reward total. In example embodiments, an average reward total is based on total rewards during a given reward distribution period, such as a calendar day, and the like. As an example, rewards may be calculated in response to each user's completion of a rewardable platform activity so that over the course of a distribution period, such as a calendar day, the average reward value approaches the target average award. With award totals ranging from 10 to 5000 points, an exemplary target average award may be 25 points.

Calculating a reward total may include considering factors such as a target U.S. dollars (USD) equivalent of aggregated reward totals delivered to platform users since a start time for computing the target equivalency (e.g., a start of the distribution period), such as a calendar day, based on GMT. As the aggregated rewards total approaches the target equivalency, reward amounts may be adjusted downward to stay within an overage tolerance of the target equivalency. The target equivalency may be calculated at the start of each equivalency time frame, such as at the start of each calendar day, which typically may be the start of a distribution period. In an example, if the target USD is $10,000, then based on an exchange rate with a cryptocurrency (e.g., Bitcoin), a reward total equivalency of 1,000,000 points may be set for the distribution period. Cryptocurrency may be one of the redemption options available to a platform user. Calculating a reward total may also consider an estimate of a total number of platform users to activate the reward mechanism during the reward distribution window (e.g., a single day). A higher estimate of user rewardable activity suggests payout average should be lower than a low estimate of user rewardable activity at least because the pool of points available for the distribution period (e.g., based on the reward total equivalency calculation) would be distributed over a larger number of users. Calculating a reward total may also take into consideration preconfigured reward amounts anticipated to be awarded during the distribution window. As an example, if on average 100 users complete a survey in a distribution period, then 10,000 points (at 100 points per completed survey) from the equivalency reward total may be allocated for rewards due to users performing this rewardable platform activity. In example embodiments, preconfigured reward amounts may be calculated at the start of each distribution period, such as the start of each day. Preconfigured reward amount calculation may be based on the exchange rate used to determine reward total equivalency. Other factors that the reward engine 6802 may apply algorithmically to determine a reward total may include, without limitation, a target average reward total, an amount of time left in the distribution period, the hours left in the calendar day, specific user behaviors (e.g., use of the platform-provided dialer app) versus others on the platform, and a type of incentive (e.g., survey, referral, and the like), and the like. Specific behaviors of a user for whom a reward total is being calculated may impact a reward total in at least the following exemplary ways. If a user's behavior indicated the user has much less platform activity, factors that may contribute to a higher reward total may be weighted higher in the calculation. In this case, a minimum reward value may be adjusted so that the minimum reward total for the user may be greater than that of other frequent users. Alternatively, reward totals may be reduced or factors that favor lower reward total may be more highly weighted.

Reward totals may generally be provided in increments, such as 10, 25, 100, 500, 1000, or 5000 points. The reward engine 6802 may apply a reward increment payout factor to each increment so that a predetermined number of each increment can be awarded in a distribution period. For each reward total calculation, a user-specific factor may further adjust the payout factor for each increment. As an example, payout factors for higher amounts may be increased (e.g., weighted more highly when calculating a reward payout) for highly active users performing platform activities (e.g., placing phone calls, etc.).

A distinct distribution period may be (pre)determined for each type of rewardable platform activity. As an example, a calendar day distribution period may be established for a first call of the day rewardable platform activity. A calendar week distribution period may be established for a survey rewardable platform activity. Different distribution periods may also be established for different increments of awards. As an example, a distribution period for a 5000-point reward may cover a duration longer than a calendar day, such as a week, month and the like. The distribution period for a 5000-point reward may remain active until the 5000-point reward is distributed to a user. Other variations of distribution period are contemplated and included herein.

In example embodiments, a reward mechanism module 6804 that handles user requests for a rewardable platform activity may provide a framework for performance of a rewardable platform activity. As an example, for a rewardable profile completion platform activity, the reward mechanism module 6804 may provide user interface 6812 screens (and/or content for rendering in a user interface) to facilitate profile completion, activity tracking functions (e.g., monitor a profile of a user for completion of a set of fields associated with rewarding the user for completing a profile) and the like. The reward mechanism may also provide access to platform services (e.g., configuring referral links and sending messages), activating phone features (e.g., opening a camera app in video capture mode to capture a profile video), and the like. The reward mechanism module 6804 may also provide a variable reward chance-like interface function (e.g., a spinner or the like) through which a user who has completed a rewardable platform activity may take a chance to earn reward points. In example embodiments, a reward total for some rewardable activities may be based on a result of a user-initiated reward chance action, such as activating (e.g., clicking in a user interface) the spinner. This reward mechanism feature of a game-like interface may communicate with the reward engine 6802 to determine which reward total to provide to the user. The reward engine 6802 may indicate to the reward mechanism 6804 which reward increment is to be rewarded and the reward mechanism 6804 may adjust the user interface to reflect the indicated reward increment (e.g., by causing the spinner to land on the indicated reward increment).

In example embodiments, the reward mechanism 6804 may prompt and/or monitor for user performance of each type of rewardable platform activity. In particular, the reward mechanism 6804 may monitor specific actions/status/conditions of the platform to determine user performance of a selected rewardable platform activity. Examples of reward mechanism 6804 functions include monitoring a dialer app of a user's phone for a first outgoing call of the day, monitoring user activity regarding a profile of the user for performing certain activities, (such as adding a profile video), and the like. The reward mechanism 6804 may facilitate presenting and/or monitoring user activity associated with granting of permissions (e.g., permissions to receive incentive for performing rewardable platform activity, permissions to use user-specific data by the platform and/or third-party services), and the like. The reward mechanism 6804 may respond to a user selection of an incentive to gift a variable points reward to a friend by presenting an interface through which the user may identify the friend and effect the gifting. The reward mechanism may configure a second instance associated with the targeted recipient of the gift to monitor for acceptance and use of the gift to enable either or both of the gift giver and the recipient to earn reward points. The reward mechanism may confirm acceptance by the other user of the gift and close out the reward activity for the gift giving user. When a rewardable platform activity that is selected by a user includes opening a third-party wallet, the reward mechanism 6804 may provide a link or an interface, or otherwise facilitate collecting information from the user and interaction with an external wallet provider to create and manage the new wallet account. Referring a non-platform user to join the platform may cause the reward mechanism 6804 to capture relevant information about the non-platform user (e.g., contact info and the like), open a referral rewardable activity for at least the referring user, transmit the referral, monitor for acceptance of the referral (e.g., by monitoring for a platform new user join function activated through a referral link that optionally includes metadata tied to the referral), and signal to the reward engine 6802 at least when the referred user has joined the platform. In example embodiments, the reward mechanism 6804 may facilitate opening a new credit card with a third party and/or linking an external credit card account with a user account of the platform user. In example embodiments, a user interface 6812 through which a user is notified of available rewardable platform activities may include a user interface of a platform dialer/phone app 6822.

A platform user may be notified of rewardable platform activities through one or more user interfaces of the platform and/or through messages, emails, phone calls, voice/video messages, and the like delivered by or on behalf of the platform. In some cases, a portion of content of such a notification may be determined by a SCM data structure (embodiments of which are described herein). The reward incentive configuration module 6806 may configure SCM content for notifying users of rewardable platform activity that is available. SCM content for this purpose may include, without limitation, a selectable displayable element (e.g., an icon, image, text, video, and the like) that may activate a corresponding reward mechanism 6804. SCM content may be configured and delivered to a platform user's phone at the start of each distribution period (generally at the start of a calendar day) that causes the dialer app of the phone, which may optionally be a platform-specific dialer app 6822, to display the rewardable platform activity incentive content. In addition to SCM content being delivered to a platform user's phone, an SCM data structure function executing on the user's phone may manage SCM content generation and use thereof on the user's phone so that recurring rewardable platform activities, such as a first call of the day, may be notified, executed, and retired each day by the phone without requiring that specific SCM content be delivered to the phone each day. Further, the methods and systems for generation and application of SCM data structures described herein may be applied for the purpose of rendering and activating rewardable platform activity incentive content.

For some rewardable platform activities, displayable content of an SCM data structure may be dynamically adapted based on contemporaneous phone activities, state, and/or status. In an example of dynamically adapted incentive content display, a rewardable platform activity of referring a non-platform user to join the platform may involve presenting on a platform user's call-in-progress screen (optionally the phone lockscreen if the phone is locked while the call is in progress) SCM content to invite the other party on the call to join the platform. The dynamic content may include a message that is customized based on call metadata such as by including the other party's name, caller ID, photo, and the like, such as: "Invite Dominique to join our network of platform users for a chance to earn reward points."

The reward account manager 6808 may interface the reward engine 6804 for accumulating points and a points redemption facility 6810 for facilitating a user redemption of points. In example embodiments, the reward engine 6804 may indicate to the reward account manager 6808 a reward points total to accrue for each completed rewardable platform activity. The reward account manager 6808 may perform a database transaction to update a user-specific account 6814 in a platform reward database to reflect the total points rewarded. In example embodiments, the reward accounts manager 6808 may also coordinate reward activity by deducting from a platform-owned points account 6816 of the platform reward database an equivalent total of points that are earned by the user for performing the platform activity. The reward account manager 6808 may, at the start of each distribution period (e.g., at the start of each calendar day), replenish a daily reward points sub-account of the platform-owned points account so that the sub-account holds at least the target equivalency points determined at the start of the distribution period. Points earned by users performing rewardable platform activities throughout the day may be transferred from this sub-account. The rewards account manager 6808 may include interfaces through which a platform user may view and take action on points in the user's reward points account. Account interfaces may include administrative interfaces to manage aspects of account control, such as authorized users, permissions to access the points in the account, automatic redemption triggers, and the like.

In example embodiments, the points redemption facility 6810 for facilitating a user redemption of points may include interfaces and automation capabilities for performing redemption of points. The redemption facility 6810 may provide secure interfaces with external wallet services of the user's preference for transferring points from the user's account to the user's external wallet 6818. Where points are not already denominated as such, transferring points may involve conversion of points to another type of currency, such as a cryptocurrency. In an example, points in a user's account may merely reflect a user's share of a pool of cryptocurrency in a cryptocurrency portion of a wallet 6820 that is maintained/owned by the platform. A transfer of points to a user's external wallet may involve a transfer of a portion of the user's share of the platform cryptocurrency pool to a cryptocurrency portion of the external account. Contemporaneously with this wallet-to-wallet cryptocurrency transfer, a total of points designated in the transfer may be deducted from the user's points account by the rewards account manager 6808. In example embodiments, activities that may not be performed instantaneously, such as those that require manual or other approval, may activate one or more escrow functions. User points being redeemed may be put in to (e.g., assigned to, such as by recording the assignment in a distributed ledger) an escrow state/account until the external wallet confirms the transaction is complete. Likewise, cryptocurrency being transferred from the platform owned wallet to the user's external wallet may be put into an escrow state/account until the transaction is complete. In example embodiments, points and/or cryptocurrency allocated for transfer (e.g., in response to a user redemption) may be aggregated in the one or more escrow accounts for a plurality of users until an event (e.g., a minimum redemption amount is aggregated, a transaction window opens, and the like) occurs that would trigger the aggregated transfers. While this approach may impose a delay from user point-redemption authorization until confirmation of deposit of the converted points into the user's external wallet, it may improve efficiency, reduce security risks, improve platform profitability (e.g., maximize exchange rates or reduce exchange fees, and the like), and the like.

In example embodiments, redemption of points may include conversion to, for example, a cryptocurrency at least, but not limited to, that described above. Redemption may also include conversion to another type of point system, such as a points accrual system associated with retail transactions and the like. A user may designate a third-party point-based account to which redeemed points are to be transferred. The redemption module 6810 may facilitate cross-registration with a third-party points system and assist in transfer and optionally in conversion of points from platform points to third-party points. Examples of third-party points systems that may be targets for redemption include airline points accounts, hotel points accounts, shopping points accounts, dining points accounts, purchase accrual points accounts (e.g., to earn a discount on a future purchase), and the like.

Each of the functional modules of FIG. 68 may interact through computer-to-computer communication including, without limitation, use of Application Programming Interfaces and the like to transfer data, cause a module to perform an action, and the like.

Figure 69:
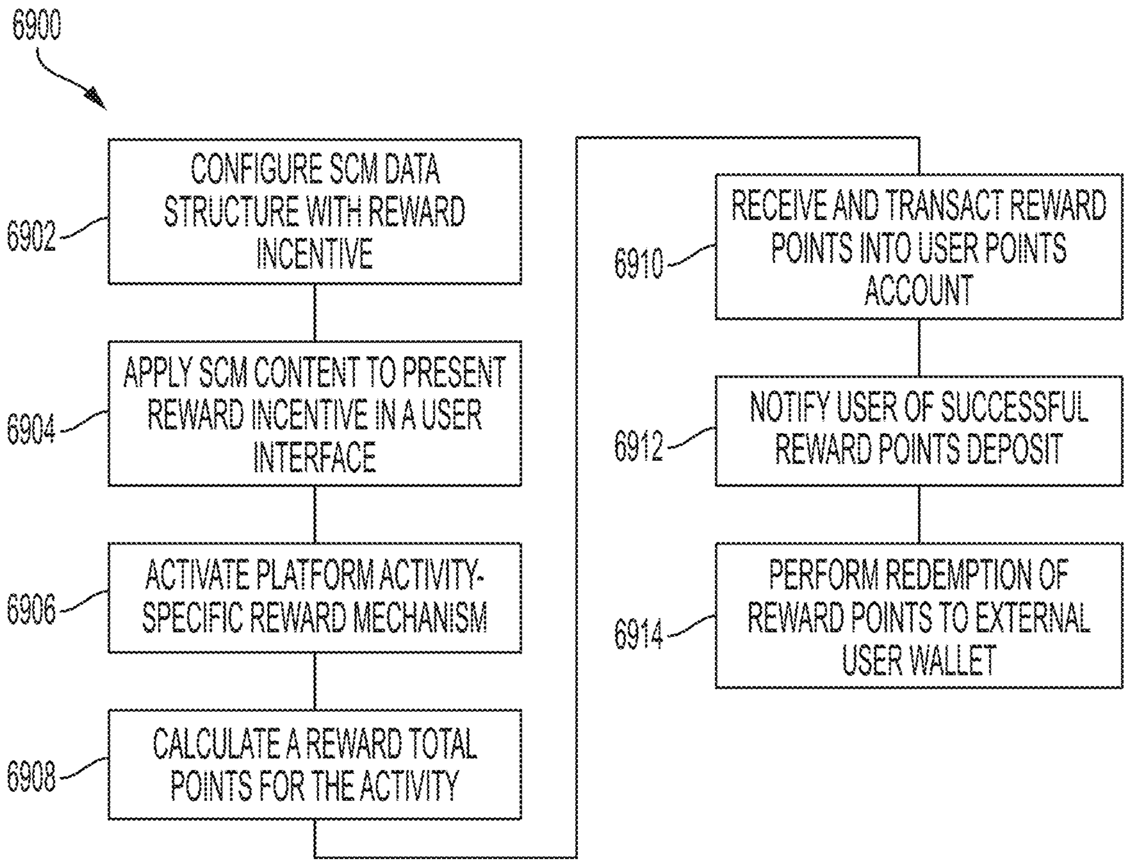
FIG. 69 illustrates a flow diagram of incentivizing and rewarding users for performing rewardable platform activities.

Referring to FIG. 69 that depicts a flow diagram for the methods and systems of rewardable platform activity notification, performance, and reward, a sequence of method steps is depicted. At step 6902, a SCM data structure is configured with content that facilitates notifying a user (e.g., incentivizing the user) of an available rewardable platform activity. Configuring the SCM data structure may include configuring text to be presented in a user interface screen, a visual element (e.g., icon, image and the like) that overlays or otherwise is linked with a selectable element in the user interface screen, a command, instruction or link that activates a redeemable platform action reward mechanism, and optional dynamic content that may change based on user interaction or other conditions (e.g., for the duration of time the visual element is rendered, one or more reward increments may become unavailable in the distribution period). Examples of SCM data structure content and the like are described throughout this specification and may apply to rewardable platform activity notification.

At step 6904, the SCM data structure is applied to a user interface 6812 function of the user's phone, such as a lockscreen, a dialer screen, a call in-progress screen, a unified messaging interface, and the like. The displayable content items may be rendered and monitored for user interaction therewith. In example embodiments, a user interface through which a user is notified of available rewardable platform activities may include a user interface of a platform dialer/phone app 6822.

At step 6906, responsive to a user selection of an incentive offer to perform a rewardable platform activity indicated in the user interface screen, a reward mechanism function is activated. The reward mechanism function facilitates the user performing the rewardable platform action as described above herein.

At step 6908, a reward total is calculated by a reward engine for the user performing the rewardable platform activity. The reward engine, as described above herein may determine, optionally interactively with the reward mechanism function, a reward total of points to be provided to the user responsive to the user completing the rewardable platform activity. The user may be notified, e.g., via the reward mechanism function, of the total reward points granted for the user performing the rewardable platform activity.

At step 6910, a reward account manager service may receive an indication of the reward total to be credited to the user's point account. A corresponding number of points may be deducted from a platform distribution-period sub-account as described herein.

At step 6912, the user may be notified of the successful completion of the points being added to the user's points account and, based on the points available to the user exceeding a redemption minimum threshold, may be offered the option of redeeming the redeemable portion of the user's points account.

At step 6914, responsive to a user requesting redemption, either through redemption offered at step 6912 or via a user interface of the account manager (or optionally through an automated redemption process of the platform), a redemption process may be performed. This process, as described above, may include optional conversion and transfer of points from the user's points account to an external wallet owned and/or designated by the user. In the event that the user's redemption includes conversion of the points to a cryptocurrency, a transaction between the platform's cryptocurrency wallet and the user's wallet may be performed.

In example embodiments, the steps of FIG. 69 may be performed for an environment without being constrained by use of SCM content. In such example embodiments, steps 6902 and 6904 may be replaced by a function of a platform-provided phone dialer/phone app 6822 executing on the user's phone. The platform provided dialer/phone app 6822 may be constructed and/or configured with computing functions that render, for example, an incentive for a rewardable platform activity, such as placing a first call of the day. Other incentive offers for performing a rewardable platform activity, such as referring a friend, completing a survey, staying on a call, receiving a call, engaging with content, clicking a link, creating an account, and the like may also be presented via a user interface of the platform provided dialer/phone app 6822.

In example embodiments, the user interface 6812 may functionally be replaced with a lockscreen function of the phone, such as a native lockscreen function that may receive and render content, including rewardable platform activity incentive content as described herein. Further within and throughout this application, methods and systems for rendering and facilitating user interaction with content rendered in a lockscreen are described and may be applied to the methods and systems of platform user reward notification, performance, rewarding, and redemption.

In example embodiments, an SCM data structure that impacts what is presented on the dialer app screen based on context of the app, such as when the app is opened to provide an incentive to place a first call of the day, when a call is being connected to provide an incentive to perform a rewardable platform activity, when a call is in progress (e.g., with a non-platform user) to refer the party on the call to join the platform as a rewardable platform activity, when a call ends to refer the party on the call that just ended to join the platform as a rewardable platform activity, to deliver an incentive to the other party to perform a rewardable platform activity, and the like. In example embodiments, an SCM data structure for providing incentives to platform users to perform rewardable platform activities may be adapted based on various conditions, including without limitation: starting a new calendar day triggers activation of an SCM with first-call incentive displayable content; responsive to making that first call, the SCM may change the displayable content to an incentive for another rewardable platform activity that no longer includes the first call incentive until the end of the current calendar day. SCM incentive displayable content may change when a platform user opts out of a reward program, so that no future incentive offers are rendered on the display screen. First call reward incentive actionable/displayable content may be adapted from time to time until a user's first call of the day based on, for example, reward mechanism activity, platform-wide reward total activity prior to the user's first call, and the like. In example embodiments, the adapted content may include reward increments that have been rewarded, reward increments that remain to be rewarded, odds of receiving one or more of the remaining reward increments, and the like.

In example embodiments, types of incentives may impact how a reward engine 6802 determines a reward total. In example embodiments, some types of incentives may cause the reward engine 6802 to reward a fixed incentive-type-specific total, a minimum total reward that is different than the default reward total, a conditional reward total that may be dependent on a further action within the platform, such as another user taking an action, such as accepting a referral, and the like. Examples of fixed reward total types of incentives and exemplary fixed reward values may include without limitation: (i) referring a friend incentive type may provide approximately 500 reward points; (ii) accepting a friend-initiated referral may provide approximately 500 reward points; (iii) setting a platform user's profile photo or video may provide approximately 20 reward points; (iv) setting a platform friend's photo or video may provide approximately 20 reward points; (v) conducting a survey may provide approximately 100 reward points; (vi) signing up for a wallet may provide approximately 1000 reward points; (vii) watching content in a dialer app display screen contemporaneously with use of the dialer app (e.g., to place a call) may provide approximately 2 reward points; and (viii) watching content in a messaging app display screen contemporaneously with use of the messaging app (e.g., send a message) may provide approximately 2 reward points.

In addition to the optionally fixed value type incentives, incentives may include phone call-related incentives, such as answering a call. As an example, a business, such as a phone carrier, can incentivize a platform user to answer an incoming call and hear about their new data plan by including a selectable displayable element in an SCM data structure that impacts an incoming call display function on the phone such that a target call recipient selecting the element activates the reward mechanism of the platform by configuring the reward engine 6802 to generate a call acceptance reward. The carrier and/or the platform may adapt the SCM data structure to be personalized based on the target user's specific existing calling plan with the carrier. In another example, a credit card provider may utilize a business system workflow to configure a SCM data structure in a new card promotional calling campaign to provide a selectable displayable element on a target recipient's incoming call screen to activate a corresponding configuration of a reward mechanism that provides a reward total based on acceptance of an incoming call to, for example, listen to why a new card is better (for the target recipient) than an existing card.

Other incentive types include lockscreen-based content review incentives, wherein, for example, an incentive selectable displayable element is presented in a lockscreen. When the element is selected, content (e.g., scrollable or clickable content) may be presented that terminates with an incentive activation element that triggers a corresponding reward mechanism.

Other types of incentives include geo-location and/or geo-fence-based incentives. In example embodiments, when a user enters a store, the lockscreen may be updated with an incentive that may configure the reward mechanism to provide a reward, such as a discount, digital asset, or credit towards a purchase. Walking down an aisle in a store (detected by an aisle-specific geo-fence) may automatically trigger a reward mechanism configured to provide a limited-edition artwork, giveaways, tickets to exclusive events, digital currency, or other Non-fungible Tokens. Walking into a geo-fence of a mall may activate a reward mechanism configured to provide airdrops and giveaways available for visiting various vendors in the mall. Walking to a specific geo-location (optionally a geo-fence) may configure a reward mechanism to automatically provide an answer to a clue to a puzzle or competition that leads to either another milestone or completion of the puzzle or competition.

In example embodiments, other types of incentives may include message notification incentives, such as a message provided by a business with an offer that is valid for a specified period of time. A notification with an incentive-selectable, displayable element may be provided by an app on a users' phone to take an action that causes a digital asset/currency reward type configured reward mechanism to be activated. An airdrop notification from an artist may provide access to an incentive that activates a reward mechanism that provide rewards, such as limited-edition artwork, giveaways, tickets to exclusive events, digital currency, or other Non-fungible Token.

In example embodiments, other types of incentives may include platform user participation in a distributed call center. Rewardable platform activities may include making or taking distributed call center calls. Users may be incentivized to accept a distributed call center call as a rewardable platform activity using the SCM-based incoming call screen content as described herein. In example embodiments, SCM data structure incentive content for accepting may include a link in an incoming call user interface that connects the call and directs the user to a script for taking the call. In example embodiments, an incoming call script may include a static script (optionally selected from a set of static scripts that are based on incoming call context, such as caller ID and the like). An incoming call script may be dynamically adapted, through use of an artificial intelligence system that adapts the script based on customer responses and generally on call content. Users may be incentivized to handle an outgoing call through content displayed on the user's phone screen (e.g., on a lockscreen of the user's phone) that includes a link for activating the incentive. In example embodiments, incentive content may include a link that connects the user's device with an outgoing call of the distributed call center (e.g., based on a business system call campaign program and the like) that prompts the user with a script (static or dynamic as noted above) for performing the rewardable platform activity.

Rewards for performing a rewardable distributed call center platform activity may be fixed (e.g., 100 points), may be based on a profile of the user (e.g., a user who agrees to participate in a distributed call center in exchange for platform rewards may designate a value, and/or a range of reward values), may be dynamically determined based on a range of factors including, without limitation, customer ratings (e.g., customers with whom the user interacts as a platform user performing a distributed call center rewardable platform activity), outcomes of calls, and the like. In example embodiments, ratings of distributed call center users that may be based on customer feedback, outcomes and the like may also be used to determine a reward amount for such a rewardable platform activity.

In addition to use of lockscreens, phone dialer applications, and the like on a mobile phone, a widget (e.g., a mobile phone-specific) may be disposed on a home screen of a platform user's mobile device. The widget may display content that reflects one or more forms of incentive for performing a rewardable platform activity. In example embodiments, a widget (e.g., an icon and the like) may be represented by content that incentivizes the user to place his/her first call of the day to receive a reward. The content presented in the widget may be adjusted based on reward activity of the user, and of other users of the platform. In example embodiments, the widget may display a maximum reward value still available to be rewarded by the platform. A rewardable platform activity widget may be updated with content, including underlying logic and the like that may, when selected (e.g., in a home screen of a mobile device user interface) cause one or more rewardable platform activity screens to be presented from which the user may select for performing a rewardable platform activity.

Figure 70:
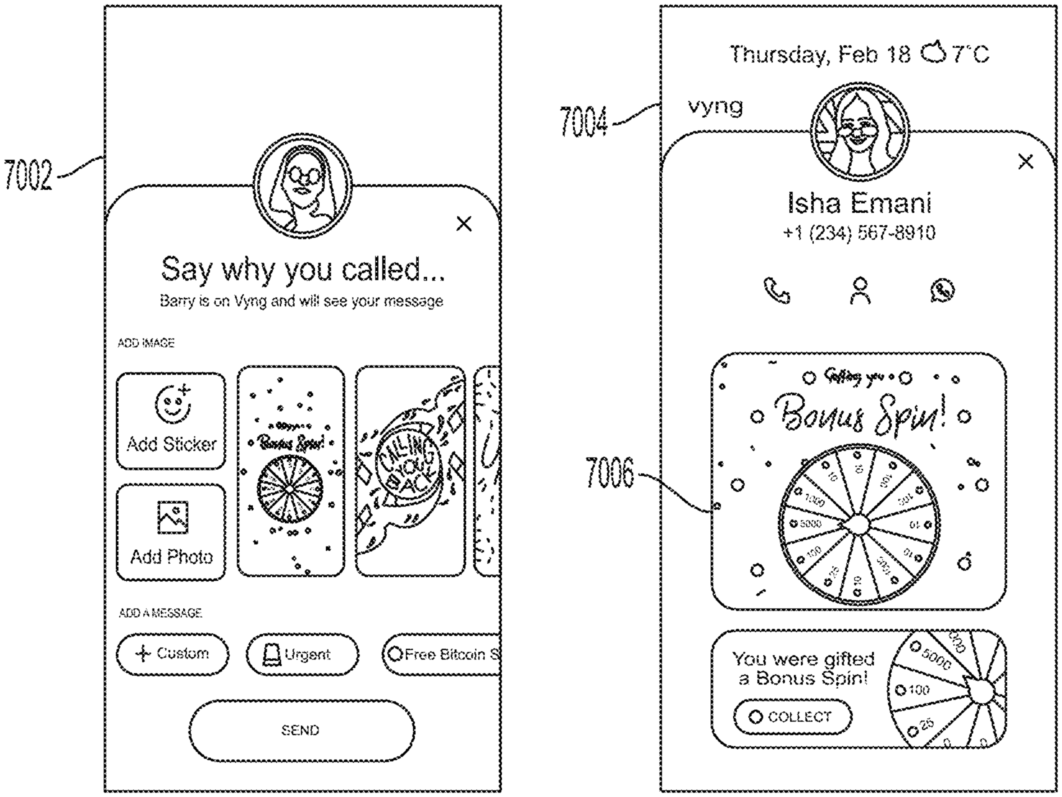
FIG. 70 illustrates reward gifting user interface screens.

Referring to FIG. 70, screen shots for gifting a variable reward to another platform user are depicted. Gifting selection screen 7002 depicts selectable content that can be gifted to another user on the platform including a bonus spin of a rewards point selector. Gift reception screen 7004 depicts selectable content in a user's display screen that includes a gifted bonus spin 7006.

Figure 71:
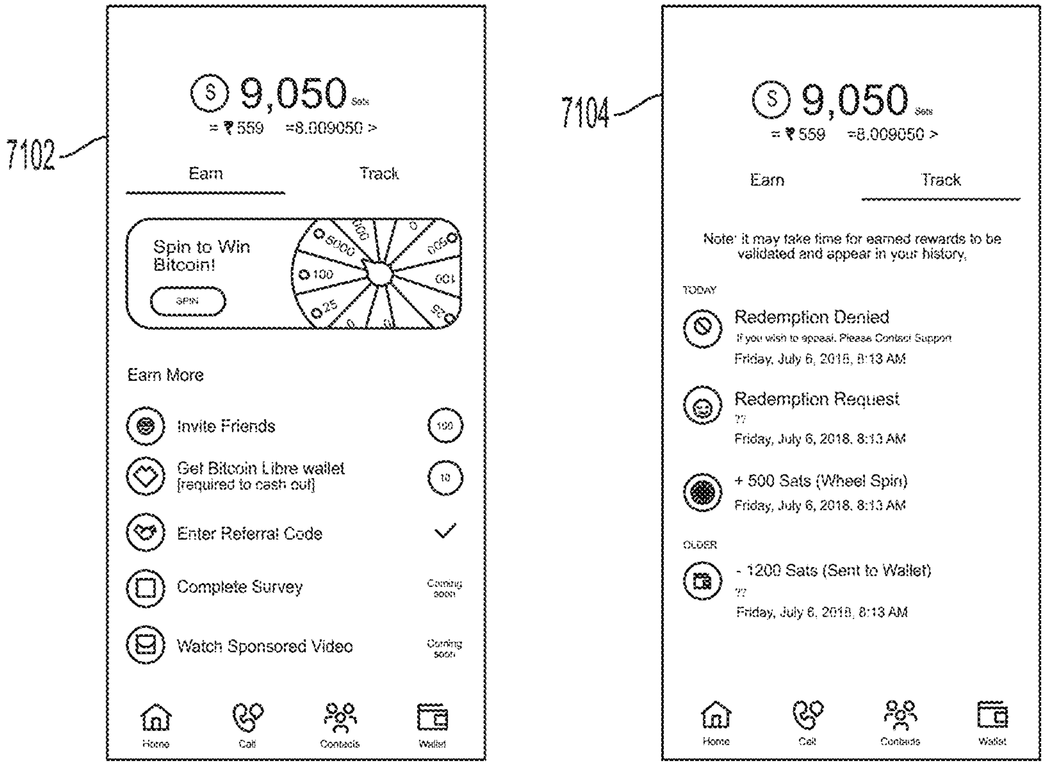
FIG. 71 illustrates incentivizing a user to perform a rewardable platform activity and managing redemption of rewarded points.

Referring to FIG. 71, screen shots for selecting among a plurality of rewardable platform activities 7102 and a redemption status and action screen 7104 are depicted. In example embodiments, a platform user may select among a plurality of available rewardable platform activities as depicted in the screen 7102. In example embodiments, a platform user may view current points account activity as depicted in the screen 7104.

Figure 72:
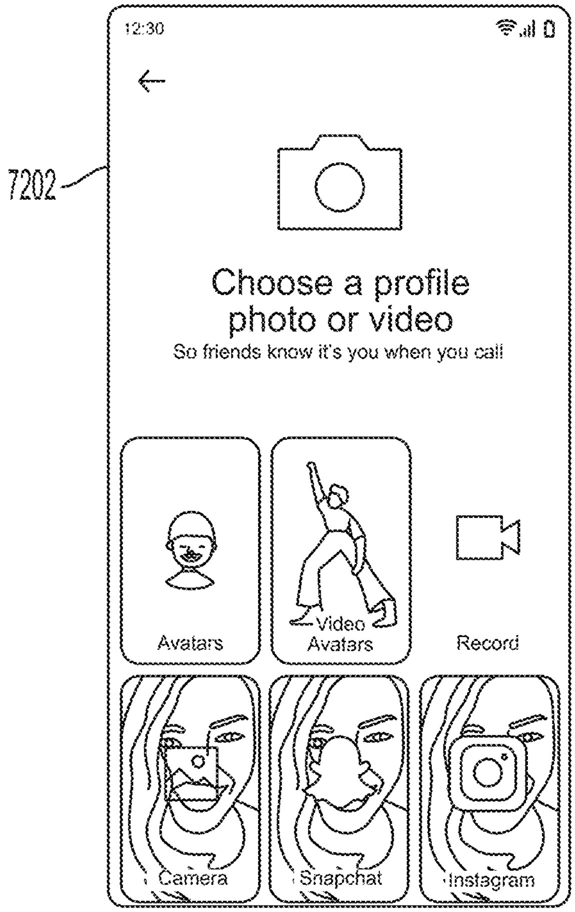
FIG. 72 illustrates a display screen through which a user may perform a rewardable platform activity of selecting a profile photo or video.

Referring to FIG. 72, in response to a platform user selecting an incentive to receive a reward for choosing a profile video or photo, a reward mechanism may present an interface through which the user may select a profile video or photo 7202 to fulfill requirements of performing the rewardable platform activity.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable the execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims unless a different meaning is expressly provided or otherwise clear from the context. So, for example performing the step of X includes any suitable method for causing another party such as a remote user, a remote processing resource (e.g., a server or cloud computing environment) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not to be located within a particular jurisdiction.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. All documents referenced herein are hereby incorporated by reference.

What is claimed is:

1. A method of incentivized rewardable platform activity tracking:

configuring a sender-controlled media (SCM) data structure with interactive displayable content associated with a sender-controlled media (SCM) platform;

providing the interactive displayable content to a user's phone to present the interactive displayable content in a user interface of a lockscreen of the user's phone;

receiving an indication of a user selection of a rewardable platform activity through the user interface of a rewardable platform activity incentive portion of the interactive displayable content;

executing a reward mechanism that monitors user actions within the SCM platform based on a set of requirements of the selected rewardable platform activity; and when a reward point total for the selected rewardable platform activity is a variable amount, performing a reward total determining function that performs a probabilistic determination of a reward total for the selected rewardable platform activity based at least in part on reward point totals rewarded to users of the SCM platform during a reward distribution period of time;

wherein the probabilistic determination produces a reward total that is greater or equal to a variable minimum value not less than zero points so that over a plurality of executions of the probabilistic determination for other platform users, an average reward total over the course of the reward distribution period of time approaches a target average reward total.

2. The method of claim 1, wherein the selectable rewardable platform activity is selected from a list of rewardable activities consisting of a first call of the day activity, completing a survey activity, configuring a profile video activity, configuring a profile photograph activity, referring a friend to join the platform activity, signing up for an external wallet activity, granting permissions to receive promotional content, granting permissions to permit activity tracking, and watching sponsored content.

3. The method of claim 1, wherein the interactive displayable content comprises a link that activates a platform service that is consistent with a rewardable platform activity represented by the interactive displayable content.

4. The method of claim 3, wherein the platform service is a reward mechanism that facilitates a user performing the rewardable platform activity.

5. The method of claim 4, wherein the reward mechanism triggers a reward engine to calculate a reward points total.

6. The method of claim 5, wherein the reward engine performs the probabilistic determination when calculating the rewards points total.

7. The method of claim 1, wherein the probabilistic determination of reward total is based on a target U.S. dollars (USD) equivalent of aggregated reward total points rewarded to platform users since a start time of the distribution period.

8. The method of claim 7, wherein the distribution period includes a calendar day.

9. The method of claim 8, wherein a start time of the distribution period is based on Greenwich Mean Time (GMT).

10. The method of claim 7, wherein the target USD equivalent is based on an exchange rate between USD and a cryptocurrency on which the reward total is based.

11. The method of claim 1, wherein the determination of a reward points total for the user performing the selected rewardable platform activity is based on an estimate of a total number of platform users to activate the reward mechanism during the reward distribution period.

12. The method of claim 1, wherein the determination of a reward points total for the user having performed the selected rewardable platform activity is adapted for the user based on user-specific behaviors on the platform.

13. The method of claim 12, wherein user-specific behaviors that indicate that the user is a frequent user of the platform causes a weighting of higher value reward increments to be more likely to be calculated for rewarding the user.

14. A system comprising:

an incentive configuration module of a call management platform executing on a processor producing a sender-controlled media (SCM) data structure of displayable content associated with a sender-controlled media (SCM) platform;

a reward mechanism module that, when executing on the processor, records and tracks user activity on the SCM platform for performing a rewardable platform activity;

a reward engine that performs a probabilistic determination of reward points associated with the rewardable platform activity based on at least a target average points reward value and the user activity;

a reward account manager that, when executing on the processor adjusts a user points account based on an indication of the probalistic determination of the reward points from the reward engine; and a reward redemption system that, when executing on the processor, handles user requests for redemption by transferring points from a wallet of the user in which the reward manager adjusts user points into an external wallet designated by the user.

15. The system of claim 14, wherein the rewardable platform activity is selected from a list of rewardable activities consisting of a first call of the day activity, completing a survey activity, configuring a profile video activity, configuring a profile photograph activity, referring a friend to join the platform activity, signing up for an external wallet activity, granting permissions to receive promotional content, granting permissions to permit activity tracking, and watching sponsored content.

16. The system of claim 14, wherein the displayable content comprises a link that activates a platform service that is consistent with a rewardable platform activity represented by the displayable content.

17. The method of claim 16, wherein the platform service is an instance of the reward mechanism that is specific to the selected rewardable platform activity and that facilitates a user performing the rewardable platform activity.

18. The method of claim 17, wherein the reward mechanism triggers the reward engine to calculate the reward points total.

19. The method of claim 18, wherein the reward engine performs the probabilistic determination when calculating the rewards points total.

20. The method of claim 14, wherein the reward engine is adapted to determine a reward points total for the user having performed the selected rewardable platform activity based on user-specific behaviors on the platform.

* * * * *